United States Patent
Conti et al.

(10) Patent No.: US 7,934,036 B2
(45) Date of Patent: Apr. 26, 2011

(54) INTERRUPT-RELATED CIRCUITS, SYSTEMS, AND PROCESSES

(75) Inventors: Gregory Conti, Saint Paul (FR); Franck Dahan, Nice (FR)

(73) Assignee: Texas Instruments Incorporated, Dallas, TX (US)

( * ) Notice: Subject to any disclaimer, the term of this patent is extended or adjusted under 35 U.S.C. 154(b) by 235 days.

(21) Appl. No.: 12/100,534

(22) Filed: Apr. 10, 2008

(65) Prior Publication Data

US 2009/0049220 A1    Feb. 19, 2009

(30) Foreign Application Priority Data

May 10, 2007  (EP) .................................. 07290589
Mar. 27, 2008  (EP) .................................. 08290292

(51) Int. Cl.
*G06F 13/24* (2006.01)
(52) U.S. Cl. .......................... 710/261; 710/262
(58) Field of Classification Search .......... 710/260–269, 710/322, 323; 714/34; 718/108
See application file for complete search history.

(56) References Cited

U.S. PATENT DOCUMENTS

| | | | |
|---|---|---|---|
| 5,630,052 A | 5/1997 | Shah | |
| 5,721,922 A | 2/1998 | Dingwall | |
| 5,943,507 A | 8/1999 | Cornish et al. | |
| 5,995,745 A | 11/1999 | Yodaiken | |
| 6,421,754 B1 | 7/2002 | Kau et al. | |
| 6,466,962 B2 | 10/2002 | Bollella | |
| 6,807,595 B2 * | 10/2004 | Khan et al. ............. | 710/260 |
| 6,944,699 B1 * | 9/2005 | Bugnion et al. .......... | 710/269 |
| 7,020,879 B1 | 3/2006 | Nemirovsky et al. | |
| 7,117,284 B2 * | 10/2006 | Watt et al. .............. | 710/261 |
| 7,120,771 B2 * | 10/2006 | Dahan et al. ............ | 711/163 |
| 7,165,134 B1 | 1/2007 | Kardach | |
| 7,237,081 B2 * | 6/2007 | Dahan et al. ............ | 711/163 |
| 7,325,146 B2 | 1/2008 | Nalawadi et al. | |
| 7,730,248 B2 * | 6/2010 | Goss et al. ............... | 710/261 |
| 2003/0005417 A1 | 1/2003 | Gard et al. | |
| 2003/0204655 A1 * | 10/2003 | Schmisseur et al. ...... | 710/260 |
| 2004/0105298 A1 | 6/2004 | Symes | |
| 2004/0153807 A1 * | 8/2004 | Watt et al. .............. | 714/35 |
| 2004/0236879 A1 * | 11/2004 | Croxford et al. ......... | 710/48 |
| 2005/0005072 A1 | 1/2005 | Pruvost et al. | |
| 2005/0005073 A1 | 1/2005 | Pruvost et al. | |
| 2005/0010728 A1 | 1/2005 | Piry et al. | |
| 2005/0081020 A1 | 4/2005 | Volp | |
| 2005/0114616 A1 | 5/2005 | Tune et al. | |
| 2005/0251806 A1 | 11/2005 | Auslander et al. | |

(Continued)

OTHER PUBLICATIONS

Krewell, Kevin "ARM Opens Up to SMP," Microprocessor Report May 24, 2004, pp. 1-4.

(Continued)

*Primary Examiner* — Khanh Dang
(74) *Attorney, Agent, or Firm* — Wade J. Brady, III; Frederick J. Telecky, Jr.

(57) ABSTRACT

An electronic interrupt circuit includes an interrupt-related input line, a security-related status input line, a context-related status input line, and a conversion circuit having plural interrupt-related output lines and selectively operable in response to an interrupt-related signal on said interrupt-related input line depending on an active or inactive status of each of said security-related status input line and said context-related status input line.

15 Claims, 46 Drawing Sheets

U.S. PATENT DOCUMENTS

| | | | |
|---|---|---|---|
| 2007/0150771 A1 | 6/2007 | Penton et al. | |
| 2007/0150780 A1 | 6/2007 | Shimooka | |
| 2007/0226795 A1 | 9/2007 | Conti et al. | |
| 2007/0294496 A1 | 12/2007 | Goss et al. | |
| 2008/0046621 A1* | 2/2008 | Okino et al. | 710/260 |
| 2008/0086769 A1 | 4/2008 | Conti | |
| 2008/0162770 A1* | 7/2008 | Titiano et al. | 710/309 |
| 2008/0163353 A1 | 7/2008 | Conti | |
| 2008/0163358 A1 | 7/2008 | Conti | |
| 2009/0158011 A1* | 6/2009 | Jennings et al. | 712/220 |
| 2010/0122008 A1* | 5/2010 | Goss et al. | 710/264 |

OTHER PUBLICATIONS

ARM, "Cortex (TM)-M3 Revision: r1p1," Technical Reference Manual, pp. 7-3, 7-4, 2005, 2006.

PCT, Written Opinion of the International Searching Authority, mailed Dec. 23, 2008, PCT/US2008/063003.

European Patent Office, European Search Report, dated Dec. 28, 2009, App. Number EP 09 15 5494.

Intel Corporation and NTT DoCoMo, Inc., "Open and Secure Terminal Initiative (OSTI) Architecture Specification," Revision 1.00, Oct. 16, 2006.

* cited by examiner

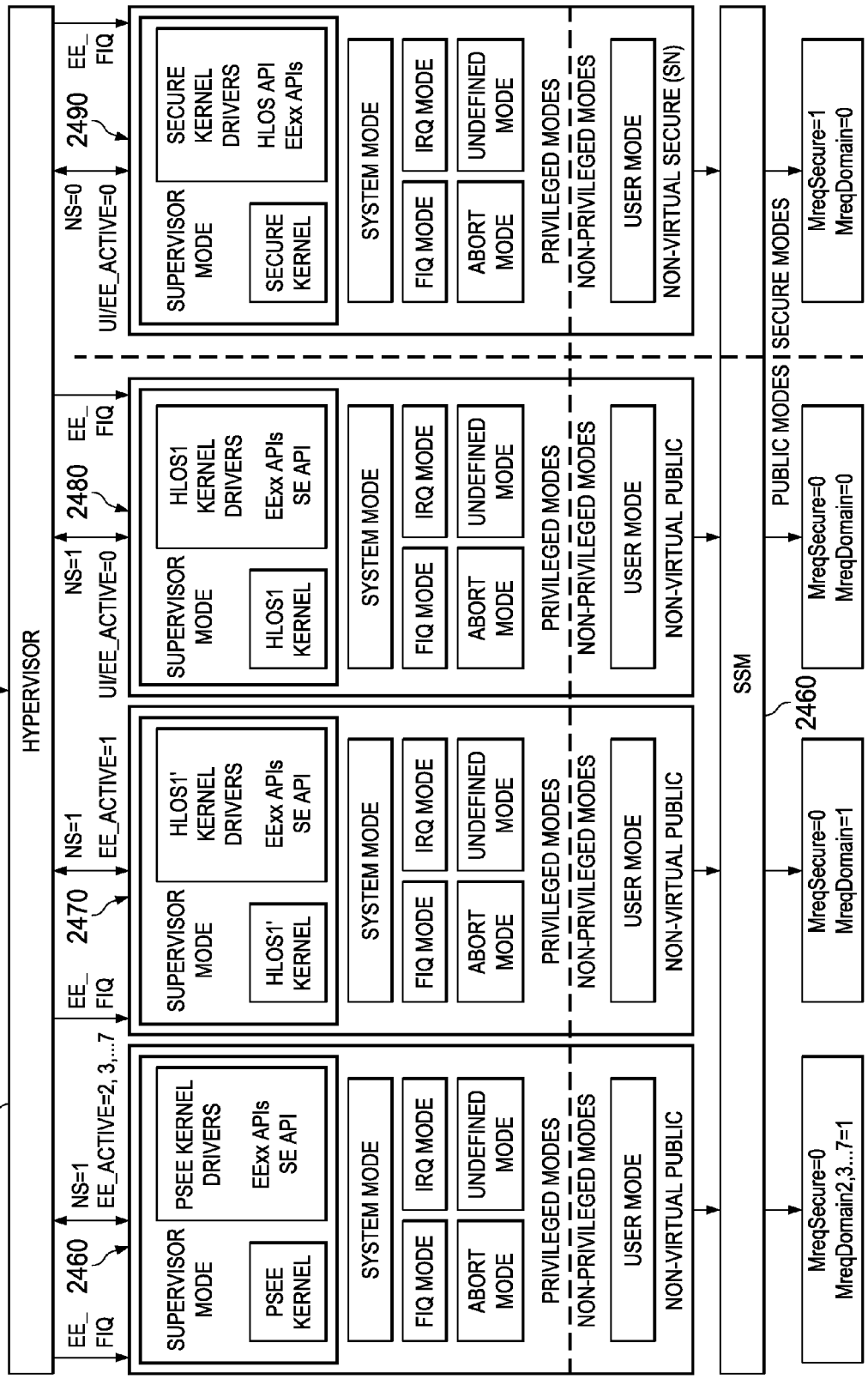

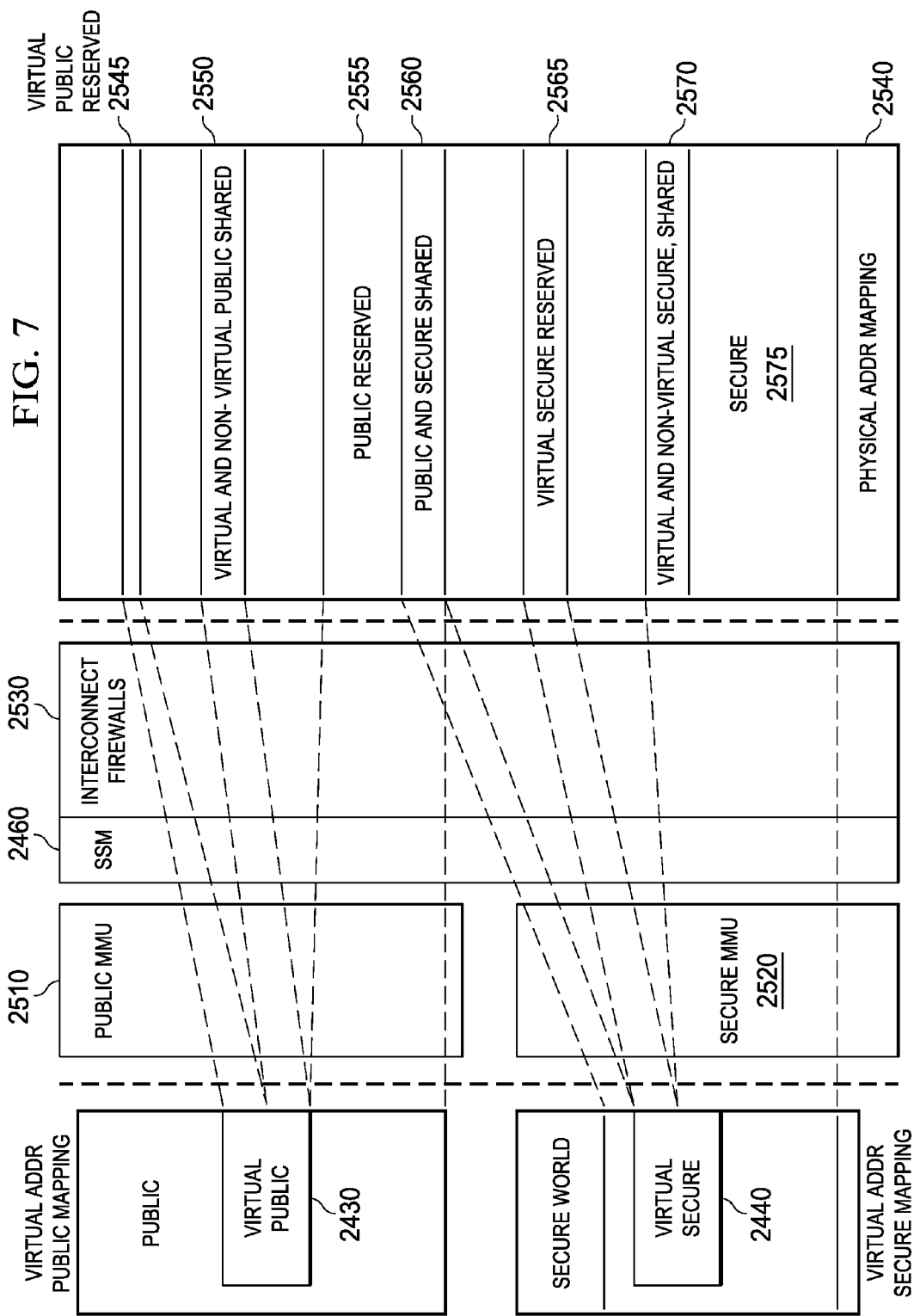

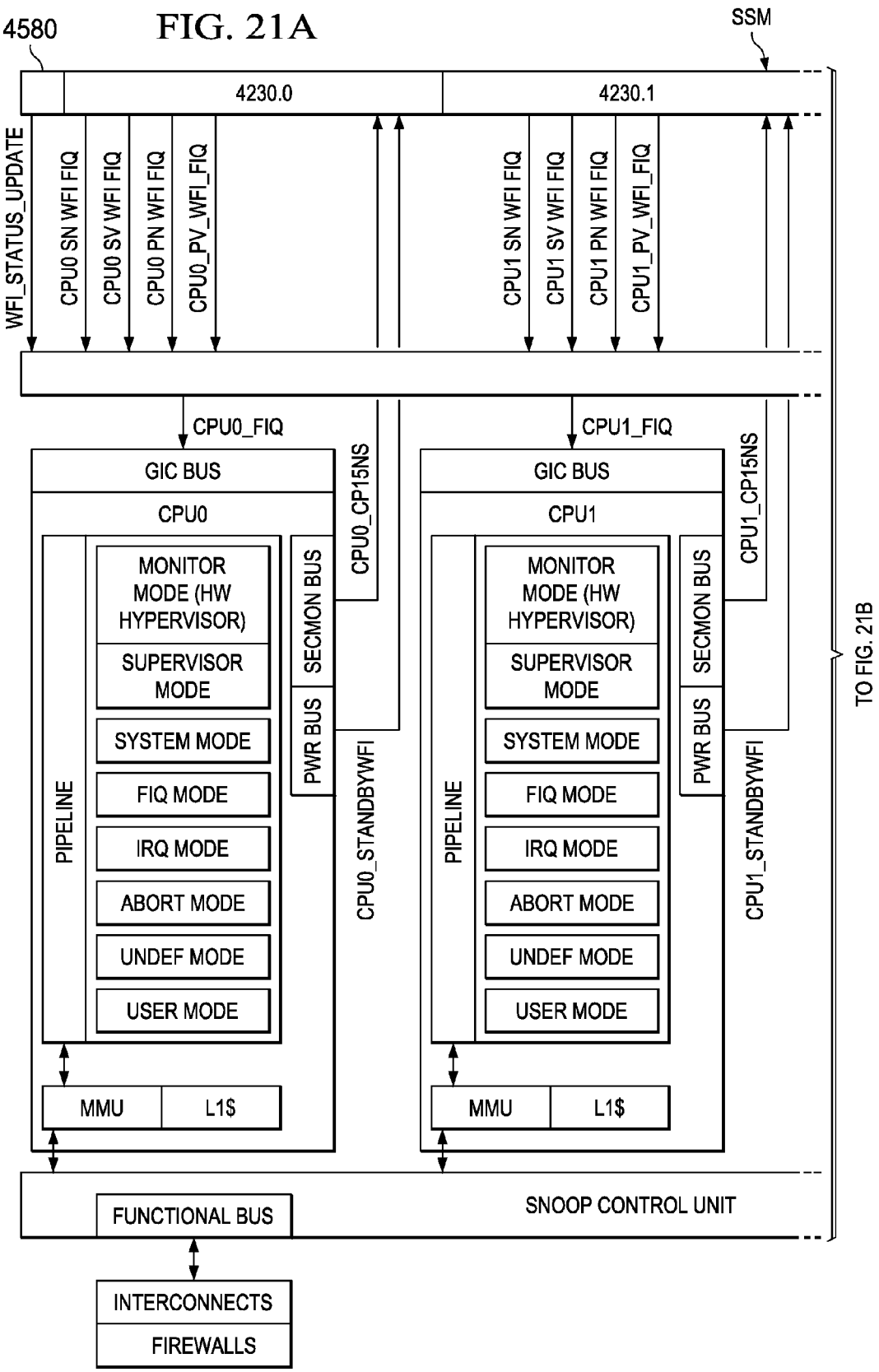

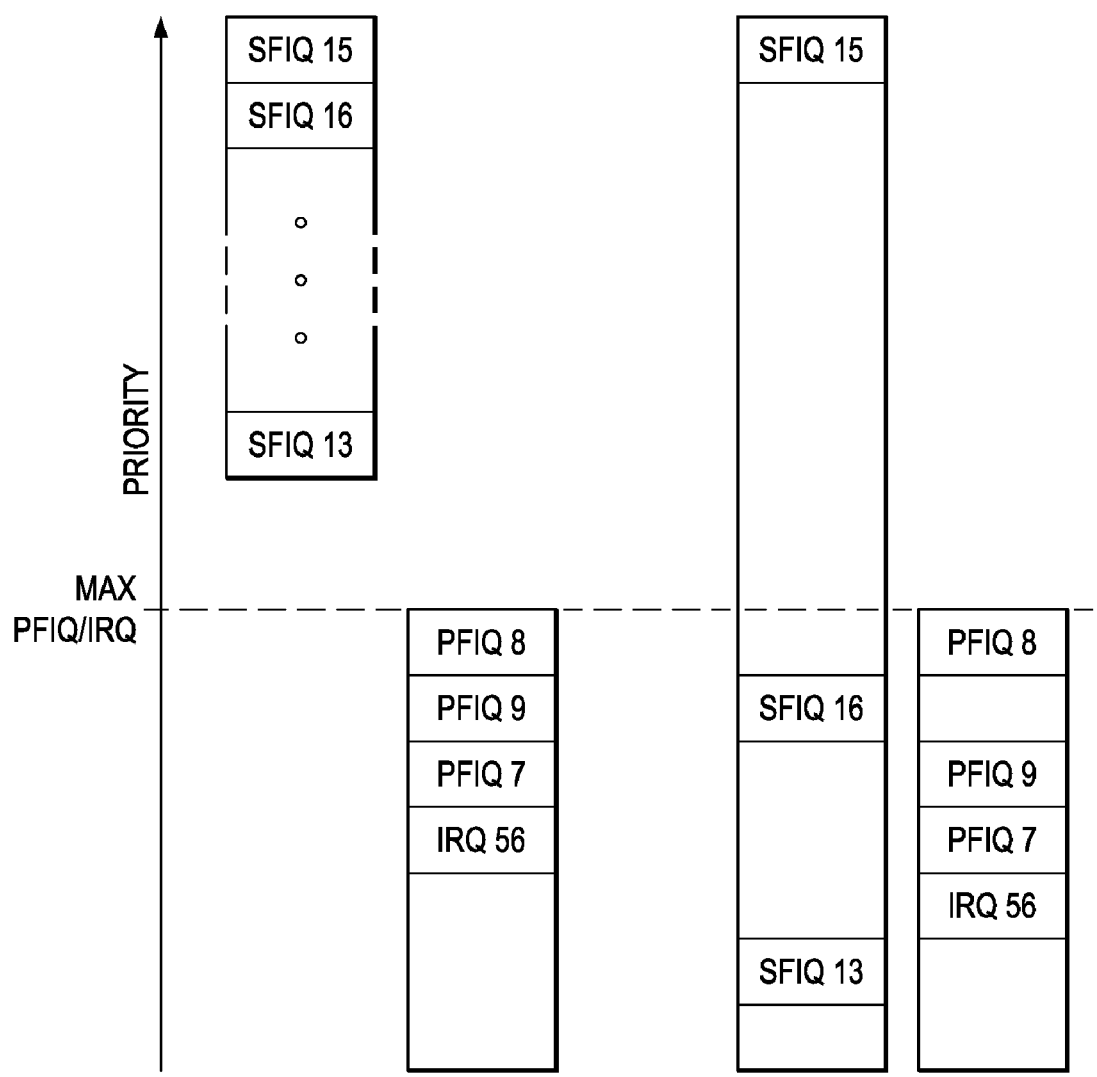

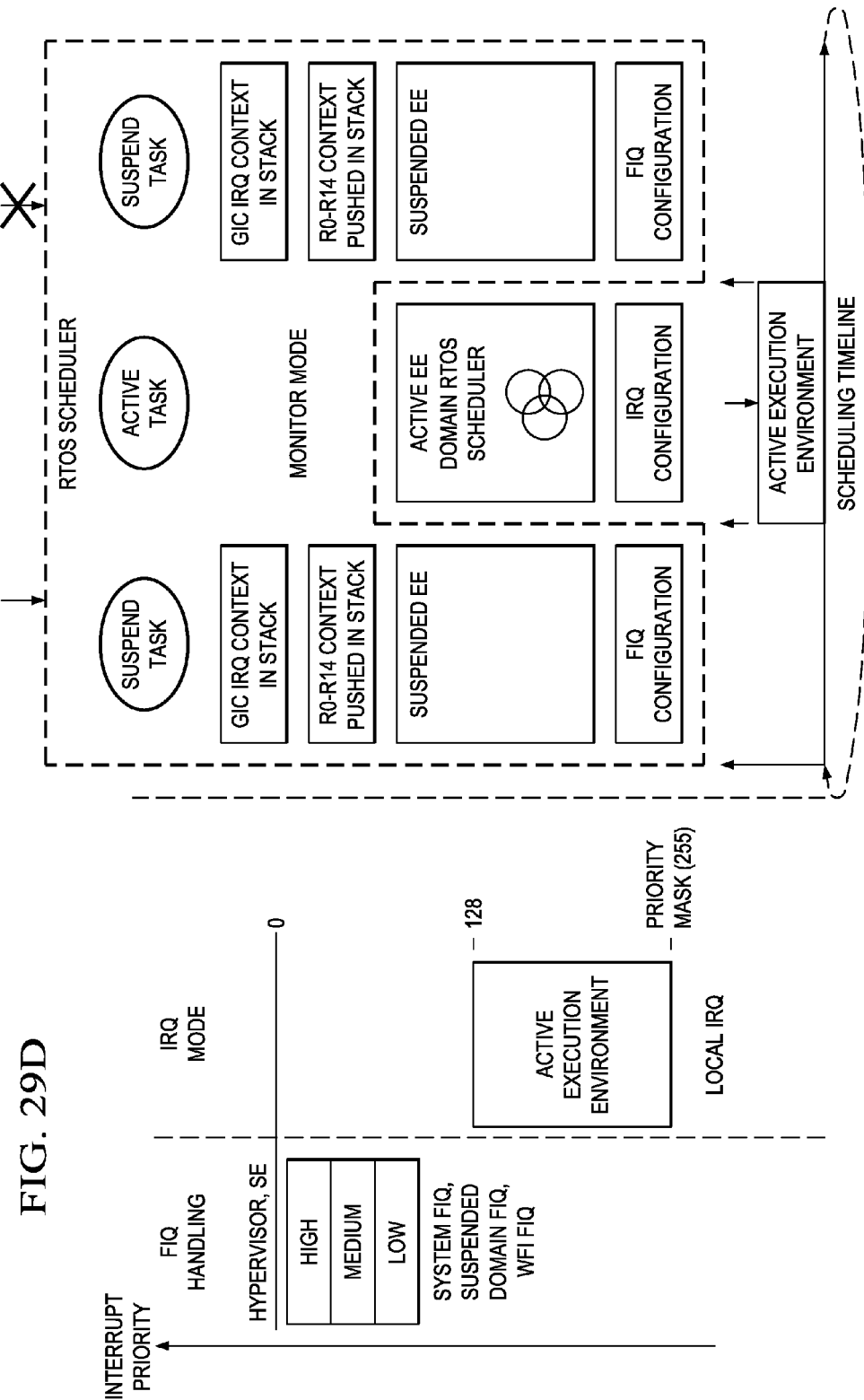

INTERRUPT-RELATED CIRCUITS, SYSTEMS, AND PROCESSES

CROSS-REFERENCE TO RELATED APPLICATIONS

This application is related to "Interrupt scheduling" TI-63816 EP PS European patent application No. 07290589.6/EP07290589 filed May 5, 2007 (May 10, 2007), and Paris Convention priority is claimed under 35 U.S.C. 119 and/or all other applicable law.

This application is related to "Interrupt-Related Circuits, Systems, and Processes," TI-63816/65042 EP PS European patent application No. 08290292.5 EP filed Mar. 27, 2008, and Paris Convention priority is claimed under 35 U.S.C. 119 and/or all other applicable law.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

BACKGROUND OF THE INVENTION

This invention is in the field of electronic computing hardware and software and communications, and is more specifically directed to improved processes, circuits, devices, and systems for information and communication processing purposes, and processes of making them. Without limitation, the background is further described in connection with communications processing.

Wireline and wireless communications, of many types, have gained increasing popularity in recent years. The personal computer with a wireline modem such as DSL (digital subscriber line) modem or cable modem communicates with other computers over networks. The mobile wireless (or "cellular") telephone has become ubiquitous around the world. Mobile telephony handsets can communicate video and digital data, and voice over packet (VoP or VoIP), in addition to cellular voice. Wireless modems, for communicating computer data over a wide area network, using mobile wireless telephone channels and techniques are also available.

Wireless data communication in wireless local area networks (WLAN), such as that operating according to the well-known IEEE 802.11 standard, has become popular in a wide range of installations, ranging from home networks to commercial establishments. Short-range wireless data communication according to the "Bluetooth" technology permits computer peripherals to communicate with a personal computer or workstation within the same room. Numerous other wireless technologies exist and are emerging.

Security techniques are used to improve the security of retail and other business commercial transactions in electronic commerce (e-commerce) and its mobile commerce form (m-commerce), and to improve the security of communications wherever personal and/or commercial privacy is desirable. Security is important in both wireline and wireless communications.

For security reasons, at least some processors provide at least two levels of operating privilege: a first level of privilege for user programs; and a higher level of privilege for use by the operating system. However, the higher level of privilege may or may not provide adequate security for m-commerce and e-commerce, given that this higher level relies on proper operation of operating systems. In order to address security concerns, some mobile equipment manufacturers implement yet another third level of privilege, or secure mode, that places less reliance on operating system programs, and more reliance on hardware-based monitoring and control of the secure mode.

As computer and communications applications with security become larger and more complex, a need has arisen for technology to inexpensively handle large amounts of software program code and the data for highly disparate applications, such as for high performance and fast response given a mix of real-time and non-real-time applications, and run them more or less concurrently in a secure manner in an energy-efficient and power-efficient way.

Processors of various types, including DSP (digital signal processing) chips, RISC (reduced instruction set computing) and/or other integrated circuit devices are important to these systems and applications. Constraining or reducing the cost of manufacture and providing a variety of circuit and system products with performance features for different market segments are important goals in these chips and integrated circuits generally and system-on-a-chip (SOC) design.

Further alternative and advantageous solutions would, accordingly, be desirable in the art.

SUMMARY OF THE INVENTION

Generally and in one form of the invention, an electronic interrupt circuit includes an interrupt-related input line, a security-related status input line, a context-related status input line, and a conversion circuit having plural interrupt output lines and selectively operable in response to an interrupt-related signal on the interrupt-related input line depending on an active or inactive status of each of the security-related status input line and the context-related status input line.

Generally and in another form of the invention, a processing system operable in various execution environments includes plural processor cores having respective interrupt inputs, respective wait for interrupt outputs, and respective security outputs; a register coupled to at least one of the processor cores for identifying active execution environments; a global interrupt handler operable to selectively route interrupts to one or more of the interrupt inputs of the plural processor cores; and a conversion circuit having plural interrupt-related output lines, and the conversion circuit fed with at least some of the respective wait for interrupt outputs and respective security outputs and fed by the register.

Generally and in a further form of the invention, an electronic power management system includes plural processors operable in different security and context-related modes and having respective supply voltage inputs and clock inputs, the processors having at least one interrupt input and at least one wait for interrupt output, a power control circuit operable to configurably adjust supply voltages and clock rates for the supply voltage inputs and clock inputs; and a wait for interrupt expansion circuit responsive to the at least one wait for interrupt output to provide an interrupt signal, at least one of the processors operable to configure the power control circuit in response to the interrupt signal.

Generally, and in still another form of the invention, a processor system with an application and a maintenance function that would interfere with the application if concurrently executed, and includes a set of processor cores operable in different security and context-related modes, the processors having at least one interrupt input and at least one wait for interrupt output, a wait for interrupt expansion circuit responsive to the at least one wait for interrupt output to provide an interrupt signal, at least one of the processor cores operable in response to the interrupt signal to schedule a maintenance function separated in time from execution of the application.

Generally, and in an additional form of the invention an electronic debug circuit includes a scan controller operable for serially providing a multi-bit scan signal at a scan output and receiving a multi-bit scan signal at a scan input; and a conversion circuit having plural interrupt-related output lines, and the conversion circuit having at least one wait for interrupt input and respective security and context-related signal input lines and the conversion circuit is operable to selectively activate a selected one of the plural interrupt-related output lines depending on active or inactive statuses of the security and context-related input lines; and a configurable register circuit to enable and record signal states and the configurable register circuit coupled to the conversion circuit, the configurable register circuit coupled to the scan output and to the scan input of the scan controller.

Generally, another additional form of the invention involves a method of operating an electronic circuit having at least one interruptible processor operable in different security and context-related modes and the electronic circuit having a wait for interrupt output, and the method includes expanding the wait for interrupt output depending on which security and context-related modes of a given processor pertain to a wait for interrupt signal therefrom, and providing at least one interrupt signal.

Generally, in a still further form of the invention, a process of manufacturing an electronic product includes preparing in integrated circuitry form an interrupt-related input line, a security related status input line, a virtual context-related status input line, and a conversion circuit having plural interrupt-related output lines and selectively operable in response to an interrupt-related signal on the interrupt-related input line depending on an active or inactive status of each of the security-related status input line and the context-related status input line.

Generally, in a further additional form of the invention, a memory includes memory circuitry and software stored in the memory circuitry and including at least one interrupt-related instruction specifying an execution environment requesting a service.

Generally, in another further form of the invention, a telecommunications apparatus includes a wireless modem, a processing system coupled to the wireless modem and including plural processor cores operable in various execution environments and each said core having an interrupt input, a wait for interrupt output, and a security output, and the processing system also including a register coupled to at least one of the cores for identifying active execution environments, and a wait for interrupt expansion circuit fed by the register and a said security output and responsive to provide at least one interrupt signal coupled to at least one said interrupt input in response to at least one said wait for interrupt output; and a user interface coupled to the processing system.

Other forms of the invention involving processes of manufacture, processes of operation, circuits, devices, telecommunications products, wireless handsets and systems are disclosed and claimed.

BRIEF DESCRIPTION OF THE DRAWINGS

FIG. 6A is a diagram of another inventive compartmentalized process from a different perspective from that of FIG. 4A and governed by a hypervisor monitor mode, the process responsive to interrupt requests to particular execution environments EE.

FIG. 7 is diagram of address spaces controlled by a Public MMU and a Secure MMU in an inventive system related to FIGS. 4, 4A, 6 and 6A.

FIG. 24 is an interrupt priority diagram for configuring a Generalized Interrupt Handler (GIC) and its process of operation.

FIGS. 29A-29E are successive portions of a time sequence of an inventive process of operation of the structures of the other Figures activating and suspending various execution environments, wherein each of FIGS. 29A-29E represents three operational layers: RTOS scheduler related to monitor mode hypervisor over one or more execution environments EEs or categories, and FIG. 29D has an associated interrupt priority diagram and rotation loop, or other scheduling timeline, wherein IRQ are transformed to FIQ using FIGS. 12A and 13 structures.

Figure 1:
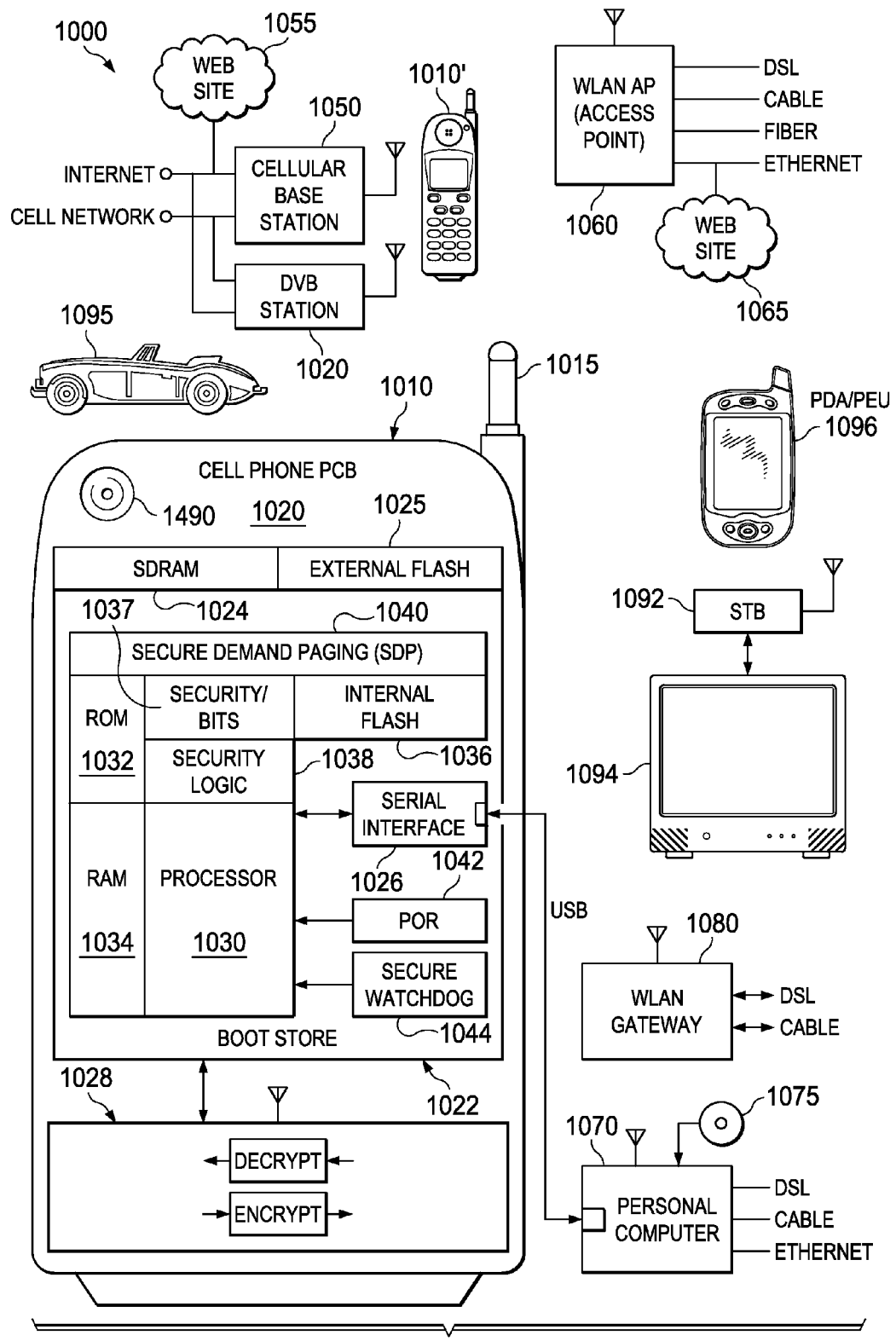
FIG. 1 is a pictorial diagram of a communications system including system blocks, for example a cellular base station, an automotive vehicle, a WLAN AP (wireless local area network access point), a WLAN gateway, a personal computer, a set top box and television unit, and two cellular telephone handsets, any one, some or all of the foregoing improved according to the invention.

Corresponding numerals indicate corresponding parts throughout the Figures of drawing, except where the context indicates otherwise. If a signal name or register field designation is expressed in all caps, title case, or lower case in different places in the drawing and description, the same signal or register field is signified unless the context indicates otherwise. An index such as i, x, y, or xx indicates a particular one or each of a plurality of analogous signals or structures, fields, etc. A pair of brackets "[]"indicates a register bit position. A colon with a pair of brackets "[:]" indicates a plurality of register bit positions.

DETAILED DESCRIPTION OF EMBODIMENTS

U.S. non-provisional patent application TI-61985 "Virtual Cores and Hardware-Supported Hypervisor Integrated Circuits, Systems, Methods and Processes of Manufacture" U.S. Ser. No. 11/671,752 filed Feb. 6, 2007 is hereby incorporated herein by reference.

U.S. non-provisional patent application TI-38800 "System And Method For Checking The Integrity Of Computer Program Code" U.S. Ser. No. 11/463,426, filed Aug. 9, 2006, is hereby incorporated herein by reference.

U.S. non-provisional patent application TI-38213 "Methods, Apparatus, and Systems for Secure Demand Paging and Other Paging Operations for Processor Devices" U.S. Ser. No. 11/426,597 filed Jun. 27, 2006, is hereby incorporated herein by reference.

U.S. non-provisional patent application TI-39617 "Page Processing Circuits, Devices, Methods And Systems For Secure Demand Paging And Other Operations," U.S. Ser. No. 11/426,598 filed Jun. 27, 2006 is hereby incorporated herein by reference.

U.S. non-provisional patent application TI-60478 "Power Management Electronic Circuits, Systems, And Methods And Processes Of Manufacture" U.S. Ser. No. 11/760,263, filed Jun. 8, 2007, is hereby incorporated herein by reference.

In FIG. 1, an improved communications system 1000 has system blocks as described next and improved with any one, some or all of the circuits and subsystems shown in various Figures of the drawing. Any or all of the system blocks, such as cellular mobile telephone and data handsets 1010 and 1010', a cellular (telephony and data) base station 1050, a WLAN AP (wireless local area network access point, IEEE 802.11 or otherwise) 1060, a Voice over WLAN Gateway 1080 with user voice over packet telephone 1085 (not shown), and a voice enabled personal computer (PC) 1070 with another user voice over packet telephone (not shown), communicate with each other in communications system 1000. Each of the system blocks 1010, 1010', 1050, 1060, 1070, 1080 are provided with one or more PHY physical layer blocks and interfaces as selected by the skilled worker in various products, for DSL (digital subscriber line broadband over twisted pair copper infrastructure), cable (DOCSIS and other forms of coaxial cable broadband communications), premises power wiring, fiber (fiber optic cable to premises), and Ethernet wideband network. Cellular base station 1050 two-way communicates with the handsets 1010, 1010', with the Internet, with cellular communications networks and with PSTN (public switched telephone network).

In this way, advanced networking capability for services, software, and content, such as cellular telephony and data, audio, music, voice, video, e-mail, gaming, security, e-commerce, m-commerce, file transfer and other data services, Internet, world wide web browsing, TCP/IP (transmission control protocol/Internet protocol), voice over packet and voice over Internet protocol (VOP/VoIP), and other services accommodates and provides security for secure utilization and entertainment appropriate to the just-listed and other particular applications.

The embodiments, applications and system blocks disclosed herein are suitably implemented in fixed, portable, mobile, automotive, seaborne, and airborne, communications, control, set top box 1092, television 1094 (receiver or two-way TV), and other apparatus. The personal computer (PC) 1070 is suitably implemented in any form factor such as desktop, laptop, palmtop, organizer, mobile phone handset, PDA/PEU personal digital assistant personal entertainment unit 1096, internet appliance, wearable computer, content player, personal area network, or other type.

For example, handset 1010 is improved for selectively determinable functionality, performance, security, energy efficiency, and economy when manufactured. Handset 1010 is interoperable and able to communicate with all other similarly improved and unimproved system blocks of communications system 1000. Camera 1490 provides video pickup for cell phone 1020 to send over the internet to cell phone 1010', personal digital assistant/personal entertainment unit PDA/PEU 1096, TV 1094, automobile 1095 and to a monitor of PC 1070 via any one, some or all of cellular base station 1050, DVB station 1020, WLAN AP 1060, STB 1092, and WLAN gateway 1080. Handset 1010 has a video storage and other storage, such as hard drive, flash drive, high density memory, and/or compact disk (CD) in the handset for digital video recording (DVR) such as for delayed reproduction, transcoding, and retransmission of video to other handsets and other destinations.

On a cell phone printed circuit board (PCB) 1020 in handset 1010, is provided a higher-security processor integrated circuit 1022, an external flash memory 1025 and SDRAM 1024, and a serial interface 1026. Serial interface 1026 is suitably a wireline interface, such as a USB interface connected by a USB line to the personal computer 1070 and magnetic and/or optical media 1075 when the user desires and for reception of software intercommunication and updating of information between the personal computer 1070 (or other originating sources external to the handset 1010) and the handset 1010. Such intercommunication and updating also occur via a processor in the cell phone 1010 itself such as for cellular modem, WLAN, Bluetooth from a website 1055 or 1065, or other circuitry 1028 for wireless or wireline modem processor, digital television and physical layer (PHY).

In FIG. 1, processor integrated circuit 1022 includes at least one processor MPU (or central processing unit CPU) block 1030 coupled to an internal (on-chip read-only memory) ROM 1032, an internal (on-chip random access memory) RAM 1034, and an internal (on-chip) flash memory 1036. A security logic circuit 1038 is coupled to secure-or-general-purpose-identification value (Security/GPI) bits 1037 of a non-volatile one-time alterable Production ID register or array of electronic fuses (E-Fuses). Depending on the Security/GPI bits, boot code residing in ROM 1032 responds differently to a Power-On Reset (POR) circuit 1042 and to a secure watchdog circuit 1044 coupled to processor 1030. A device-unique security key is suitably also provided in the E-fuses or downloaded to other non-volatile, difficult-to-alter parts of the cell phone unit 1010.

The words "internal" and "external" as applied to a circuit or chip respectively refer to being on-chip or off-chip of the applications processor chip 1022. All items are assumed to be internal to an apparatus (such as a handset, base station, access point, gateway, PC, or other apparatus) except where the words "external to" are used with the name of the apparatus, such as "external to the handset."

ROM 1032 provides a boot storage having boot code that is executable in at least one type of boot sequence. One or more of RAM 1034, internal flash 1036, and external flash memory 1025 are also suitably used to supplement ROM 1032 for boot storage purposes.

Figure 2:
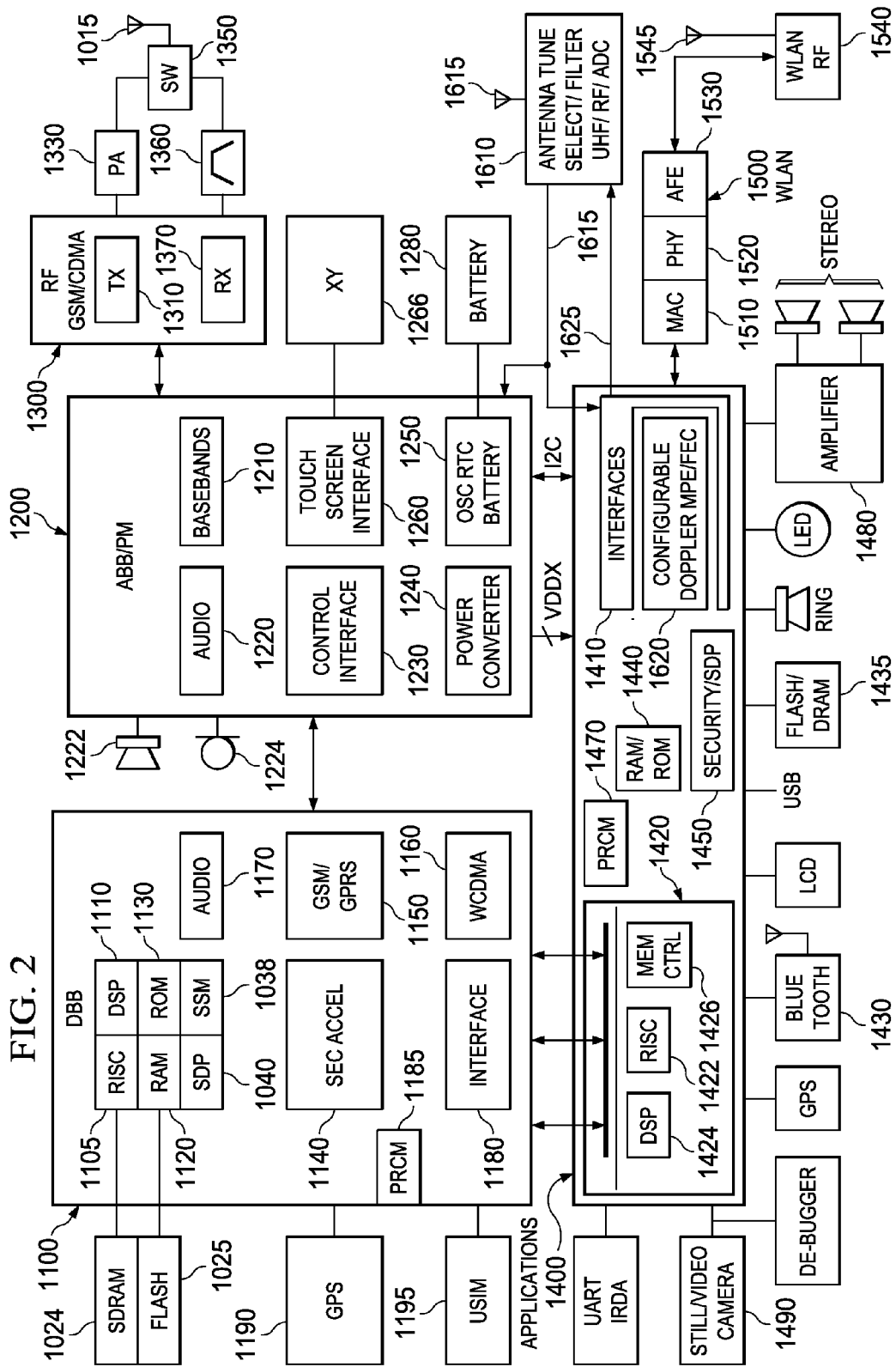
FIG. 2 is a block diagram of inventive integrated circuit chips for use in the blocks of the communications system of FIG. 1.

FIG. 2 illustrates inventive integrated circuits 1100, 1200, 1300, 1400, 1500, 1600 for use in the blocks of the communications system 1000 of FIG. 1. The skilled worker uses and adapts the integrated circuits to the particular parts of the communications system 1000 as appropriate to the functions intended. For conciseness of description, the integrated circuits are described with particular reference to use of all of them in the cellular telephone handsets 1010 and 1010' by way of example.

It is contemplated that the skilled worker uses each of the integrated circuits shown in FIG. 2, or such selection from the complement of blocks therein provided into appropriate other integrated circuit chips, or provided into one single integrated circuit chip, in a manner optimally combined or partitioned between the chips, to the extent useful to support any of the applications supported by the cellular telephone base station 1050, personal computer(s) 1070 equipped with WLAN, WLAN access point 1060 and Voice WLAN gateway 1080, as well as cellular telephones, radios and televisions, Internet audio/video content players, fixed and portable entertainment units, routers, pagers, personal digital assistants (PDA), organizers, scanners, faxes, copiers, household appliances, office appliances, microcontrollers coupled to controlled mechanisms for fixed, mobile, personal, commercial, medical, robotic and/or automotive use, combinations thereof, and other application products now known or hereafter devised for increased, partitioned or selectively determinable advantages.

In FIG. 2, an integrated circuit 1100 includes a digital baseband (DBB) block that has a RISC processor 1105 (such as MIPS core(s), ARM core(s), or other suitable processor) and a digital signal processor 1110 such as from the TMS320C55x™ DSP generation from Texas Instruments Incorporated or other digital signal processor (or DSP core) 1110, communications software and security software for any such processor or core, security accelerators 1140, and a memory controller. Security accelerators block 1140 provide additional computing power such as for hashing and encryption that are accessible, for instance, when the integrated circuit 1100 is operated in a security level enabling the security accelerators block 1140 and affording types of access to the security accelerators depending on the security level and/or security mode. The memory controller interfaces the RISC core 1105 and the DSP core 1110 to Flash memory 1025 and SDRAM 1024 (synchronous dynamic random access memory). On chip RAM 1120 and on-chip ROM 1130 also are accessible to the processors 1110 for providing sequences of software instructions and data thereto. A security logic circuit 1038 of FIGS. 1-3 has a secure state machine (SSM) 2460 to provide hardware monitoring of any tampering with security features. A Secure Demand Paging (SDP) circuit 1040 is provided for effectively-extended secure memory.

Digital circuitry 1150 on integrated circuit 1100 supports and provides wireless interfaces for any one or more of GSM, GPRS, EDGE, UMTS, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, with or without high speed digital data service, via an analog baseband chip 1200 and GSM/CDMA transmit/receive chip 1300. Digital circuitry 1150 includes a ciphering processor CRYPT for GSM ciphering and/or other encryption/decryption purposes. Blocks TPU (Time Processing Unit real-time sequencer), TSP (Time Serial Port), GEA (GPRS Encryption Algorithm block for ciphering at LLC logical link layer), RIF (Radio Interface), and SPI (Serial Port Interface) are included in digital circuitry 1150.

Digital circuitry 1160 provides codec for CDMA (Code Division Multiple Access), CDMA2000, and/or WCDMA (wideband CDMA or UMTS) wireless suitably with HSDPA/HSUPA (High Speed Downlink Packet Access, High Speed Uplink Packet Access) (or 1xEV-DV, 1xEV-DO or 3xEV-DV) data feature via the analog baseband chip 1200 and RF GSM/CDMA chip 1300. Digital circuitry 1160 includes blocks MRC (maximal ratio combiner for multipath symbol combining), ENC (encryption/decryption), RX (downlink receive channel decoding, de-interleaving, viterbi decoding and turbo decoding) and TX (uplink transmit convolutional encoding, turbo encoding, interleaving and channelizing). Blocks for uplink and downlink processes of WCDMA are provided.

Audio/voice block 1170 supports audio and voice functions and interfacing. Speech/voice codec(s) and user voice-recognition/voice control are suitably provided in memory space in audio/voice block 1170 for processing by processor(s) 1110. An applications interface block 1180 couples the digital baseband chip 1100 to an applications processor 1400. Also, a serial interface in block 1180 interfaces from parallel digital busses on chip 1100 to USB (Universal Serial Bus) of PC (personal computer) 1070. The serial interface includes UARTs (universal asynchronous receiver/transmitter circuit) for performing the conversion of data between parallel and serial lines. A power resets and control module 1185 provides power management circuitry for chip 1100. Chip 1100 is coupled to location-determining circuitry 1190 for GPS (Global Positioning System). Chip 1100 is also coupled to a USIM (UMTS Subscriber Identity Module) 1195 or other SIM for user insertion of an identifying plastic card, smart card, or other storage element, and/or circuitry for sensing biometric information to identify the user and activate features.

In FIG. 2, a mixed-signal integrated circuit 1200 includes an analog baseband (ABB) block 1210 for GSM/GPRS/EDGE/UMTS/HSDPA/HSUPA which includes SPI (Serial Port Interface), digital-to-analog/analog-to-digital conversion DAC/ADC block, and RF (radio frequency) Control pertaining to GSM/GPRS/EDGE/UMTS/HSDPA/HSUPA and coupled to RF (GSM etc.) chip 1300. Block 1210 suitably provides an analogous ABB for CDMA wireless and any associated 1xEV-DV, 1xEV-DO or 3xEV-DV data and/or voice with its respective SPI (Serial Port Interface), digital-to-analog conversion DAC/ADC block, and RF Control pertaining to CDMA and coupled to RF (CDMA) chip 1300.

An audio block 1220 has audio I/O (input/output) circuits to a speaker 1222, a microphone 1224, and headphones (not shown). Audio block 1220 has an analog-to-digital converter (ADC) coupled to the voice codec and a stereo DAC (digital to analog converter) for a signal path to the baseband block 1210 including audio/voice block 1170, and with suitable encryption/decryption activated.

A control interface 1230 has a primary host interface (I/F) and a secondary host interface to DBB-related integrated circuit 1100 of FIG. 2 for the respective GSM and CDMA paths. The integrated circuit 1200 is also interfaced to an I2C port of applications processor chip 1400 of FIG. 2. Control interface 1230 is also coupled via circuitry to interfaces in circuits 1250 and the baseband 1210.

A power conversion block 1240 includes buck voltage conversion circuitry for DC-to-DC conversion, and low-dropout (LDO) voltage regulators, as in FIG. 14 described later herein, for power management/sleep mode of respective parts of the chip supplied with voltages VDDx regulated by the LDOs. Power conversion block 1240 provides information to and is responsive to a power control state machine between the power conversion block 1240 and circuits 1250.

Circuits 1250 provide oscillator circuitry for clocking chip 1200. The oscillators have frequencies determined by one or more crystals and are suitably also supported by circuits responsive to a cellular network time base and/or GPS time base. Circuits 1250 include a RTC real time clock (time/date functions), general purpose I/O, a vibrator drive (supplement to cell phone ringing features), and a USB On-The-Go (OTG) transceiver. A touch screen interface 1260 is coupled to a touch screen XY 1266 off-chip for display and control.

Batteries such as a lithium-ion battery 1280 and backup battery provide power to the system and battery data to circuit 1250 on suitably provided lines from the battery pack. When needed, the battery 1280 also receives charging current from a Charge Controller in analog circuit 1250 which includes MADC (Monitoring ADC and analog input multiplexer such as for on-chip charging voltage and current, and battery voltage lines, and off-chip battery voltage, current, temperature) under control of the power control state machine. Battery monitoring is provided by either or both of 1-Wire and/or an interface called HDQ.

In FIG. 2 an RF integrated circuit 1300 includes a GSM/GPRS/EDGE/UMTS/CDMA RF transmitter block 1310 supported by oscillator circuitry with off-chip crystal (not shown). Transmitter block 1310 is fed by baseband block 1210 of chip 1200 and together with the digital baseband hardware in chip 1100 these blocks act as a cellular modem physical layer or PHY. Transmitter block 1310 drives a dual band RF power amplifier (PA) 1330. On-chip voltage regulators maintain appropriate voltage under conditions of varying power usage. Off-chip switchplexer 1350 couples wireless antenna and switch circuitry to both the transmit portion 1310, 1330 and the receive portion next described. Switchplexer 1350 is coupled via band-pass filters 1360 to receiving LNAs (low noise amplifiers) for 850/900 MHz, 1800 MHz, 1900 MHz and other frequency bands as appropriate. Depending on the band in use, the output of LNAs couples to GSM/GPRS/EDGE/UMTS/CDMA demodulator 1370 to produce the I/Q or other outputs thereof (in-phase, quadrature) to the GSM/GPRS/EDGE/UMTS/CDMA baseband block 1210.

Further in FIG. 2, an integrated circuit chip or core 1400 is provided for applications processing and more off-chip peripherals. Chip (or core) 1400 has interface circuit 1410 including a high-speed WLAN 802.11a/b/g/i/n interface coupled to a WLAN chip 1500. Further provided on chip 1400 is an applications processing section 1420 which includes a RISC processor 1422 (such as MIPS core(s), ARM core(s), or other suitable processor), a digital signal processor (DSP) 1424 such as from the TMS320C55X™ DSP generation and/or the TMS320C6X™ DSP generation from Texas Instruments Incorporated or other digital signal processor(s), and a shared memory controller MEM CTRL 1426 with DMA (direct memory access), and a 2D/3D (two/three-dimensional display) graphic accelerator. Speech/voice codec functionality is suitably processed in chip 1400, in chip 1100, or both chips 1400 and 1100.

The RISC processor 1422 and the DSP 1424 in section 1420 have access via an on-chip extended memory interface (EMIF/CF) to off-chip memory resources 1435 including as appropriate, mobile DDR (double data rate) DRAM, and flash memory of any of NAND Flash, NOR Flash, and Compact Flash. On chip 1400, the shared memory controller 1426 in circuitry 1420 interfaces the RISC processor 1422 and the DSP 1424 via an on-chip bus to on-chip memory 1440 with RAM and ROM. A 2D/3D graphic accelerator is coupled to frame buffer internal SRAM (static random access memory) in block 1440. A security block 1450 in security logic 1038 of FIG. 1 includes an SSM analogous to SSM 1038, and includes secure hardware accelerators having security features and provided for secure demand paging 1040 as further described herein and for accelerating encryption and decryption. A random number generator RNG is provided in security block 1450. Among the Hash approaches are SHA-1 (Secured Hashing Algorithm), MD2 and MD5 (Message Digest version #). Among the symmetric approaches are DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard). Among the asymmetric approaches are RSA, DSA, DH, NTRU, and ECC (elliptic curve cryptography). The security features contemplated include any of the foregoing hardware and processes and/or any other known or yet to be devised security and/or hardware and encryption/decryption processes implemented in hardware or software.

Security logic 1038 of FIG. 1 and FIG. 2 (1038, 1450) includes hardware-based protection circuitry, also called security monitoring logic or a secure state machine SSM 2460. Security logic 1038 (1450) is coupled to and monitors busses and other parts of the chip for security violations and protects and isolates the protected areas. Security logic 1038 (1450) makes secure ROM space inaccessible, makes secure RAM and register space inaccessible and establishes other appropriate protections to additionally foster security. In one embodiment such a software jump from Flash memory 1025 (1435) to secure ROM in 1440, for instance, causes a security violation wherein, for example, the security logic 1038 (1450) produces an automatic immediate reset of the chip. In another embodiment, such a jump causes the security monitoring logic 1038, (1450) to produce an error message and a re-vectoring of the jump away from secure ROM. Other security violations suitably respond to attempted access to secure register or secure RAM space.

On-chip peripherals and additional interfaces 1410 include UART data interface and MCSI (Multi-Channel Serial Interface) voice wireless interface for an off-chip IEEE 802.15 (Bluetooth and low and high rate piconet and personal network communications) wireless circuit 1430. Debug messaging and serial interfacing are also available through the UART. A JTAG emulation interface couples to an off-chip emulator Debugger for test and debug. Further in peripherals 1410 are an I2C interface to analog baseband ABB chip 1200, and an interface to applications interface 1180 of integrated circuit chip 1100 having digital baseband DBB.

Interface 1410 includes a MCSI voice interface, a UART interface for controls, and a multi-channel buffered serial port (McBSP) for data. Timers, interrupt controller, and RTC (real time clock) circuitry are provided in chip 1400. Further in peripherals 1410 are a MicroWire (u-wire 4 channel serial port) and multi-channel buffered serial port (McBSP) to Audio codec, a touch-screen controller, and audio amplifier 1480 to stereo speakers.

External audio content and touch screen (in/out) and LCD (liquid crystal display), organic semiconductor display, and DLP™ digital light processor in-phone display or associated DLP™ technology from Texas Instruments Incorporated, are suitably provided in various embodiments and coupled to interface 1410. In vehicular use, the display is suitably any of these types provided in the vehicle, and sound is provided through loudspeakers, headphones or other audio transducers provided in the vehicle. In some vehicles a transparent organic semiconductor display 1095 of FIG. 1 is provided on one or more windows of the vehicle and wirelessly or wireline-coupled to the video feed.

Interface 1410 additionally has an on-chip USB OTG interface that couples to off-chip Host and Client devices. These USB communications are suitably directed outside handset 1010 such as to PC 1070 (personal computer) and/or from PC 1070 to update the handset 1010.

An on-chip UART/IrDA (infrared data) interface in interfaces 1410 couples to off-chip GPS (global positioning system block cooperating with or instead of GPS 1190) and Fast IrDA infrared wireless communications device. An interface provides EMT9 and Camera interfacing to one or more off-chip still cameras or video cameras 1490, and/or to a CMOS sensor or other sensor of radiant energy in the visible and/or non-visible spectrum. Such cameras and other apparatus all have additional processing performed with greater speed and efficiency in the cameras and apparatus and in mobile devices coupled to them with improvements as described herein. Further in FIG. 2, an on-chip LCD controller or DLP™ controller and associated PWL (Pulse-Width Light) block in interfaces 1410 are coupled to a color LCD display or DLP™ display and its LCD light controller off-chip and/or DLP™ digital light processor display.

Further, on-chip interfaces 1410 are respectively provided for off-chip keypad and GPIO (general purpose input/output). On-chip LPG (LED Pulse Generator) and PWT (Pulse-Width Tone) interfaces are respectively provided for off-chip LED and buzzer peripherals. On-chip MMC/SD multimedia and flash interfaces are provided for off-chip MMC Flash card, SD flash card and SDIO peripherals.

In FIG. 2, a WLAN integrated circuit 1500 includes MAC (media access controller) 1510, PHY (physical layer) 1520 and AFE (analog front end) 1530 for use in various WLAN and UMA (Unlicensed Mobile Access) modem applications. PHY 1520 includes blocks for Barker coding, CCK, and OFDM. PHY 1520 receives PHY Clocks from a clock generation block supplied with suitable off-chip host clock. These clocks are compatible with cell phone systems and the host application is suitably a cell phone or any other end-application. AFE 1530 is coupled by receive (Rx), transmit (Tx) and CONTROL lines to WLAN RF circuitry 1540. WLAN RF 1540 includes a 2.4 GHz (and/or 5 GHz) direct conversion transceiver, or otherwise, and power amplifier and has low noise amplifier LNA in the receive path. Bandpass filtering couples WLAN RF 1540 to a WLAN antenna. In MAC 1510, Security circuitry supports any one or more of various encryption/decryption processes such as WEP (Wired Equivalent Privacy), RC4, TKIP, CKIP, WPA, AES (advanced encryption standard), 802.11i and others. Further in WLAN 1500, a processor comprised of an embedded CPU (central processing unit) is connected to internal RAM and ROM and coupled to provide QoS (Quality of Service) IEEE 802.11e operations WME, WSM, and PCF (packet control function). A security block in WLAN 1500 has busing for data in, data out, and controls interconnected with the CPU. Interface hardware and internal RAM in WLAN 1500 couples the CPU with interface 1410 of applications processor integrated circuit 1400 thereby providing an additional wireless interface for the system of FIG. 2.

Still other additional wireless interfaces such as for wideband wireless such as IEEE 802.16 WiMAX mesh networking and other standards are suitably provided and coupled to the applications processor integrated circuit 1400 and other processors in the system. WiMAX mesh networking has MAC and PHY processes and the illustration of blocks 1510 and 1520 for WLAN indicates the relative positions of the MAC and PHY blocks for WiMAX mesh networking.

In FIG. 2, a further digital video integrated circuit 1610 is coupled with a television antenna 1615 (and/or coupling circuitry to share antenna 1015 and/or 1545) to provide television antenna tuning, antenna selection, filtering, RF input stage for recovering video/audio/controls from television transmitter (e.g., DVB station 1020 of FIG. 1). Digital video integrated circuit 1610 in some embodiments has an integrated analog-to-digital converter ADC on-chip, and in some other embodiments feeds analog to ABB chip 1200 for conversion by an ADC on ABB chip 1200. The ADC supplies a digital output to interfaces 1410 of applications processor chip 1400 either directly from chip 1610 or indirectly from chip 1610 via the ADC on ABB chip 1200. Applications processor chip 1400 includes a digital video block 1620 coupled to interface 1410 and having a configurable adjustable shared-memory telecommunications signal processing chain such as Doppler/MPE-FEC. See incorporated patent application TI-62445, "Flexible And Efficient Memory Utilization For High Bandwidth Receivers, Integrated Circuits, Systems, Methods And Processes Of Manufacture" Ser. No. 11/733,831 filed Apr. 11, 2007, which is hereby incorporated herein by reference. A processor on chip 1400 such as RISC processor 1422 and/or DSP 1424 configures, supervises and controls the operations of the digital video block 1620 such as by a line 1625.

TABLE 1 provides a list of some of the abbreviations used in this document.

TABLE 1

GLOSSARY OF SELECTED ABBREVIATIONS

| | |
|---|---|
| ACK | Acknowledge |
| AVS | Adaptive Voltage Scaling |
| BIOS | Basic Input Output System |
| CLK | Clock |
| CM | Clock Manager |
| COPR | Coprocessor (skewed pipe or other auxiliary processor) |
| DFF | D-Flipflop |
| DMA | Direct Memory Access |
| DPLL | Digital Phase Locked Loop |
| DPS | Dynamic Power Switching |
| DSP | Digital Signal Processor |
| DVFS | Dynamic Voltage Frequency Scaling |
| D2D | Device to Device |
| EE | Execution Environment |
| EMI | Energy Management Interface |
| FIFO | First In First Out (queue) |
| FIQ | Fast Interrupt Request |
| FSM | Finite State Machine |
| GFX | Graphics Engine |
| GPMC | General Purpose Memory Controller |
| IMM | Immediate |
| INTC | Interrupt Controller |
| INTH | Interrupt Handler |
| IRQ | Ordinary Interrupt Request |
| IVA | Imaging, Video and Audio processor |
| LDO | Low Drop Out regulator. |
| L1$, L2$ | Level 1, Level 2 Cache |
| LS | Level Shifter |
| MEM | Memory |
| MPU | Microprocessor Unit |
| OCP | Open Core Protocol bus protocol |
| OPP | Operating Performance Point |
| PLL | Phase Lock Loop |
| POR | Power On Reset |
| PRCM | Power Reset and Clock Manager |
| PRM | Power & Reset Manager |
| P1, P2 | Peripheral domain, $1^{st}$ or $2^{nd}$. |
| PSCON | Power State Controller |
| REQ | Request |
| RISC | Reduced Instruction Set Computer |
| ROM | Read Only Memory |
| SDRAM | Synchronous Dynamic Random Access Memory |
| SDRC | SDRAM Refresh Controller |
| SGX | Graphics engine |
| SLM | Static Leakage Management |
| SMPS | Switch Mode Power Supply |
| SMI | System Management Interrupt |
| SMS | SDRAM Memory Scheduler |
| SR | Sensor Error unit |
| SRAM | Static Random Access Memory |
| SSM | Secure State Machine |
| UART | Universal Asynchronous Receiver Transmitter (2-way serial interface) |
| VCON | Voltage Controller |
| VDD | Supply Voltage |
| VP | Voltage Processor |
| VP_ACTIVE | Virtual Processor Active |
| VP1 | Virtual Processor |
| WDT | Watchdog Timer |
| WFI | Wait for Interrupt |
| WKUP | Wakeup |

Further described next are improved circuits, structures and processes and improved systems and devices for use in and with the systems of FIGS. 1 and 2 and all other systems to which their structures and processes commend their use.

In a type of embodiment, a hypervisor is established and can control and differentiate virtually and non-virtually (Non-virtual) both the non-secure and secure worlds. A monitor mode is given hardware structural support called checker circuits or checkers as in incorporated patent application TI-61985 to enable software operation therein as a hypervisor. Security is protected from the public world side because the SSM (secure state machine) and the checkers are used together to establish one or more classifiers or classifier control signals. For example at least one classifier signal MreqDomain specifies virtual mode and non-virtual mode(s), and another classifier signal MreqSecure specifies secure mode and non-secure mode. Classifier signals are used collectively to specify combinations of virtual/non-virtual, secure/non-secure, and other such categories or execution environments EE. The hardware checker checks transactions and interrupts, and different access types. The Monitor mode operates as software on top of the checker hardware.

The hypervisor monitors which secure mode is being used and detects when a switch is happening from virtual mode to Non-virtual mode and insures the integrity of the architecture. Jumping between modes is mediated, controlled and scheduled by the hypervisor as a bridge instead of being permitted directly. Each time operations are to enter virtual mode or to leave virtual mode, or enter/leave an EE, the transition is arranged and structured to go through the Monitor mode as hypervisor under a specific process that is controlled by the SSM 2460 or is defined by SSM.

Added to that, the system has debug capability and trace controlled through SSM, so that blocks and functions that do not exist in the secure zone are put in the SSM outside the processor core. The SSM establishes the function of a secure zone to provide a minimum level of support for a variety of chips.

Some embodiments create virtual processors or EEs using an SSM-secured monitor mode acting as a hypervisor. Such architecture allows running in each of these virtual processors and EEs a complete operating system that is completely independent and isolated from any other operating system running in a different Non-virtual or virtual processor or EE.

For example, in some embodiments a $3^{rd}/4^{th}$ generation (3G/4G) wireless modem Protocol Stack runs under a real time operating system (RTOS) and is desirably isolated from one or more application operating systems. Application processor 1400 desirably executes on the same processor core (CPU, MPU) a real time 3G/4G Modem Protocol Stack (PS) and a Secure Kernel, as well as a High Level Operating System (HLOS) for handling applications. The HLOS need not be a real time operating system.

Establishing an RTOS and modem protocol stack (PS) under a hypervisor and independent of an application operating system like an HLOS, then enhances security and real time operational reliability and stability, and confers tamper-resistance against updating an IMEI number by some other application running under the HLOS.

Application operating systems are often not architected to be real time. Thus, a real-time modem protocol stack PS as in FIG. 3 running independently of a non-real time operating system prevents and obviates latencies and possible crash scenarios. The modem protocol stack memories are given enhanced stability because the modem protocol stack is independent of the application operating system.

The modem protocol stack is made HLOS-agnostic thanks to the monitor mode hypervisor and improved secure state machine (SSM) and checkers while providing strong timing accuracy for a protocol stack interrupt model and providing a hardware-ensured high priority fast interrupt request FIQ. Protocol stack activity benefits from complete hardware isolation from HLOS, for improved security and stability of the protocol stack. The improved interrupt model is agnostic to HLOS behavior and is timing accurate and predictable. High portability with other HLOS means that the same hardware design can be used with different HLOS, thereby reducing costs of designing products.

Even further comprehensive flexibility and control over many EEs is provided by wait-for-interrupt WFI expansion to deliver FIQ from various HLOSs and RTOSs on a per-CPU and per-EE basis as described further herein. IRQ configuration for an active EE is transformed into an FIQ configuration when the EE is suspended, and then transformed back to IRQ configuration when the EE is re-activated. Put another way, interrupt lines allocated to a given EE are transformed from FIQ to IRQ routing configuration when the EE is activated, and then transformed back to FIQ when the EE is suspended.

Secure fast interrupts (Secure FIQ) pre-emptive masking technology is combined herein with the MreqDomain hardware security infrastructure and hypervisor to give real time properties to each virtual processor core, if needed. The Secure FIQ identifies the source of each interrupt by classifier states, e.g., Non-virtual or virtual processor core or EE, and by other classifiers or qualifiers.

A DMA (direct memory access) component supports and is used by one or more of the operating systems. The MreqDomain classifier is added and provided as a qualifier for a DMA transaction issued when the MPU is evolving a virtual processor core in the secure mode.

Some hardware-based embodiments offer simplicity, a high level of security, resistance to software attacks and real time properties through improved interrupt expansion and transformable IRQ/FIQ configurations. Processor core caches and MMU are used efficiently while promoting very fast processing on each switch between EEs. As many virtual processor cores or EEs as needed are implemented in various embodiments. Two or more operating systems suitably co-exist on a given platform.

The Monitor Mode operation is hardware-checked, and Monitor Mode integrity is structured and preserved by physical address checking and virtual address checking coupled with execution status integrity checking and one or more hardware firewalls. Resistance to and prevention of buffer overflow attacks is provided and enhanced. Integrity of the security zone run-time configuration including MMU mapping and exception base vectors is protected. A dynamic hardware firewall protects Secure Privilege modes against buffer overflow attacks. Secure Privilege mode and User mode can fetch in a protectively regulated and structured manner from Secure RAM, Secure ROM and Secure Stacked SDRAM. Various modes are protected against fetching instructions in disallowed memory. Secure RAM and Secure ROM are hardware-protected from disallowed accesses. Secure Stacked SDRAM programmably establishes secure regions for virtual processors.

Inconsistency in MMU configuration is detected by monitoring for an attempt to fetch non-secure code in spaces reserved for secure mode access. Secure Privilege Debug Mode is protected against the Secure User Debug Mode. Virtual Processor modes are created, resource-isolated and MMU mapped. Attempted access by one virtual processor or EE into the stack of another virtual processor or EE is monitored and restricted or prevented.

Figure 3:
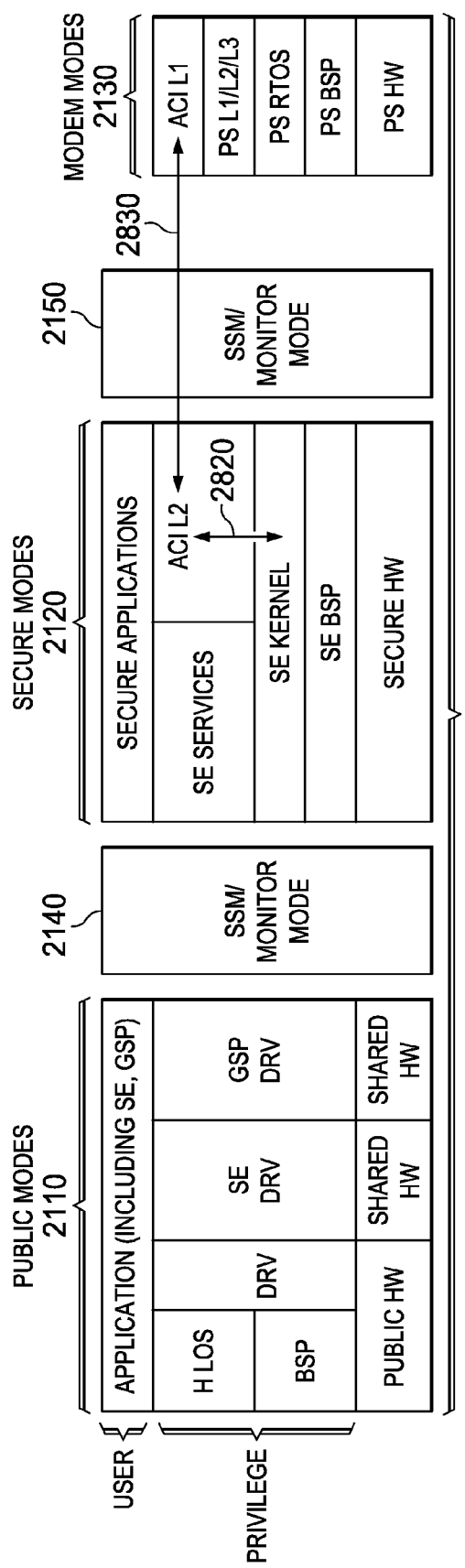
FIG. 3 is a diagram of operational layers and structures for compartmentalizing real-time operations from certain public and secure operations.

In FIG. 3, a first example of hardware-supported hypervisor provides three virtual processors or resources: Public 2110, Secure 2120, and Modem 2130. Switching between each processor is made through a low latency SSM-supported monitor mode structured to act as a hypervisor and shown as two seamlessly-associated protective processing structures 2140 and 2150. Switching between Public resources 2110 and modem resources 2130 is done through the secure processor 2120 exclusively in this example. The Modem processor 2130 and Secure virtual processor 2120 preempt any public activity (IRQ/FIQ) inconsistent with their hardware security requirements, thereby guaranteeing integrity of the RTOS (real time operating system) and modem hardware properties.

In FIG. 3, from left to right, the worlds of the three processors 2110, 2120, 2130 are separated and protected by Monitor Mode hypervisor processes 2140 and 2150. A Public, non-virtual (PN) processor 2110 has applications APP accessible in a non-privileged User mode in the upper layer. These applications are accessible even if they include calls to a secure environment (SE) and/or a modem process GSP. Privilege modes are occupied by a Public HLOS (high level operating system), by a board support package (BSP), and by a secure environment driver, a GSP driver or modem driver and other drivers DRV. Public hardware (HW) and shared Public/secure hardware are accessible in non-secure (public) mode. Public modes such as User mode, as well as Privileged modes can access resources 2110. Supervisor, IRQ, FIQ, Undef Undefined Exception, and Abort mode can access resources 2110.

In the secure resources 2120 of FIG. 3, reside Secure Applications, Secure Environment (SE) Services, SE Kernel, modem commands called AT Command Interface (ACI) Layer 2 (L2) coupled to SE Kernel, SE BSP, and Secure Hardware such as encryption/decryption accelerators and random number generator RNG. Only Secure modes are permitted to access resources 2120. Supervisor/System, FIQ, Undef, Abort, and secure User mode can access resources 2120.

The resources 2130 of FIG. 3 have real-time operations, also called modem modes in a telecommunications context herein. Protocol stack (PS) layers there include modules or entities which are running as OS tasks. These OS tasks communicate using messages via queues. The modem GSP API is used to support and provide the messaging services to the PS and a modem AT Command Interface (ACI) and to abstract from different operating systems that the PS can or might run on. Communication with the application layer is performed in a manner depending on the hardware and operation system arrangements, such as one OS for Apps and PS, or different OS for Apps and PS, and using single processor hardware core or plural processor hardware cores. A secure driver for the PS is used to access IMEI (International Mobile Extended Identification) data and SIMlock (Subscriber Identification Module) data.

The real-time resources 2130 has layers including ACI L1, PS L1/L2/L3, PS RTOS, PS BSP. PS hardware (HW) (such as in integrated circuit 1100 of FIG. 2) supports the layers of resources of resources 2130. Modem command interface ACI L1 is coupled via the Monitor Mode protective interface process 2150 to ACI L2. In the example of FIG. 3, access to the real-time modes is provided for processor modes called Supervisor, FIQ, and Abort.

By contrast with the real-time RTOS and modem in area 2130, for instance, the non-real-time HLOS in area 2110 and its applications need not be scheduled real-time-accurately, and can wait their turn to execute. The non-real-time HLOS and its applications are therefore expected to be negligibly affected or unaffected by introduction of the embodiments taught herein. On the other hand, in a modem in area 2210, if server sync is not done in time, then a server at a wireless base station or a wireline central site can issue a time-out signal and break the communications protocol activity (phone call for example). Then a restart of the communication becomes introduced. At least some of the embodiments herein confront or ameliorate or prevent scenarios wherein the phone user might experience a bad transmission followed by a call interruption or unexpected crash. These undesirable event scenarios might happen if the HLOS were responsible for the modem (unlike FIG. 3) and were to over-schedule multiple applications (display+file system+MMU allocation) at the wrong moment with IRQ and FIQ unmasked and were to miss a modem L1 Protocol Stack interrupt IRQ. Another undesirable situation might involve some non-synchronized timers or non-synchronized peripherals firing concurrently and creating many pending interrupts, and in some interrupt mode of HLOS IRQ/FIQ, the modem interrupts might be undesirably masked. When modem interrupts are masked, an interruption of a non-realtime process that desirably should occur by a modem call does not occur or is not taken in time.

In some embodiments, multiple virtual processors or EEs are used. By context-switching fully on a per-CPU, per-EE basis the MMU and processor registers and the interrupt configuration even outside the processor in interrupt handler and SSM, such embodiment places or accommodates as many different HLOS as desired. MreqDomainx qualifiers are generated when operating in a virtual category or EE in order for system interconnect firewalls to protect memories from other categories. Consequently for a complete and robust security scheme, some embodiments generate qualifiers to identify as many virtual processors as needed (MreqDomain1, MreqDomain2 . . . ). Some other embodiments provide HLOSes in a given single world (i.e., Virtual Public) that have exactly the same level of security where one HLOS cannot impact or is prevented from having any impact security-wise on any other HLOS.

In some other embodiments, the Monitor software code that acts as an hypervisor can configure the interconnect hardware firewalls to deny all accesses to one HLOS physical space while providing full access to other HLOSes when running in the same virtual world (other contexts or EEs as described). The Monitor software code also configures the SSM hardware that supports the Monitor code as hypervisor to define new EE physical and virtual address space boundaries in accordance with this real-time resources protection configuration as well as the full MMU setting.

Multiple non-virtual processors suitably are made to reside inside the same Non-virtual world, e.g. Non-virtual Secure. Corresponding strategy is suitably used for the Non-virtual case as for a virtual category described just above herein. The virtual mode is created with the MreqDomain qualifier to provide strong security isolation between HLOS, RTOS and secure mode at system level. The Secure Virtual category is created or established by symmetry or analogously. There is no limit on how many categories or EEs that are implemented (1) MreqDomain bit or signal supports 4 worlds as in FIG. 4; two (2) MreqDomain bits or signals support 8 worlds, three (3) MreqDomain bits or signals support 16 worlds (8 public, 8 secure)). In multi-core embodiments, see e.g. FIGS. 20-26F, these numbers can be augmented or coded to identify each CPU core (e.g., 1 more for 2 cores, 2 more for 4 cores) and provide an extensive flexibility in establishing and organizing system embodiments herein.

Figure 8:
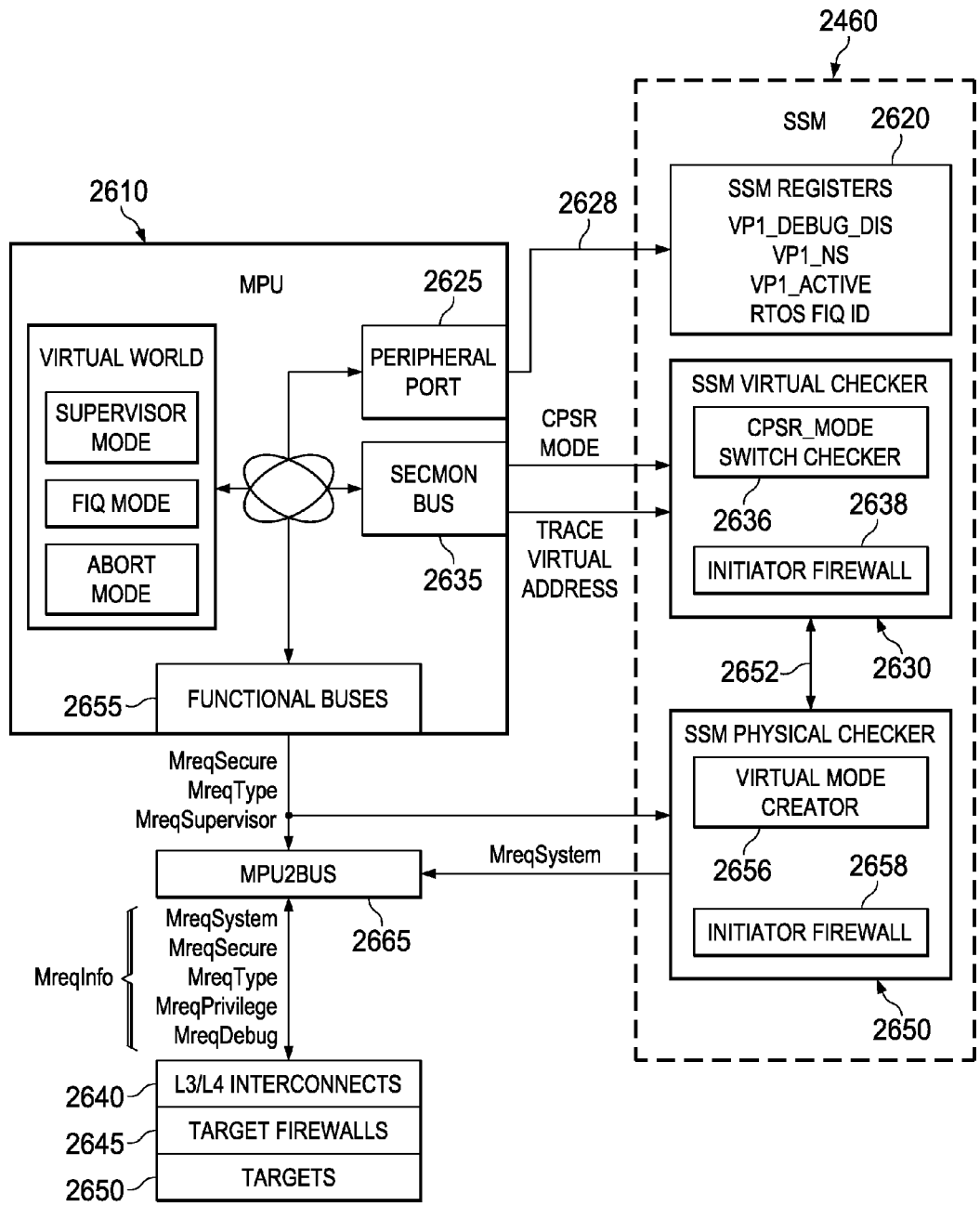
FIG. 8 is a block diagram of a combination of a microprocessor unit (MPU) and target hardware together with and protected by security hardware (SSM) and target firewall circuits.
Figure 12:
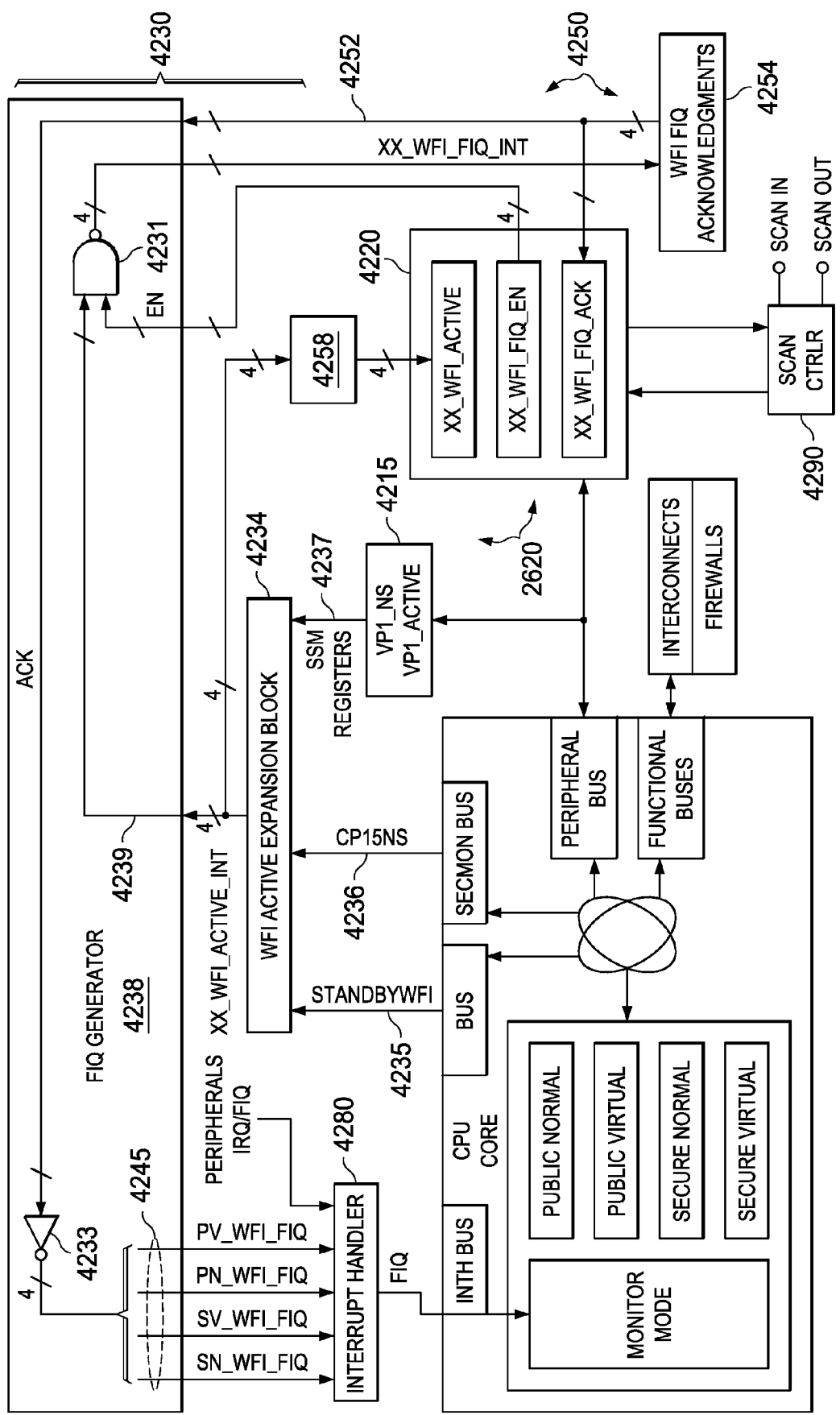
FIG. 12 is a block diagram of an inventive circuit for expanding and converting interrupt related signals such as wait for interrupt (WFI) signals to deliver interrupts to at least one processor on a category specific basis for use in FIG. 6, 11, FIGS. 21A/21B/21C, FIGS. 26A-26F, and other systems.

Refer briefly to FIGS. 12 and 8. In FIG. 12, when in the secure mode, the processor MPU generates a bit CP15_NS=0 for an example on an ARM® core. The SSM herein maintains an SSM register bit designated VP1_NS corresponding to CP15_NS. Any MMU page programming or any transfer retained in cache is marked with an NS qualifier equal to or responsive to CP15_NS. The NS qualifier bit is used thereafter to generate a protection signal HPROT[ ] on a line of a system bus. Using FIG. 8 to supplement FIG. 12, an MPU2BUS interface 2665 creates the actual signal designated MreqSecure=NOT(HPROT[ ]). In other words, the MreqSecure qualifier is the logical complement of the logically equal signals HPROT[ ], NS_qualifier, and CP15_NS.

The SSM 2460 of FIGS. 8 and 12 provides bit fields VP1_NS and VP1_Active. The VP1_Active bit field defines whether operations in FIGS. 3 and 4 are transitioning from Monitor mode to a Non-virtual or Virtual category (VP1_Active), and the VP1_NS bit field concurrently defines whether the transition is going to Secure or Public category and in this way the four categories of FIG. 4 are individually specified.

In FIG. 8, the SSM 2460 is provided with protective circuitry coupled to MPU 2610. The protective circuitry is operable to couple a first qualifier MreqSecure to a system bus via interface 2665. MreqSecure is responsive to a line from MPU 2610 signaling Secure mode. The field VP1_Active is an example of a register field in the protective circuitry that is coupled as a second qualifier MreqSystem (FIG. 8) or MreqDomainx (FIG. 8A) to the bus. For instance, virtual processor VP1 in some embodiments represents whether the processor 2610 is in a particular category (e.g., Public Virtual assigned to a real-time virtual processor such as a modem) or not for a given access. The protective circuitry is responsive to a line from MPU 2610 indicating that the processor is in Monitor mode. The protective circuitry permits alteration of the SSM register field by MPU 2610 in the Monitor mode or Secure Supervisor mode and prevents at least some such alteration when MPU 2610 is in some other mode. In some embodiments Monitor Mode or Secure Supervisor mode access is required for all such alteration and firewalls are also programmed in Monitor mode or Secure Supervisor mode therein.

A Virtual Core or Virtual Processor (VP1) here is comparable with a Virtual Machine Context (VMC) in Secure Demand Paging SDP (see description elsewhere herein and background in incorporated application TI-38213). The virtual machine (VMC of SDP) virtualizes HLOS tasks such as applications in User mode, and this virtualization is applied, if desired, to some kernel services in Supervisor mode. Herein, some information about a virtualized core is or may be ported to establish a Virtual Processor (e.g., VP1 for modem) on MPU 2610. Tht information may include some or all of SDP registers, IRQ/FIQ/ABORT/UNDEF vector and code, MMU mapping, and MPU 2610 core configuration (e.g., register file, debug and other properties) categorized according to category or EE.

Figure 4:
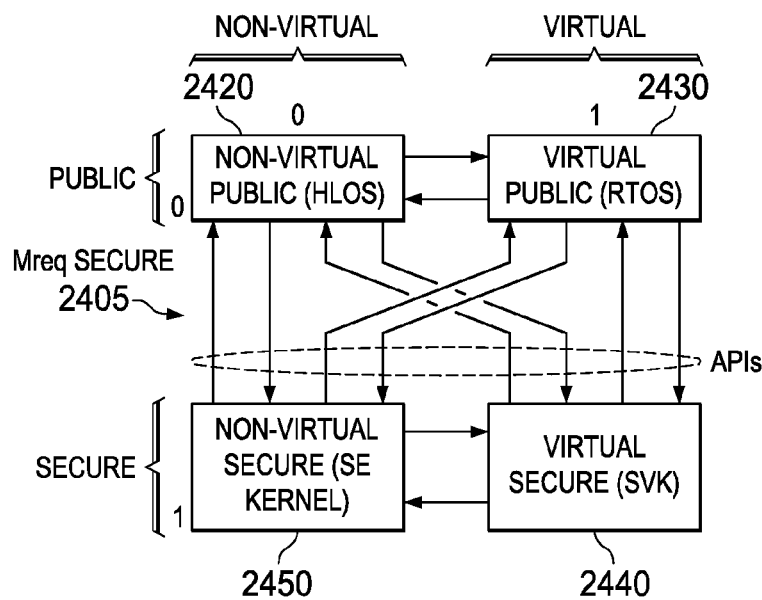
FIG. 4 is a diagram of a compartmentalized process to support the layers and structures of FIG. 3.
Figure 4A:
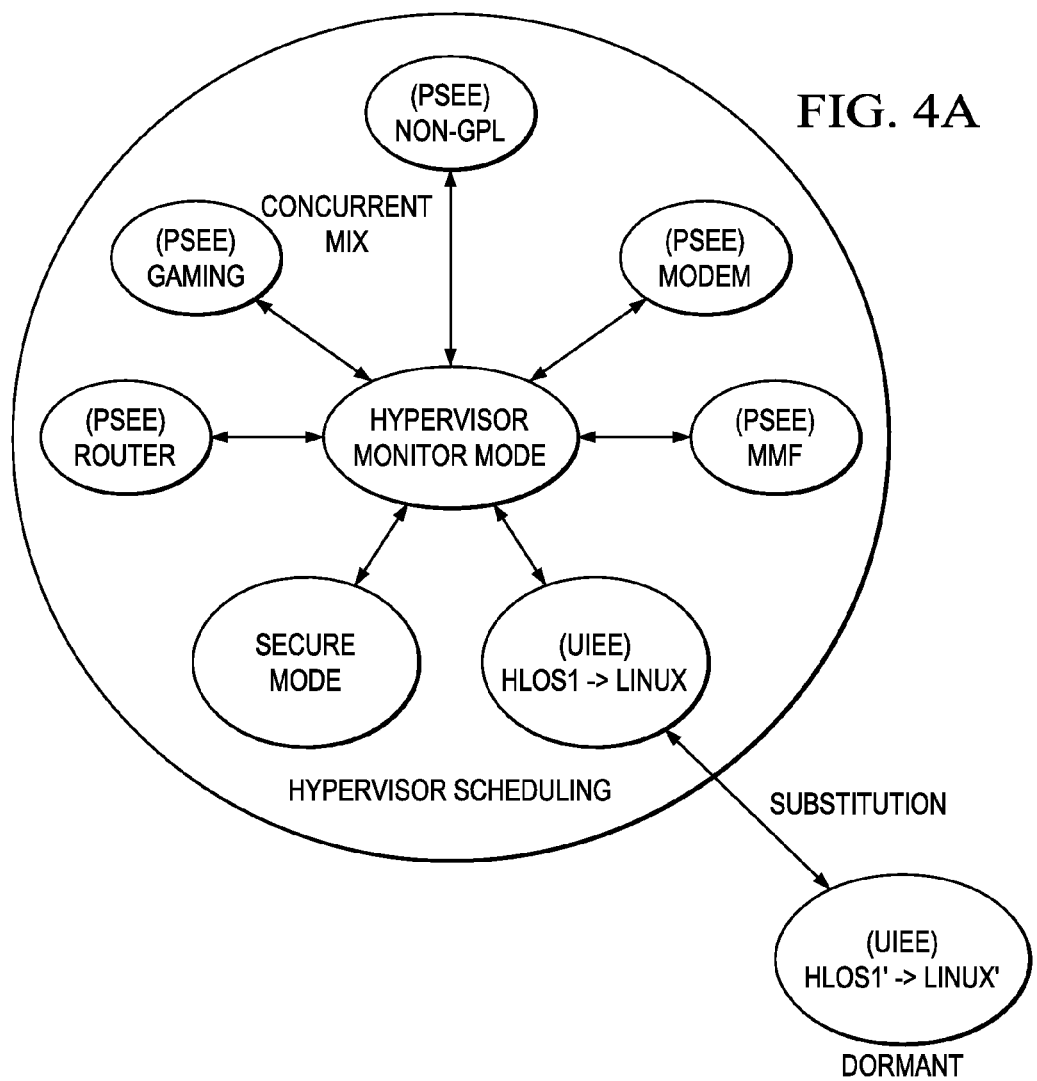
FIG. 4A is a diagram of another inventive compartmentalized process to support the layers and structures of FIG. 3.

In FIGS. 4 and 4A, the Hypervisor differentiates categories of operation using MreqSystem or MreqDomainx qualifiers along with MreqSecure to identify in which world operations are running and thereby protect data and code in any category of FIG. 4 or FIG. 4A from other categories using interconnect firewalls. The Hypervisor effectively controls MreqSystem or MreqDomainx through register field VP1_Active and provides a virtualization of a real-time DSP application applied to the MPU 2610 itself. This keeps track of DSP-level functions in the system and/or achieves a higher level of virtualization that extends to the core or processor level, as the teachings herein make possible.

Signals MreqModem and MreqSystem (or MreqDomainx) along with MReqSecure, act as qualifiers to identify a given category or EE at DMA level and interconnect level, and have somewhat distinctive meanings in various embodiments. Let a first embodiment have a DSP (digital signal processor) separate from the MPU 2610 operating as a modem engine. The SSM hardware and interface 2665 then generate a signal MreqModem active to accompany attempted accesses by this modem engine DSP core. In a second embodiment, suppose the DSP core is absent and the modem engine is established as software on the MPU 2610 which in some embodiments is a RISC processor core and not a DSP core. For expressiveness of signal designations, the SSM hardware and interface 2665 then generate a signal designated MreqSystem active to accompany attempted accesses by this virtual modem engine running on the MPU 2610. The significance of MreqModem and MreqSystem are both the same farther out in the system in that a process (e.g., modem) is attempting an access.

A first embodiment has an application engine including a RISC core, system DMA, and dedicated peripherals. Coupled to the application engine is a Modem engine including a DSP plus modem DMA plus dedicated peripherals. Shared memory such as SDRAM and Flash memory and shared peripherals such as USB serial bus are coupled to both the application engine and the modem engine.

A second embodiment is similar to the first embodiment except that the modem engine is virtualized onto the RISC core and uses the same system DMA, but has modem-dedicated peripherals. The second embodiment has the modem engine run on the same core MPU 2610 with a modem RTOS using the same system DMA and co-existing with a Public HLOS. To deal with the constraints of the second embodiment, recreation of the two distinct engines (application and modem) is accomplished by effectively virtualizing the distinct engines onto the RISC core and system DMA. They are transformed into categories in FIG. 4.

The signal MreqModem is generated and used in the first embodiment (RISC plus DSP) so that both the Application engine and Modem engine (subsystems in general) have access to a large number of DMA channels and as much DMA as is desirable for each engine (in effect a combination of the system DMA and modem DMA. Using the MreqDomain (or MreqModem) differentiates the application engine from the modem engine for accessing or preventing access to peripherals reserved for the application engine or reserved for the modem engine, for instance. In the first embodiment, the DSP is dedicated to modem engine and the DSP is operated or provided with circuitry to assert MreqModem active to differentiate each DMA channel programmed by the modem engine (DSP) from each DMA channel programmed by the application engine (MPU 2610 core). In the second embodiment MreqDomain is similarly used, from an interconnect/ DMA point of view, and this provides economical design of different system products with complementing advantages using a very similar methodology or architectural scheme as described herein.

In the first embodiment, MreqModem (MreqDomain) goes active when the Modem DSP attempts access to a peripheral instead of MPU 2610 and inactive when MPU 2610 attempts access. In the second embodiment, the real-time process represented by the DSP code is suitably modified and ported to be compiled and run as a virtualized modem engine, for example, on MPU 2610 such as a RISC processor. MreqDomain goes active when the virtualized real-time process (e.g., modem) thus ported to MPU 2610 attempts access to a peripheral, and inactive when the application engine attempts access.

The field VP1_Active when active in SSM registers 2620 signifies that MPU 2610 is in a Virtual category indicative of the modem for instance, so that the checking circuitry and firewalls circuitry can know to which category the current MPU operations pertain. The SSM register bit field VP1_NS is set equal to the Non-Secure/Secure bit CP15_NS described hereinabove. Bit field VP1_NS services an intermediate configuration state while in Monitor mode. For example, suppose CP15_NS=1 (context switching Public MMU) but operations are to go to a Secure category. VP1_NS provides a flag for Monitor Mode software. The Monitor code software structure sets, triggers and resets the bits CP15_NS and VP1_NS at different stages and times. One example architecture uses a Virtual Public category and an empty Virtual Secure category and consequently suitably provides only one set of banked registers for Virtual mode. These triggers are used also to select in the SSM address boundary checker register bank.

Logic circuitry of SSM responds to the bit field VP1_Active to generate the qualifier MreqDomain. The qualifier MreqDomain is a signal that accompanies or is attached to each transaction the MPU 2610 creates in the second embodiment (without physical DSP), and is the signal that accompanies or is attached to each transaction the DSP creates in the first embodiment that has DSP. Interconnect firewalls respond to qualifier MreqDomain to protect memories from accesses that are inconsistent with a currently operative category of operation.

In one group of embodiments a DSP with RTOS and real-time application(s) is virtualized onto a RISC processor that also runs non-real-time HLOS and non-real-time applications. In another group of embodiments a RISC processor with real-time application(s) is virtualized onto a DSP that also runs non-real-time HLOS and non-real-time applications. In still another group of embodiments, a RISC processor with a non-real-time HLOS and non-real-time applications(s) is virtualized onto a DSP that runs an RTOS and real-time application(s). In yet another group of embodiments, a DSP with non-real-time HLOS and non-real-time applications is virtualized onto a RISC processor that runs an RTOS and real-time application(s). In still other groups of embodiments, a first processor runs both an RTOS and HLOS and their applications is virtualized as a distinct virtual processor for system purposes onto a physical core MPU that runs both an RTOS and HLOS and their applications as a second virtualized processor maintained distinct from the RTOS, HLOS and applications of the first virtualized processor. Further groups of embodiments have the processors be physical (non-virtual) but provide MreqDomain qualifier(s) to indicate and identify to the system and to protective SSM hardware which physical processor is making an attempted access. Yet other groups of embodiments virtualize multiple distinct processors, as respective clusters of contexts identified to a virtual core, onto a physical core. Still other groups of embodiments include clusters of physical processors as in FIGS. 11, 21, 22A-22B, and 26A-26F.

When one processor x, e.g. real-time, is virtualized onto another processor (e.g., non-real-time), a qualifier (e.g., MreqDomainx) is suitably provided and has states to respectively signify which virtualized processor is active. Thus, the inactive state of MreqDomainx can indicate a virtualized processor distinct from the virtualized processor signified by the active state of MreqDomainx. When more than one processor is virtualized onto another processor(s), then an MreqDomainx qualifier is provided as a single field with more than two states to keep the virtual processors distinctly identified for hypervisor and system firewall purposes. Alternatively, multiple MreqDomainx qualifiers are provided and represented by multiple fields or bits so that more than two states are analogously available to distinctly identify the virtual processors for hypervisor and system firewall purposes.

"GSP" herein is used as a software platform designator to refer collectively to a Modem, BSP with RTOS, ACI, Debug, Emulator, and Trace all together.

In FIG. 4, application port interfaces (APIs) in each category respond to a respective OS or kernel in each category to initiate transitions to another category. The transitions are mediated and controlled by an SMI handler in the hypervisor or a Secure FIQ trap in the hypervisor. FIG. 4 is also conceived as a view downward by the hypervisor onto four exemplary categories, modes, or worlds of operation of the system of FIG. 6. Some categories of operation are defined as combinations of different modes Public and Secure and independently selectable modes Non-virtual and Virtual. A qualifier or classifier signal MreqSecure determines whether a mode is Public or Secure. An additional qualifier/classifier signal MreqSystem determines whether a mode is Non-virtual or Virtual. In this way a first category (00) is Public Non-virtual PN, a second category (01) is a Secure Non-virtual SN, a third category (10) is Public Virtual PV, and a fourth category (11) is Secure Virtual SV.

In FIG. 4A, a hardware (HW) security architecture embodiment introduces a useful Monitor mode infrastructure that allows several execution environments EEs to run in parallel under an SSM HW-protected hypervisor built around the Monitor mode and using the SSM.

In FIG. 4A, respective Platform Support Execution Environments (PSEE) are provided in a system example to respectively support Router (TCP/IP and IMS Stacks), Gaming, Non-GPL device drivers and code (GPL refers to an open-source regime), Modem support, and Multi-Media Framework (MMF). All the PSEE coexist at the same time and thus form a parallel architecture. Each PSEE is allowed to use up to a configured amount of dedicated memory (e.g., 32 Mbytes) for code and data and benefits from the HLOS (UIEE) IO mapping (L4 Interconnect Core, L4 Peripheral, Physical resources, etc.). The UIEE is a form of EE, the PSEE is a form of EE, and the secure environment is a form of EE, as the symbolism EE is used herein.

IOs and/or peripherals can also wake up the system or some part of it when one or more execution domains EE are idle. Thus, one or more of these execution environments EEs have associated hardware peripherals, and the phrase execution domain suggests this association of processor context with parts of the system hardware. Notice that the context can be associated with a particular processor such as a DSP and context-supporting peripherals such as joysticks and special displays for games, and modem hardware for a cell phone modem. Accordingly, the hypervisor configures the system to appropriately respond to and supply information to various context-related hardware in response to the category or EE identified in the EE-related register(s).

Figure 8A:
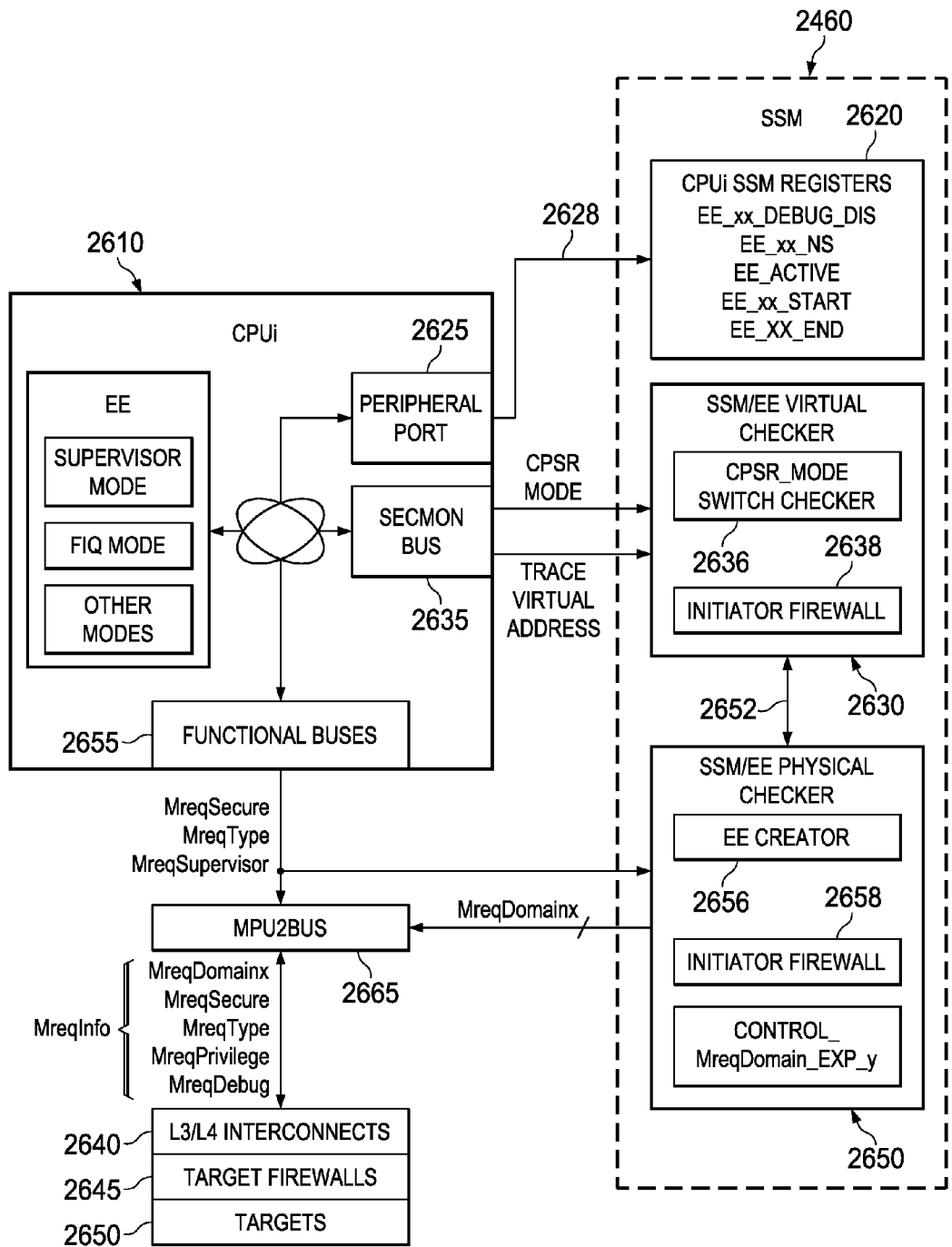
FIG. 8A is a block diagram of an inventive combination of a microprocessor unit (MPU) and target hardware together with and protected by inventive security hardware (SSM) and inventive target firewall circuits for execution environments EE xx.

3-bit register fields in registers CONTROL_MREQDOMAIN_EXP1, 2, etc. secure registers, are respectively provided in FIG. 8A to specify to which EE=x an initiator (peripheral) belongs by configuring at initiator port level a 3-bit MreqDomainx value. A lock bit is provided so that that register can only be written at boot time. Examples of peripherals are SAD2D 3520.7, IVA, USB, SGX (Graphics), etc. of FIG. 10 for as many initiators as desired to correspond to each EE. As one example, suppose the modem is provided on one integrated circuit chip 1100 that is die-to-die (D2D) coupled by a SAD2D 3520.7 communications interface to another integrated circuit chip having application processor 1400.

Delivery circuitry delivers to the SAD2D firewall the appropriate 3-bit field specifying which EE=x in register CONTROL_MREQDOMAIN_EXP is supplied as MreqDomain[2:0] to qualify every access generated by that initiator. MreqInfo configured into the SAD2D firewall include MreqSecure, MreqDebug=0, MreqType, MreqSupervisor, MreqDomain[2:0]=x, MCMD=R/W, ConnID=D2D.

Design pseudocode for the delivery circuitry is suitably expressed by PI_Modem_Initiator_MreqDomain [2:0] <=PO_Control_MreqDomain_EXP1[:3 bits:].

Register CONTROL_MREQDOMAIN_EXP is provided in either the SSM or the Control Module, and is programmed by secure privilege OCP access at boot time. Control module registers are suitably located on a L4 (Core or Config) in Wakeup domain or backup in the Wakeup domain.

User Interaction Execution Environment (UIEE) in one example includes a high-level operating system subject to the hypervisor scheduling in FIG. 4A designated HLOS1 (e.g., Linux or SMP Linux for symmetric multiprocessing). Another such operating system HLOS1' is in a dormant condition except when and if HLOS' is substituted for HLOS1. The dormant operating system is designated HLOS1' (e.g., a Linux variant or alternative another HLOS dedicated to games or multimedia). HLOS1 and HLOS1' do not coexist for hypervisor scheduling purposes at the same time in this example except in memory.

The Monitor Mode is responsible for asserting the Secure/Public qualifier and has strong, secure protection while it acts as the secure master of this architecture.

The Secure State Machine SSM prevents the Public modes penetrating or modifying illegally the secure modes, prevents a Secure user mode from penetrating or modifying the secure privilege modes, and prevents Secure privilege modes from penetrating or modifying the Monitor mode. In this way the SSM protects the Secure world.

The SSM provides the capability to use the Monitor mode as a bridge to create several virtual processors or execution environments EEs targeted for specific real time application(s) or very portable software stacks.

To ensure and leverage the security robustness of a security zone processor architecture, the SSM protects integrity of the Monitor mode by checking that the behavior of the Monitor Code is as expected. SSM preserves system integrity by physical and virtual address checking coupled with execution status integrity checking and dynamic hardware firewalls to prevent buffer overflow attacks and other attacks. The SSM protects the integrity of MMU mapping and exception base vectors specifying the security zone run-time configuration. Dynamic hardware firewalls efficiently protect the secure privilege mode against buffer overflow attacks. The Secure Privilege mode and user modes are protected against fetching of instructions in non-allowed memory space such as data-only memory space. Detection of inconsistency in MMU configuration is achieved by monitoring to detect any attempt to fetch non-secure code in the Secure world. A Secure Privilege debug mode is protected against a secure user debug mode. SSM supports and performs creation, resource isolation and MMU mapping of PSEEs.

Moreover, the SSM leverages the secure mode capability by providing efficient support for secure interrupts, secure demand paging, external boot, test modes and General Purpose device.

To port and maintain software across different platforms, different OS types and different OS revisions could entail a more complex OS support challenge and a significant cost to accomplish software re-use. The software may be specialized, high value, sensitive code that may call for attention to the subjects of latency, stability, and security. Examples of the software include ISP real time software, Modem protocol stack, Multimedia codec, framework, DRM, TCP/IP stack, IMS, USB/IrDa and wireless stacks. The solutions herein can make such porting and maintenance less complex.

An example of a solution herein isolates SW into several execution environments.

Some embed OS, and some are OS agnostic. Software complexity is reduced in regard to cost, development, integration, and validation. The approach provides stability and security, uses a hardware protected Hypervisor and reduces SW dependencies among applications, and simplifies HLOS interaction.

The execution environments include some environments called Platform Subsystem Execution Environments (PSEEs). A PSEE is assigned to each of Router (TCP/IP, IMS, Stacks), Gaming, Non GPL, Modem, and MMF/ISP mechanics. All the PSEE coexist or can coexist at the same time in Public mode, in parallel with the secure environment software in Secure mode.

Some embodiments have a User Interaction Execution Environment (UIEE) involving two or more OSs that are substituted as needed into the UIEE. In FIG. 4, these are designated HLOS1 and HLOS1' as discussed. An HLOS for UIEE HLOS1 or HLOS1' can be Linux, Linux variant, WinCE, Symbian, or other HLOS.

Different embodiments may have a single processor CPU, or two CPUs, or a quad strategy with four CPUs, or even more extensive or mixed architectures. Without limitation, eight (8) Execution Environments are illustrated in FIG. 4A, and more or fewer execution environments may be implemented instead of the number shown. All SMP HLOS instances across CPUs count for one execution domain UIEE. If all four CPUs are in asymmetric mode, then in one system example, up to one Domain or EE per CPU is assigned (4 CPU and 4 Domains or one domain/CPU) at any given instant. Multiple EEs or Domains can be time-shared on a given CPU core in a multi-core system by using local timer interrupts, WFI or other interrupt related signals, and the Hypervisor to launch the EEs in a manner that allocates the proportion of processor time duration or bandwidth for each time-shared EE. The Hypervisor running in Monitor mode is arranged and configured for SMP when multiple processors are used.

Interrupt scheme support with a Global interrupt controller GIC involves a GIC configuration wherein fast interrupt request lines nFIQ are dedicated to Secure world, Monitor mode, and suspended domain(s) EE. Fast interrupt requests FIQs are made not-maskable regardless of an attempt to do so made by operations in the public world. By contrast, fast interrupt requests FIQs may be masked by commands from any of Secure modes and Monitor mode. FIQs are trapped into Monitor mode. Active domains EE do not use FIQ, but wait for interrupt signals WFI from active domains becoming suspended or idle are converted to FIQ in some of the embodiments herein to alert the Hypervisor.

Ordinary interrupt requests nIRQ are dedicated to Public world and are maskable by operations in either the Public or Secure world. These ordinary interrupt requests nIRQ are not trapped into Monitor mode, and instead they are trapped locally in IRQ mode of a processor. Secure mode uses only FIQ and not IRQ in some embodiments, thereby providing a clean differentiation of the Public world from the Secure world.

To protect the security of transactions between a cache coherency-promoting snoop control unit SCU 5010 and cache L2$, a DSB (Drain Store Buffer) operation is used when changing from a UIEE/PSEE to another PSEE/UTIEE. SSM monitors between SCU and L2 to detect and prevent one UIEE/PSEE from directly modifying or updating another PSEE/UTIEE. For instance, PSEE are checked by ETM monitoring of the SECMON bus (FIG. 9A) and comparison checking against address ranges established by configuration of PSEE mapping so that PSEEs are prevented from updating each other.

PSEEs are locked down in their respective memory spaces for security in order to prevent UIEE from changing any of them. PSEE TLB translation lookaside buffer mapping is locked down. Each CPU is provided with multiple TLBs that are assigned to the different EEs. UIEE suitably defines Peripherals/IVA/GFX resources and shared buffer of PSEE for PSEE access into static mapped virtual address spaces.

SSM tracks execution environments EE in SSM register space (of FIGS. 12, 12A, 12B) in an operation herein called Domain tracking. The information derived from domain tracking is accessible to the in-circuit emulator for debug. SSM registers are configured and updated to specify the Physical address range of PSEE private physical resources and to identify from which CPUi the accesses are coming (between CPUi and cache L2$, before L2$) for UIEE intrusion protection and MreqDomainx creation, on respective MreqDomainx qualifier lines provided in a bus. In some embodiments, given MreqDomainx line is set active to represent that its corresponding x-indexed execution domain EE is active, and other embodiments carry a bit field on the MreqDomain lines to collectively represent which domain EE is active.

Figure 5:
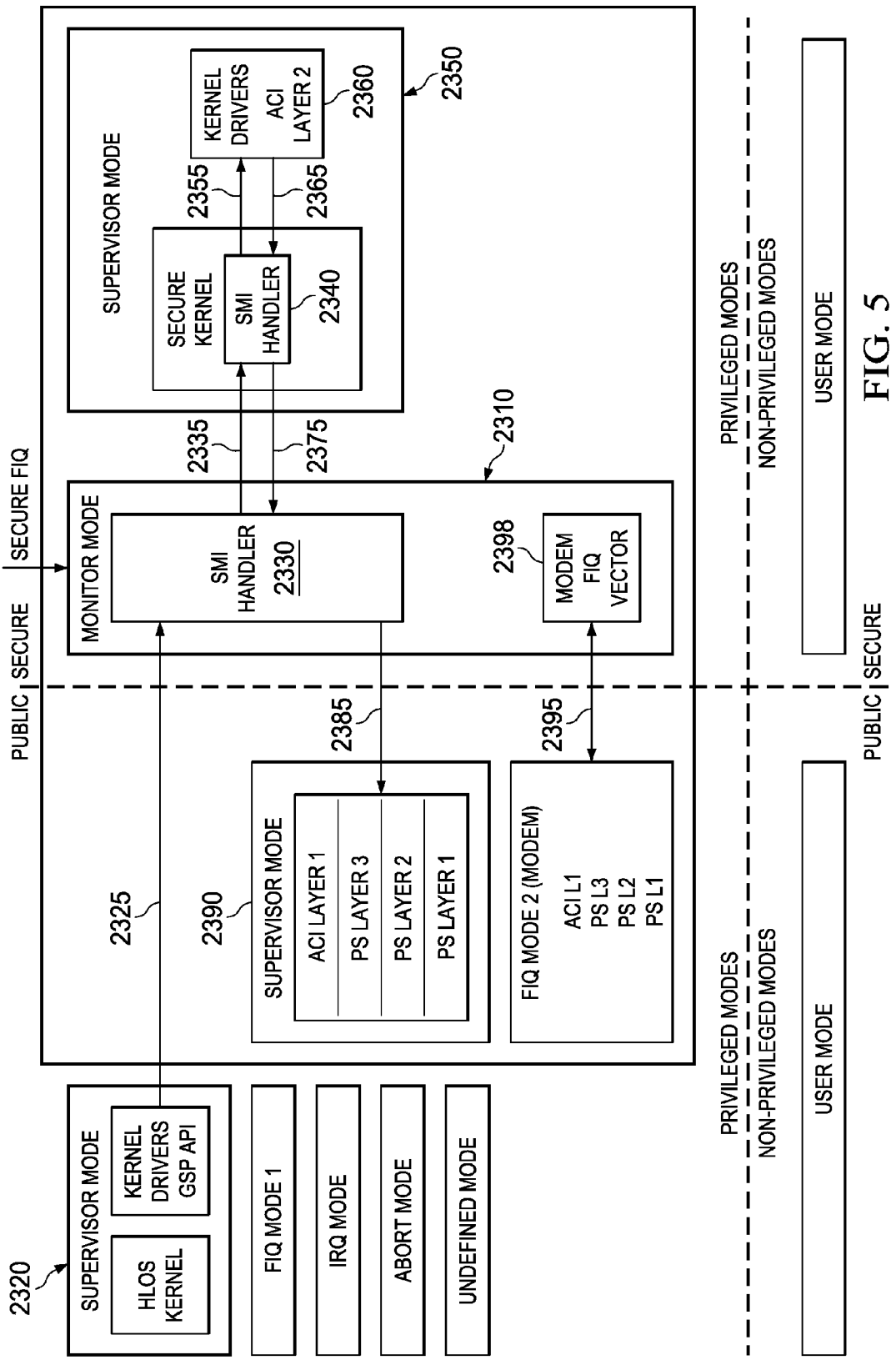
FIG. 5 is a diagram of a process of a hypervisor monitor mode mediating transitions between various modes.

In FIG. 5, modes are divided into four quadrants indicated by a vertical dotted line and a horizontal dotted line. A classifier MreqSecure divides Public modes on left from Secure modes on the right. An additional classifier MreqPrivilege divides Privileged modes from Non-privileged mode(s) such as User Mode by a horizontal dotted line lower in FIG. 5. In the operation of the Privileged modes, various transitions can occur in a structured manner as taught herein and shown as examples by arrows in FIG. 5. A software monitor interrupt SMI instruction makes a transition from a given mode to the Monitor Mode.

In FIG. 5, one transition example goes from Public Supervisor mode 2320 wherein the HLOS kernel activates the GSP API. See also area 2110 of FIG. 3. It should be understood that this particular example is but one of many examples that could be given for transitions between any pair of categories based on one or another API. In this particular example, suppose the user wants to place a cell phone call, which involves activating the modem. The GSP API asserts SMI, and arrow 2325 represents transition to Monitor Mode 2310 in Secure environment and activation of an SMI handler 2330 process therein. Compare with section 2140 of FIG. 3. A transition 2335 in the Secure Environment of FIG. 5 now occurs from the SMI handler 2330 process in Monitor Mode 2310 to an SMI handler 2340 process in a Secure Supervisor mode 2350. The SMI handler 2340 process further transitions via arrow 2355 to a block 2360 for Kernel drivers and for a modem command ACI Layer 2, which is an AT Command Interface (ACI) in area 2120 of FIG. 3 and enforced by a 3G network hardware firewall.

In FIG. 5, the transition 2355 activates modem command interface ACI L2, and operation of ACI L2 is completed in due course and then transitions by an arrow 2365 back to the SMI handler 2340 process. Operations of SMI handler 2340 further transition from Secure Supervisor mode via an arrow 2375 to the SMI handler 2330 process of Monitor Mode in the Secure environment. Compare with section 2150 of FIG. 3. The SMI handler 2330 process, in its turn, transitions via an arrow 2385 from Monitor Mode in the Secure environment to a Public Supervisor mode 2390. In some embodiments, the Public System mode is used for mode 2390. Thus, plural mode choices are usable, and optimizations minimize context switch latency such as by using System mode from the Public HLOS world. Also, various embodiments use varying amounts or none of the RTOS kernel in mode 2390.

In Public Supervisor mode 2390 of FIG. 5, ACI Layer 1 is initiated and modem protocol stack PS Layers L3, L2, L1 are activated. Compare with section 2130 of FIG. 3. Modem operation occurs on a real-time basis and generates a fast interrupt request FIQ mode 2 (modem) related to ACI L1, or PS L3, L2, L1. Note that Modem FIQ is always trapped in this example into the Monitor Mode by action of Secure FIQ as further described elsewhere herein. A bi-directional arrow 2395 shows transitions each way between the Supervisor mode 2390 FIQ Mode 2 (modem) and Monitor mode 2310. A Modem FIQ vector 2398 delivers and provides FIQ Mode 2 dynamic creation in Monitor Mode. Compare with section 2150 and arrow 2830 of FIG. 3.

Examples of operation based on FIG. 5 in Public, Privileged modes are also indicated for a fast interrupt request FIQ Mode 1, an interrupt request IRQ mode, an Abort mode, and an Undefined (Undef) mode. Other process and structure embodiments such as those of FIG. 18 and TABLE 29 and TABLE 42 and description elsewhere herein can be compared with FIG. 5 and with each other.

In some embodiments, the Public Virtual PV category 2430 (e.g., modem) generates one or more Secure FIQ even though secure environment SE Kernel generate Secure FIQ as well (but at other times). The SE Kernel is arranged non-interferingly so that the SE Kernel and its FIQ routine disables the FIQ masking (e.g. F bit) very rarely for only few clock cycles. And each time operations are in Monitor Mode before entering the Public Virtual category 2430, the Monitor code gives category 2430 (modem) the capability to disable the FIQ masking. FIQ masking capability is withheld from the Public Non-virtual category PN 2420 (for Public HLOS) because of the configuration of the security zone register (e.g., CP15NS) and hardware enforcement 2755 thereof in FIG. 9B. SE Kernel may have the capability to mask modem FIQ but is coded so SE Kernel does not do so. Code in Public Virtual PV category 2430 (modem) can mask all FIQ when processing critical sections of modem code. Public HLOS cannot mask the Secure FIQ of either category 2430 nor 2450 (Modem or SE). In this way the modem runs in real time without interference. Some other embodiments provide dedicated modem FIQ and have the secure environment SE mask only public FIQ and secure FIQ but not the modem FIQ. In either type of embodiments, the modem virtual processor runs freely in real-time without interference from Secure FIQs from the SE Kernel in single core and multi-core examples as taught herein.

Figure 6:
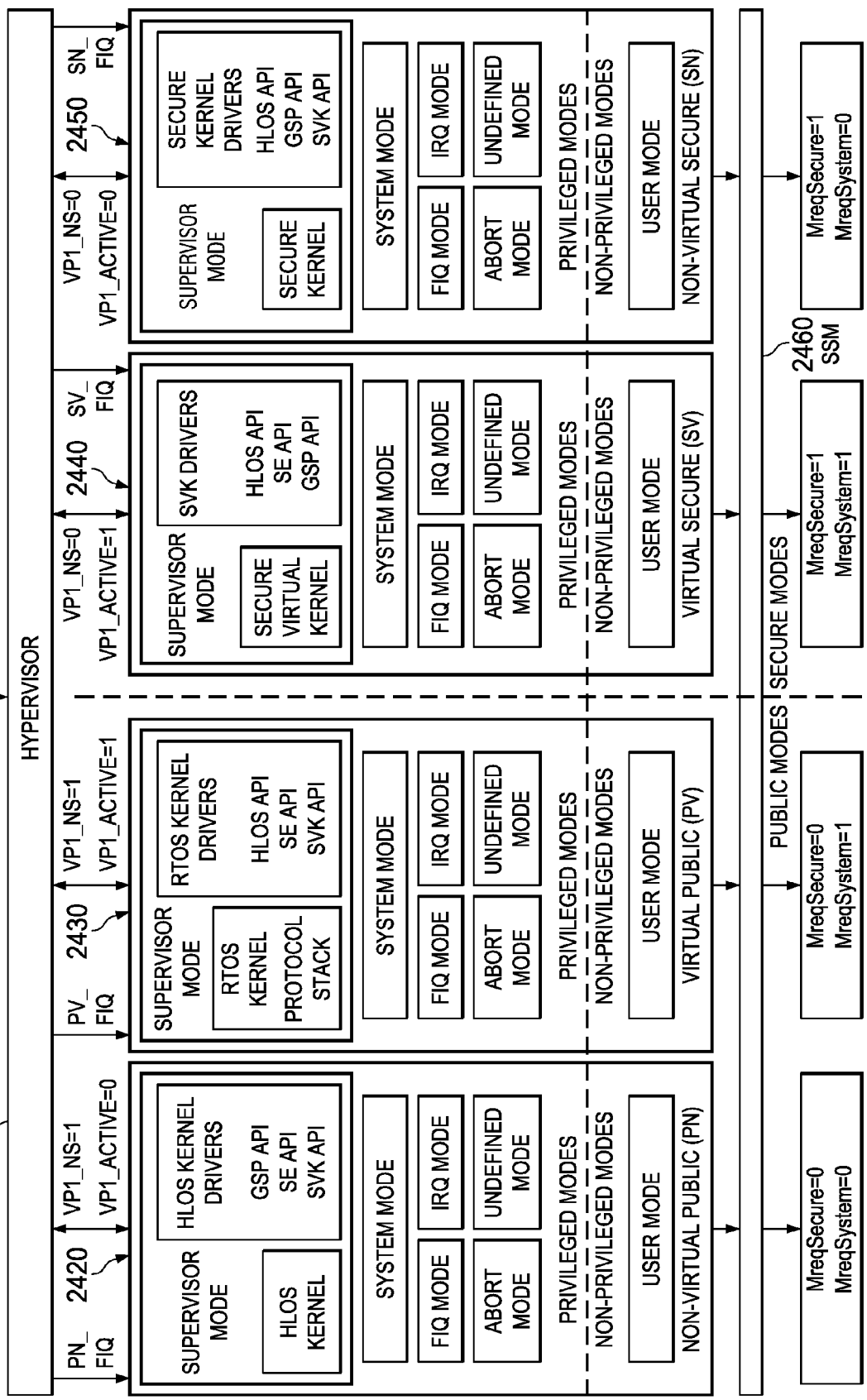
FIG. 6 is a diagram of an inventive compartmentalized process from a different perspective from that of FIG. 4 and governed by a hypervisor monitor mode, the process responsive to category specific fast interrupt requests xx_FIQ for execution environments EE xx.

In FIG. 6, a SSM-supported processor core virtualization architecture switches between the different categories of FIG. 4 through the Monitor Mode which acts as an hypervisor 2410. FIG. 6 is conceived as a profile view of the categories of FIG. 4 viewed along a viewing direction 2405 and with the categories spread out from FIG. 4 into FIG. 6. The Hypervisor 2410 is depicted above the categories. A viewing direction 2415 of FIG. 6 shows the direction of view for going from FIG. 6 to FIG. 4.

In this embodiment, switches between the categories are prevented except through Monitor Mode. Notice that the hypervisor 2410 controls or is structured by certain register bits. A CP15_NS bit or SCR bit is active or not to indicate and distinguish the Non-secure (Public) condition from the Secure condition. The SSM 2460 has a VP1_NS bit or field in a SSM_Virtual_Processor register (see FIG. 9) that mirrors the CP15_NS bit to also distinguish Non-secure (Public) from Secure condition for SSM hardware monitoring purposes.

Further in FIG. 6, the SSM 2460 has a VP1_Active bit or field provided elsewhere in the SSM_Virtual_Processor register. This bit or field indicates and distinguishes the Virtual condition from a Non-virtual (Normal) condition. The SSM issues the classifier signal MreqDomain as a function (e.g., same or complement) of the VP1_Active bit or field. Note that even in embodiments where Virtual/Non-virtual is simply two states that are represented by one bit, either or both of VP1_Active and MreqDomain are suitably one-bit or plural bits to avoid one-hot conditions where radiation error-resistance or otherwise highly reliable operation is required. The various categories established by a plurality of classifiers or qualifiers are in some embodiments suitably encoded, expanded, decoded or otherwise transformed and delivered as signals in the hardware and software of various embodiments as a further security feature.

In FIG. 6, the hypervisor 2410 sets the bits or fields VP1_NS and VP1_Active to establish the different categories of resources of FIG. 4 and otherwise. Accordingly, the hypervisor is shown as an expansive mantle over four columns of hypervisor-controlled categories 2420, 2430, 2440, 2450 as indicated or driven by states of the bits or fields. All the categories have, or can have a Supervisor Mode, a System mode, an FIQ mode, IRQ mode, Abort mode, Undef mode, and User mode. Fast interrupt requests FIQ are trapped by the Monitor Mode. Interrupt IRQ is trapped by the Monitor Mode for Virtual categories and Secure categories. An External Abort EA need not be trapped into the Monitor Mode in this example. As discussed in FIG. 5, SMI Handler in Monitor Mode handles transitions between categories where a software monitor interrupt SMI instruction is used to initiate the transition out of a particular category.

Each category 2420, 2430, 2440, 2450 has drivers to interface the kernel that operates in or controls each application in that category with each application in that category. Each category has APIs to interface the kernel to the other categories. These APIs make transitions that are trapped and mediated by hypervisor 2410.

For example, in FIG. 6, category 2420 is Public Non-virtual PN and has an HLOS kernel which is the operating system for category 2420. HLOS Kernel Drivers interface HLOS with each application in category 2420. GSP API, SVK API, and SE API respectively interface HLOS of category 2420 with the corresponding RTOS Kernel of category 2430, Secure Virtual Kernel (SVK) of category 2440, and the Secure Environment (SE) kernel of category 2450. Each of these—GSP API, SVK API, SE API, makes an inter-category transition relative to category 2420 that is SMI-handled and mediated by hypervisor 2410. FIG. 5 illustrates a transition process as described hereinabove.

In FIGS. 6 and 4, category 2430 is Public Virtual PV and in this example has an RTOS kernel which is the real time operating system for category 2430, Modem Protocol Stack PS layers, and RTOS Kernel Drivers to interface RTOS with the PS layers. Compare with section 2130 of FIG. 3 and areas 2390 and PS layers of FIG. 5. In some embodiments this category 2430 is used for one or more other real time processes instead of or in addition to a modem. In category 2430, HLOS API, SVK API, and SE API provide respective interfaces between RTOS kernel of category 2430 and the corresponding HLOS kernel of category 2420, SVK of category 2440, and the SE kernel of category 2450. Each of the HLOS API, SVK API, and SE API, makes an inter-category transition relative to category 2430 that is trapped and mediated by hypervisor 2410.

Category 2440 is Secure Virtual SV and in this example has a Secure Virtual Kernel (SVK), and Secure Virtual kernel drivers and APIs. An example of an SVK is a secure OS for a content player, gaming box, and/or still imaging or camera system which is provided in category 2440. The SVK in category 2440 is used either by itself or in addition to a category 2430 wireline modem RTOS or wireless modem RTOS according to the type of system desired. In category 2440, HLOS API, GSP API, and SE API provide respective interfaces between the SVK kernel of category 2440 and the corresponding HLOS kernel of category 2420, RTOS kernel of category 2430, and the SE kernel of category 2450. Each of the HLOS API, GSP API, and SE API makes an inter-category transition relative to category 2440 that is trapped and mediated by hypervisor 2410.

Category 2450 is Secure Non-virtual SN and in this example has a Secure Kernel, and Secure Kernel drivers to interface the Secure Kernel with secure applications or protected applications in category 2450. In category 2450, an HLOS API, GSP API, and SVK API provide respective interfaces between Secure Kernel of category 2450 and the corresponding HLOS kernel of category 2420, RTOS kernel of category 2430, and SVK of category 2440. Each of the HLOS API, GSP API, and SVK API, makes an inter-category transition relative to category 2450 that is trapped and mediated by hypervisor 2410.

The arrangement is flexible so that one or more of the categories 2420, 2430, 2440, 2450 is or can be populated or empty. When a category is empty, the APIs in the other categories for interfacing to the empty category are suitably also omitted unless retained for upgrade purposes. Additional categories are suitably further established according to the teachings herein, and then additional APIs in the categories are added to interface to each additional category. SSM 2460 provides hardware monitoring and enforcement and issues classifier bits or fields MreqDomain, MreqPrivilege, MreqSecure, and other qualifiers or classifiers according to the teachings herein to regulate access to system peripherals of FIGS. 2 and 10, for instance. FIG. 6 can also be compared with multi-processor embodiments shown in FIGS. 21A/21B/21C, FIGS. 22A/22B and FIGS. 26A/26B and description elsewhere herein.

FIG. 6A shows an alternative structuring of the operations of either a uniprocessor or a multiprocessor system according to the execution environment concept of FIG. 4A. the public modes are arranged into eight execution environments (EE) identified by a public/secure signal NS=1 and an execution environment specifier EE_Active set equal to any value xx from zero (000 binary) to seven (7=111 binary) in this example. At far right in FIG. 6A a secure mode execution environment is identified by a public/secure signal NS=0 (secure) and the execution environment specifier EE_Active set equal to zero (000 binary). A fast interrupt request (FIQ) is captured by the hypervisor 2410 and directed to the applicable execution environment and identified as EE_xx_FIQ wherein xx identifies the particular execution environment EE.

FIG. 7 shows an SSM MPU core virtualization MMU overview. An example system provides two (2) MMU components: a Public MMU 2510 and a Secure MMU 2520. Each MMU 2510 and 2520 has its own virtual memory space that can access the physical memory space according to a mapping. At MMU level, differentiation need not be applied as between the virtual processor and the Non-virtual processor of each category of resources 2410, 2420, 2430, 2440 of FIGS. 4 and 6. Categories 2430 and 2440 are shown for example in FIG. 7. The SSM 2460 of FIG. 6 creates for each memory space in FIG. 7 defined for a virtual processor the MreqDomain qualifier to distinguish transactions belonging to Virtual or Non-virtual modes. Concurrently, the MreqSecure qualifier distinguishes the Secure resources from the Public resources.

At MMU level, protection and convenience are provided to accommodate multiple EEs of FIGS. 4A and 6A. In one example, PSEE MMU remaps a code and data section to the address 0x0 seen by the CPUi so that each PSEE has its own exception vector table, and when that exception vector table is used it is mapped to address 0x0 and does not need any code relocation porting. When a PSEE EE is activated and currently running, page table walk occurs on a global PSEE mapping. The global PSEE mapping is an empty UIEE that can perform default MreqDomain tagging and applies to all PSEE. The empty UIEE is suitably tagged with a specific UIEE_Active number for extra protection so that UIEE HLOS are protected against PSEE access. Page table walk occurs on a currently activated UIEE even when a PSEE EE is activated and currently running. An MMU TLB flash is performed each time a PSEE/UTIEE HLOS switch is made. Suppose for example that the UIEE has a predetermined virtual address range (e.g., 0-32 MB), and that the respective PSEEs are provided with virtual address ranges in successive 32 MB virtual address spaces having MSBs equal to each PSEE index number. The PSEE (code and data) software is compiled to be translated down when activated and located to start at virtual address 0x0. The peripherals and shared buffer memories virtual addressing is made the same for UIEE and PSEE. Thus, the modified virtual address for both PSEE and UIEE code and data has exclusive address space, while memories and peripherals are shared. In this way, only one MMU table is necessary for all PSEEs. A simple MMU register write is sufficient to switch PSEE and UIEE at the MMU. There is no need to invalidate the MMU TLB when switching PSEEs, nor any need to clean and/or invalidate caches L1$ and L2$ when switching EEs.

An interconnect firewall 2530 is enabled to reserve or isolate or enforce memory space allocated to a particular virtual processor or non-virtual processor. Shared memory space is provided as between various combinations of the four categories of resources of FIG. 4: Non-Virtual Public, Virtual Public, Non-Virtual Secure, and Virtual Secure. For example, a memory space 2540 has reserved spaces 2545, 2555, 2565, 2575 for Virtual Public, Public, Virtual Secure, and Secure respectively. Shared spaces 2550, 2560, and 2570 for instance are provided for respective sharing between Virtual and Non-virtual Public, Public and Secure, and Virtual and Non-virtual Secure as illustrated in FIG. 7.

Figure 9A:
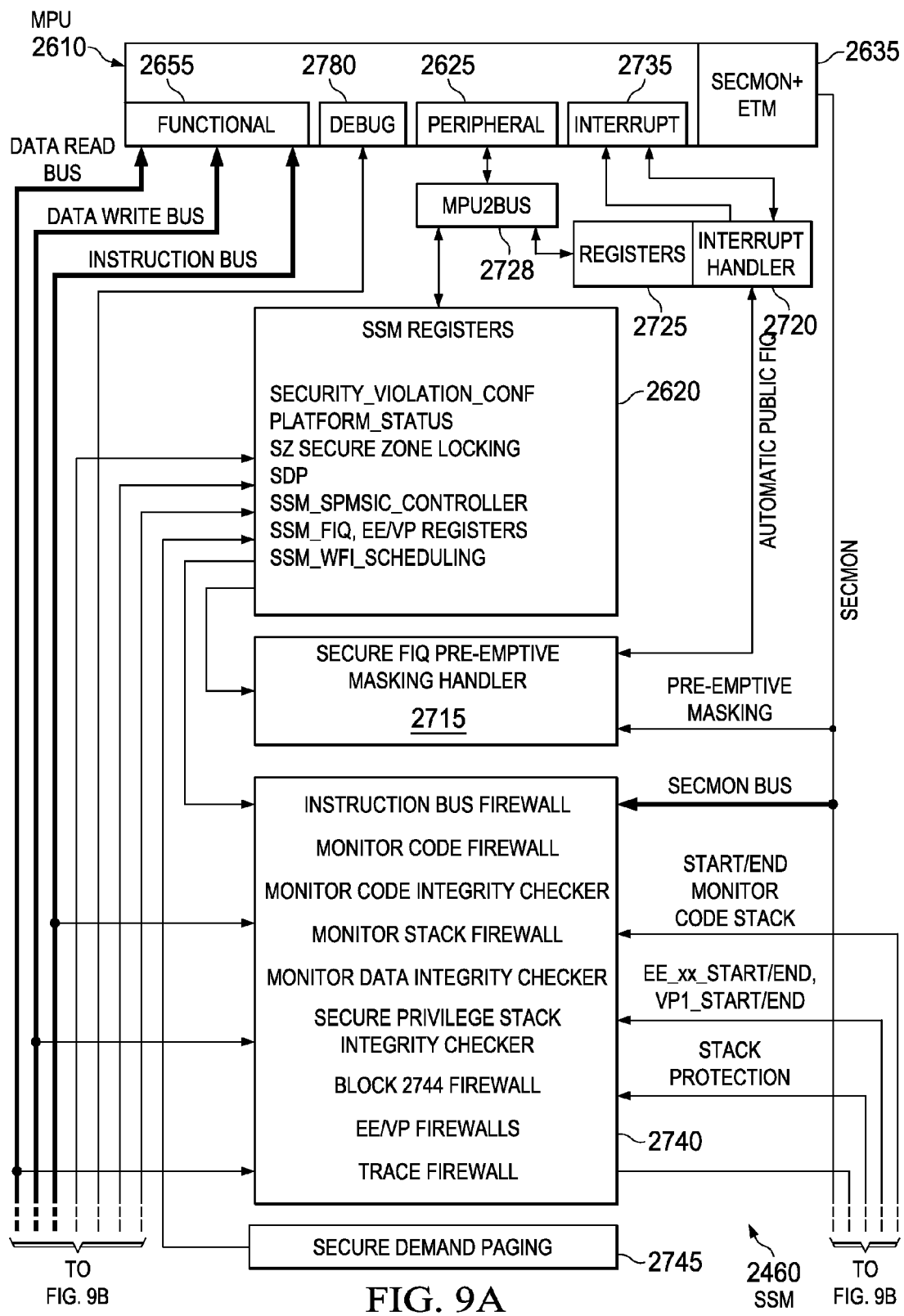
FIGS. 9A and 9B are two halves of a block diagram showing inventive security hardware (SSM), and other inventive blocks in FIG. 8A in further detail.
Figure 25:
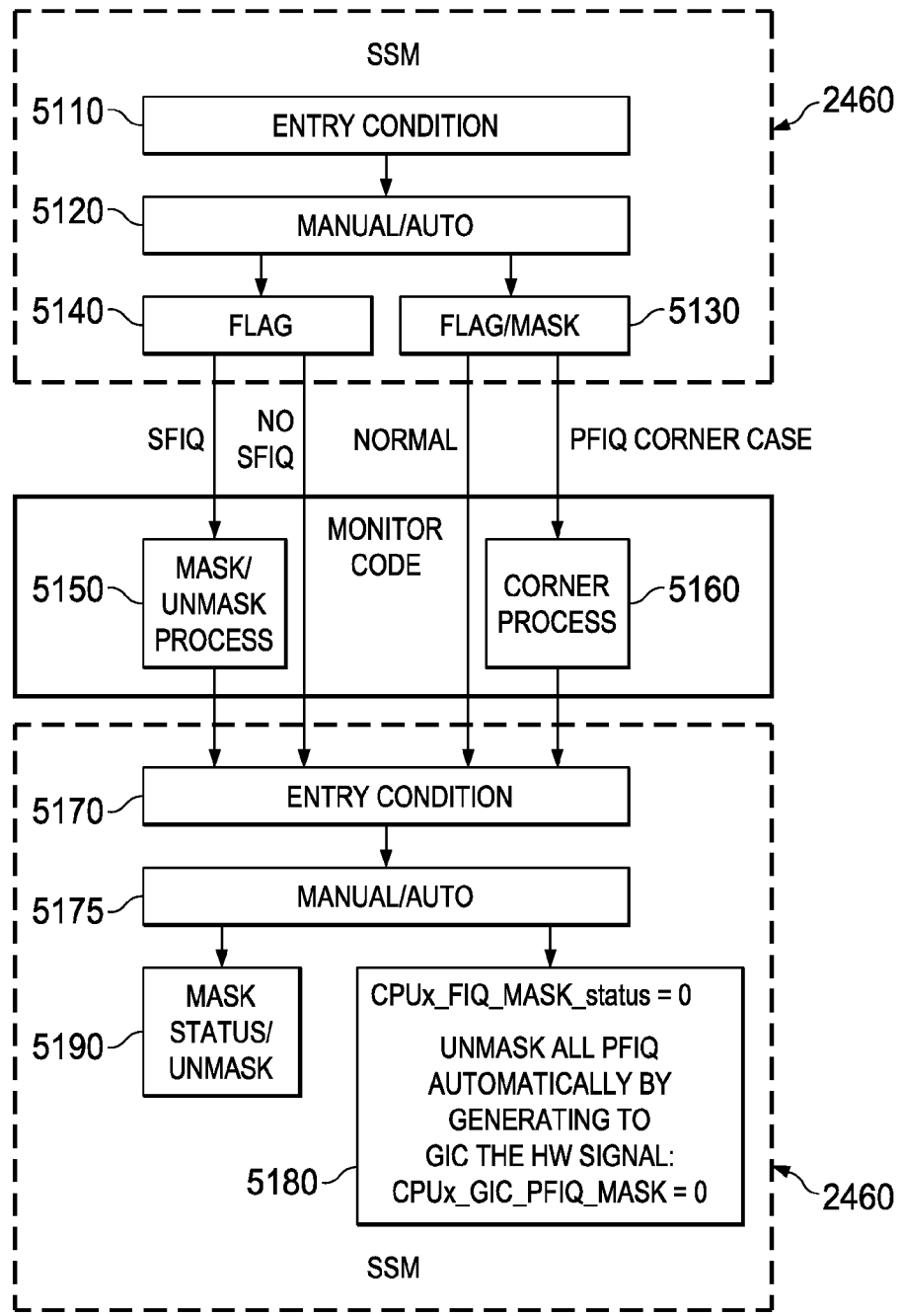
FIG. 25 is a partially-block, partially process diagram of masking and FIQ operations and structure for secure monitoring hardware (SSM) and Monitor Mode processing, for use with an inventive combination including FIG. 13, FIGS. 12 and 12A or 12B.

In FIG. 7 and FIG. 9A, hardware monitoring 2740 of the Monitor Mode software code range of addresses for security violations is enabled by writing in a Monitor_EN field of a SSM_Firewall_Controller register of FIGS. 24-26 and of TABLE 19 of incorporated patent application TI-61985. The SSM_Firewall_Controller register is situated in a circuit called a Control Module as in FIG. 9B, for example. When Monitor_EN is active, the SSM 2460 checks that the Monitor Mode software code only fetches instructions in an allowed memory range and only reads data from an allowed memory range. When Monitor_EN is active, the Start_Monitor_Code and End_Monitor_Code start address and end address registers are locked. If the Monitor Mode attempts to access an address outside the permitted address range(s) while the Monitor_EN field is active, a security violation signal is generated. This security violation hardware monitoring process is active when the MPU 2610 of FIG. 8 is physically in Monitor Mode (CPSR_Mode=Monitor). In this way, the SSM 2460 operation just described contributes, structures, or enforces addresses ranges for Monitor Mode so that hypervisor operation effectively occurs.

When the processor MPU or CPUi is physically in Monitor Mode and the hardware monitoring mechanism is activated (Monitor_EN field active), the SSM hardware monitoring mechanism is configured to restrict the physical instruction fetch of the Monitor code to a ROM only location, for example. In that case, the Monitor mode RAM stacks are excluded. Execution in the monitor mode stacks is prevented because the stacks are not included in the ROM address range defined as permitted by the Start_Monitor_Code and End_Monitor_Code start address and end address registers. Moreover, a Trace Firewall circuitry of FIG. 9A herein and as described in FIG. 31A/31B of incorporated patent application TI-61985 allows detection of abnormal instruction flow activity. This prevention effectively impedes and resists basic buffer overflow attack. The Monitor Mode software code by this construction does not expose any API (FIGS. 4, 4A, 5, 6, 6A) to the external world.

Also, in some embodiments, the hypervisor code in Monitor Mode context switches the MMU completely each time a switch is made from a Non-virtual category to a Virtual category. This provides a large system address space (e.g., 4 Gb or other large space size) for each category or world, physically differentiated and protected with the classifier MreqDomain. An embodiment that hypervises two HLOSes suitably puts one HLOS in a Non-virtual category and the other HLOS in a Virtual category or in another PSEE. Along with the circuitry and processes of FIGS. 5-8, a complete MMU context switch is added to accommodate such additional HLOS. Thus, alternative structure and process embodiments are provided depending on the target HLOS and/or target RTOS established in the architecture to run in a Virtual category or in another PSEE.

In FIG. 7, the virtual section 2440 that is shown included respectively into public and secure mappings 2560, 2565, 2570 are quite suitable for a modem implementation that features desirably-high instruction rate (MIPS) and as little context switching as possible. In other embodiments, the MMU is completely devoted or 100% allocated to one category at a time while in Monitor, such as to have a multi-gigabyte address space for each category of FIGS. 3, 4 and 4A. Accordingly, FIG. 7 is suitably revised for such other embodiments in respect of shared space.

FIG. 8 shows an embodiment of virtualization hardware architecture that includes a processor core MPU 2610 and the secure state machine SSM 2460. MPU 2610, for example, has an ARM™ core, MIPS™ core, or other processor core such as for core 1105 and/or 1422 of FIG. 2. MPU 2610 is coupled to SSM registers 2620 via a peripheral port 2625 and peripheral bus 2628. MPU 2610 has a virtual world with a Supervisor Mode, an FIQ mode, and an Abort mode in the virtual world. The SSM registers 2620 include a VP1_Debug_Dis debug disable for virtual processor 1 (VP1), a Non-secure/Secure qualifier VP1_NS, and a VP1_Active field for indicating a Virtual or Non-virtual category. An RTOS container FIQ ID interrupt identification for the RTOS is included in the SSM register 2620 area.

In FIG. 8A, SSM Registers 2620 have SSM registers prefixed CPUi_for each CPUi in the system. For each CPUi, various EE-related SSM registers are provided, such as EE_Active to identify which EE is active, and various registers or fields replicated for each index EE_xx such as EE_xx_Debug_Dis to show which EEs have debug disabled, and EE_xx_NS to show which EEs are Public/Secure. Address Boundary registers EE_xx_START and EE_xx_END identify the start/end addresses for each EE xx. WFI scheduling is supported by SSM registers 2620, see FIGS. 12, 12A, 12B for more detail.

In FIG. 8, the processor core 2610 is coupled to an SSM Virtual Checker 2630 through a secure monitor bus SECMON 2635, which provides a signal and line CPSR Mode, and address lines to provide a Virtual Address for Virtual Checker 2630 and for a TRACE unit, (not shown). The Virtual Checker 2630 checks that the virtual modes execute properly in their own virtual address space. The Virtual Checker 2630 also includes a CPSR Mode switch checker 2636 and further includes an Initiator Firewall 2638.

An initiator firewall like Initiator Firewall 2638 is provided in each initiator in the system. An initiator is a circuit block that initiates transfers of information. Each initiator firewall detects whether its associated initiator has been corrupted and can enforce specific security mechanisms, such as a buffer overflow checker or other checker. When an initiator is performing a transaction, in-transaction classifiers or qualifiers are generated. These in-transaction classifiers are, for example, any one or more of the following: MCMD for Read/Write qualification, and MreqInfo qualifiers such as Mreq-Domain, MreqSecure, MreqDebug, MreqType, MreqPrivilege and other suitable qualifiers. These qualifiers reflect the system state of the initiator at the time of the transaction, and the qualifiers are propagated to interconnect 2640 in FIGS. 8 and 8A and 3521 in FIG. 10. The interconnect 2640 generates a parameter designated ConnID to identify exactly which initiator made the transaction.

Each of several configurable Target Firewalls 2645 (e.g., each L4 interconnect firewall, system memory, and each L3 interconnect firewall) respectively dedicates a memory or a peripheral in the Targets 2650 to each initiator and isolates each such target among Targets 2650 from any other initiator so that corruption or attack from any other initiator is prevented. A firewall is configurable to share initiators, if desired. Either or both of an Initiator Firewall 2638 and a Target Firewall 2645 generate a Security Violation signal when an attempted bus-access by an initiator is inconsistent with permissions configured into a firewall.

A reset or power management transition may clear or erase a firewall configuration. The processor core 2610 boots in Secure Supervisor mode and reconfigures the firewalls 2645 to their default run-time configurations. Accordingly, upon reset, any memory or target 2650 that can be used for security is restricted to use by the processor core 2610 in Secure Privileged mode.

In FIG. 8, an SSM Physical Checker 2650 checks that the Virtual modes (compare to EEs in FIG. 8A) execute properly in their own physical address spaces. The SSM Physical Checker 2650 is bi-directionally coupled to the SSM Virtual Checker 2630 by an arrow 2652, representing defined Virtual and Physical memory space container boundaries from register 2620 and/or a Control Module 2765 of FIGS. 9B and 10. The SSM Physical Checker 2650 is also coupled to Functional buses 2655. Physical Checker 2650 receives lines MreqSecure, MreqType, and MreqPrivilege (MreqSupervisor). The SSM Physical Checker 2650 has a Virtual Mode Creator block 2656 that creates the FIG. 8 MreqSystem qualifier and FIG. 8A MreqDomainx qualifier and supplies that qualifier to a bus interface 2665 designated MPU2BUS. Interface 2665 couples a bus protocol suitably used by MPU 2610 (e.g. AXI protocol) to a peripheral bus using another suitable bus protocol (e.g., OCP Open Core Protocol). MPU2BUS 2665 is bi-directionally coupled to Interconnects 2640 and Target Firewalls 2645 for various peripherals. Classifier signals such as MreqDomain, MreqSecure, MreqType, MreqPrivilege and MreqDebug are provided to the Interconnects 2640.

In FIGS. 8 and 8A, the SSM Physical Checker 2650 defines physical memory space for each virtual container or PSEE/UIEE. The SSM Physical Checker 2650 also checks that when the processor MPU 2610 is executing in these containers and ranges there no fetch or data read outside each established boundary. In some embodiments, the SSM Physical Checker 2650 also uses classifier MreqType to check that each memory boundary defined as Data Only is not executed or accessed as if it were an instruction. This enhances buffer overflow attacks detection, for instance.

In FIGS. 5 and 8, the processor core 2610 is operated to execute in a virtual processor category (e.g., as a modem) in privileged mode. The SSM Physical Checker 2650 ensures that no unauthorized intruding User mode (MreqPrivilege=Non-privileged) accesses happen. The classifier MreqPrivilege facilitates checking by the Target Firewalls 2640 to intercept any non-privileged access to a peripheral or address space that is reserved for a virtual processor in FIG. 7.

Figure 12A:
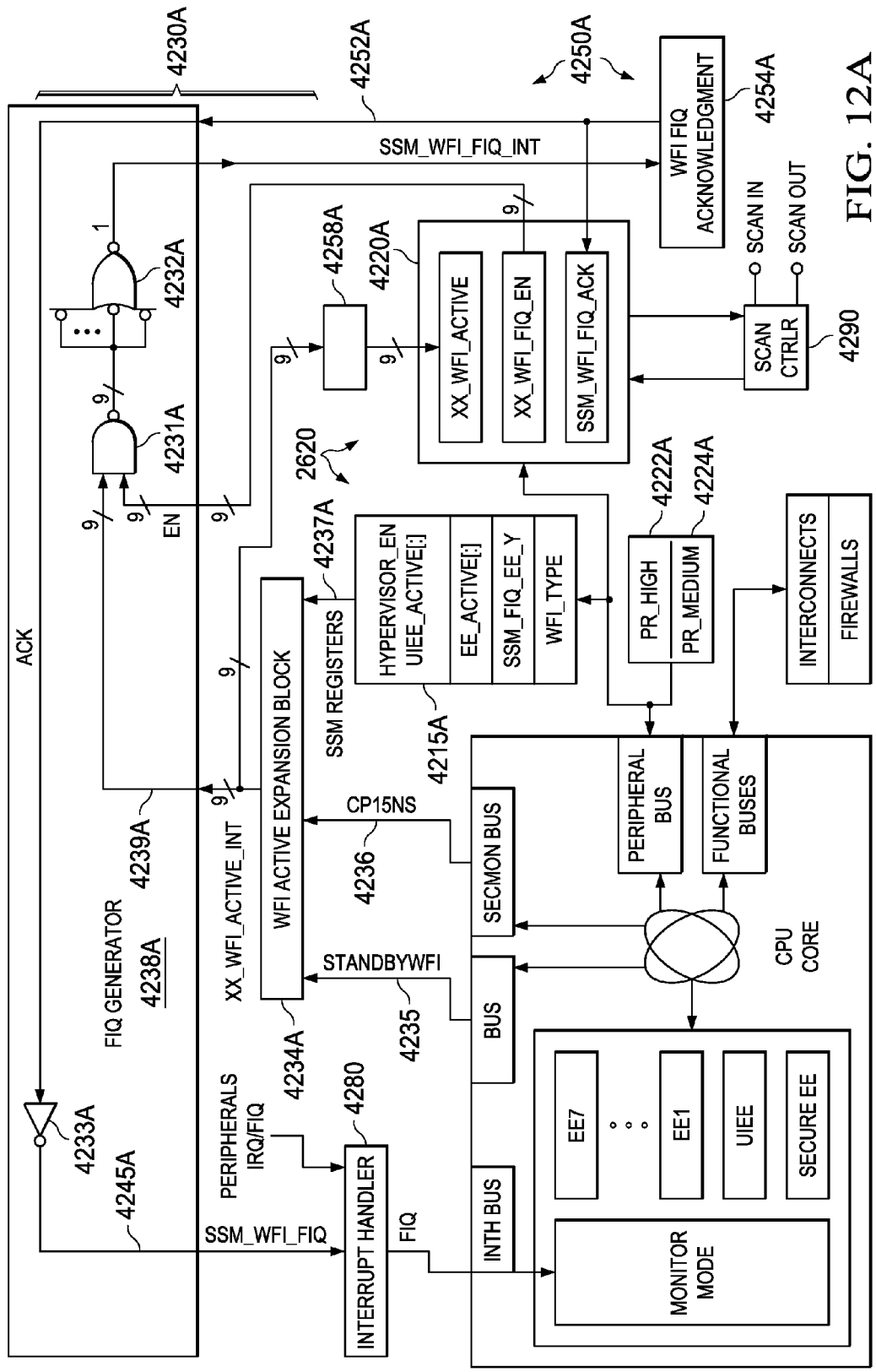
FIG. 12A is a block diagram of an alternative inventive circuit for converting interrupt related signals such as wait for interrupt (WFI) signals to deliver interrupts to at least one processor pertaining to a specified execution environment EE, for use in FIG. 6A, 11, FIGS. 21A/21B/21C, FIGS. 22A/22B, FIGS. 26A-26F and other systems.

In FIG. 8A, the SSM Physical Checker 2650 includes EE Creator 2656 circuitry coupled to SSM registers of FIG. 12A and to Read bus and Write bus (in Functional buses 2655) from a CPUi 2610. TABLE 33 shows design pseudocode for circuitry of EE Creator 2656 that is responsive to Hypervisor Enable, EE_Active (PSEE) and UIEE_Active fields in SSM registers of FIG. 12A to identify and create MreqDomainx for a PSEE that is active within its START/END address boundaries.

TABLE 33

SSM PHYSICAL CHECKER 2650 DESIGN PSEUDOCODE

```
SEC_VIOLATION_READ_x_ <= '0';      SEC_VIOLATION_READ _x+1_ <= '0';
MREQ_DOMAIN_ READ_x_ <= '0';        MREQ_DOMAIN_ READ _x+1_ <= '0';
MREQ_DOMAIN_WRITE_x_<= '0';         MREQ_DOMAIN_WRITE _x+1_<= '0'
IF ((CPSR_MODE! = MONITOR_MODE) AND (ARVALID = '1' AND ACLKEN = '1' AND
UIEE_ACTIVE != EE_ACTIVE) - Access occurring on READ CHANNEL
THEN
   -- Loop __x__{0,7} --
   IF (PHY_EE_START_x_ [msb:] = ARADDR [msb:] AND PHY_EE_START_x_ [lsb] ≤
ARADDR [lsb:] ≤ PHY_EE_END_x_ [lsb:] AND HYPERVISOR_EN = '1')
   THEN
     IF (SSM_PHYSICAL_EE_DATA [_x_] = '1'AND ARPROT □= '1') THEN
   SEC_VIOLATION_READ_x_ <= '1'; -- Data-only specified; Instruction fetched tentative
     ELSE MREQ_DOMAIN_ READ _x_ <= '1';
     ENDIF;
   ELSE SEC_VIOLATION_READ_x_ <= '1'
   ENDIF;
ENDIF;
IF (AWVALIDW = '1' AND ACLKEN = '1' AND HYPERVISOR_EN = '1')
THEN                   - Access occurring on WRITE CHANNEL
   -- Loop __x__{0,7} --
```

TABLE 33-continued

SSM PHYSICAL CHECKER 2650 DESIGN PSEUDOCODE

```
   IF (PHY_EE_START_x_ [msb:] = ARADDRW [msb:]
   AND PHY_EE_START_x_ [lsb:] ≦ ARADDRW [lsb:] ≦ PHY_EE_END_x_ [lsb:])
   THEN MREQ_DOMAIN_WRITE_x_ <= '1';
   ENDIF;
ENDIF;
IF (MREQ_DOMAIN_READ_x_ OR ..OR MREQ_DOMAIN_READ_x+1_) = '1'
THEN MREQ_DOMAIN_READ_CHANNEL [2:0] <= EE_ACTIVE [2:0];
ELSE MREQ_DOMAIN_READ_CHANNEL [2:0] <= UIEE_ACTIVE [2:0];
ENDIF;
IF (MREQ_DOMAIN_WRITE_x_ OR ..OR MREQ_DOMAIN_WRITE _x+1_) = '1' THEN
MREQ_DOMAIN_WRITE_CHANNEL [2:0] <= EE_ACTIVE [2:0];
ELSE MREQ_DOMAIN_WRITE_CHANNEL [2:0] <= UIEE_ACTIVE [2:0];
ENDIF;
SECURITY_VIOLATION_ READ_PHY_EE <= SEC_VIOLATION_READ x_ AND ... AND
SEC_VIOLATION_READ _x+1_;
SECURITY_VIOLATION_PHY_EE_IBUS <=
      SECURITY_VIOLATION_READ_PHY_EE AND ARPROT [];
SECURITY_VIOLATION_PHY_EE_RBUS <=
      SECURITY_VIOLATION_ READ_PHY_EE AND NOT (ARPROT [];
VIOLATION_READ_NEUTRALIZER_FCT (SECURITY_VIOLATION_READ_PHY_EE OR
{same group});
```

The EE Creator 2656 of TABLE 33 checks to see if the asserted address (except in Monitor mode) on either the Read or Write bus is in the range allocated to a particular PSEE indexed x. If so, the MreqDomainx qualifier representing that PSEE in the EE_Active register for that bus is activated. If not, then the MreqDomainx qualifier is representing the UIEE identified in register UIEE_Active since the address is outside PSEE address space. If an instruction read in a data-only space is detected, then a security violation is issued. These tests supplement other Physical Checker tests disclosed in incorporated application TI-61985. A Hypervisor_EN bit, when active, is enabling for this EE Creator 2656 and the bit indicates that the system of PSEEs and UIEE is being used.

The PE Creator pseudocode of TABLE 33 is but one of many possible embodiments. Some embodiments use a comparison of the address range Start/End boundaries corresponding to PSEE identification value x in the EE_Active register with the address of the attempted access and sets MreqDomainx only if the address of the attempted access lies within the address range permitted for the PSEE, else a security violation is issued.

The SSM Physical Checker 2650 is also coupled to the Data Write bus of FIG. 9A. Note that Physical Checker 2650 does not need to check for violation on the Data Write base in a case wherein the Data Cache and Write Buffer might not have been drained before entering the Monitor mode in path to enter the virtual container. In such case, a possible writeback could result during this Monitor code and cause an unnecessary violation signal when no meaningful security violation has actually occurred. The Monitor Mode software code ensures the system coherency by executing the appropriate memory barriers before activating the new EE to ensure that no undesired write takes place after entering the new EE.

When leaving a virtual container or an EE to switch to the Monitor Mode, the Monitor Mode 2310 of FIGS. 5 and 2410 of FIGS. 6 and 6A executes a Data Memory Synchronisation/Write Barrier (DMB_DSB/DWB) to ensure that all pending items in Data Cache belonging to the EE or Virtual Processor are written to a physical address. See also FIG. 18 and TABLE 42. The reason is that when an EE is suspended or a virtual container is deactivated (VP1_ACTIVE=0, EE_Active no longer points to another EE), then a write access belonging to the EE x signified by MreqDomainx is pending, or a pending write access belongs to a virtual container that is no longer marked as Virtual by MreqSystem=1 qualifier being active. The implementer also defines or configures the virtual container or EE or category to have a granularity such as page size and a permitted total memory space such as some substantial fraction of DRAM space.

In FIG. 8, SSM Virtual Checker 2630 defines the virtual container virtual memory space. Also, the SSM Virtual Checker 2630 checks that when the processor core 2610 is executing in the virtual container there no fetch or data transfer outside the memory boundary. Memory boundaries defined as Data Only by classifier MreqType are not executed, which enhances buffer overflow attacks detection. By means of L1 cache physical to virtual indexing, the SSM Virtual Checker 2630 also ensures that the memory has not been corrupted by the non-virtual world to which it belongs. The SSM virtual checker also ensures that branch phantom instructions (see glossary TABLE 36 of incorporated patent application TI-61985) and executed instructions do not generate an exception. This facilitates detection of corrupted code in some attack scenarios.

In FIG. 9A, processor core 2610 is coupled via a peripheral port 2625 and bus interface 2728 to Registers 2620 in the SSM 2460. SSM 2460 also includes a Secure FIQ preemptive masking handler 2715 coupled to an Interrupt Handler 2720. The Interrupt Handler 2720 has various numbered inputs to which various interrupt sources in the system are assigned. Examples of interrupt sources are SSM (secure state machine) 2460, System DMA (SDMA), Display DMA, Camera DMA, Core, Emulation, and Peripheral, compare with FIG. 10.

Interrupt Handler 2720 is coupled to registers 2725 including an Interrupt Status Register ISR and Interrupt Register ITR, and is coupled to the peripheral port 2625 via the bus interface 2728. Interrupt Handler 2720 has FIQ/IRQ output coupled to the processor core 2610 via an interrupt bus 2735. The Secure FIQ preemptive masking handler 2715 delivers automatic public FIQ pre-emptive masking signals to Interrupt Handler 2720. In SSM Registers 2620, a Public_FIQ VP1 register and a Secure_FIQ VP1 register configure the Secure FIQ preemptive masking handler 2715, see detail of FIG. 13.

In FIG. 9A, SSM registers 2620 are provided and discussed in more detail in connection with FIGS. 8, 8A, 12, 12A, 12B, and 21C and elsewhere herein.

In FIG. 9A, a Firewalls and Checkers block 2740 includes an instruction bus firewall, monitor code firewall, monitor code integrity checker, monitor stack firewall, monitor data integrity checker, secure privilege stack integrity checker, firewall 2742 for Block 2744, and firewalls that protection execution environments EEx or virtual processor (NS, VP1), and a Trace firewall. Compare the SSM Virtual Checker 2630 and SSM Physical Checker 2650 of FIGS. 8 and 8A with checker functions of the Firewalls and Checkers block 2740 of FIG. 9A.

Functional busses coupled to interface 2655 include one or more busses. Three functional busses for Data Read, Data Write, and Instruction are depicted. Other embodiments may have one or more combined busses so that fewer functional busses are present. In such embodiments, the blocks 2740 of FIG. 9A and block 2760 of FIG. 9B are revised to accommodate the combined busses.

Further in FIG. 9A, secure demand paging circuitry 2745 in effect expands secure memory space and has registers in SSM Registers 2620. Incorporated patent applications TI-38213 and TI-39617 describe some examples of secure demand paging technology that are suitably used in block 2745.

Figure 9B:
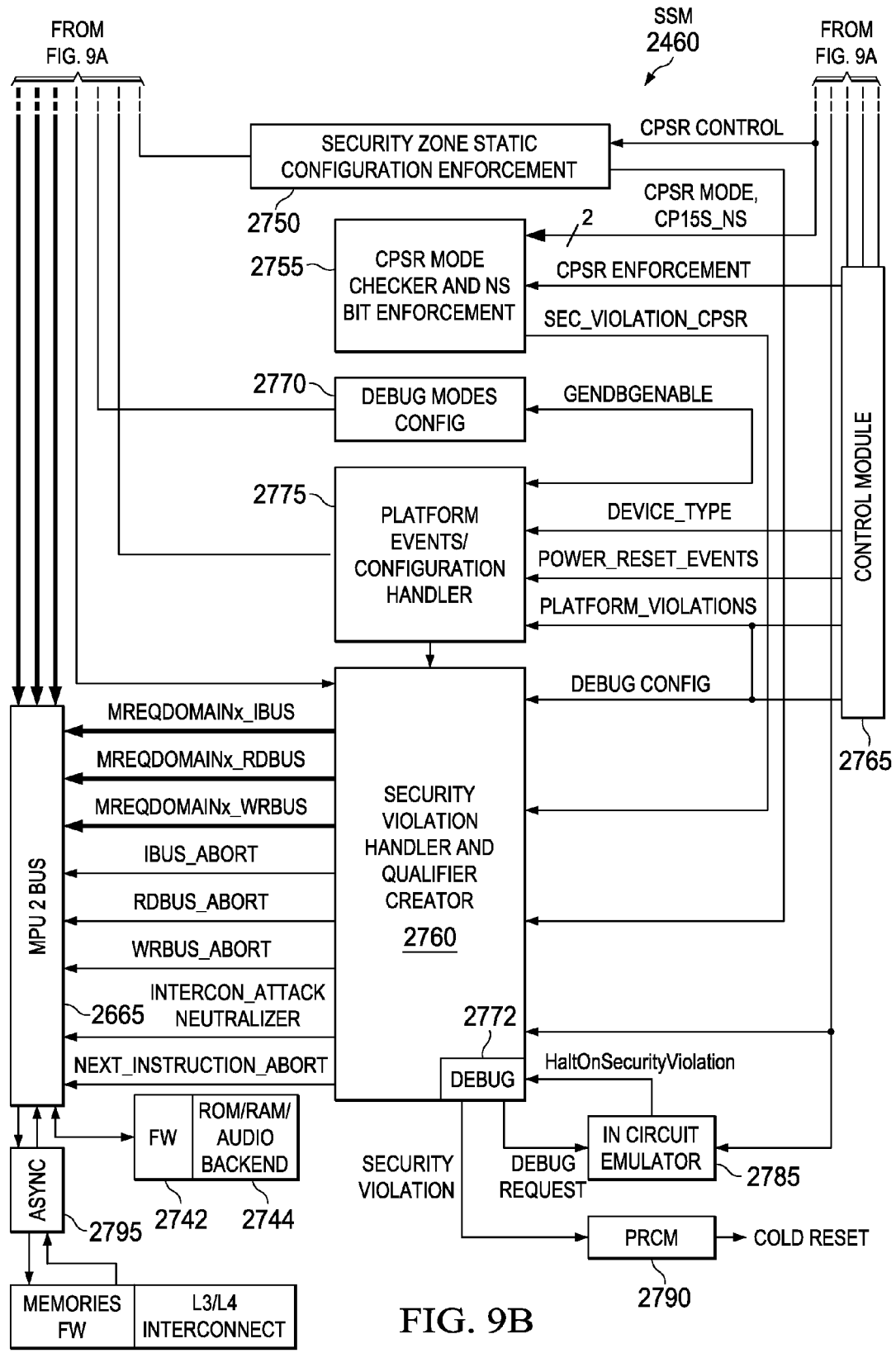

In FIG. 9B, a Security zone static configuration enforcement block 2750 is fed by CPSR control bits from the Security Monitor bus SECMON 2635. CPSR is monitored because CPSR determines modes and indicates transitions to and from Monitor Mode, for instance. A CPSR/NS block 2755 has a CPSR mode checker circuit and an NS bit Enforcement circuit. If a security violation event occurs, CPSR/NS block 2755 supplies a security violation output to a Security Violation Handler block 2760. The CPSR/NS block 2755 is fed with CPSR mode bits and CP15 NS bit and is responsive to a signal designated CPSR Enforcement Mode supplied from Control Module 2765. A Debug Modes Configuration block 2770 is activated by a general debug enable signal GenDbgEnable from a Platform Events and Configuration Handler block 2775. The Debug Modes Configuration block 2770 supplies a Debug Request to a Debug Port 2780 of the processor core 2610.

In FIGS. 9B and 9A and in FIG. 8A, the Control Module 2765 supplies the Firewalls and Checkers block 2740 with information representing Start and End addresses of the Monitor code and Monitor Stack, with the Start and End addresses of the virtual processor or EE resources, and with stacked memories protection and Secure privilege stack protection information. The Control Module 2765 supplies the CPSR/NS block 2755 with a CPSR Enforcement mode signal. Control Module 2765 supplies the Platform Events and Configuration Handler 2775 with signals along lines for a Device Type, for Platform Violations, and for Power Reset Events. Control Module 2765 supplies the Security Violation Handler 2760 with Platform Violations enables (compare with FIGS. 28A/28B of incorporated patent application TI-61985) and supplies a debug section 2772 with information regarding Debug configuration. (Compare with FIG. 30 of incorporated patent application TI-61985).

Figure 10:
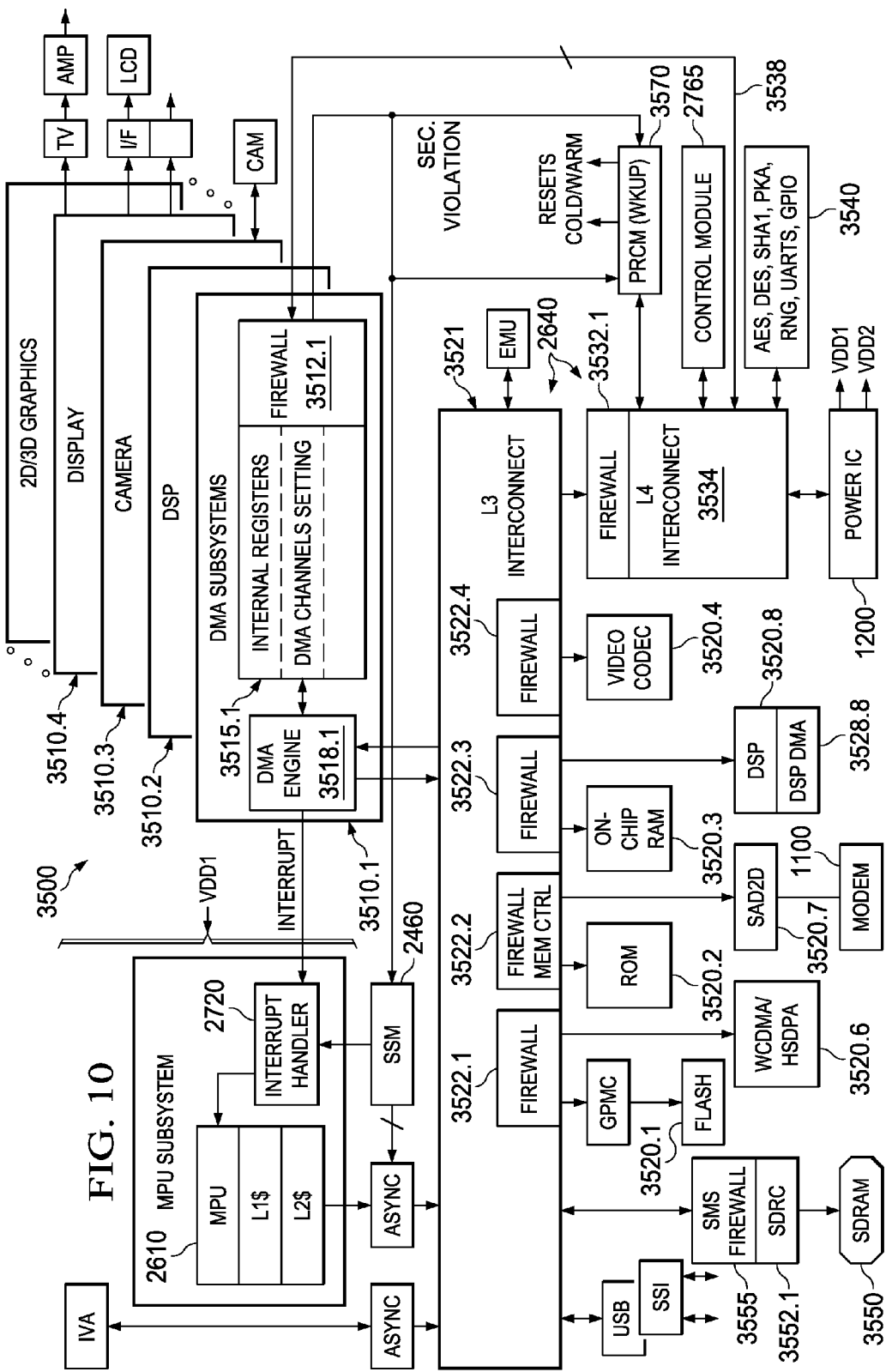
FIG. 10 is a block diagram of an electronic system protected by an inventive security hardware (SSM) of FIGS. 8A and 9A/9B and target firewall circuits.

Control Module 2765 in FIG. 9B has error log registers for access errors identified by various sources and firewalls in the system of FIG. 10, such as from SSM 2460, Secure Watchdog, Emulation Firewall, Peripherals Firewalls, DSP Firewall, MAD2D Firewall, SSM Firewall, Display DMA Firewall, Camera DMA Firewall, WCDMA Firewall, System Memory Functional Bus Firewall, Flash Firewall, On-Chip RAM Firewall, and On-Chip ROM Firewall. Separate error log registers of Control Module 2765 log errors in Debug mode for the various sources in the system of FIG. 2 and FIG. 10.

In FIG. 9B, Security Violation Handler and Qualifier Creator 2760 is fed with violation information from Firewalls and Checkers block 2740, from Security zone static configuration enforcement block 2750, from CPSR/NS block 2755, and from Platform Events and Configuration Handler 2775. Security Violation Handler and Qualifier Creator 2760 is bi-directionally coupled to the SSM Registers 2620.

In FIGS. 9A/9B, Power Management circuitry PRCM 2790 or PRCM 3570 (FIG. 10) is provided to establish and control different power domains in a single integrated circuit (IC) and/or in a multiple IC system such as in FIGS. 2 and 10. The power domains handle different levels of power hierarchy (FIG. 16) and facilitate proper switching from one power domain to another without losing already-configured parameters that are desired for use after the switching or upon return to operation of a given power domain. The power domains include an MPU Power Domain, a Wakeup Power Domain, a Core Power Domain, and a Peripheral Power Domain.

The MPU Power Domain includes the FIG. 9A processor core(s) 2610 and its ports and interfaces 2625, 2635, 2655, 2735, 2780, and Functional Bus Interface 2665 of FIG. 9B and peripheral bus interface 2728, and SSM 2460 including blocks 2620, 2715, 2740, 2745, 2750, 2755, 2760, 2770, 2775, and Interrupt Handler 2720 and its Interrupt Registers 2725, a block 2744 for ROM, Fast RAM and Audio backend with an associated firewall FW 2742, and In-Circuit Emulation block 2785. Emulation block 2785 is coupled to blocks 2760 and 2740. Emulation block 2785 receives CP15 flags and MreqDomainx qualifiers, among its other debug inputs. Emulation 2785 provides a Halt on Security Violation output to block 2760. SSM 2460 is suitably driven by a MPU core clock and a half-rate clock derived from the MPU core clock. The Wakeup Power Domain includes PRCM 2790. A Warm CPU reset and a Cold reset are provided. A Core Power Domain includes the Control Module 2765 and Memories. A Peripheral Power Domain includes various cryptographic accelerators and resources.

In FIG. 10, a system 3500 has DMA subsystems 3510.i. DMA is integrated into the system 3500 in such a way that it can perform target accesses via target firewalls 2645 of FIG. 8 or 8A (see also FIG. 10 firewalls 3522.i, 3532.1, 3555) connected on the interconnects 2640. A target is a circuit block targeted or accessed by an initiator. In order to perform such accesses the DMA channels 3515.i are programmed. Each DMA channel specifies the source location of the Data to be transferred and the destination location of the Data.

Data exchange between the peripheral subsystem and the memory subsystem and general system transactions from memory to memory are handled by the System SDMA 3510.1 having a DMA engine 3518.1. Data exchanges within a DSP subsystem 3520.8 are handled by the DSP DMA 3528.8 and/or by DSP DMA 3510.2. Data exchange to refresh a display is handled in display subsystem 3510.4 using a DISP DMA 3518.4 (numeral omitted). Data exchange to store camera capture is handled using a Camera DMA 3518.3 in camera subsystem 3510.3.

Figure 13:
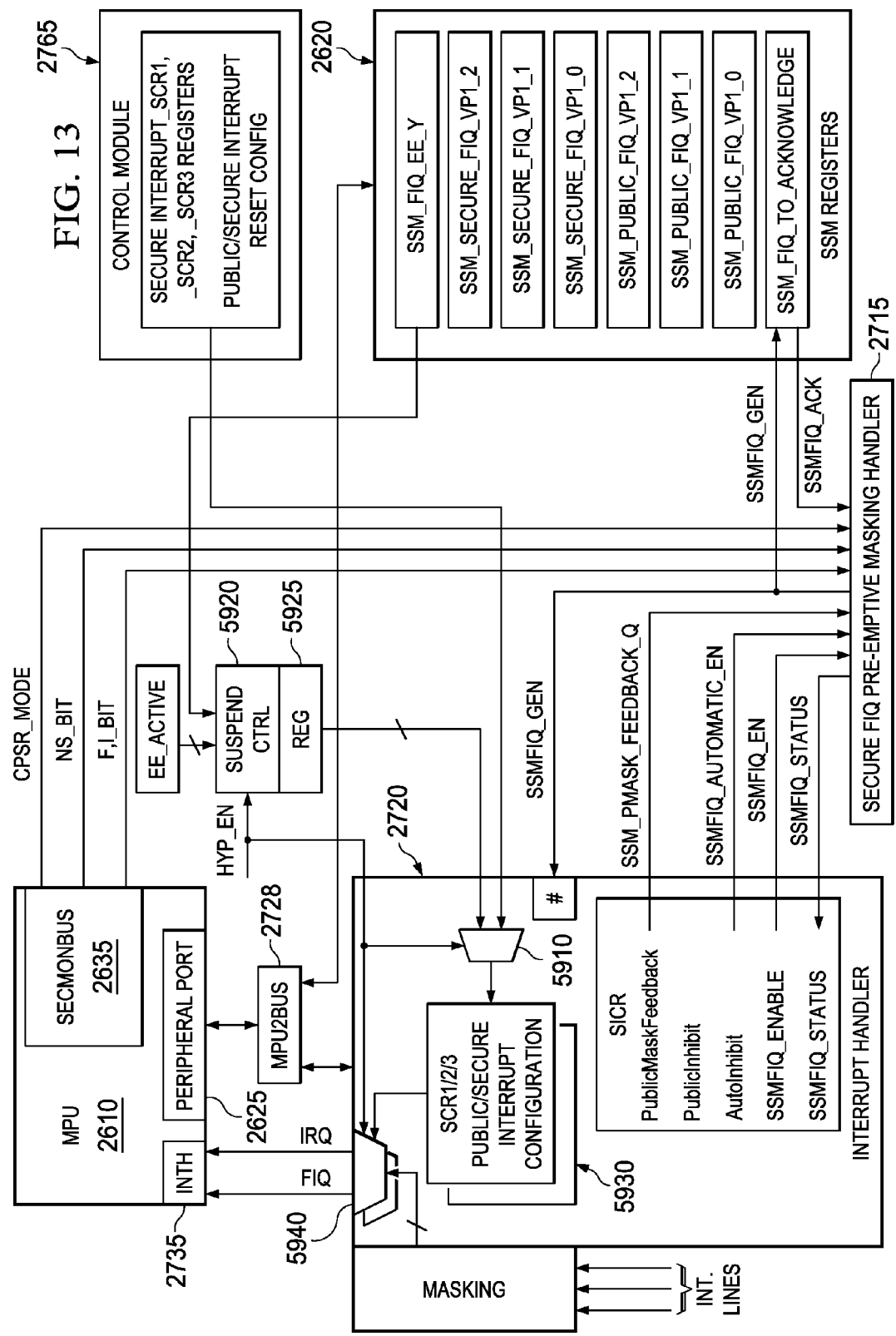
FIG. 13 is a block diagram for combination with FIGS. 12A and 12B highlighting an Interrupt Handler and Secure FIQ Pre-emptive Masking Handler with related registers in combination transforming an IRQ configuration for active EE to FIQ configuration for suspended domain and back to IRQ as in FIGS. 29A-E and 30-32.

A hardware security architecture including SSM 2460 propagates qualifiers via MPU2BUS interface ASYNC onto the interconnect as shown in FIGS. 8 and 10. The MPU 2610 issues bus transactions and sets some qualifiers on Interconnect 3521. SSM 2460 also provides the MreqDomain qualifier(s) as in FIG. 8A. The bus transactions propagate through the L4 Interconnect 3534 and then reach a DMA Access Properties Firewall 3512.1. Transactions are coupled to a DMA engine 3518.*i* in each subsystem 3510.*i* which supplies a subsystem-specific interrupt to the Interrupt Handler 2720. Interrupt Handler 2720 is controlled by the SSM 2460 as shown in FIG. 13.

Firewall protection by firewalls 3522.*i* is provided for various system blocks 3520.*i*, such as Flash memory 3520.1, ROM 3520.2, on-chip RAM 3520.3, Video Codec 3520.4, WCDMA/HSDPA 3520.6, SAD2D 3520.7 and DSP 3520.8. SAD2D means signaling asynchronous die to die, which is an electronic interface or optical-electronic interface or other communicative interface between stacked dice, wherein each die in the stack has an integrated circuit fabricated in that die. Each die in the stack is physically affixed to any adjacent other die. Some embodiments have application processor 1400 (FIG. 2) and Modem processor 1100 on respective stacked dice, or application processor 1400 plus a graphic processor on a respective die, or plural application processors 1400 replicated on respective dice, and other embodiments provide other combinations of two or more stacked dice partitioning the electronic system of FIG. 2 and other systems.

Various initiators in the system are given 4-bit identifying codes designated ConnID. Some Initiators and their buses in one example are Processor Core MPU 2610 [RD, WR, INSTR Buses], digital signal processor direct memory access DSP DMA 3510.2 [RD, WR], system direct memory access SDMA 3510.1 [RD WR], Universal Serial Bus USB HS, virtual processor PROC_VIRTUAL [RD, WR, INSTR], virtual system direct memory access SDMA_VIRTUAL [RD, WR], display 3510.4 such as LCD, memory management for digital signal processor DSP MMU, camera CAMERA 3510.3 [CAMERA, MMU], and a secure debug access port DAP, see debug interface 2772 in FIG. 9B, emulator in FIG. 10, and scan controller 4290 in FIGS. 12, 12A and 12B, and scan controller 4590 in FIG. 21C.

The DMA channels support interconnect qualifiers collectively designated MreqInfo, such as MreqSecure, MreqPrivilege, MreqDomain in order to regulate access to different protected memory spaces. The system of FIGS. 8, 8A, 9B, 10 and other Figures, configures and generates these different access qualifiers in a security robust way and delivers them to hardware firewalls 3512.1, 3512.2, etc. and 3522.1, 3522.2, etc. associated with some or all of the targets. L4 Interconnect 3534 supplies any subset or all of the MreqInfo signals of TABLE 7 to the DMA Firewall 3512.1 and other firewalls 3512.*i*. Interconnect 3534 is also coupled to Control Module 2765 and cryptographic accelerators and blocks 3540. The improved hardware firewalls protect the targets according to different access rights of initiators.

The DMA channels 3515.1, .2, etc. are configurable through the L4 Interconnect 3534 by the MPU 2610. A Firewall configuration is also provided and restricts different DMA channels according to the configuration written beforehand to configuration register fields. This firewall configuration implements hardware security architecture rules in place to allow and restrict usage of the DMA channel qualifiers used in attempted accesses to various targets.

When an attempt to configure access for DMA channels in a disallowed way is detected, in-band errors are sent back to the initiator that made the accesses and out-band errors are generated to the Control Module 2765 and converted into an MPU Interrupt.

TABLE 7

MREQINFO SIGNALS

| Firewall Qualifier | Definition |
|---|---|
| MreqDomainx | 0 Non-virtual transaction |
| | 1 EEx transaction; virtual transaction |
| MReqPrivilege (Or MreqSupervisor) | 0 User mode access, non-privileged |
| | 1 Supervisor or other non-user mode privileged access |
| MReqSecure | 0 Public transaction |
| | 1 Secure transaction |
| MReqDebug | 0 Application access |
| | 1 Emulator access |
| MReqType | 0 Data access |
| | 1 Opcode fetch |
| Additional Qualifiers for L3 Interconnect Firewalls 3522.i | |
| MReqCacheable | 0 Non-cacheable data |
| | 1 Data cacheable, CPU has access to cacheable memory location. |
| MReqElementSize | Natural data type of the access. |
| | 00 Byte |
| | 01 16-bit |
| | 10 32-bit |
| | 11 Unknown |
| MReqEndianness | Endian-ness assumption made re the target. |
| | 0 Big Endian |
| | 1 Little Endian |
| MReqEndianLock | 0 Endianness can be changed if target mismatch is detected. |
| | 1 Lock transaction endianness on the whole path to target. |
| MReqEndianConvResp | 0 No endian conversion needed on the response |
| | 1 Response data is endian-converted before return to initiator |

A signal ConnID is issued onto the various buses by each initiator in the system 3500. The signal ConnID is coded with the 4-bit identifying code pertaining to the initiator originating that ConnID signal. System Memory Interface SMS firewall 3555 in some embodiments also has an adjustment made to ConnID initiator code so that if incoming ConnID=MPU AND MreqDomain='1', then ConnID=MPU_Virtual. If incoming ConnID=SDMA AND MreqDomain='1', then ConnID=SDMA_Virtual. In this way the special signal MreqDomain identifies a virtual world for these initiators to protect their real time operation.

The System Memory Interface SMS 3555 in some embodiments provides a HOST 3560 qualifier to represent a Host access (or non-Host modem access) for SDRC SDRAM Refresh Controller 3522.1 coupled to SDRAM 3550.

In FIG. 10, DMA access properties firewall 3512.*i* has configuration hardware security rules for example as follows. 1) A secure access configures a DMA channel 3515.*i* as Secure, i.e., the access is restricted to be a secure access to make the configuration happen. This can effect a substantive change to the firewall configuration even if the firewall configuration is already set to Secure because configuring or programming the same mode in a given hardware security rule here can involve re-configuring another MreqInfo qualifier (such as MreqType) subject to compliance with the other configuration hardware security rules here. If a Public access attempts to program a DMA channel as Secure, the action is prevented and produces a security violation. Secure accesses are able to program a DMA channel 3515.*i* as Public or Secure subject to compliance with the other configuration hardware security rules.

2) For FIGS. 4 and 6, setting of any DMA channel 3515.*i* as Virtual is restricted to occur only when the access to program the DMA channel is made by accesses initiated by the MPU 2610 in Virtual mode. A Non-virtual access is allowed to configure DMA channel as Non-virtual, provided the other configuration hardware security rules are complied with. However, if a Non-virtual access attempts to program a DMA channel as Virtual, the action is prevented and a security violation is issued. For FIGS. 4A and 6A, the DMA configuration rule is based on the existence of several EEs and keeps the PSEEs and UIEE from modifying DMA channel configurations of each other or among themselves, while permitting the secure environment (SE, or secure EE) to do so under supervision of the hypervisor.

3) Setting of any DMA channel 3515.$i$ as Public Privilege is restricted to occur only when the access to program the DMA channel is made by Public Privilege, Secure User or Secure Privilege accesses to an address of the channel register DMA_CHANNELi in registers 3515.$i$ to be programmed. Setting of any DMA channel as Secure Privilege is also restricted to occur only when the access to program the DMA channel is made by Secure Privilege access. Analogously, a Public User access is allowed to configure DMA channel as Public User, subject to compliance with the other configuration hardware security rules. However, if a Public User access attempts to program a DMA channel as Public Privilege, the action is prevented and a security violation is issued. A Secure User access is allowed to configure a DMA channel as Secure User. However, if a Secure User access attempts to program a DMA channel as Secure Privilege, the action is prevented and a security violation is issued. On the other hand, Privilege accesses are able to program a DMA channel as User or Privilege without restriction in their own Public or Secure mode, subject to compliance with the other configuration hardware security rules.

Hardware security rules are applied as follows. When a channel rights configuration for DMA channel 3515.$i$ is successfully made according to the configuration hardware security rules implemented in the hardware, the MreqInfo TABLE 7 qualifiers of the accesses that made that configuration are recorded or entered and thereby establish the channel rights in the channel rights register for regular (non-configuration) run-time accesses to DMA subsystem 3510.$i$ (source, destination). Then operation of the DMA subsystem 3510.$i$ is started and uses these MreqInfo qualifiers configured into the channel rights register DMA_CHANNELi 3515.$i$ for firewall evaluation of a regular transaction issued on the interconnect.

In FIG. 10, the DMA registers 3515.$i$ include eight registers DMA_CHANNELi_INT[ ] that temporarily or internally hold the DMA channel i attempted configuration. Index i is replaced by a digit 0, 1, . . . 7 in the register name for an eight-channel example. Also, a further eight registers DMA_CHANNELi hold the actual current DMA channel rights for the respective channel indexed i, where index i is replaced by a digit 0, 1, . . . 7 in the register name. Each DMA_CHANNELi register has bits/fields for Lock, Mreq-Domain, MreqPrivilege, MreqSecure, and any other MreqInfo bits/fields appropriate to administer the DMA channel indexed i.

The Lock bit, if set, locks the DMA_CHANNELi register to which it pertains. The various Mreq-prefixed bits MreqDomain, MreqPrivilege, MreqSecure, and so forth, in the DMA_CHANNELi register are issued to the DMA Access Properties Firewall 3512.$i$ on occurrence of an attempted regular (non-configuration) DMA transaction via the corresponding DMA channel from Interconnect 3534. The attempted DMA transaction is represented by signals on lines 3538 in FIG. 10 for memory command MCMD for Read or Write (R/W), memory request information MReqInfo, memory data MDATA, and memory address MADDR. In FIG. 10, the interconnect 3534 has a bus 3538 that supplies those memory-related signals.

A security violation is recognized by the Firewall 3512.$i$ upon an attempted configuration access wherein the MReqInfo supplied from Interconnect 3534 is non-compliant or inconsistent with the configuration hardware security rules hereinabove for a given attempted configuration access and implemented in the firewall 3512.$i$ to which the attempted configuration access is made. Then the DMA Access Properties Firewall 3512.$i$ issues an active signal on a line SEC_VIOLATION to a Violation Handler in FIG. 10 for in-band error that returns a Security System Response signal SRESP to the Interconnect 3534. In this way, the hardware protection by the firewall 3512.$i$ over its own configuration is achieved for configuration accesses. If the attempted configuration access is compliant with the configuration hardware security rules hereinabove, then a grant signal is activated and the configuration process is completed.

In FIGS. 10 and 9A/9B, Control Module 2765 between Interconnect 3534 and DMA Firewall 3512.1 receives the Security Violation signal from DMA Firewall 3512.1. A Security Violation flag is activated in a Control_Sec_Err_Status register and is forwarded to SSM Platform_Status_Register of FIG. 9A. This flag is read on every Monitor Mode switch or otherwise frequently read, or interrupt handler 2720 generates an interrupt each time one of the Flag bits is updated or activated by the hardware.

Figure 11:
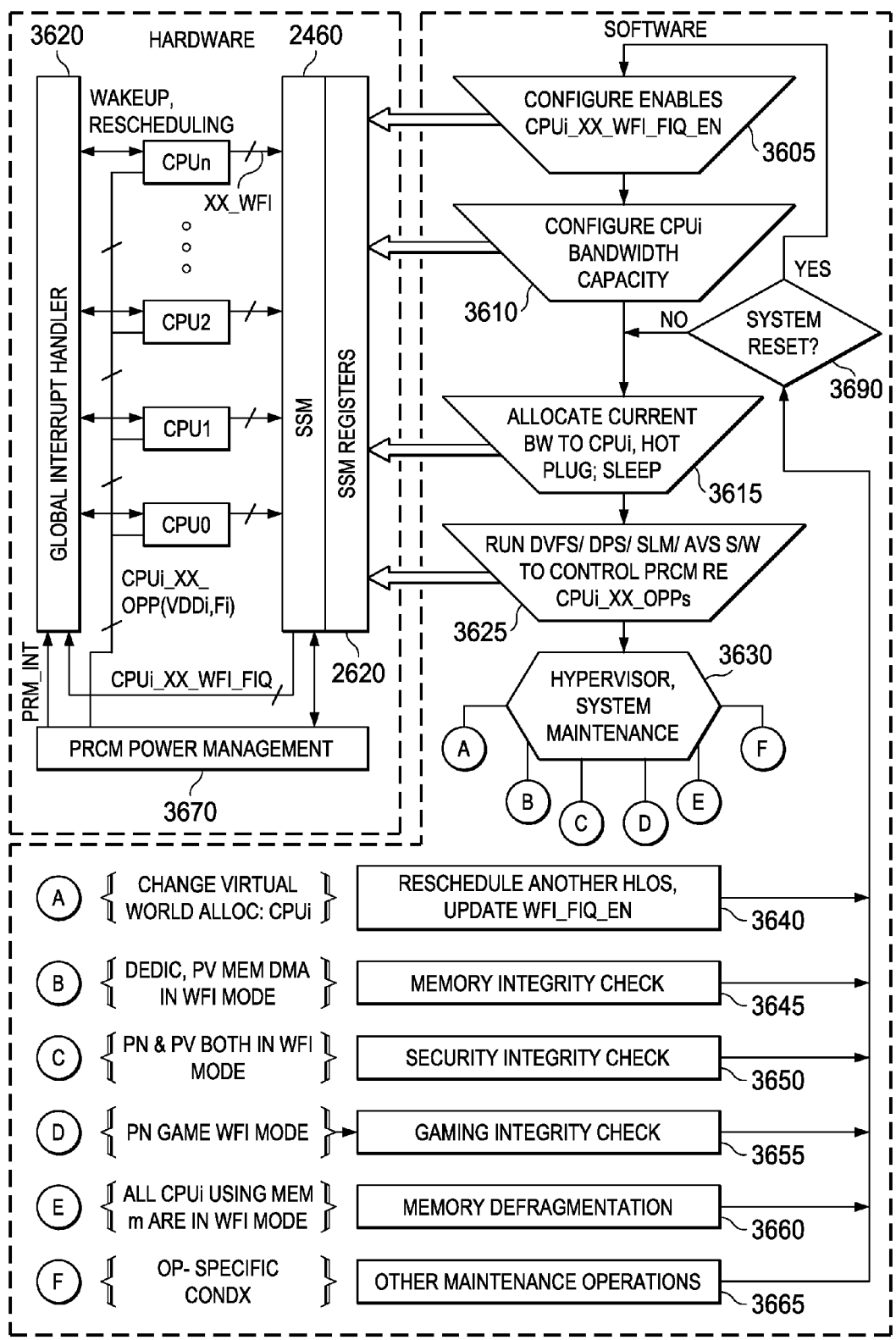
FIG. 11 is a partially block, partially flow diagram of an inventive combination of a multiprocessor system with power management and global interrupt handling protected by a secure state machine and operated according to a inventive process of operation.

Turning to FIG. 11, Hardware (HW) embodiments based on at least one interrupt related instruction such as the wait for interrupt (WFI) instruction optimize task scheduling of parallel operating systems running in separate MPU core categories or execution environments (EEs) in a single-core architecture or multi-core architecture of FIG. 11 or the other Figures. As used herein, "WFI" is used as a broad term referring to software including one or more instructions the execution of which initiates a processor core idle, standby, sleep or similar state and the processor core can subsequently be reactivated or awakened by a subsequent exception such as an interrupt or other exception provided to the processor core. "WFI" in one specific form in ARM® Cortex™ processor technology, for instance, refers to an instruction which when executed puts the processor into a lower power state such as stopping the clock in some part of the processor circuitry until an exception subsequently occurs. "WFI" herein also refers a signal or a line indicative of the WFI execution. An interpretation of the WFI wait-for-interrupt mnemonic as used herein is that a processor core executes the WFI and that core waits in a lower power state than it had prior to executing the WFI and waits until an interrupt or other exception is provided to that core from some other source. For instance, another source for the exception to wake up a waiting processor core can be a hypervisor running on another processor core, a scheduling hardware module, or some other source. Reference to WFI as an instruction in some embodiments is merely illustrative and without limitation in regard to other embodiments in which WFI is alternatively provided within the broad meaning here.

"Interrupt-related" as the phrase is used herein pertains to an interrupt itself or to influencing the handling of an interrupt, or controlling an interrupt in some way. "Context-related" for the present purposes means pertaining to a processor context either established in the processor by context registers or by hardware and software to establish virtual categories or execution environments EEs that use, but go beyond the context registers of the processor. To go beyond the context registers, high level software for instance stores information of such environments or virtual spaces in a separate register such as the SSM or securely elsewhere in the hardware outside the processor.

Having several high level operating systems (HLOSes) that are not aware of each other running on the same processor (single core or multi-core) through a hardware hypervisor can create complex scenarios for power saving, memory bandwidth allocation, and tasks scheduling of the different HLOSes.

Monitor Mode software acting as a software driver for a hardware-protected hypervisor structure may have a poor visibility into what the different HLOS tasks and schedulers are doing and nevertheless allocate bandwidth to the different HLOS following a static scheme. A static scheme is a predetermined scheme that is likely to be insensitive to dynamic conditions of operation that involve particular categories or EEs and CPU cores. Consequently, when a HLOS is about to enter Idle mode and executes a WFI in the process of entry into Idle, a system component such as the power and reset control manager PRCM might enter, or might be caused to enter, a power management state called an operating performance point (OPP) and discussed in FIG. 16, that is less than optimum for other running high level operating systems or HLOSes. That state is less than the optimum because a high performance (e.g., OPP4) may be needed but an HLOS is in a lower performance state (e.g., OPP2), for example. Conversely, a power management state may be less than optimum because the HLOS was in a high performance state (e.g., OPP4) and another HLOS can be executed in a lower performance state (e.g., OPP2). The power saving of the system would be less than optimal because the hardware-protected hypervisor in such case lacks full information about the exact context of each HLOS (which CPU, what world) when the WFI has been executed and therefore lacks the information to appropriately and dynamically adapt to this new situation. Some embodiments herein provide the CPU and world information and use it responsively to adjust the power saving of the system, and/or other functions of the system to which benefits can be conferred, so as to provide a dynamic and more effective approach.

The impact of a problem solved herein is that on one hand, the power saving strategy of each HLOS can negatively impact the level of desirable functionality and performance of other HLOSes loaded on the system. For instance, the power saving strategy might be DVFS at state OPP2 for one HLOS and OPP4 for another HLOS or other program. A negative impact may be to decrease performance of another potentially resource-demanding HLOS such as an HLOS running multimedia application(s). And on the other hand when a first HLOS has requested an Idle mode, the hardware-protected hypervisor, because of having poor visibility and being constrained by a static scheme, might keep some previously needed but currently unnecessary bandwidth allocated for the first HLOS that is in Idle. The bandwidth allocation is illustrated as being set to various percentages time for processor cycles devoted to each category or EE, see FIG. 23 for example.

When an HLOS has requested an IDLE mode, the hardware hypervisor with poor visibility will keep some bandwidth allocated for HLOS in IDLE and thus decrease performance of another potentially demanding HLOS that is running for example multimedia applications. By providing embodiments for per-world per-CPU WFI status information herein, the hypervisor does not need to blindly keep some bandwidth allocated for an HLOS in IDLE and instead allocates and schedules bandwidth in an intelligent manner.

Figure 22A:
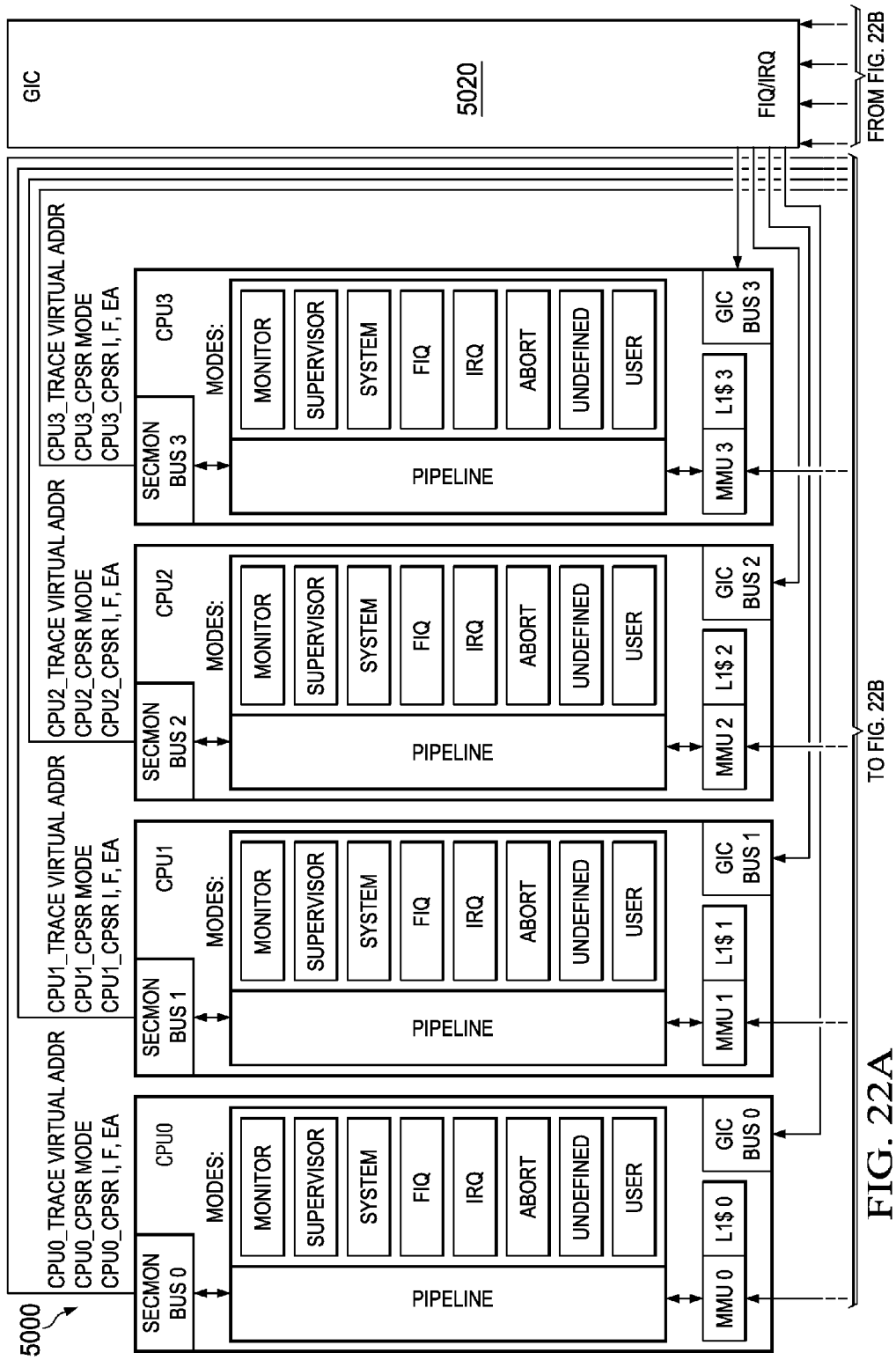
FIGS. 22A and 22B are upper and lower halves of a detailed block diagram of inventive four-CPU hardware and associated inventive hardware-support for an inventive hypervisor based process for a system.
Figure 22B:
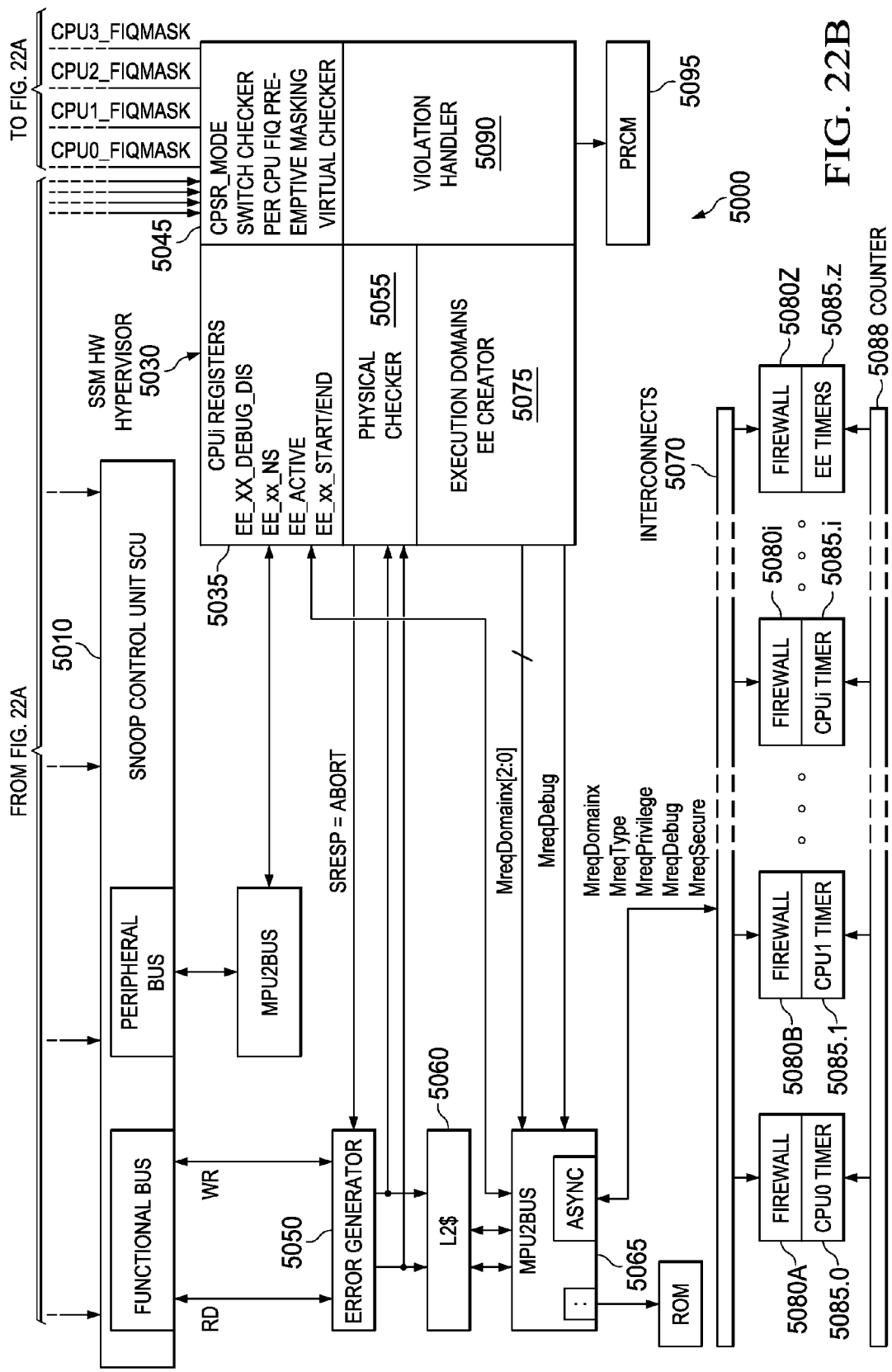
Figure 23:
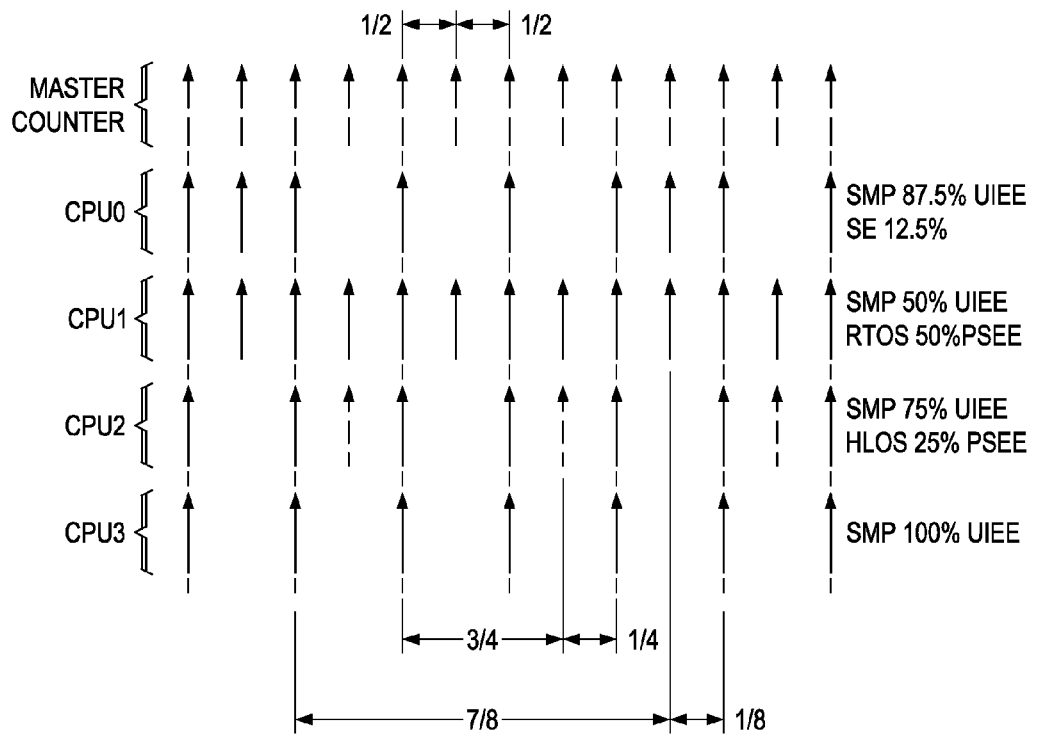
FIG. 23 is a timing diagram of an inventive process of digital signal transitions of an inventive system including master counter, and of four CPUs in an inventive four-CPU system such as in FIGS. 20, 21A/21B/21C, 22A/22B and 26A-F, and showing interspersed interrupt signal transitions legended for various CPUs and types of operating systems for them.

The hypervisor Monitor mode software SW is based on a SW scheduler that is run or actuated by one or several synchronous tick timers 5085.$i$ delivering ticks as in FIG. 22B and FIG. 23. Each tick informs the hypervisor in Monitor mode to switch to another category or execution environment EE for execution. This scheduler allocation of CPU bandwidth for each Execution Environment EE, or execution domain, is configured at boot (e.g., as in FIGS. 11 and 28).

For example, suppose a gaming environment EE is unused or has ceased being used and thus has generated a WFI. The hypervisor scheduler will still be receiving the tick timer for the gaming world tick (e.g., interrupt IRQ from the local timer to the hypervisor scheduler, and referred to as an HLOS tick, see FIG. 23) and may blindly allocate or continue to give over or schedule, a fraction of the bandwidth (CPU time interval) for CPU operation to the gaming world in response to the gaming world tick. The gaming world is basically doing nothing except dissipating power by leakage during such allocated CPU time. At the same time, a probably-valuable CPU-bandwidth-consuming operation in another category or EE has stopped, ceased, or ended because its CPU time interval has elapsed in the cycle of time intervals for different EEs in FIG. 23. But that cessation, in order to serve the gaming world, is unnecessary because the gaming world is doing nothing in its part of the cycle of time intervals for the EEs.

A solution provided herein tracks per-world per-CPU WFI status so that the hypervisor definitively has the information to know that a category or EE, such as the gaming world, has nothing to do and so that the hypervisor has the information to definitively identify that category or EE. Then the hypervisor does not blindly schedule bandwidth for that definitively identified category or execution environment EE that is idle. Instead, the scheduler software is suitably written to take account of the bandwidth needs of the various applications and operating systems that are actually active. Then the scheduler software and hypervisor perform a selected action such as 1) respond to the gaming world tick or interrupt IRQ from the local timer to dynamically and intelligently re-allocate CPU fractional bandwidth because of the WFI to another application or operating system instead, or 2) intelligently determine that the gaming world tick in fact requires no change of bandwidth allocation but because of the WFI temporarily depart from the configured allocation and then continue execution of a currently executing application or operating system or temporarily execute another one in place of the temporarily-idle EE.

FIG. 11 is a partially block, temporarily partially flow diagram of a multiprocessor system with power management 3670 and global interrupt handling 3620 protected by a secure state machine 2460 and operated according to flow steps 3605-3665 and 3690. In some embodiments, the hypervisor layer is provided in each monitor mode instance so that the hypervisor layer exists in each CPU0-$n$, for instance in the embodiment of FIG. 11. Different portions of the hypervisor layer may be more predominantly operative depending on the particular CPU in the system. In some systems a modem, a digital video broadcast receiving circuit, and a digital camera are coupled as in FIG. 2 to one or more of the processor cores of FIG. 11.

In FIG. 11, a multiprocessor system operates as an electronic power management system with plural processors operable in different security and context-related modes and having respective supply voltage inputs and clock inputs. The processors have at least one interrupt input and at least one wait for interrupt output. PRCM 3670 is an example of a power control circuit that establishes different supply voltages and clock rates for the supply voltage inputs and clock inputs, see also FIGS. 14-17. In the SSM 2460, a wait for interrupt WFI expansion circuit of FIG. 12 or 12A is responsive to the at least one wait for interrupt output to provide an interrupt signal. The WFI expansion circuit facilitates tracking each WFI signal on a per-CPU per-EE or per-category basis, which is represented by the legend XX_WFI in FIG. 11. Depending on embodiment, the WFI expansion circuit and XX_WFI is physically associated for convenience more fully with each CPU in some cases or more fully with other SSM circuitry in other cases, or elsewhere, and any degree of security needed for a given architecture is suitably provided and maintained. System management interval SMI signaling is also suitably provided.

The secure state machine SSM 2460 has registers 2620 including a configuration register coupled to the processors CPU0-n and operable for configuring the power management circuit 3670 and the wait for interrupt WFI expansion circuit. At least one of the processors CPU0-n configures the power management circuit 3670 in response to one or more of the interrupt signals at interrupt input(s). In some embodiments, the wait for interrupt WFI expansion circuit in SSM 2460 is responsive to provide an interrupt signal CPUi_xx_WFI_FIQ to a different one of the interrupt inputs depending on which security and context-related mode of a given one of the processors pertains to a wait for interrupt signal therefrom. The wait for interrupt expansion circuit in SSM 2460 is responsive to the wait for interrupt WFI to supply a selected portion of an SSM register with a signal representing which of the security and context-related modes of a given one of the processors pertains to a wait for interrupt signal therefrom, and that register is coupled to at least one of the processors via a bus such as a peripheral bus. The circuitry also routes a system management interrupt between the processors.

In FIG. 11, the software has operations, which in pertinent part for the present description start with a step 3605 that configures a set of register enable bits CPUi_xx_WFI_FIQ_EN, see also FIGS. 12 and 12A. A succeeding step 3610 configures the bandwidth capacity of each of the CPUi. For example, the bandwidth capacity can be configured, such as at boot-time (see also, e.g., step 5830 FIG. 28), as the MIPS (millions of instructions per second) deliverable by each processor CPUi at a clock frequency corresponding to the operating performance points that can be made available to this CPU at run-time by the PRCM 3670. A further step 3615 then allocates bandwidth, such as at run-time, to each processor CPUi so that the processors collectively can run a current mix of applications. This involves configuring the time interval durations permitted for each EE or category. These durations are described elsewhere herein in regard to FIGS. 23 and 23A. The step 3615 in FIG. 11 also includes hot plug and sleep controls.

A succeeding step 3625 executes DVFS, DPS, SLM, and AVS power management processes in a mixture of hardware and software wherein PRCM 3670 is appropriately controlled and operates to establish operating performance points (OPPs) on a per-CPU per EE or category basis designated CPUi_xx_OPPi. In the example of FIG. 11 CPUi_xx_OPPi signify a respective pair of values of voltage VDDi and frequency Fi for processor CPUi when operating in category xx or execution environment xx. When a transition from one OPPi to another OPPj has been ordered by software in step 3625 reconfiguring power control register space in the SSM 2460, then the PRCM 3670 responsively causes the power transition to actually be delivered to and realized at the CPUi. When the new OPPj is actually realized in the system, then PRCM 3670 provides a power management interrupt PRM_INT to global interrupt handler 3620, which causes the appropriate processor CPUi to resume or commence operations in category xx or execution environment xx.

In a step 3630, the hypervisor software controls the system and performs system maintenance functions at appropriate times. Step 3630 evaluates various conditions A, B, C, D, E, F and fulfills the maintenance functions 3640, 3645, 3650, 3655, 3660, 3665 corresponding to whichever of the conditions A, B, C, D, E, F are true. The software process then goes to a decision step 3690 to determine whether a system reset is called for or required. If Yes at step 3690, then operations loop back to configuration step 3605. If No at step 3690, then operations instead go to the run-time step 3615 again.

Regarding the system maintenance functions in FIG. 11, changing an execution environment or virtual world or category assigned to CPUi is accomplished in a step 3640. (See description of FIG. 23A elsewhere herein that shows an example related to step 3640.) The processor system is operable to execute plural high-level operating systems (HLOSes), and each processor that issues the wait for interrupt signal is in a wait for interrupt mode relative to the time interval of FIG. 23 allocated to a given EE or category until the processor is interrupted. In step 3640 one type of maintenance function includes terminating one HLOS in a particular category on a first of the processor cores and initiating another HLOS on the same processor core. In this way, at least some of the bandwidth or time interval yielded by the terminated HLOS is used by the initiated HLOS. At least one of the processor cores launches the other HLOS provided an enabling condition exists that the first processor core activates an interrupt line from the wait for interrupt expansion circuit. The result of the expansion signifies that the particular category on the first processor core is in the wait for interrupt mode. Step 3640 also is able to update the CPUi_xx_WFI_FIQ_EN at run-time, compare to step 3605.

In FIG. 11, the processor system has applications and at least one maintenance function that in some examples would interfere with the application if concurrently executed. At least one of the processor cores is operable in response to an interrupt coupled from the wait for interrupt expansion circuit to schedule a maintenance function separated in time from execution of the application.

In step 3640 a first processor generates a wait for interrupt WFI signal to the wait for interrupt expansion circuit in SSM 2460 to provide an interrupt signal to a selected one of the interrupt inputs of a second processor among the processors in some embodiments, and for the second processor to transfer at least one application from the first processor onto at least a third processor and then configure the power control circuit to put the first processor into a lower power state, such as in a hot plug operation called in step 3615 for performance by step 3640. Also, in step 3640, or other appropriate step, the second processor reconfigures the power control circuit for a different clock rate for the third processor, such as when more performance is needed from the third processor to handle the computing load now present as a result of the transfer.

In a step 3645 a memory and a direct memory access DMA process operate in a public context-related category, and the maintenance function includes a memory integrity check. The hypervisor operating on one of the processor cores launches the memory integrity check provided an enabling condition exists that the public context-related category is in the wait for interrupt mode. In this way, the memory integrity check is separated in time to not interfere with DMA process operation when the public context-related category is active or not in WFI mode.

In a step 3650, the maintenance function includes a security integrity check of a secure world on a the processor core. The hypervisor operating on one of the processor cores launches the security integrity check of that secure world on that processor core provided an enabling condition exists that predetermined public context-related modes are in the wait for interrupt mode. Again, the approach is non-interfering so that the security integrity check is completed satisfactorily and so that the user experience that may pertain to the predetermined public context-related modes when they are active (not in WFI modes) is also satisfactory or improved.

In a step 3655 the maintenance function includes an integrity check of a public context-related category, such as gaming or another public application. A control processor core such as CPU0 can launch the integrity check of the public context-related category on a Hypervisor-determined or selected processor core provided an enabling condition exists that the public context-related category is in the wait for interrupt mode on that hypervisor selected processor core. The integrity check thus is separated in time from execution of the public context-related mode and the user experience is maintained favorably.

A further example of non-interfering operation is memory defragmentation. Each processor that issues the wait for interrupt WFI signal is in a wait for interrupt mode until interrupted. At least one of the processor cores launches the memory defragmentation as in step 3660 when an enabling condition exists that all of the processor cores that use the memory element are currently in the wait for interrupt mode. Thus, defragmentation is performed when there is no interference with ordinary operations of the processor cores that use the memory element.

In general, and as shown in connection with step 3665, maintenance operations on either virtualized or physical system portions are launched in a non-interfering manner with the non-maintenance operations or applications that use or pertain to those system portions. The maintenance portions are enabled or at least not permitted to occur unless in response to the presence of an operation specific condition involving WFI mode and context related information such as category or execution environment EE pertaining to the WFI on a per-CPU basis.

Applying FIG. 12 to FIG. 11, some embodiments herein involve a relatively uncomplicated hardware WFI conversion and expansion architecture that allows trapping in the Secure State Machine SSM 2460 the different WFI commands when generated per-category (public/secure virtual and public/secure non-virtual as in FIG. 6) and per-CPU in multi-core systems by tracking the information represented by hardware signals generated when a given CPUi in a particular world executes a WFI. Examples of such hardware signals are a non-secure/secure CP15NS hardware signal and a virtual/non-virtual VP1_Active hardware signal. For example, using CPU cores each having a Monitor mode, the WFI status information from WFI instruction execution and the related hardware signals is tracked per-world per-CPU using respective secure FIQ (fast interrupt request) signals directly trapped into the Monitor mode of one or more of the CPUs. The secure FIQ interrupts at least one CPU and makes available processing by such CPU(s) and initiates further processing by the hardware-protected hypervisor.

The Hypervisor in Monitor mode of FIG. 12 uses power management software in association with a power, resets and control management hardware block (PRCM) as in FIGS. 2, 10 and 11. Together, the power management software and the PRCM provide an embodiment of structure and process of operation to perform any one or more of DVFS, DPS, AVS, and SLM power management as described in connection with FIGS. 11, 14, 15, 16, and 17. In doing so, some embodiments record all the WFI requests by all the different categories (virtual and non-virtual, each secure or public) and for all CPUi cores and then decrease or increase the MIPS bandwidth of some categories or force a transfer of activity to a greater or fewer number of cores in a multi-core system, such as by steps 3615 and 3640 of FIG. 11. Utilizing per-category per-CPU WFI status information, the Hypervisor with scheduler software re-schedules another HLOS and sets or augments its bandwidth (e.g., FIG. 23 time interval duration allocation) while reducing bandwidth for a core that was running a newly-idled HLOS. The OPP for each CPUi and category xx is established and updated to the extent called for in steps 3615 and 3625 of FIG. 11. The hypervisor is also operable to transfer and confine activity to a fewer number of cores in a multi-core system. In this way, the hardware-protected hypervisor reduces energy and power consumption of one or more cores by lowering the execution frequency and/or scaling the voltage of one or more selected cores.

Figure 12B:
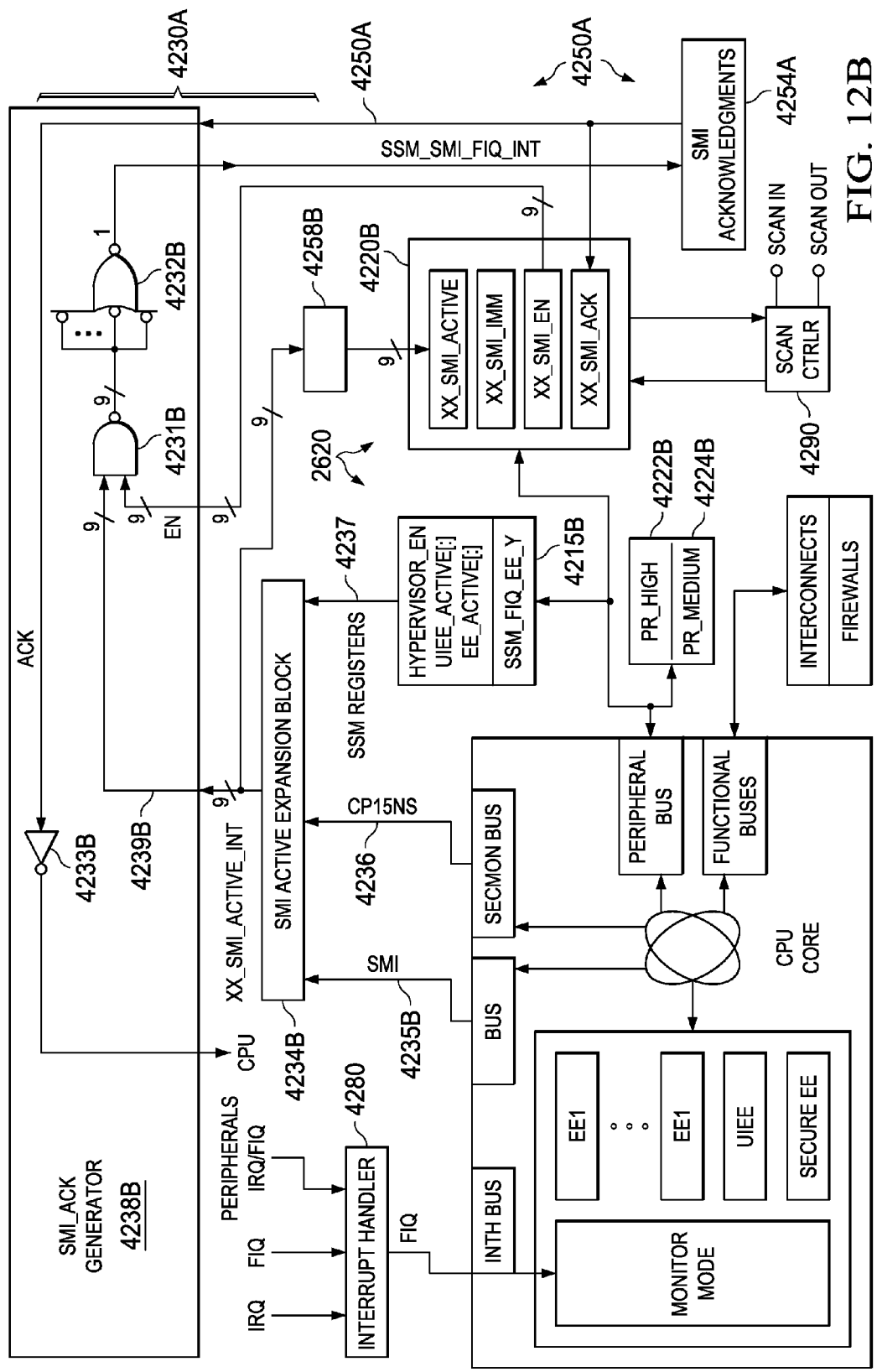
FIG. 12B is a block diagram of an inventive circuit for converting interrupt related signals such as system management interrupt (SMI) signals to deliver interrupts to at least one processor pertaining to a specified execution environment EE, for use in FIGS. 5 and 18 and the other systems.

Access to the per-category per-CPU WFI status information delivered by WFI expansion in FIG. 12 is provided for the system of FIG. 11 in a simple and security robust manner that is hardware based and thus faster, more reliable, more secure and less intrusive, if at all, into different HLOSes than a complicated, heavily semaphored software approach is likely to be. The hardware approach in FIG. 12, 12A or 12B is independent of the CMOS process or other integrated circuit fabrication process used to make the hardware. The hardware approach in FIG. 12, 12A or 12B is easily adapted to any targeted computing hardware platform having or not having a secure mode (UNIX workstation, PC-desktop). Single core and multi-core integrated circuits and systems are supported.

Figure 21B:
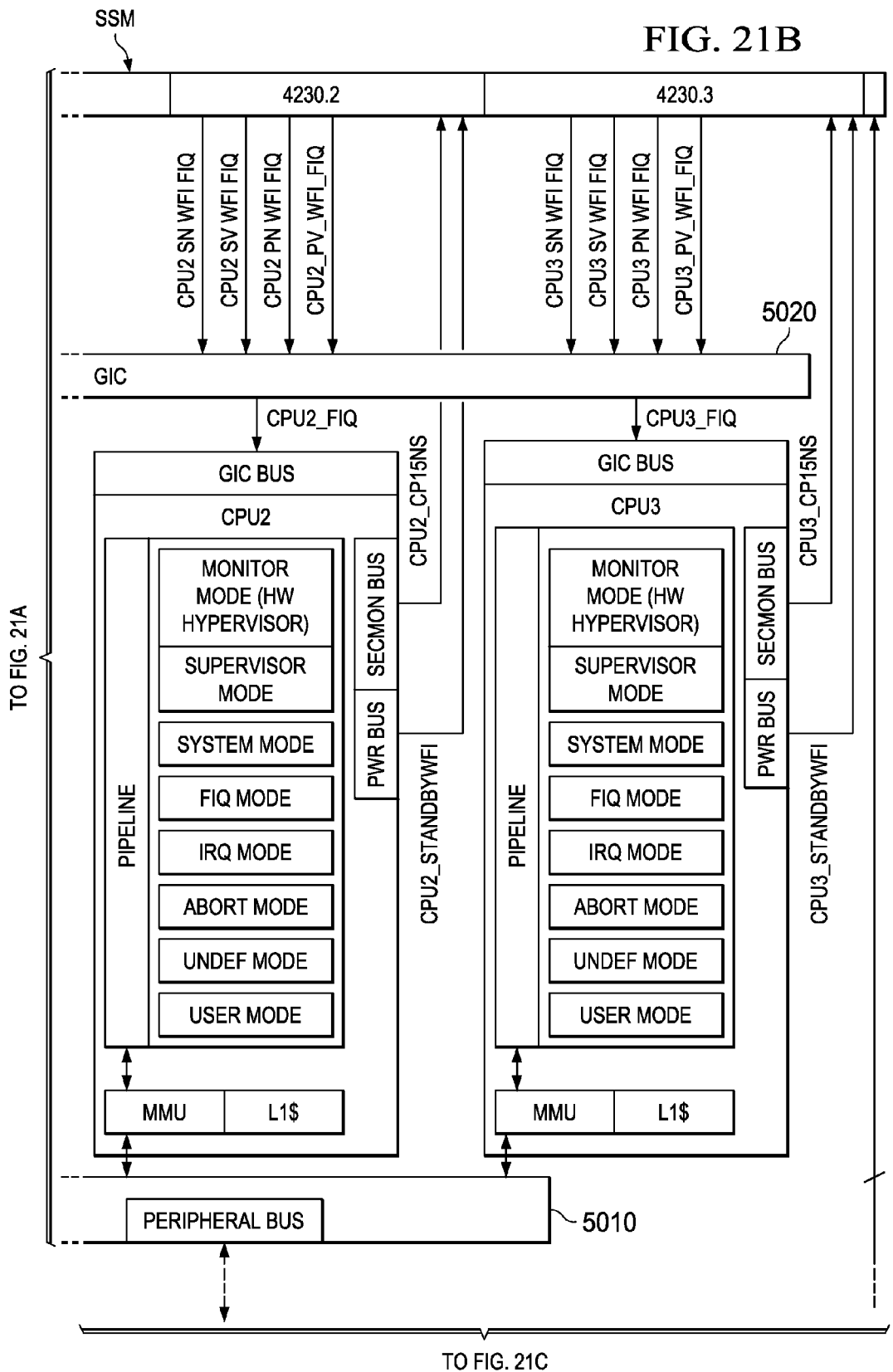
FIGS. 21A/21B/21C are three portions of a composite block diagram showing a detail of an example of inventive four-CPU hardware and software for four-core operation in a system of FIGS. 10 and 11 and using multiple instances of inventive conversion circuitry from any of FIGS. 12, 12A and 12B.

In the circuitry FIGS. 12 and 21A/21B/21C applied to FIG. 11, each interrupt line from a set of many interrupt lines is tagged with a prefix PN_, PV_, SN_, or SV_to designate that it respectively belongs to the Public Non-virtual PN, Public Virtual PV, Secure Non-virtual SN, or Secure Virtual SV category or world. (A prefix xx_indicates that any particular such prefix PN_, PV_, SN_, or SV_can be substituted.) In some embodiments, a security zone SZ allows trapping any FIQ into a Monitor Mode. There, software called Monitor code is programmed to determine from tabular information about the particular interrupt line, or read a special SSM register as in FIG. 12 that tells to which category the FIQ belongs (Public Non-virtual PN, Public Virtual PV, Secure Non-virtual SN, or Secure Virtual SV of both FIGS. 4 and 6) or to which execution environment EE the FIQ belongs as in FIGS. 4A and 6A. The Monitor code reads the Secure/Public hardware signal from Interrupt Handler INTH (secure or public FIQ) and the Non-virtual/Virtual hardware signal such as VP1_Active from the SSM 2460. Using that information the Monitor code can more intelligently switch to a specific processor, activate or inactivate processors, and otherwise better administer the system.

A scheduling optimization structure and procedure using per-world per-CPU WFI status information is described next. In FIG. 12, an HLOS (high level operating system) is running a current task in one of the categories (e.g., four or more categories of FIGS. 4 and 6). When the HLOS finishes the current task, it executes a WFI instruction, enters the Idle mode or other-named lower-power mode, and awaits a re-scheduling or wake up event. When the WFI is executed, the CPU core executing the HLOS that includes the WFI further generates a hardware signal designated STANDBYWFI at the CPU boundary. The hardware signal STANDBYWFI is coupled to a PRCM component such as in FIG. 11, which responds with an appropriate interrupt to power management software that issues a latest power management control pattern of signals to the system according to its power saving strategy. In the particular context of having virtual processors that are not aware of each other, this signal STANDBYWFI is used by the SSM 2460 to generate a fast interrupt request FIQ. WFI FIQ is a Secure FIQ, in all cases in some embodiments, that is provided in order to be trapped into Monitor mode. The WFI initiated SFIQ forces an automatic entry to the hypervisor in Monitor Mode and is able to 1) activate another virtual processor in order to run/resume a pending task and for further processing, and/or 2) run software Monitor code according to, responsive to, or applicable to different per-world per-CPU WFI execution statuses, and/or 3) re-allocate bandwidth in FIGS. 23 and 23A, and/or 4) configure controls to which the PRCM responds.

In FIGS. 12 and 11, the Monitor code suitably provides scheduling optimization to synchronize or otherwise coordinate some resource consuming operations such as security integrity check 3650, and memory defragmentation 3660 when it is known that the different HLOSes in the different worlds and CPUs are currently in WFI mode. WFI mode herein means that a given CPU in a given world has generated a WFI and conveyed the signal STANDBYWFI and either that CPU is awake but inactive and has not been re-scheduled or that CPU is asleep and thus has not been re-awakened. Security integrity checks 3650 are scheduled by Monitor code during WFI mode and thus the security integrity checks 3650 are synchronized or coordinated to maintain high bandwidth performance of multimedia applications. Integrity checks are thus synchronized or coordinated, for instance, when public HLOS (Public Non-virtual PN) and Modem HLOS (Public virtual PV) are in WFI mode so that performance remains high.

Some resource consuming operations in FIG. 11, such as security integrity checks 3650 are thus coordinated, synchronized or executed at least to some extent concurrently, sequentially or otherwise near in time to each other to promote high performance such as on multimedia applications, modem, GPS, gaming, and operators/manufacturer domains. On a multi-core platform, multiple operating systems (e.g. HLOSes) can be executed in parallel using the different categories or execution domains EE (e.g., modem, multimedia, operators, non-GPL, Homebrew, etc.). The Monitor Mode software is made part of the Secure Kernel and is updated with and maintains a record of the Wait for Interrupt WFI status of each OS in each execution domain on each core of a multi-core system. Accordingly, the Monitor Mode software monitors operational status (e.g., placing a phone call) of each execution domain and its associated domain resources and bandwidth. Gaming can be integrity checked in step 3655 concurrently with modem operation, for example, when or because the resources of gaming (data-only) are not linked to the voice modem, thus integrity checking does not impact gaming. When gaming is integrity checked, this can involve root certificate re-authentication and hash-authentication. Hash-authentication can involve SHA1/SHA2 memory portion hashing and comparison with stored hash for a match indicating that integrity has been preserved.

The Monitor Mode software selectively launches an integrity check in FIG. 11 when its monitoring function determines that performance of the integrity check does not impact the execution domain to be checked. For instance, in FIGS. 4, 6, 10, 11 and 12, with gaming (Public Non-virtual PN) in progress some modem memories that are on a different interconnect with a dedicated DMA can be integrity checked as in step 3655 (Public Virtual PV) without adverse impact on the game operation. Doing integrity checking in this way avoids or obviates operations found in some operating systems which might freeze a game every several seconds if such integrity checking were demanded of the operating system.

Security integrity check 3650 and memory defragmentation 3660 (FIG. 11) are synchronized or executed concurrently, sequentially or otherwise in some time association with each other. Memory defragmentation and integrity checks are part of a global operation herein called maintenance operations. Maintenance operations desirably have non-blocking performance so that maintenance operations do not noticeably interfere with or block non-maintenance operations. Also, memory defragmentation is also or alternatively and desirably performed when all domains and OS subject to the maintenance operation are in a WFI sleeping mode.

WFI sleeping mode refers to a CPU idle, standby or sleep mode that is initiated by the WFI and can be further supported by reconfiguring the PRCM to substantially reduce voltage and thus reduce leakage current to a CPU in WFI mode that is further put in WFI sleeping mode herein.

Defragmenting 3660 in FIG. 11 is performed by a CPU0 while other CPUi are in WFI sleeping mode. Defragmenting in WFI sleeping mode in that way is useful because defragmenting can impact several execution domains at the same time when using contiguous memory spaces or when using shared memories. In WFI sleeping mode, no such impact should occur. Security integrity check 3650 and memory defragmentation 3660, which operate while one or more processors are in WFI sleeping mode, are thus coordinated with, and separated in time from, awake operations of those processors so that impact is low or nil.

Figure 18:
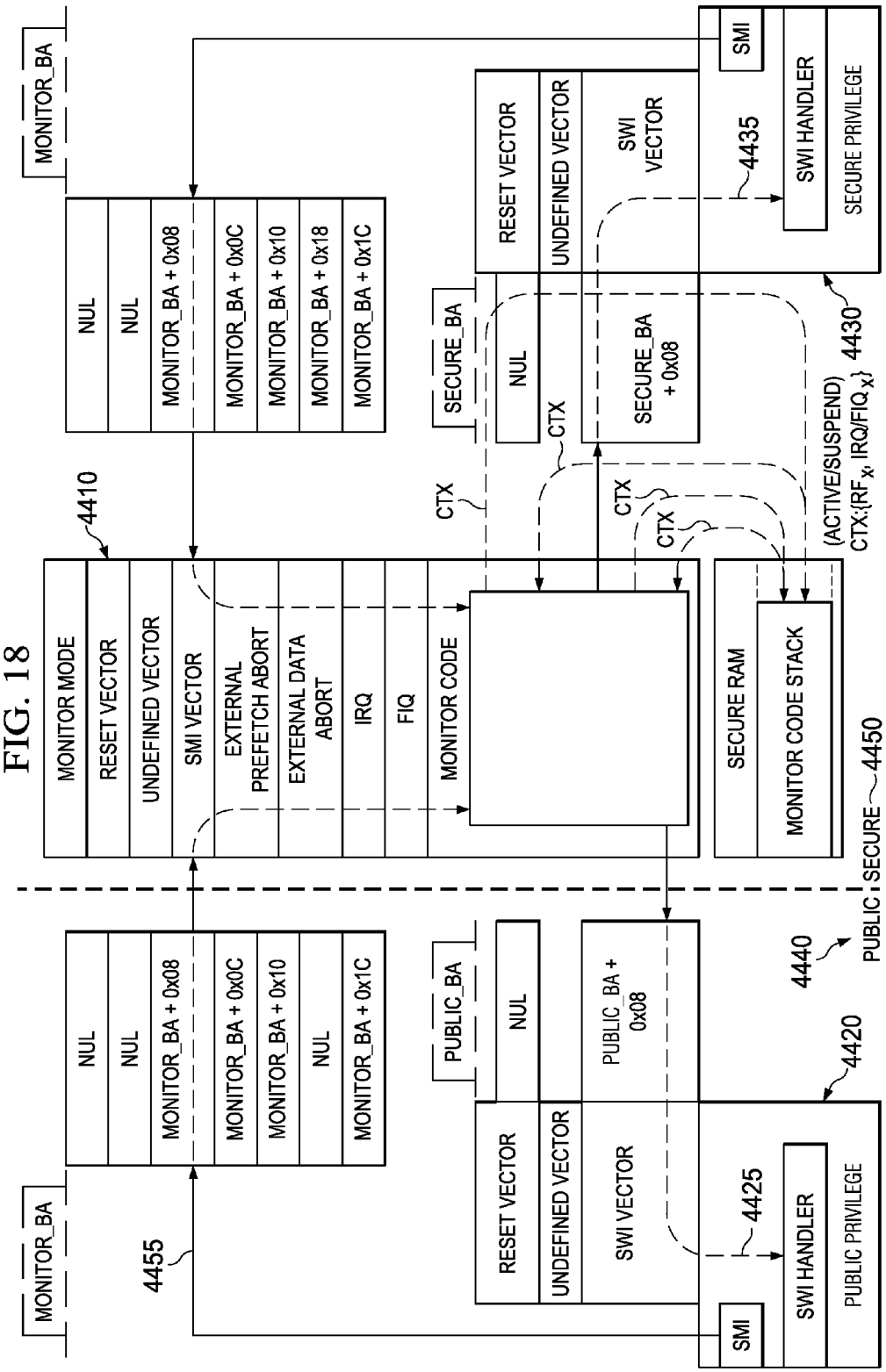
FIG. 18 is a partially block, partially flow diagram of a process of Monitor code, vectors and transitions, and is related to FIG. 5 in the inventive systems herein.

An embodiment of software (SW) that is run according to the different per-world per-CPU WFI status information is illustrated in FIGS. 11 and 18. This software runs mainly in Monitor Mode of FIG. 12 where a software driver is provided for the hardware-protected hypervisor that runs in Monitor Mode. The hardware-protected hypervisor is associated with a scheduler (RTOS) with semaphore/mutex functions. The scheduler then calls either Monitor Mode service or a Secure Kernel service routine. Monitor Mode is preferred but if memory resources allocated to Monitor mode become a performance constraint, then Secure Kernel service is suitably used.

The scheduler is suitably an RTOS scheduler (also see FIGS. 29A-E and FIG. 30) that services the timer ticks of FIG. 23 for the SMP system, and the RTOS scheduler implements semaphore and mutex services. The RTOS scheduler in some embodiments is agnostic to each category or world EE and does not rely on world or EE status or identifications to handle at its level the power and reset activity. In some embodiments, only Monitor mode has access to all world or EE status. The RTOS Scheduler and HLOSes generate WFI when they are idle. Accordingly, the hypervisor running in Monitor mode need not be a heavily semaphored software approach and can be relatively streamlined because it can use EE status herein to handle operations at its hypervisor level.

In FIGS. 11 and 12 or 12A, a SW task is associated with Monitor mode scheduler and responds to a scheduler event according to different WFI execution status on a per category and per CPU basis. This benefits SMP systems by intelligently scheduling multiple categories or execution environments in one CPU or multiple CPUs.

The software, running mainly in Monitor Mode, also suitably implements power management DVFS dynamic voltage and frequency scaling functions for power saving as in step 3625. The software, running mainly in Monitor Mode, also suitably implements hot plug capability support (see FIG. 11 step 3615) for SMP HLOS (symmetric multi-processing high level operating system) such as requested by clients requesting support by SMP Linux and SMP Symbian.

Hot-plug in step 3615 of FIG. 11 involves operations in a multi-core system that transfers at least one currently loaded application from a first CPU core therein onto at least one other CPU core(s) and the system, and then using step 3625 putting that first CPU core into a lower power state such as a sleep mode or powering-off the core, wherein not only is the clock stopped but also the operating voltage is substantially reduced. The per-CPU part of the WFI status information from FIG. 12, 12A or 12B thus is recorded over time and used by the hypervisor to determine that enough bandwidth on a given CPUi has become available to accommodate all the CPU bandwidth currently being used by another CPUj. In such case, the hypervisor can transfer the software execution from CPUj to CPUi and power down CPUj. Consider a system example with multiple execution domains (e.g., eight in FIGS. 4A and 6A) and with a hypervisor. The Monitor Mode software of FIG. 12 desirably sees the per-world per-CPU WFI status information for proper hot-plug operation in step 3615 of FIG. 11. The per-world per-CPU WFI status information provides useful information that can even avoid crashing the hypervisor execution domain. Proper operation of the hypervisor execution domain is important so that the hypervisor can justifiably be implemented in the first place. Thus having per-world per-CPU WFI status information provides valuable support for the hypervisor. Also, some embodiments transfer or re-allocate hypervisor execution domains to one core or another core to be able to provide deeper or more comprehensive hot-plug capability across a multi-core system.

For proper hot-plug operation in steps 3615 and 3640 of FIG. 11, the per-world per-CPU WFI status information avoids crashing the hypervisor execution domain because, on a multi-core system, all the different categories or EEs running on the system can execute a WFI instruction which can stall the respective CPUi and directly or indirectly can cut its clocks and can power off or put in retention the CPUi local memory (MMU, L1$). Such behavior might corrupt the system since data in retention may not be available for accesses or data might be lost on a memory power off. For example, hypervisor might crash without per-world per-CPU WFI status information in a SMP (symmetric multi-processing) system wherein all hypervisor software code instances are linked and share stack and memory chunks.

Hot plug in step 3615 of FIG. 11 in some systems is also useful if all or a sufficient number of the current execution environments on a given CPUi have generated a WFI instruction, regardless of whether the power and reset manager PRCM 3670 cuts clock and memory availability to that CPUi. According to the teachings herein, the hypervisor has per-category per-CPU WFI status information, and the hypervisor code is suitably written to take account of the per-world per-CPU WFI status information from the circuit of FIG. 12, 12A or 12B, for some examples, so that hot plug is prevented from occurring unless that status information indicates that the memory availability and hypervisor execution domain integrity are present on which a proper hot plug transition from another CPU to the given CPU may depend.

Some embodiments use CPUs that may have different kinds of WFI instructions that operate differently to cut clocks to different relevant portions of the CPU blocks and/or power off, put in retention, or otherwise selectively disable the CPU local memory. Accordingly, such embodiments suitably also provide register space in the SSM to identify which kind or type of WFI instruction has currently been executed in each CPU and execution environment therein. The hypervisor code suitably takes account of this information about kinds of WFI instructions by accessing the register space in the SSM.

Turning to an even more detailed description of the circuitry in FIG. 12, a SSM WFI Scheduling block 4230 is provided into SSM 2460. Block 4230 has a conversion circuit that is responsive to the STANDBYWFI signal, and to the security signal CP15NS from a CPU core and to VP1_Active in a register 4215 put in SSM Registers 2620. Block 4230 is responsive to generate FIQs on distinct interrupt lines on a per-category basis PN_WFI_FIQ, PV_WFI_FIQ, SN_WFI_FIQ, or SV_WFI_FIQ to interrupt handler 4280 (3620, 2720) and thus provide per-category WFI status information in the interrupt process. Since all these per-category interrupt lines are physically distinct, the Monitor code can determine, learn, and distinguish what category running on which CPU has executed the WFI that has ultimately sent such FIQ to the hypervisor CPU from interrupt handler 4280.

The Interrupt Handler 4280 (3620, 3720) responds to the signals on the four xx_WFI_FIQ interrupt lines from each CPU to interrupt one CPU, a selected number of CPUs, or all the CPUs depending on the configuration in the interrupt handler INTH 4280. The INTH 4280 makes an interrupt request through a dedicated HW pin or line to any CPU the (FIQ or IRQ) interrupt mode to be entered by generally asserting an active low on an nFIQ line or nIRQ line. When the CPU has entered the corresponding interrupt mode (CPSR=FIQ or CPSR=IRQ), the CPU executes the software SW associated to or pointed to by the exception vector of this CPSR mode (FIQ or IRQ). This SW calls the Interrupt Service Routine (ISR) which accesses and reads in information from the INTH registers 2725 of FIG. 9A and from registers in FIG. 13. The applicable INTH register contains the FIQ number that fired (or IRQ #). In the embodiment of FIG. 12A, ISR also accesses and reads in execution environment EE information from an SSM register 4215A and proceeds to service the interrupt on the basis of the particular WFI-originating category xx. The treatment of the interrupt in some embodiments depends on whether the category is active or suspended (FIGS. 13, 29A-E and 30-32).

In FIG. 12, the SSM WFI Scheduling block 4230 determines which category, EE or world is involved based on hardware signals CP15NS and VP1_Active and generates a given said per-category FIQ active low provided that STANDBYWFI is active and an enabling register bit xx_WFI_FIQ_EN has been set active for that world in an SSM_WFI_SCHEDULING register 4220. The enabling register bits xx_WFI_FIQ_EN keep track of the latest enables from boot code or Monitor code. Additional register 4220 bits xx_WFI_ACTIVE keep track of WFI Active states specifying which STANDBYWFI is active for a particular world xx. Register 4220 also has per-world tracking bits xx_WFI_FIQ_ACK that track logical ANDing 4231 of per world WFI enablement and WFI Active. The per world tracking bits xx_WFI_FIQ_ACK are respectively used to trigger a corresponding low-active FIQ on the respective line xx_WFI_FIQ from WFI Scheduling block 4230 to Interrupt Handler 4280.

In the WFI hardware, the meaning for system operation of STANDBYWFI active and WFI_FIQ_EN not enabled, is as follows. When a WFI instruction is executed, then the STANDBYWFI signal is activated high at CPU# boundary. This signal activates HW logic that sends an Idle Request IDLE_REQ to all CPUi-related hardware components (SSM, MPU2BUS, Debug). These components in turn locally finish their current actions, and when done (in a few clock cycles generally) they respond back by generating their respective IDLE_ACK signals. When all IDLE_ACK are received, and if WFI_FIQ_EN is zero (not enabled), the CPU clocks are cut off and a system PRCM request is performed. The PRCM puts the memory of the CPU in retention or off. By contrast, when WFI_FIQ_EN='1' (enabled) and the SSM receives a STANDBYWFI signal, the SSM does not generate and send back the IDLE_ACK but instead generates xx_WFI_FIQ of FIG. 12 or SSM_WFIFIQ of FIG. 12A.

xx_WFI_ACTIVE is suitably HW set/SW clear. Monitor code clears the active bit when an Interrupt (IRQ, FIQ) corresponding to this category xx has been received to indicate and confirm or prove to the Monitor code that the WFI mode (idle, stalling) is ended in the category or execution environment EE that originated the WFI or that Monitor code itself has signaled for that EE to resume active execution immediately.

TABLE 5 details a pertinent part of an SSM Virtual Processors register 4215 of FIG. 12. TABLE 6 details a pertinent part of an SSM WFI Scheduling register 4220. TABLE 7 shows hardware design pseudocode for the SSM WFI scheduling block 4230. TABLE 8 shows hardware design pseudocode for SSM Registers WFI block 4250.

In FIG. 12 and TABLES 5 and 6, the tabulated SSM registers 4215 and 4220 do not depend on the device security type GP (lower security, general purpose) or HS (higher security). Reset value is to inactive. The bit fields of TABLE 5 and 6 are read-only to most accesses, except Secure Privilege accesses have further access permission. In TABLE 5 Secure Privilege accesses are permitted to read/write VP1_NS, VP1_Active, SSM_NIDEN_Disable, and SSM_DBGEN_Disable. In TABLE 6, Secure Privilege accesses have permissions as tabulated. The right-arrow symbol in TABLE 6 signifies a meaning on the right of the arrow pertaining to a symbol to the left of the arrow. Access to the register 4220 of TABLE 6 is suitably by Secure Privilege access. R/C is read/clear. R/W is read/write.

In FIG. 12, a WFI Active Expansion block 4234 in SSM WFI Scheduling block 4230 is responsive per TABLE 7 to the STANDBYWFI signal on an interrupt related input line 4235, and to CP15NS on a security related input line 4236 from a CPU core. Block 4234 is also responsive in TABLE 7 to context related status input line such as a VP1_Active line or lines 4237 in a register 4215 among SSM Registers 2620. Block 4234 operates as a wait for interrupt WFI expansion circuit that supplies per-world internal expansion signals xx_WFI_ACTIVE_INT on interrupt related output lines 4239. Block 4234 is selectively operable to selectively activate the interrupt related output lines 4239 in response to the STANDBYWFI signal on line 4235 from a given CPU core and the selective activation depending on an active or inactive status of each of the security related status input line 4236, from the CPU core and a context related status input line 4237 from SSM register 4215.

The per-world internal expansion signals xx_WFI_ACTIVE_INT are supplied to an FIQ Generator block 4238 and to a WFI Active Bits block 4258. WFI Active Bits block 4258 is reporting hardware that operates per-world in response to xx_WFI_ACTIVE_INT signal to set respective xx_WFI_ACTIVE bits in SSM_WFI_SCHEDULING register 4220. In this way, Secure Privilege access such as from the hypervisor via a peripheral bus or by debugger access can check the registers 4215 and 4220 and thereby check operation of the hardware of FIG. 12, and software-clear the reporting bits when desired.

In FIG. 12, these per-world internal expansion signals xx_WFI_ACTIVE_INT are supplied to FIQ Generator block 4238. These signals xx_WFI_ACTIVE_INT are ANDed by four NAND-gates 4231 with corresponding per-world enabling bits xx_WFI_FIQ_EN from register 4220 to produce four low-active output signals xx_WFI_FIQ_INT.

In the embodiment of FIG. 12, an electronic interrupt circuit is provided wherein the logic circuitry has a set of four output lines xx_WFI_FIQ_INT and includes four NAND logic gate circuits, collectively designated 4231. Each of the NAND gates has a first input connected to corresponding one of the four enable lines xx_WFI_FIQ_EN, and each of the NAND gates has a second input connected to one of the interrupt-related output lines xx_WFI_ACTIVE_INT. The NAND gates in 4231 each have an output line forming a different one of the set of output lines xx_WFI_FIQ_INT of the logic circuitry. SSM register 4220 has four CPU-configurable category specific enables xx_WFI_FIQ_EN, a reporting bits field xx_WFI_ACTIVE, and another reporting bits field xx_WFI_FIQ_ACK coupled via WFI FIQ Acknowledgments block 4254 to receive signals inverted from each output line xx_WFI_FIQ_INT from the NAND gates 4231.

The output signals xx_WFI_FIQ_INT represent conjunctions (logical ANDs) of WFI FIQ enables and WFI_ACTIVE_INT signals indicating that a given WFI FIQ should be generated provided it is enabled. Output signals xx_WFI_FIQ_INT from FIQ Generator 4238 are fed to corresponding inputs of a WFI FIQ Acknowledgements block 4254. WFI FIQ Acknowledgements block 4254 sets high-active acknowledge bits xx_WFI_FIQ_ACK as more reporting bits in the register 4220 and couples them back to FIQ Generator 4238. In this way, Secure Privilege access such as from the hypervisor or debugger can further check the operation of the hardware of FIG. 12 by reading the acknowledge bits xx_WFI_FIQ_ACK in register 4220 and software clear them if desired.

The CPU core is coupled via a bus such as the peripheral bus shown in FIG. 12 to the SSM registers 4215 and 4220. Notice that this coupling is separate from the coupling of the circuitry 4230 back to the CPU via the interrupt handler 4280. In this way the CPU can configure the SSM registers 4215 and 4220 via write access thereto, and the privileged supervisory code such as a hypervisor can read the SSM registers 4215 and 4220 as reporting registers so that system operations can be controlled on a security-related and context-related per-world per-CPU basis that is visible to the hypervisor.

Then in FIG. 12, FIQ Generator 4238 has four inverters 4233 to invert each signal xx_WFI_FIQ_ACK on lines 4252 from WFI FIQ Acknowledgements block 4254. Inverters 4233 respectively produce the respective per-category low active interrupt signals on low-active FIQ lines PN_WFI_FIQ, PV_WFI_FIQ, SN_WFI_FIQ, and SV_WFI_FIQ. These FIQ lines couple FIQ Generator block 4238 to Interrupt Handler 4280. Interrupt Handler 4280 in turn couples one or more active secure FIQs to an interrupt bus interface INTH BUS of the CPU to gain SFIQ interrupt access to the hypervisor.

A scan controller 4290 is combined with the WFI conversion circuitry of FIG. 12 and serially provides a multi-bit scan signal to an emulator for testing, verification and debug purposes at a scan output and receives a multi-bit scan signal from the emulator at a scan input. The configurable register circuits 4215 and 4220 enable and record signal states. The configurable register circuits 4215 and 4220 are not only coupled to the WFI conversion circuit 4250, but also the configurable register circuits 4215 and 4220 are coupled to the scan output and to the scan input of the scan controller 4290.

TABLE 5

SSM_VIRTUAL_PROCESSORS register 4215

| Bit Field Name | Function |
|---|---|
| VP1_Debug_DIS | When High the SSM_DBGEN_Disable and SSM_NIDEN_Disable are set High before entering the VP1 CPSR Modes and Reset to previous value before exiting |
| VP1_NS | When Low the Secure Virtual Processor is active |
| VP1_Active | When High the Public Virtual Processor is active When High the VP1 CPSR Modes are active |
| SSM_NIDEN_Disable | When High NIDEN is Low at MPU boundary (Non Invasive Debug Enable) |
| SSM_DBGEN_Disable | When High DBGEN is Low at MPU boundary (Debug Enable) |

TABLE 6

SSM_WFI_SCHEDULING register 4220

| Bit Field Name | Function | |
|---|---|---|
| Reserved | Reserved | R |
| SV_WFI_FIQ_ACK | 0 ⇒FIQ (SV_WFI_FIQ) is not generated<br>1 ⇒FIQ (SV_WFI_FIQ) is generated | R/C |
| SN_WFI_FIQ_ACK | 0 ⇒FIQ (SN_WFI_FIQ) is not generated<br>1 ⇒FIQ (SN_WFI_FIQ) is generated | R/C |
| PV_WFI_FIQ_ACK | 0 ⇒FIQ (PV_WFI_FIQ) is not generated<br>1 ⇒FIQ (PV_WFI_FIQ) is generated | R/C |
| PN WFI FIQ_ACK | 0 ⇒FIQ (PN_WFI_FIQ) is not generated<br>1 ⇒FIQ (PN_WFI_FIQ) is generated | R/C |
| SV_WFI_FIQ_EN | 0 ⇒FIQ generation is disabled when WFI instruction is executed in the Secure Virtual World<br>1 ⇒FIQ generation is enabled when WFI instruction is executed in the Secure Virtual World | R/W |
| SN_WFI_FIQ_EN | 0 ⇒FIQ generation is disabled when WFI instruction is executed in the Secure Non-virtual World<br>1 ⇒FIQ generation is enabled when WFI instruction is executed in the Secure Non-virtual World | R/W |
| PV_WFI_FIQ_EN | 0 ⇒FIQ generation is disabled when WFI instruction is executed in the Public Virtual World<br>1 ⇒FIQ generation is enabled when WFI instruction is executed in the Public Virtual World | R/W |
| PN_WFI_FIQ_EN | 0 ⇒FIQ generation is disabled when WFI instruction is executed in Public Non-virtual World<br>1 ⇒FIQ generation is enabled when WFI instruction is executed in the Public Non-virtual World | R/W |
| SV_WFI_ACTIVE | 0 ⇒Normal activity in the Secure Virtual World<br>1 ⇒WFI instruction has executed in Secure Virtual | R/C |
| SN_WFI_ACTIVE | 0 ⇒Normal activity in the Secure Non-virtual World<br>1 ⇒WFI instruction has executed in Secure Non-virtual | R/C |
| PV_WFI_ACTIVE | 0 ⇒Normal activity in the Public Virtual World<br>1 ⇒WFI instruction has executed in Public Virtual | R/C |
| PN_WFI_ACTIVE | 0 ⇒Normal activity in the Public Non-virtual World<br>1 ⇒WFI instruction has executed in Public Non-virtual | R/C |

TABLE 7

SSM WFI SCHEDULING HARDWARE 4230 DESIGN PSEUDOCODE

```
#######WFI ACTIVE EXPANSION BLOCK 4234##########
SN_WFI_Active_INT
        <= NOT (CP15NS) AND NOT (VP1_Active) AND STANDBYWFI;
      -- WFI executed in the Secure Nonvirtual mode from CPU and from register 4215.
SV_WFI_Active_INT <= NOT (CP15NS) AND VP1_Active AND STANDBYWFI;      -- WFI executed in the Secure Virtual Mode
PN_WFI_Active_INT <= CP15NS AND NOT (VP1_Active) AND STANDBYWFI;      -- WFI executed in the Public Non-virtual Mode
PV_WFI_Active_INT <= CP15NS AND VP1_Active AND STANDBYWFI;
      -- WFI executed in the Public Virtual Mode
### FIQ GENERATOR 4238 ###### driven from Reg 4220 and from Block 4234
SN_WFI_FIQ_INT <= NOT ((SN_WFI_FIQ_EN) AND (SN_WFI_Active_INT));   --
Active LOW to Block 4254
SN_WFI_FIQ      <= NOT (SN_WFI_FIQ_ACK); from Block 4254-- Active LOW
SV_WFI_FIQ_INT <= NOT ((SV_WFI_FIQ_EN) AND (SV_WFI_Active_INT));   --
Active LOW
SV_WFI_FIQ      <= NOT (SV_WFI_FIQ_ACK);                           -- Active LOW
PN_WFI_FIQ_INT <= NOT ((PN_WFI_FIQ_EN) AND (PN_WFI_Active_INT));   --
```

TABLE 7-continued

SSM WFI SCHEDULING HARDWARE 4230 DESIGN PSEUDOCODE

```
Active LOW
PN_WFI_FIQ        <= NOT (PN_WFI_FIQ_ACK);                       -- Active LOW
PV_WFI_FIQ_INT <= NOT ((PV_WFI_FIQ_EN) AND (PV_WFI_Active_INT));  --
Active LOW
PV_WFI_FIQ        <= NOT (PV_WFI_FIQ_ACK);                       -- Active LOW
```

TABLE 8

SSM REGISTER WFI HARDWARE 4250 DESIGN PSEUDOCODE

```
########WFI FIQ ACKNOWLEDGEMENTS BLOCK 4254##########
IF SN_WFI_FIQ_INT = '0'   --from FIQ Generator 4238
THEN SN_WFI_FIQ_ACK <='1'; -- HW set / SW clear
                   -- to FIQ generator 4238 and to Table 6 register 4220
ENDIF;
IF SV_WFI_FIQ_INT = '0'
THEN SV_WFI_FIQ_ACK <='1'; -- HW set / SW clear
ENDIF;
IF PN_WFI_FIQ_INT = '0'
THEN PN_WFI_FIQ_ACK <='1'; -- HW set / SW clear
ENDIF;
IF PV_WFI_FIQ_INT = '0'
THEN PV_WFI_FIQ_ACK <='1'; -- HW set / SW clear
ENDIF;
#######WFI ACTIVE BITS BLOCK 4258##############
IF SN_WFI_Active_INT = '1'    --from WFI Active Expansion Block
4234
THEN SN_WFI_Active <='1'; -- HW set / SW clear -- to Table 6
register 4220
ENDIF;
IF SV_WFI_Active_INT = '1'
THEN SV_WFI_Active <='1'; -- HW set / SW clear
ENDIF;
IF PN_WFI_Active_INT = '1'
THEN PN_WFI_Active <='1'; -- HW set / SW clear
ENDIF;
IF PV_WFI_Active_INT = '1'
THEN PV_WFI_Active <='1'; -- HW set / SW clear
ENDIF;
```

Turning to the circuitry of FIG. 12A, and by way of comparison with FIG. 12, the Interrupt Handler 4280 responds to the signals on the single SSM_WFIFIQ interrupt line to interrupt one CPU, a selected number of CPUs, or all the CPUs depending on the configuration in the interrupt handler INTH 4280. The INTH makes a request through a dedicated HW pin or line to any CPU for the FIQ interrupt mode to be entered by generally asserting an active low on the FIQ line on the INTH bus. When the CPU has entered the interrupt mode (CPSR=FIQ) it executes the software SW associated to or pointed to by the exception vector of this CPSR mode (FIQ). This SW calls the Interrupt Service Routine (ISR) which accesses and reads in information from the INTH registers 2725 of FIG. 9A and from registers in FIG. 13. The applicable INTH register contains the FIQ #number that fired (or IRQ #).

In the embodiment of FIG. 12A, ISR also accesses and reads in execution environment EE_Active and UIEE_Active information from an SSM register 4215A and proceeds to service the interrupt on the basis of the particular execution environment EE=xx that originated the WFI. The treatment of the interruption in some embodiments depends on whether the EE is active or suspended (FIGS. 29A-E, 30). When a PSEE or UIEE is active, the EE_Active register or UIEE register respectively has the identification bits currently entered and present therein that identify the active PSEE or UIEE. Its interrupts are configured as IRQ and trapped in Public IRQ mode. When the identification bits do not identify a given PSEE or UIEE, then the interrupts for any such PSEE or UIEE not identified as active are configured as Secure FIQ and trapped as SFIQ into Monitor Mode.

The electronic interrupt circuit in FIG. 12A has a plurality (e.g., nine) of enable lines xx_WFI_FIQ_EN and a logic circuitry 4231A, 4232A having a set of nine first inputs of nine parallel NAND gates 4231A respectively coupled to the plurality of enable lines and a set of nine second inputs respectively coupled to the plural interrupt-related output lines xx_WFI_ACTIVE_INT. The logic circuitry in this embodiment has a single NOR gate 4232A having nine low-active inputs respectively connected to the nine low active outputs of the nine NAND gates 4231A. (Notice that NOR gate 4232A is the equivalent in Boolean logic to a nine input AND gate.) NOR gate 4232A supplies a one-line logic output SSM_WFI_FIQ_INT responsive to both the first set of inputs and the second set of inputs of the nine parallel NAND gates 4231A. A reporting register bit SSM_WFI_FIQ_ACK is coupled to receive the one-line logic output from the logic circuit, which is first converted to high active by a block 4254A and designated WFI FIQ Acknowledgment. An inverter 4233A in FIQ generator block 4238A has its input fed by a line SSM_WFI_FIQ_ACK 4252A connected from register 4220A. Inverter 4233A with block 4254A acts as a coupling circuit having an input coupled to the one-line logic output from the logic circuitry 4231A, 4232A. Inverter 4233A feeds interrupt output line SSM_WFIFIQ. WFI Active Bits block 4258A buffers the nine xx_WFI_Active_INT lines and feeds register xx_WFI_ACTIVE in registers 4220A. TABLE 8A shows the design pseudocode for FIG. 12A.

Interrupt Handler handles the signal SSM_WFIFIQ as a secure fast interrupt request SFIQ to which the hypervisor is able to respond. The hypervisor has an interrupt line number table to determine which of the execution environments an xx_WFI_FIQ came from in the embodiment of FIG. 12A. In some other embodiments the INTH 4280 is structured with register bit fields to provide these identifications. In still other embodiments, SSM is structured with register bit fields to provide these identifications, such as in FIG. 12A, where PSEE execution environment information EE_Active and UIEE information UIEE_Active are provided from SSM register 4215A and the interrupt is serviced on the basis of the particular execution environment.

For example, register bit fields SSM_FIQ_EE_y are provided so as to provide four bits of information per interrupt line in one example, so that eight interrupt lines are described by each 32-bit register y. If more than eight interrupts or more than eight 8 EEs are involved, then plural such registers indexed y are provided. Each such register is read accessible in all modes and write accessible as well in the Monitor mode. Reset value is to zero. The current FIQ belongs to the corresponding UIEE/PSEE execution environment EE (also called an execution domain herein). A selected four-bit hexadecimal value 0000 through 0111 represents public EEs 0-7 respectively. A selected four-bit hexadecimal value 1000 through 1111 represents secure EEs 0-7 respectively for secure kernel or monitor mode. The current FIQ has a priority relative to another FIQ suitably established according to the magnitude of its binary value. For example, public execution domain 7 (0111 binary) has a higher priority than a public execution domain of a lower binary value but a lower priority than any secure execution domain.

Some CPUs may have different kinds of WFI instructions that operate differently to cut clocks to different relevant portions of the CPU blocks and/or power off, put in retention, or otherwise selectively disable the CPU local memory. Some embodiments suitably also provide a bit field WFI_TYPE in register 4215A space identifying which Type of WFI instruction has currently been executed in each CPUi and execution environment EE=xx therein. This bit field WFI_TYPE is suitably made part of SSM register 4215A and/or used to augment the EE_active bit field therein. Correspondingly, this bit field WFI_TYPE is included with the per-category per-CPU information describing each interrupt in registers SSM_FIQ_EE_y as to provide an additional two bits of information per interrupt line in one example, so that five interrupt lines (32/6) are described by each 32-bit register SSM_FIQ_EE_Y. A sufficient number of such registers indexed y are provided to accommodate the interrupts and EEs. The hypervisor code then suitably takes account of this information about kinds of WFI instructions by accessing WFI_TYPE in the EE_Active bit field when FIQ interrupt SSM_WFIFIQ is active on line 4245A.

The scan controller 4290 of FIG. 12 is combined with the WFI conversion circuitry of FIG. 12A and serially provides a multi-bit scan signal to an emulator at a scan output and receives a multi-bit scan signal from the emulator at a scan input. The configurable register circuits 4215A and 4220A of FIG. 12A enable and record signal states. The configurable register circuits 4215A and 4220A are not only coupled to the WFI conversion circuit, but also the configurable register circuits 4215 and 4220A are coupled to the scan output and to the scan input of the scan controller 4290.

FIGS. 12 and 12A each depict both structure and a process flow of hardware operation. The process of operation in one aspect expands the wait for interrupt output depending on which security and context-related modes of a given processor pertain to a wait for interrupt WFI signal therefrom, and provides at least one interrupt signal. In a multiprocessor circuit that has at least three processors operable to run applications, the method in a further aspect includes operating the second processor to respond to at least one interrupt signal to transfer at least one application from the first processor onto at least a third processor. Another aspect of the method of operation involves configuring a power control circuit to put the first processor into a lower voltage state after the transfer.

TABLE 8A

DESIGN PSEUDOCODE FOR FIG. 12A

```
########WFI ACTIVE EXPANSION BLOCK 4234A#######
SECURE_WFI_ACTIVE_INT <= NOT (CP15NS) AND STANDBYWFI;
          -- WFI executed in the SECURE WORLD
EE0_WFI_ACTIVE_INT <= CP15NS AND EE_ACTIVE = 0x0 AND STANDBYWFI;
          -- WFI executed in the EE = 0x0 (EE0)
EE1_WFI_ACTIVE_INT <= CP15NS AND EE_ACTIVE = 0x1 AND STANDBYWFI;
          -- WFI executed in the EE = 0x1 (EE1)
EE2_WFI_ACTIVE_INT <= CP15NS AND EE_ACTIVE = 0x2 AND STANDBYWFI;
          -- WFI executed in the EE = 0x2 (EE2)
EE3_WFI_ACTIVE_INT <= CP15NS AND EE_ACTIVE = 0x3 AND STANDBYWFI;
          -- WFI executed in the EE = 0x3 (EE3)
EE4_WFI_ACTIVE_INT <= CP15NS AND EE_ACTIVE = 0x4 AND STANDBYWFI;
          -- WFI executed in the EE = 0x4 (EE4)
EE5_WFI_ACTIVE_INT <= CP15NS AND EE_ACTIVE = 0x5 AND STANDBYWFI;
          -- WFI executed in the EE = 0x5 (EE5)
EE6_WFI_ACTIVE_INT <= CP15NS AND EE_ACTIVE = 0x6 AND STANDBYWFI;
          -- WFI executed in the EE = 0x6 (EE6)
EE7_WFI_ACTIVE_INT <= CP15NS AND EE_ACTIVE = 0x7 AND STANDBYWFI;
          -- WFI executed in the EE = 0x7 (EE7)
### FIQ generator 4238A ##########
SSM_WFI_FIQ_INT <=  NOT   (SECURE_WFI_FIQ_EN)            OR    NOT
(SECURE_WFI_ACTIVE_INT)   AND   -- Active LOW
NOT (EE0_WFI_FIQ_EN) OR NOT (EE0_WFI_ACTIVE_INT) AND
NOT (EE1_WFI_FIQ_EN) OR NOT (EE1_WFI_ACTIVE_INT) AND
NOT (EE2_WFI_FIQ_EN) OR NOT (EE2_WFI_ACTIVE_INT) AND
NOT (EE3_WFI_FIQ_EN) OR NOT (EE3_WFI_ACTIVE_INT) AND
NOT (EE4_WFI_FIQ_EN) OR NOT (EE4_WFI_ACTIVE_INT) AND
NOT (EE5_WFI_FIQ_EN) OR NOT (EE5_WFI_ACTIVE_INT) AND
NOT (EE6_WFI_FIQ_EN) OR NOT (EE6_WFI_ACTIVE_INT) AND
NOT (EE7_WFI_FIQ_EN) OR NOT (EE7_WFI_ACTIVE_INT);
SSM_WFIFIQ <= NOT (SSM_WFI_FIQ_ACKNOWLEDGE);            --
Active LOW
IDLE_ACK condition <= (do not ack when a STANDBYWFI request is ongoing unless all WFI
request have requested and are enabled)
###### WFI FIQ ACKNOWLEDGEMENT 4254A #################
-- HW set / SW clear
IF SSM_WFI_FIQ_INT = '0' THEN SSM_WFI_FIQ_ACKNOWLEDGE <='1"; ENDIF;
############WFI ACTIVE BITS BLOCK 4258A####################
-- HW set / SW clear
IF SECURE_WFI_ACTIVE_INT = '1'  THEN SECURE_WFI_ACTIVE   <='1"; ENDIF;
IF EE0_WFI_ACTIVE_INT = '1' THEN EE0_WFI_ACTIVE <='1"; ENDIF;
IF EE1_WFI_ACTIVE_INT = '1' THEN EE1_WFI_ACTIVE <='1"; ENDIF;
IF EE2_WFI_ACTIVE_INT = '1' THEN EE2_WFI_ACTIVE <='1"; ENDIF;
IF EE3_WFI_ACTIVE_INT = '1' THEN EE3_WFI_ACTIVE <='1"; ENDIF;
IF EE4_WFI_ACTIVE_INT = '1' THEN EE4_WFI_ACTIVE <='1"; ENDIF;
```

TABLE 8A-continued

DESIGN PSEUDOCODE FOR FIG. 12A

IF EE5_WFI_ACTIVE_INT = '1' THEN EE5_WFI_ACTIVE <='1''; ENDIF;
IF EE6_WFI_ACTIVE_INT = '1' THEN EE6_WFI_ACTIVE <='1''; ENDIF;
IF EE7_WFI_ACTIVE_INT = '1' THEN EE7_WFI_ACTIVE <='1''; ENDIF;

In FIG. 12B, another circuitry embodiment expands a SMI instruction. Some embodiments use such circuitry instead of or in addition to that of FIGS. 12 and 12A.

The reader may compare and contrast the SMI expansion circuit and process of FIG. 12B with the WFI expansion circuit and process of FIG. 12A. Circuit blocks in FIG. 12B are marked with a corresponding numeral suffixed "B" instead of "A" to permit ready comparison with analogous circuit blocks in FIG. 12A. The analogous circuit blocks suitably are provided with identical circuitry in them unless the detailed description herein describes them otherwise. In some instances, the circuit blocks substitute a legend portion "SMI" in FIG. 12B for a legend portion "WFI" in FIG. 12A.

StandbyWFI on line 4235 of FIG. 12A is replaced by a SMI line 4235B from CPUi in FIG. 12B. Thus the signal interpretation and process of operation for FIG. 12B is different from that of FIG. 12A because the SMI line 4235B provides a SMI signal instead of a WFI signal. If the processor core lacks an explicitly-provided SMI output, the SMI signal on surrogate signal responsive to SMI is generated by providing appropriate software and/or hardware.

A SMI immediate value is generated by CPUi and stored in a further SSM register XX_SMI_IMM, not found in FIG. 12A, for CPUi and EE execution environment xx. The circuitry of FIG. 12B supplies an output SMI_ACK that is routed in place of SMI to the control processor running the hypervisor in any suitable manner appropriate for routing SMI itself. The interrupt handler 4280 has input lines for IRQ, FIQ, and peripherals IRQ/FIQ that are deemphasized in FIG. 12B and given greater detail in other Figures.

The use of the circuitry of FIG. 12B is described in further detail also in connection with FIG. 18 later hereinbelow.

In FIG. 13, IRQ interrupts fed to the CPUi IRQ input line are delivered by hardware directly to an actively executing/scheduled EE. Hypervisor context switches the CPUi entire Virtual Address space (e.g. 4 GB) and placing the active EE(s) there, which insures that an interrupt goes through an EE's private vector table when and only when Hypervisor has previously securely configured interrupt controller 2720 and memory management unit MMU for that to occur. An EE vector table and all of EE's other private memory data are only visible on the CPU when Hypervisor has made it visible by context switching the Virtual Address space. FIQ interrupts are delivered to by interrupt controller 2720 to the separate FIQ input line of CPUi and trapped and delivered by hardware to the Hypervisor in Monitor mode. The CPU is previously configured by setting an FIQ trap bit so that FIQ is automatically trapped and triggers a switch to Monitor mode whereupon to use the Monitor vector table's FIQ vector for FIQ servicing by the hypervisor. The hypervisor securely configures the interrupt controller 2720 to allow each interrupt line, which is associated with a particular EE, at the input of the interrupt controller to be selected and routed as FIQ or IRQ to the FIQ input or IRQ input of CPUi depending on whether the EE is suspended or active respectively.

The interrupt lines themselves at the interrupt controller 2720 are Interrupt Morphed between IRQ and FIQ. In this process, the hypervisor suspends or activates a particular EE and in the process reconfigures interrupt controller 2720 regarding FIQ or IRQ for that EE accordingly. A suspended EE cannot receive and service interrupts since it is inactive. Instead, a suspended EE's interrupts are configured as FIQ and fed to the FIQ input line, so that they go directly to Hypervisor. Hypervisor takes note of the interrupt and determines if an immediate EE context switch is required to deliver the interrupt to the appropriate EE. If not, the hypervisor keeps the interrupt pending until the hypervisor normally schedules the EE. For example, some embodiments mask that interrupt line using a mask register to keep the interrupt pending and provide mask logic represented by demuxing 5940 to prevent the interrupt line from being coupled to the IRQ input of a CPU while permitting the interrupt to be immediately coupled to the FIQ line given that the EE is suspended. Comparator circuitry in suspend control 5920 of FIG. 13 determines whether the contents of the EE_Active register match the EE identification for any given interrupt line. If a match, then the EE is recognized is active, otherwise if no match, the EE is regarded as suspended. Then that EE's interrupt lines are reconfigured as IRQ when the suspended EE subsequently becomes active due to a hypervisor response to the FIQ. Any interrupt lines that were previously masked by hypervisor to keep them pending are unmasked allowing those interrupts to propagate directly into the EE along with any others that arrive while the EE is now actively executing.

An active EE receives and services interrupts on the IRQ input line directly. This is believed the fastest possible distribution, with zero hypervisor overhead for such interrupts. Upon activation of an EE, the EE's interrupt lines are dynamically reconfigured from FIQ to IRQ (morphing) and thus rerouted to IRQ input of CPUi instead of FIQ input of CPUi, and then the CPUi directly applies them to the now-active EE so that the IRQ fire directly into the EE's private interrupt vector table.

Because various EE are the ultimate consumers of interrupts directed to them, a bottleneck occurs at the hypervisor kernel in some embodiments wherein only one EE per CPUi can be active at a time. Thus some interrupts, targeted at suspended EE(s), are gated or masked until the hypervisor scheduler can reschedule and activate the EE which was targeted by such gated or masked interrupts so that such interrupts can be applied/consumed by the EE.

In other words, an EE cannot consume an interrupt unless the EE can execute. However, the EE must wait its turn for hypervisor scheduling policy, and thus the interrupt deliveries become dependent on the hypervisor scheduling with attendant impact on and exacerbation of interrupt latency.

In FIG. 13, Interrupt Morphing (also called interrupt transformation in connection with FIGS. 29A-E and 30-32) herein leverages two interrupt input lines for IRQ and FIQ respectively provided in the CPUi core, which has a security zone and splits trap bits for IRQ or FIQ for completely different vectoring on the two interrupts (trap to Monitor or not).

In FIG. 13 and FIGS. 29A-E and 30-32, Interrupt Morphing herein significantly contrasts with the traditional hypervisor interrupt delivery software operations, by instead allowing interrupts which can be delivered to an EE, which is currently in-context and running, to have CPU direct delivery of those interrupts with zero hypervisor overhead for such interrupts. Conversely, pending interrupts targeted at EE(s) which are suspended, and cannot be immediately delivered, are vectored and delivered directly to the hypervisor via trapping of FIQ to the Monitor mode. As hypervisor kernel executes in Monitor mode, this automatic switching of the CPU from non-secure world to secure-world is highly efficient and completely done by CPUi internal mechanics. That even encompasses a switch from non-secure MMU to secure MMU, as secure zone HW MMU virtualizes MMU into secure/non-secure sets of controls. Interrupt Morphing makes possible a dramatic speedup in system operations.

Thus, the interrupts are vectored directly to the code (EE or hypervisor in Monitor Mode) which can best accommodate the fastest route to servicing/consumption of the interrupt. Interrupt Morphing reduces interrupt latency, reduces hypervisor overhead by saving hypervisor CPU cycles, and improves interrupt event ordering and thus provides stabilized low jitter factor.

Due to the bottleneck mentioned above, suppose three (3) suspended EEs have three (3) interrupt lines each, and all nine (9) interrupt lines go pending at the same exact moment. One method might have all nine (9) interrupts fielded at the hypervisor kernel, where it must time-consumingly execute hypervisor code to simulate/deliver those interrupts into each EE. The operations would entail many extra cycles added onto the EE(s) native interrupt handling mechanics and incurred at the tail end of this hypervisor arbitration process.

By contrast, Interrupt Morphing operates to handle interrupts so that 1) one interrupt per suspended EE is delivered as FIQ and causes the hypervisor to perform the context switch to activate that EE, and simulate/deliver that interrupt. 2) The other two interrupts (FIQ) pending meanwhile and destined for the same EE are applied directly by the CPUi after hypervisor activates the EE and reconfigures the pending interrupts to be IRQ instead whereupon hardware direct delivery of these IRQ go efficiently directly to the EE IRQ vector table. 3) Thus, three (3) out of the nine (9) interrupts go to the FIQ CPUi input and are trapped and have Hypervisor overhead/arbitration. However, the other six (6) interrupts are directly applied by active lows on the IRQ CPUi input line thereby vectoring the IRQ(s) directly into the EE vector table and with no Hypervisor arbitration penalties.

The EE Interrupt Distribution system usefully improves and/or provides for EE software reuse to use legacy software conveniently, and provides for low EE interrupt latency, for EE interrupt exclusivity and isolation, and for EE global masking arbitration.

The interrupt mechanics promote software reuse (use of pre-existing software) wherein each EE running under hypervisor remains as closely compatible to the CPUi Interrupt mechanics as possible, and are achieved via particular HW support enhancements to the interrupt hardware to support the hypervisor. Interrupt vectoring occurs directly into EE(s), and each EE has direct access to Interrupt Controller. Hypervisor configures interrupt controller 2720 to route interrupts as IRQ to the IRQ CPUi interrupt input line to be delivered into an EE by vectoring directly into a vector table for the EE in the same manner as would occur if the EE were standalone without a hypervisor. The EE vector table is located at the same location and EE vector table entries are formatted in the same way.

In some cases, pre-existing OS base ports perform direct access to the interrupt controller for purposes of proper identification of an interrupt source and subsequent dispatch of servicing handlers. Under a hypervisor the interrupt controller becomes a contended accessed resource by such OS base ports, which is properly and swiftly arbitrated by the hypervisor interrupt mechanics herein. In FIG. 13, one EE's access to the interrupt controller is independent of and not negatively impacted by another EE's interrupt operations or access to the interrupt controller.

EE interrupt latency is kept low using hardware-based Interrupt Morphing herein. An active EE with pending interrupt has its interrupt applied immediately as IRQ without any Hypervisor intervention. Thus Hypervisor need not be involved for such an interrupt delivery. A suspended EE with pending interrupt cannot directly receive interrupts and so the Hypervisor first receives a suspended EE FIQ and performs a context switch to that EE (resumption of that EE's execution, with suspension of the current active EE) and then the pending interrupt is delivered as IRQ directly.

EE interrupt exclusivity and isolation is provided in some embodiments by having all interrupts that are utilized by any EE to each be exclusively managed by a particular EE. Each interrupt source utilized by an EE is exclusively allocated to a particular EE and serviced by only that particular EE. Hypervisor is responsible for scheduling the timing and delivery of some timer interrupts to the EE(s). Interrupt line sharing for multiple peripherals on the same line is done with a single EE and are not shared across multiple EEs. IRQ interrupts are delivered only to the EE which exclusively owns an IRQ line. H/W enhancements to the interrupt controller such as by providing Demuxes 5940, each responsive to an active/suspend selector control from suspend control circuit 5920 in FIG. 13, sufficiently partition it to present only the interrupts on interrupt lines exclusively dedicated to the currently executing (active, in-context) EE as IRQ on the IRQ output line of the interrupt controller to the IRQ input of that CPUi. In some embodiments, the Demuxes 5940 each have one input coupled to a respective system interrupt line, and have two outputs each. The first output of each demux is coupled to the FIQ input of the CPU. A second output of each demux is coupled to IRQ input of the CPU. Some embodiments route the FIQs to a control CPU0 and route IRQs to CPUi to which they pertain. In other embodiments, the plural CPUi each have an IRQ input connected in common to IRQ outputs of a subset of the Demuxes 5940, and the plural CPUi each have an FIQ input coupled in common to FIQ outputs of some of those demuxes as appropriate to the embodiment. Various embodiments for controlling the selections made by the Demuxes 5940 are described later hereinbelow in connection with FIGS. 31-32.

EE global masking arbitration addresses the situation wherein sections in software cannot receive interrupts due to critical update of state variables that might be corrupted via a re-entrant code execution sequence. The CPUi processor has Global Interrupt Masking flags to modulate/arbitrate all interrupts arrivals to CPUi. These global masking actions can undesirably effect the real time response for other EEs executing under the Hypervisor. If one EE is allowed to mask all interrupts arriving for the entire CPUi, then other EEs are then also impacted by such a global masking operation and cannot receive an interrupt. Accordingly, the hypervisor together with Interrupt Morphing circuitry prevent global masking operations attempted or performed by an EE at the CPUi CPSR I and F bits (IRQ mask, FIQ mask bits) from negatively impacting the interrupt latencies of other EEs.

Interrupt Morphing re-vectors the CPUi execution for an interrupt application to at least two distinctly different systems software locations selectively. In some embodiments, two systems software locations correspond to IRQ and FIQ respectively. Interrupt Morphing occurs at every context switch of the EE(s). Interrupt Morphing changes/reconfigures each EE's interrupt lines to either an FIQ CPUi input line or an IRQ CPUi input line. A resumed EE's exclusive interrupt lines are configured to IRQ, while all suspended EEs' exclusive interrupt lines are configured as FIQ. EE which are suspended have their interrupts directed as FIQ to the Hypervisor which can then perform a context switch for delivery of high priority interrupts arriving from suspended EEs.

Such interrupt re-vectoring is accomplished by dynamically switching (e.g., by Demuxing 5940 and or muxing 5910) each of the interrupt lines configurations from an FIQ interrupt generation to IRQ interrupt generation and vice versa. The reconfiguration of interrupt lines occurs during EE context switching sequences and is performed by the Hypervisor to keep the interrupt delivery points most optimal for all EEs. In the ARM® CPU with TrustZone™ security zone environment, for one example, the IRQs are then vectored very rapidly into the currently active EE, and the FIQs are vectored very rapidly into the hypervisor running in Monitor mode. The circuitry 5910, 5920, 5940 of FIG. 13 and FIG. 31 for dynamically switching the interrupt configurations between IRQ and FIQ thereby intelligently utilizes this high speed vectoring so that it becomes manifested as high system responsiveness and speed even when many EEs are operating on the same processors and system hardware.

The Interrupt Morphing improves and addresses EE Interrupt Latency by preventing additional Hypervisor overhead for the arbitration and application of the largest majority of interrupts occurring on the system, namely IRQs of actively executing EEs that thus receive IRQ interrupts directly without hypervisor overhead. Suspended EEs have their interrupts re-configured as FIQs which go directly to the Hypervisor such that Hypervisor, if warranted, can immediately context switch to the suspended EE to make that EE active. Then hypervisor delivers that same interrupt as an IRQ since that EE's interrupt lines are at that point all morphed back to IRQ when that EE is resumed.

EE Interrupt Exclusivity and Isolation are promoted by preventing interrupts belonging to one EE being incorrectly applied to another EE due to the reconfiguration of the active EE's exclusively owned interrupt lines as IRQ and thereby partitioned or isolated by demuxing 5940 to keep the active EE interrupt lines partitioned or isolated from interrupt lines allocated to suspended EEs. Since all FIQs are vectored directly to hypervisor, all suspended EE's have their morphed IRQ interrupts vectored as FIQ to the hypervisor for further arbitration.

EE Global Masking Arbitration is promoted due to the fact that FIQ interrupts on the CPUi take priority over IRQ interrupts, and the active EE is configured to be allowed Global Masking privilege for changing only the IRQ mask flag in the CPUi CPSR register. The active EE is prevented from masking the FIQ flag in the ARM CPSR register by CPSR F bit lockdown configuration. Because only IRQ interrupts are ever applied to an actively executing EE (in-context or resumed state), the EE has no need to mask the FIQ anyhow because such FIQ, at that particular point in time, would only represent interrupts targeted/owned by another (suspended) EE under the Interrupt Morphing process. The interrupt controller has an FIQ interrupt line mask register, with per line mask bits for FIQ interrupts as well, and which are only accessible by the hypervisor in secure mode. Since any active EE operates in public mode, the EE is prohibited from and locked out of access to the FIQ interrupt line mask register in interrupt controller if the EE attempts to do any masking of one or more FIQ interrupt lines there.

Hypervisor thus utilizes and is supported by an interrupt queuing or buffering mechanism whereby the interrupt H/W and peripherals keep an interrupt pending until it is serviced by an EE exclusively owning that interrupt and having the device support code to fully complete the servicing of that interrupt. The interrupt stays pending on an interrupt initiator such as a peripheral until it is signaled to retract or deactivate that pending interrupt by following EE actions: 1) servicing the status register and clearing the interrupt requester circuit of the initiator, and 2) initiating a new agreement NEWFIQAGR transaction with the interrupt controller. Because suspended EE(s) cannot immediately receive interrupts, this interrupt queuing strategy supports a suspended EE until the EE becomes active and can receive and service the interrupt as an IRQ.

This Interrupt Queuing Mechanism is implemented by hypervisor masking operations and per-interrupt mask bits in the Interrupt Controller 2720. Compared to traditional SW interrupt queuing, overhead associated with this mechanism is very low. An exception to this Interrupt Queuing strategy exists with respect to timer interrupts. OS typically require timer interrupts for scheduling operations, as well as other timing of operations. Timers, used for SW scheduling purposes, are typically programmed for periodic interrupt generation. Depending on the timer's interrupt activation logic, and level triggering on the interrupt, then under the hypervisor such timer interrupts could be missed or skewed in time, but instead are successfully handled herein.

A timer interrupt square wave, for instance, may not stay pending indefinitely, but instead may be withdrawn on the inactive portion of the square wave. In a purely level triggered interrupt system, this might result in some timer interrupt loss, when the interrupt consumption is expected to be in an EE. However, suspension/queuing of the interrupts for an EE occurs herein by leaving the interrupt line pending, and will latch the timer's interrupt generation, and thus timer interrupts are not lost.

Time skewing is also successfully dealt with when such timer interrupts are expected to be consumed by EE (and multiple EE are concurrently executing). Accordingly, hypervisor herein has a software function/service for simulating IRQ interrupts to the EE and for delivery of EE expected timer tick interrupts. Low level IRQ delivery functions are provided to hypervisor for simulating virtual IRQ interrupts to an EE. Hypervisor may utilize SIQ/FIQ interrupt capability for its own timing purposes in scheduling, and also delivering virtual timer interrupts into the EE. Each EE then utilizes timer ticks provided by hypervisor utilizing this IRQ simulation capability.

Interrupt service at different priority levels is provided for an EE depending upon the nature of the peripheral or process utilizing any particular interrupt line. Some services or device drivers will not be amenable to high latency for interrupt delivery. However, other interrupts and corresponding device drivers are able to sustain and react well to significantly higher levels of latency, and thus such interrupt deliveries can tolerate lower prioritization, which can help to improve latencies/stability for the higher priority interrupts. An SD storage card pulling an interrupt line probably can tolerate very high latencies unless used to deliver multi-media content like high definition video playback. Thus the priority level for SD storage card interrupt line, or any other interrupt line, can be reconfigured by hypervisor governance/arbitration over interrupt deliveries depending on the usage or interrupt service quality level desired.

When a high priority FIQ causes a context switch to a new EE, the hypervisor utilizes a suitable method to mask other active FIQ interrupt lines such as in the interrupt controller 2720 until such point that the targeted EE has fully consumed such hypervisor forwarded interrupts as IRQ and the EE is in a position to re-enable its interrupts. Such masking of other FIQ interrupt lines, which are of the morphable EE type, prevents a race.

SSM is provided with circuitry herein that detects when EE have re-enabled interrupts via their CSPSR IRQ flag. This functionality is one-shot and such that the hypervisor sets up the functionality when this detection function is to be performed, i.e. just before Hypervisor delivers a HIGH Priority interrupt to an EE. SSM reports the detection of such EE CPSR IRQ unmasking via an FIQ interrupt to hypervisor.

Because it may not be acceptable to delay IRQ interrupts until a point where a Secure Environment SE operation is completed, such interrupts are intercepted in the SE and then immediately forwarded to the Non-Secure Environment. SE IRQ forwarding mechanism also works with less or little interaction from the SW Hypervisor component by global masking of both IRQ and FIQ at CPSR register during a front end portion of the Secure Environment IRQ forwarding sequence, where the CPU has entered Monitor mode due to an IRQ arriving during Secure Environment execution. This reduces critical corner case interaction, if any, without significantly impacting interrupt performance and hypervisor scheduling precisions. FIQ interrupts are re-enabled just before applying the IRQ interrupt into the non-secure environment (or EE).

An internal logic sort routine provides the value representing an interrupt number of highest priority interrupt line. Such value is presented via the Secure Interrupt Register SCR and is read by the OS to identify which interrupting line represents the highest priority pending interrupt at the INTC. Under the hypervisor, Secure Interrupt Register SCR becomes a shared EE resource and Secure Interrupt Register SCR is virtualized via INTC enhancement on a per-EE basis by allowing a context save/restore of the Secure Interrupt Register SCR at every EE context switch point. Additionally, it provides for virtual IRQ interrupts that appear as real as any hardware/peripheral generated interrupt, due to the ability of Hypervisor to write/set values for interrupts that Hypervisor wishes to deliver to a particular EE (with OS).

Once a base port has read the Secure Interrupt Register SCR and serviced the corresponding interrupt identified by the Secure Interrupt Register SCR, a New Agreement NEW-FIQAGR bit in an interrupt controller register is set by the OS such that further interrupts and sorting can occur.

The majority of IRQ interrupts, under a hypervisor based system may be dynamically re-configured, morphed or transformed into FIQ at EE context switching points in time. Potential race/deadlock situations for the hypervisor are obviated through individual FIQ interrupt line masking capability instead of only a single mask bit that masks all FIQ interrupts. Here, the interrupt controller 2720 is made to configurably individually mask FIQ on a per-interrupt-line basis on all interrupt lines. Individual FIQ mask bits support delivery of High Priority Interrupts on unmasked FIQ interrupt lines, for instance, and can cause EE context switches to occur to meet high priority interrupt deliveries with very low interrupt latency characterizations.

FIG. 13 and examples in TABLE 9 also depict an embodiment of a Secure Fast Interrupt Request (SFIQ) Preemptive Masking Handler 2715. When Preemptive Masking Handler 2715 is enabled, it operates to prevent Public FIQ from Public non-privileged and even privileged Public processes from contending, competing, or interfering with the operations of Monitor Mode and other Secure processes. Preemptive Masking Handler 2715 thus further provides hardware support so that Monitor code can operate as a hypervisor and so that the categories or EEs of FIGS. 4 and 4A can be separated from each other in the manner shown in FIG. 3 and FIG. 5, for example.

Suppose an Interrupt request is sent by a target (e.g., 3510.*i*) to the Interrupt Handler 2720 of FIGS. 10 and 13. The Interrupt Handler 2720 has a global mask enable field in an internal register of Interrupt Handler 2720. If the global mask is not set to mask the particular target interrupt request, the Interrupt Handler 2720 after sorting its different inputs generates an IRQ or FIQ to the MPU 2610. If Interrupts are not masked inside the MPU (by I, F bits for IRQ, FIQ disable in current program status register CPSR), the MPU 2610 traps this interrupt. The trap is performed into a Public or Secure interrupt mode such as IRQ, FIQ or Monitor mode depending on whether the interrupt was received by the MPU 2610 when in Public or Secure mode and whether the IRQ or FIQ are configured to be trapped into the Monitor Mode by the FIQ/IRQ_Trapped_In_Monitor fields of TABLE 8.

Secure Configuration Register SCR1/2/3 registers of FIG. 13 also control the interrupt mapping and Secure/Public interrupt priorities configuration from Control Module 2765 in the Core Power Domain backing up and using and Interrupt Handler 2720 registers SCR1/2/3 in the MPU Power Domain. The applicable interrupt vector (FIG. 18) depends on the configuration and points to correspondingly applicable software code. The applicable software code is then executed.

TABLE 8

| SSM CPSR MODE ENFORCEMENT REGISTER FIELDS | |
|---|---|
| EA_Trapped_In_Monitor | Trap External Abort EA in Security Zone SCR. |
| FIQ_Trapped_In_Monitor | Trap Fast Interrupt FIQ, ditto. |
| IRQ_Trapped_In_Monitor | Trap Interrupt IRQ, ditto. |
| MASK_Pub_Secure | Enable Interrupt Masking in Secure mode only |
| SYSTEM_VS_USER (SU) | Enforce SYSTEM VS. USER Mode switch. |
| MONITOR_VS_SYSTEM (MS) | Enforce MONITOR vs. SYSTEM Mode switch |
| MONITOR_VS_UNDEFINED (MU) | Enforce MONITOR vs. UNDEF Mode switch |
| MONITOR_VS_ABORT (MA) | Enforce MONITOR vs. ABORT Mode switch |
| MONITOR_VS_USER (MT) | Enforce MONITOR vs. USER Mode switch |
| SECURITY_ZONE_CPSR | Ensure Security Zone default properties |
| SECURE_MODE_ENABLE | Set or unset the Secure mode |

IRQ Trapped In Monitor configures IRQ exception jump to Monitor Mode. When this IRQ trap bit is inactive and unless an IRQ is taken in Secure mode, all IRQ are treated as Public by default. Monitor Mode code performs an exit sequence. When this IRQ trap bit is set active, then each time an IRQ (Public or Secure) is taken, operations jump to Monitor Mode.

FIQ Trapped In Monitor configures FIQ exception jump to Monitor Mode. When this FIQ trap bit is inactive, FIQ are processed by MPU 2610 in FIQ mode. When this FIQ trap bit is set active, then each time an FIQ (Public or Secure) is taken, a jump to Monitor Mode occurs. Monitor Mode code performs an exit sequence.

MASK_Pub_Secure enables interrupt masking in the Public or Secure modes. When this masking configuration bit is inactive, masking of interrupts is made possible by the Public or Secure modes, i.e., that masking is permitted to be activated in either the Public or Secure modes. When this bit is set active, masking of interrupts is made possible only by the Secure modes.

Figure 20:
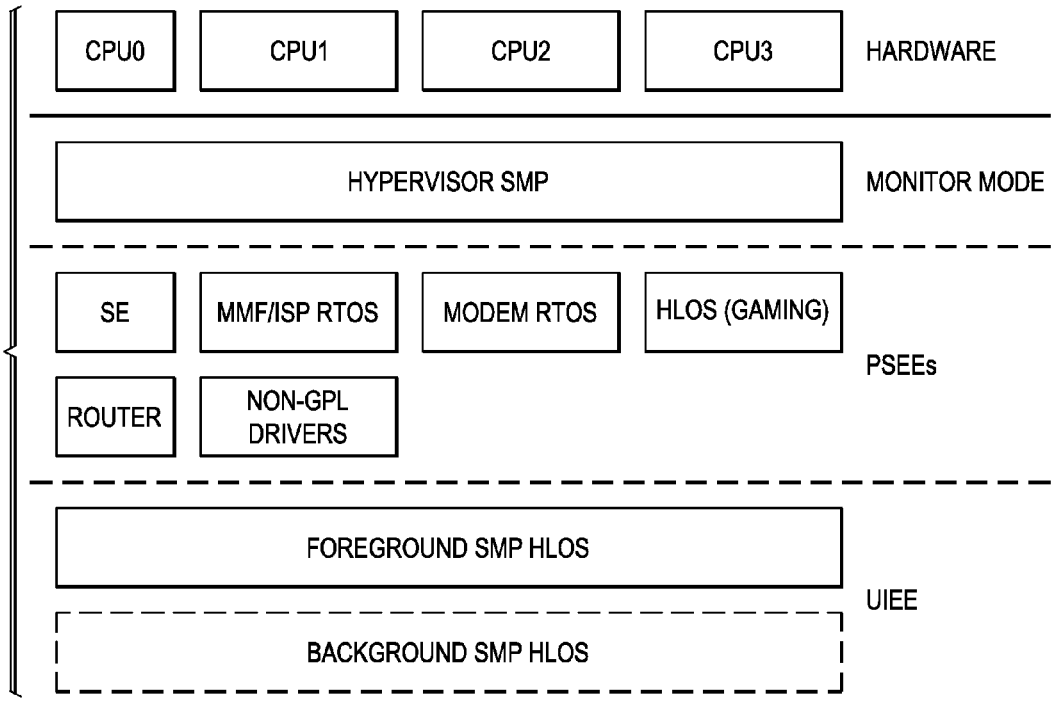
FIG. 20 is a block diagram of inventive four-CPU hardware and software for four-core operation.

In FIG. 13, upon occurrence of an interrupt request, an Interrupt Received ITR register in Interrupt Handler 2720 is updated to indicate that an interrupt request has been received, even if the request is not served and whether or not the Interrupt Handler 2720 global mask is set. The MPU 2610 can be prevented from receiving these interrupts by any of a global mask in the Interrupt Handler 2720, interrupt disabling inside MPU 2610 using a core register (e.g. CPSR I, F bits), or disabling the interrupt generation function in a system component (e.g. 3510.$i$). In some embodiments, disabling of interrupts for FIG. 10 System DMA 3518.1, DSP DMA 3518.2, Camera DMA 3518.3 and Display DMA 3518.4 is accomplished by configuring their corresponding register 3515.1, .2, .3, .4 to not generate Interrupts that are otherwise coupled to Interrupt Handler 2720. Software of suitable security and privilege activates these functions when needed. The interrupt configuration for each of these system components is protected from unauthorized modification by firewalls 3512.$i$ and/or Firewall 3532.1. Firewall out-band errors in FIG. 20 are routed as interrupts from each firewall to the Interrupt Handler 2720 of FIG. 13.

In some embodiments related to FIGS. 4 and 6, SSM 2640 distinguishes PFIQ generated by the Public Virtual (modem) category 2430 from PFIQ generated by Public Non-virtual category 2420 (using active state of VP1_Active and/or MreqSystem). This is because Modem FIQ are served in the Virtual mode when Modem RTOS is in the Modem FIQ mode (Virtual Public FIQ mode). Otherwise, masking all Public FIQ would undesirably mask Public FIQ from the VP1 modem in some embodiments too. In FIGS. 5 and 13, FIQ Mode 2 refers to hardware support by Preemptive Masking Handler 2715 separating PFIQ generated by Public Non-virtual world (FIQ Mode) from PFIQ generated by Public Virtual modem (FIQ Mode 2).

In some other embodiments, such as some related to FIGS. 4A and 6A, EE FIQ are interrupt-mapped or tagged as Secure FIQ and not Public FIQ using register EE_Active and/or the MreqDomainx qualifier. In embodiments wherein a given hardware architecture or policy makes Secure FIQ non-maskable by Public HLOS, then the second type of embodiments that interrupt-map or tag Modem FIQ as Secure FIQ have benefits of that policy. This approach is given some emphasis in the description of FIGS. 29A-E and 30-32 of FIG. 13 hardware 5910, 5920, 5930 discussed there later hereinbelow.

In still other embodiments using the execution environment EE approach of FIGS. 4A and 6A, each of the EEs have public FIQ (modem FIQ among them) and these are interrupt-handled on an EE-specific basis using the EE_Active and UIEE_Active register Fields in registers 4215A to distinguish them.

In FIG. 13, the Control Module 2765 provides Secure Interrupt registers coupled to Interrupt Handler 2720 SCR configuration registers (N registers for 32N interrupt lines in the system of FIGS. 4 and 6). The SSM_FIQ_EE_y configuration registers are suitably N(m+1) in number for $2^m$ execution environments e.g. ($2^{3=8}$, m=3 PSEEs plus bit for SE) in the systems of FIGS. 4A and 6A. The Secure Interrupt registers SCR in FIG. 13 flag if any given interrupt is Virtual or not (e.g., Modem or not) in FIGS. 4 and 6 or identify which EE corresponds to that interrupt in FIGS. 4A/6A. In this way, Monitor Mode code acting as a hypervisor switches or transfers execution to any user-requested category or hypervisor-dictated category or EE in FIG. 4 or FIG. 4A, and interrupt servicing is correct. Thereupon, the correct and effective ISR (interrupt service routine) services the FIQ (Secure FIQ when MreqDomainx is active to indicate modem operation in category 2430), or services Secure FIQ pertaining to Secure Environment SE 2450, or services FIQ from Virtual Secure category 2440 or from suspended EEs. Compare Monitor Mode pseudo-code example of TABLE 43, which describes cases of hypervisor controlled transitions or switches to various cases of FIQ handling, such as from a mode with no hardware real-time FIQ support to exigent modem real-time hardware interrupt servicing capability.

In FIG. 13, Preemptive Masking Handler 2715 itself further supports Public FIQ masking by circuitry that generates an interrupt SSMFIQ_GEN. This SSMFIQ_GEN interrupt is distinct from a masking flag SSMFIQ_STATUS. The circuitry of Handler 2715 provides two different operational options or processes—a fully automated process (SICR Auto-Inhibit active) and a Monitor Mode method (AutoInhibit inactive). The process to use is selectable by establishing and setting or clearing the AutoInhibit field or bit in the Interrupt Handler SICR register such as at Boot time. In an automated method process embodiment, AutoInhibit when active in the Interrupt Handler 2720 causes a signal SSMFIQ_Automatic_EN to be fed to the Secure FIQ Pre-emptive Masking Handler 2715 and control the interrupt SSMFIQ_GEN.

A signal SSM_PMASK_FEEDBACK_Q is taken into account in Automatic mode, also called Automatic method. When in Automatic mode, Public Non-Virtual HLOS can mask only its own FIQ from the Public Non-Virtual category 2420, and HLOS is prevented from masking FIQs from the Secure Environment 2450. Also, Public HLOS is prevented from masking FIQs from the Public Virtual (e.g., modem) category 2430 nor Secure Virtual 2440. The Automatic method operates in a manner transparent to the system and thus no instruction cycles in MPU 2610 are occupied with the process. The Automatic method is useful, for instance, when plural CPUi are operated in symmetric multiprocessing SMP such as with an SMP UIEE HLOS1 of FIG. 4A.

By contrast, the Monitor Mode method does occupy some instruction cycles in the MPU 2610. Assume IRQ_Trapped_In_Monitor is active and also that the virtual processor Modem is running. When in Monitor Mode method (also here called Manual mode), then if a Public HLOS FIQ occurs, the Monitor Mode is entered. Monitor Mode code responds to signal SSMFIQ_Status via Interrupt Handler 2720 of FIG. 13 so that only HLOS FIQ are masked (several lines of Monitor code as in FIGS. 18, 25 and TABLE 43). PublicInhibit in Secure Interrupt Control Register SICR is activated to mask any subsequent HLOS FIQ that might occur. Monitor code also generates a newFIQ agreement NEWFIQAGR in Interrupt Handler 2720 to release the current hardware signal (nFIQ) that just occurred. Monitor code thus acts to nullify the current Public FIQ event and avoids interrupt vectoring and avoids executing any interrupt code. Then Monitor code returns to the originally-interrupted software. The whole operation may occupy on the order of a hundred or more MPU clock cycles. In Manual mode, suppose Preemptive Masking Handler 2715 detects that Public HLOS is attempting to mask all FIQ. Then Preemptive Masking Handler 2715 (transparently to and independently of MPU 2610) sends the request signal SSMFIQ_Status to Interrupt Handler 2720. Interrupt Handler 2720 responds by masking only HLOS FIQ (Public Non-Virtual category FIQ), and no MPU clock cycles are occupied.

In Interrupt Handler 2720, an active high state of SSM_PMASK_FEEDBACK_Q represents a handshake or an acknowledgement to Preemptive Masking Handler 2715 that Public FIQ are indeed masked by Interrupt Handler 2720 in response to the earlier request SSMFIQ_Status. The signal SSM_PMASK_FEEDBACK_Q when inactive tells Preemptive Masking Handler 2715 information about the Interrupt Handler state too. A request to mask Public FIQ can go unfulfilled for a number of clock cycles (PublicInhibit active but SSM_PMASK_FEEDBACK_Q still inactive during sorting) when some interrupts are in the sorting machine of Interrupt Handler 2720.

If the CPSR_Mode is FIQ Mode, Public, then SSMFIQ_Status is set active by Preemptive Masking Handler 2715. In another case, if CPSR_Mode is Supervisor or System, and NS bit is Public and the IRQ mask I-bit CPSR_I is active, then SSMFIQ_Status is also set active as an enforcement mechanism to mask Public FIQ as well. If a security zone mechanism in MPU 2610 does not disable Public FIQ when in FIQ mode because the configuration of a security zone register (e.g., CP15S) is configured so that Public mode cannot mask FIQ, then Preemptive Masking Handler 2715 activates SSMFIQ_Status to enforce masking of the Public FIQ regardless. In yet another case, if MPU 2610 is in Monitor Mode or any Secure mode, and the SSMFIQ_Status_Global_REG is activated, then SSMFIQ_Status signal is activated or maintained activated if already activated. In this way, the Preemptive Masking Handler 2715 propagates a Public FIQ mask hardware state to Monitor Mode and Secure mode. Otherwise, Public FIQ might get unmasked upon an explicit Public HLOS request. Compare FIG. 5, FIG. 13, FIG. 18, FIG. 25 and TABLE 43.

In FIG. 13, the Monitor code is coded to inactivate the IRQ_Trap_In_Monitor field in the SCR of Interrupt Handler 2720 of FIG. 13 to turn off the IRQ trap when Public HLOS is switching within the Public Non-virtual mode(s) for swift interrupt operation in category 2420 of FIGS. 4 and 6. Monitor Mode is coded to activate IRQ_Trap_In_Monitor when switching in the Secure world. In this way, the Interrupt Handler 2720 SCR and IRQ_Trap_In_Monitor of TABLE 8 are used to reserve different treatment for IRQ in the Public world relative to the Secure world. As a result, interrupts IRQ pertaining to Secure modes and both Secure FIQ and Public FIQ interrupts are trapped into Monitor Mode.

A Monitor Mode software handler is responsible to control the MPU 2610 IRQ mask (e.g. CP15S_I) and/or SICR PublicInhibit for masking and unmasking the Public FIQ when needed. The Monitor Mode software handler dispatches each pending FIQ to the Public world or Secure world according to the information provided by the Interrupt Handler 2720. The Monitor Mode software handler thus acts as an efficient intermediary for fast interrupts FIQ.

External Prefetch Abort and External Data Abort exceptions from MPU2BUS interface 2665 (FIGS. 8, 8A, 9B) to MPU 2610 are also trapped into Monitor mode, such as by activating EA_Trapped_In_Monitor of TABLE 8. Boot software operating in Secure Supervisor mode configures an External Abort trap active in MPU 2610 and this Abort trap is correspondingly configured in EA_Trapped_In_Monitor of TABLE 8. External Prefetch Abort and Data Abort are triggered for instructions and data respectively when a Security Violation signal SRESP is generated by an interconnect firewall 3522*i* (constructed analogous to firewalls of FIG. 10 and configured for its position in the system) or when a major memory component error occurs.

The Monitor Mode hypervisor is configurable to be interruptible when not processing a trapped IRQ, FIQ or External Prefetch Abort/Data Abort. The Monitor Mode hypervisor is coded to re-enable CPSR bits I, F, EA pertaining to mask/unmask IRQ, mask/unmask FIQ, and mask/unmask External Aborts upon a Software Monitor Interrupt SMI exception. Software code for the Monitor Mode is illustrated in FIG. 18 and TABLE 43 and discussed elsewhere herein.

In order to speed the FIQ sorting between the different containers or categories of FIG. 4, six 32-bit SSM registers are provided in some embodiments as in FIG. 13, to inform the Monitor Mode which FIQs are Secure FIQs and which are Public FIQs for virtual processor VP1 (e.g., modem). The six registers include three 32-bit registers SSM_PUBLIC_FIQ VP1_0, _1, _2 that respectively hold Public FIQ identifications for virtual processor VP1, and three 32-bit registers SSM_SECURE_FIQ_VP1_0, _1, _2 that respectively hold Secure FIQ identifications for virtual processor VP1. The registers SSM_FIQ_EE_y handle FIQ identifications between the different execution environments EE of FIG. 4A as discussed elsewhere herein.

In FIG. 13, configuration of Secure Interrupt Control Register SICR field SSMFIQ_ENABLE (e.g., at Boot time, and when Monitor code activates the virtual processor modem) activates the Preemptive Masking Handler 2715 via a line SSMFIQ_EN. (SSM FIQ_ENABLE is also designated SSM_FIQ_Preemptive_Masking in connection with FIG. 25). In response, the Preemptive Masking Handler 2715 uses IF conditionals in TABLE 9 of incorporated patent application TI-61985 to detect when the Public FIQ needs to be masked and generates a SSMFIQ_Status signal to the Interrupt Handler 2720 that masks Public FIQ. If the Interrupt Handler 2720 does not mask the Public FIQ immediately (some clock latencies might be introduced) a not-yet-masked Public FIQ can fire and be trapped in the Monitor Mode. To handle the latencies, the Monitor Mode is coded to perform a NEWFIQAGR operation (see TABLE 40 of TI-61985) and let the respective Interrupt Handler PublicMaskFeedback SICR bit become active and generate SSM_PMASK_FEEDBACK_Q before switching back to the interrupted code and thereby effectively nullify the Public FIQ occurrence.

Suppose the field IRQ_Trapped_In_Monitor is configured or set active. When a Public FIQ fires and is consequently trapped in the Monitor Mode, the Monitor code may determine that the Public FIQ masking signal SSMFIQ_Status should be activated. Consequently, the Monitor Mode is coded to set the PublicInhibit bit in the Interrupt Handler 2720 before generating the NEWFIQAGR in order to enter the Public FIQ mode with Public FIQ masked. Concurrently and protectively, when the Public FIQ mode is entered, the Preemptive Masking Handler 2715 automatically activates the SSMFIQ_Status signal. As long as the SSMFIQ_Status is activated, the Public FIQ are masked. When the Preemptive Masking Handler 2715 detects that Public FIQ are to be unmasked (Case 1: CPSR I bit reset so IRQ unmasked, or Case 2: CPSR_Mode not in FIQ mode anymore), the SSMFIQ_Status is cleared and SICR PublicInhibit bit is automatically inactivated for software reset and hardware reset. The Public FIQ are then automatically unmasked. See TABLE 29 and Monitor code transitions.

Secure FIQ Pre-emptive Masking Handler 2715 conditions some operations on active state of a flag SSM_FIQ_Status- _Global_Reg. This internal flag indicates that a Public FIQ masking signal SSMFIQ_Status has been generated active and supplied to the Interrupt Handler 2720. SSM_FIQ_Status_Global_Reg provides an indication that previous operations of Secure FIQ Pre-emptive Masking Handler 2715 turned on or turned off the state of the masking signal SSMFIQ_Status. An internal line and signal SSMFIQ_Status_Global_VAR indicates combinatorial logic behavior (output value is supplied immediately). By contrast, the SSMFIQ_Status_Global_REG indicates flip-flop behavior that is updated on next clock cycle. (It should be understood that SSMFIQ_Status_Global_REG of FIG. 13 is distinct from Global Status 4585 of FIG. 21C pertaining to WFI status update.)

Figure 14:
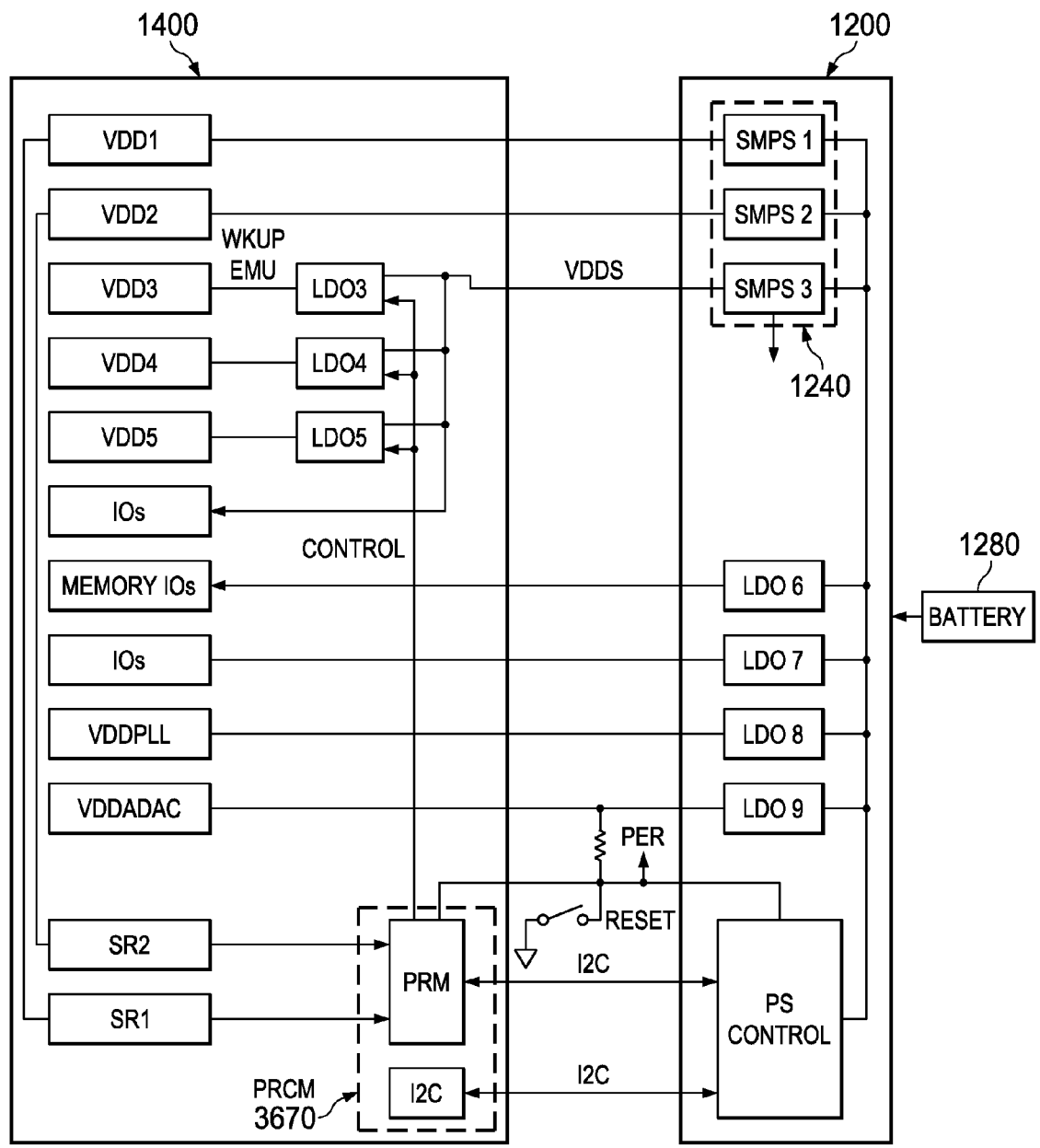
FIG. 14 is a block diagram of an integrated circuit combination of an applications processor of FIG. 2 combined with a power IC (integrated circuit) of FIG. 2 for use according to the inventive combination of FIG. 11.

FIG. 14 shows power supplies distribution and control and connections of an application processor 1400 and a Power IC 1200.

In FIG. 14, turning to a power management aspect of some embodiments, the MPU or CPUi uses software control and a serial I2C interface, along with a power and resets manager PRM in a PRCM 3670, to program an external power IC 1200. Software can use the I2C interface to program any new operational supply voltage values VDD1 for processors and VDD2 for several peripherals. The I2C interface permits and facilitates changing of Operating Performance Points OPPs by programming fixed voltage values. Moreover, the I2C interface facilitates more accurately regulating the OPP voltages to fit best power and performance requirements when a type of adaptive voltage scaling is operating. This mode of control need not or does not involve any PRM logic.

In addition to the VDD1 and VDD2 voltages controls, the PRM handles VDD3, VDD4, VDD5 and other voltages control. The PRM has operations to reduce SRAM LDOs voltage when all memories are in retention, reduce Wake-up LDO voltage when the device enters in OFF mode (Wake-up domain leakage reduction), increase Wake-up LDO voltage when emulation is active to support high performance tracing, do active isolation of levels shifters during VDD1 and VDD2 removal, and establish active sleep mode in analog cells when the device enters in OFF mode.

Two embedded SRAM LDOs LDO4, LDO5 supply regulated voltage (VDD4 or VDD5) to memory banks such as SRAM. These LDOs have plural reference voltages—a normal voltage reference, used for processors OPP2, OPP3 and OPP4 (FIG. 16) and a VDD1 overdrive voltage reference, when processors are operating at OPP1. The SRAM LDO tracks and follows VDD1 voltage as soon as it exceeds OPP2 nominal voltage. A retention voltage is set for a reduced voltage whenever all memory banks belonging to the LDO are in Back-Bias retention mode. This allows dropping down the memory arrays in voltage to optimize leakage power savings. When not used (all memories OFF), the LDO is shut down (ON-OFF) control. These modes are automatically managed by hardware (PRM). The SRAM LDO has a Mux for reference voltages that are fed to a control circuit to deliver the memory array power supply VDD4 or VDD5.

An embedded wake-up LDO3 supplies voltage for both Wake-Up domain and Emulation domain. This LDO is permanently active, and continuously feeds the Wake-Up domain. It embeds a switch, controlled by the PRM which controls power of the Emulation domain. This switch is closed upon software request command when a debug session starts, or automatically upon JTAG plug detection. This LDO has plural reference voltages—a normal voltage reference used in device active mode, a VDD1 overdrive voltage reference used when emulation is activated and MPU emulation trace is required, and a third voltage set when the device is in low power mode (OFF mode), in order to optimize leakage power savings. All these modes are automatically managed by hardware. The Wakeup LDO has a Mux for reference voltages. The Mux feeds a control circuit that delivers Wakeup and EMU power supply.

Figure 15:
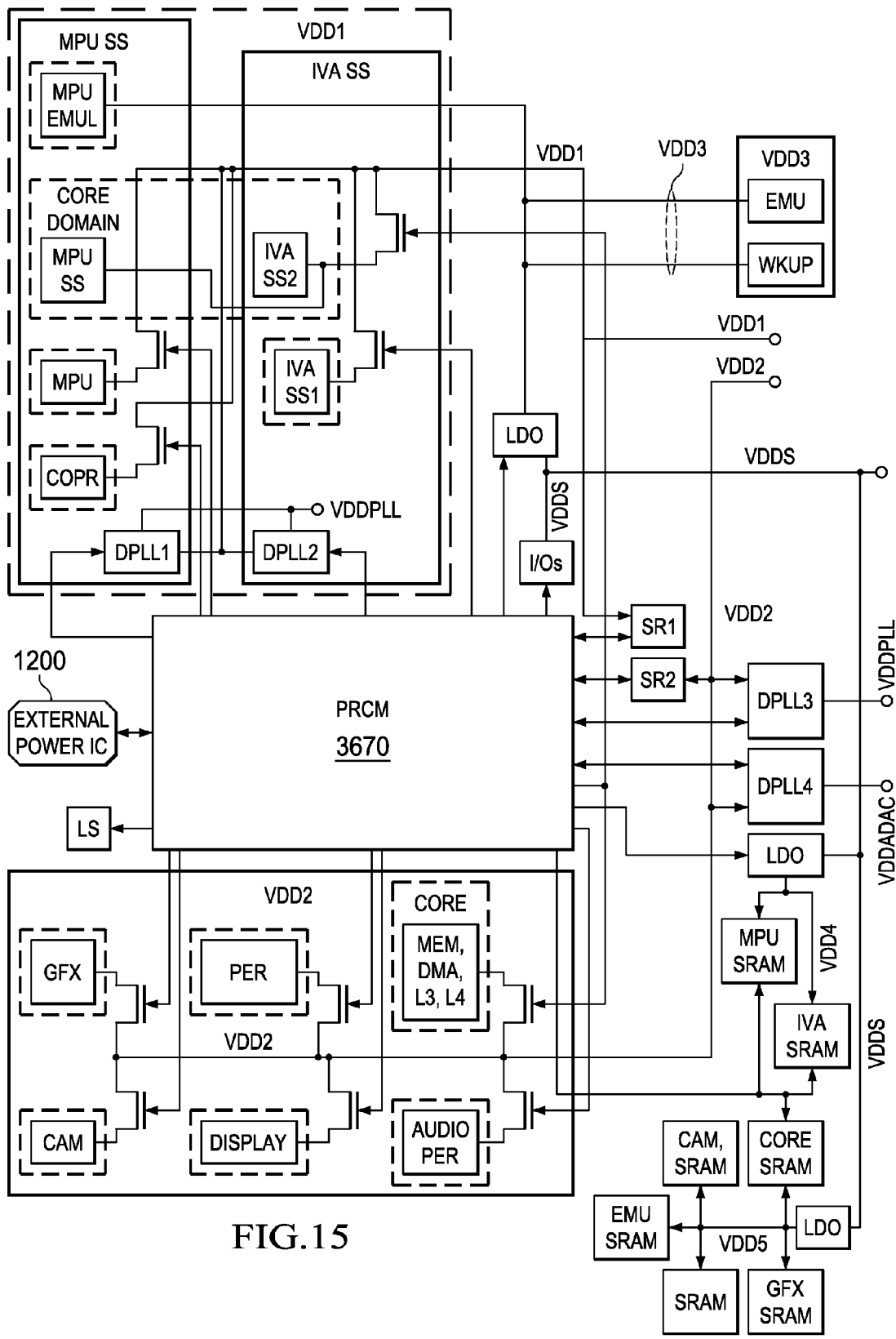
FIG. 15 is a partially schematic, partially block diagram of an integrated circuit with voltage domains and power domains for inventive use and combination in FIGS. 2, 8A, 9A/9B, 10, 11, 12, 12A, 12B, 13, and 14 and with other processors herein.

In FIGS. 14 and 15, a Power and Resets Control Module PRCM 1470 (3670) in application processor integrated circuit 1400 (and/or circuit 1200) is coupled to a power integrated circuit 1200. Read FIG. 15 together with FIG. 14. PRCM 1470 (3670) provides independently controllable clocks at various configurable and adjustable clock rates to several DPLLs designated DPLL1, DPLL2, DPLL3, DPLL4. PRCM 1470 (3670) also delivers respective control signals to turn respective power switch transistors off or on to power various power domains in FIG. 15. A VDD1 voltage domain has plural power domains for each of MPU and IVA. A Core domain has various power domains with respective power switch transistors that couple in voltage VDD2 under control of PRCM 1470 (3670). PRCM 1470 (3670) controls various Level Shifters LS suitable for the architecture. Voltage VDDPLL from power IC 1200 supplies voltage for DPLL1 and DPLL2, see also FIG. 14. The voltages VDD2 and VDDPLL are supplied for DPLL3, and the voltages VDD2 and VDDADAC are supplied for DPLL4. Respective switch mode power supplies SMPS1, SMPS2, SMPS3 and LDOs in FIG. 14 are connected to and supply their voltages to corresponding voltage rails for voltages VDD1, VDD2, VDDS in FIG. 15.

A pair of on-chip sensors SR1 and SR2 are oscillators that respond to characteristics of the chip material for adaptive voltage scaling, and they are respectively supplied with voltages VDD1 and VDD2. Sensors SR1 and SR2 provide respective sensor outputs to PRCM 1470.

Voltage VDDS from FIG. 14 is coupled to LDOs which respectively provide voltages VDD3, VDD4, VDD5. A VDD3 voltage domain has power domains for Emulator and Wakeup WKUP. A VDD4 voltage domain has power domains for MPU SRAM and IVA SRAM. A VDD5 voltage domain has power domains for Core SRAM, GFX SRAM, CAM SRAM, EMU SRAM, and other SRAM. Voltage switching transistors are provided for the respective power domains in the VDD3, VDD4, and VDD5 voltage domains and are not shown in the drawings for conciseness.

In most of the cases, a power domain is supplied by a single power supply as in FIGS. 14 and 15. The herein so-called Core power domain (relating to interconnect and not to be confused with CPU cores) is an exception in an example system wherein the Core power domain is spread over two voltage domains and three sub-systems. Voltage VDD1 is not set in retention or in OFF mode, independently from VDD2. The reason is that the daisy chains that deliver an OPP going through VDD1 voltage domain are disabled if VDD1 is at retention level, or dropped down to 0V. This then prevents any control of Core power domain when VDD2 stays active.

In FIGS. 14 and 15, the PRM manages sources of voltage as follows: Processors voltage (VDD1), Core voltage (VDD2), Wake-up voltage (VDD3), Processors SRAM voltage (VDD4), and Core SRAM voltage (VDD5). Other voltages VDDS, VDDPLL, VDDDLL, etc. in the device are directly controlled from the external device or controlled by software through an I2C interface independent from the PRM (VDDADAC).

Voltage control in applications processor chip 1400 is mainly handled by the PRM, according to 2 control types: 1) Memories LDOs (VDD4, VDD5) and Wake-up LDO (VDD3) direct control, and 2) Power IC control through PRM I2C interface (VDD1, VDD2). Additional device I2C interface, independent from PRM, allows Power IC programming MMC, VDDS and VDDADAC voltage control.

For system power-up sequencing reasons, memories 10s have a power rail independent from the other IOs. Depending on system context, the user can choose to supply memories 10s either from the LDO6 power IC 1200 (and/or potentially share the LDO7 used for other 10s), or from any other power IC (such as a separate modem power IC).

In FIG. 15, the voltage domains have hardware dependencies between the various voltages. The PRCM 1470 manages these dependencies to process proper sleep and wake-up sequences. In an example, let all the VDD1, 2, 4, 5 ON/Ret/OFF depend on VDDS being on. VDD3 has states of Nominal, Low Power and Emulator (Emu). Also, for VDD1 to go ON, then depend on VDD2 to be ON. For VDD1 to go in Retention or OFF, then let the dependency be upon the corresponding request for VDD2 Retention or OFF. Further, let VDD1 to go OFF depend on VDD4 being OFF. For VDD2 to go ON or in Retention, then let the dependency be upon VDD1 ON or Retention being correspondingly requested. For VDD1 to go OFF depends on VDD1 and VDD5 to be off. Further for VDD4 to go ON depends on VDD1 to be either in ON or Retention, and same dependence applies for VDD4 to go into Retention. Likewise, for VDD5 to go ON depends on VDD2 to be either in ON or Retention, and same dependence applies for VDD5 to go into Retention. Some dependencies such as keeping VDDPLL voltage when VDD1 and VDD2 are functional are under user responsibility.

A power-efficient DVFS/DPS result is achieved with minimum voltage, hence low power. Combined DVFS and DPS are established in power management structure and process.

Processor engines for battery powered devices such as PDA or smart cell phone have increased requirements in term of feature complexity and performance. To address these requirements advanced power management processes are provided herein, such as Dynamic Voltage and Frequency Scaling (DVFS), Dynamic Power Switching (DPS) and Adaptive Voltage Scaling (AVS) as described herein. All these processes have their respective advantages and are often more efficient for a given source of power consumption (active/standby).

In DVFS, supply voltage V is scaled to a lowest adequate voltage sufficient to deliver various operation modes and frequencies currently predicted as needed for processing and system bandwidth at different moments in operation. The needs of the system involve power management decisions responsive to the scheduling of categories and EEs and the timer configurations that are ultimately under control of the hypervisor as described herein. The different power management processes may also appear sometimes to have conflicting goals. For example, DVFS tends to minimize the idle time of the system while DPS, by contrast, tends to maximize this idle time. DVFS pairs Voltage and frequency to form OPPs (operating performance points) of different predetermined voltage and frequency. By contrast, with AVS power management the voltage is variable instead of predetermined since the voltage is dynamically set by the hardware for each device.

Some embodiments herein combine any one, some or all these power management processes together with FIGS. 11, 12, 12A, 12B bandwidth and scheduling as taught herein in spite of their apparent contradictoriness, conflict and practical constraints. In this way, an even higher relative power saving and power management efficiency is synergistically conferred on all the circuits, domains, areas, and regions of power consumption in a given system.

Some embodiments combine any two or more of DVFS, DPS and AVS power management processes in order to optimize the power saving in all modes of operation and for all sources of power consumption. Power and performance optimization architecture concurrently or simultaneously adapts to variations of wafer fabrication process, variations of temperature, and to changing speed requirements. For some power management background, see incorporated patent application TI-60478, hereby incorporated herein by reference.

Power savings associated with adjusting the supply voltage are combined with both changes in the performance requirements and changes in environmental variables, such as temperature and wafer fabrication process. For each operating point, reduced active power and reduced leakage power are sought. Dynamic voltage frequency scaling (DVFS), Dynamic Power Switching (DPS), and adaptive voltage scaling (AVS, SmartReflex™ power management from Texas Instruments Incorporated) are combined in some embodiments to minimize the power consumption of a device in plural, many, most, or all operating modes. Some embodiments, utilizing all three of DVFS, DPS, and AVS achieve greater power reduction than any one of DVFS, DPS, and AVS alone.

Some embodiments involve a power management policy for a system that describes when OPP change is performed (DVFS) and when DPS is started or stopped. Various power management process embodiments provide a more power efficient behavior of the system by combining the processes. See FIGS. 16-17.

The system includes a processor and/or any collection of modules that can be characterized by a performance requirement. The performance is defined, for instance, as a percentage (%) of maximum performance or maximum bandwidth and is translated into a target frequency of operation $f_{target}$. The system is characterized for a given number of OPPn (operating performance point), each indexed by a value of an index n. Each OPPn corresponds to a pair (Fn, Vn) representing its frequency Fn and supply voltage Vn.

DFVS dynamically changes the OPP for various power domains in a system. When DPS is started, a given domain is switched dynamically between its Active state and a low power state (OFF, Retention, inactive). In some embodiments of DPS herein, supply voltage V is scaled to a) lowest adequate DVFS voltage in operation and b) a substantially lower leakage-reducing voltage or to zero when deep-sleep. Adaptive voltage scaling (AVS) is used to adjust and set an actual minimum appropriate voltage in the vicinity of a voltage Vn defined by DVFS for a current OPPn.

Substantial power savings result by combining processes and structures that synergistically act in different and even contradictory ways on the power consuming modules. An optimum combination resolves potential conflicts between different processes and structures and is widely applicable to various types of systems.

Hardware support is provided herein for multiple power management strategies for an application processor. Some embodiments of power management strategies synergistically combine any two or more of the following:

Dynamic Voltage and Frequency Scaling (DVFS)
Adaptive Voltage Scaling (AVS)
Dynamic Power Switching (DPS)
Static Leakage Management (SLM)
Other Power Management (OPM).

Standby Leakage Management (SLM) improves standby time. SLM switches the device into ultra-low power modes when no applications are running. SLM saves more power while increasing the wakeup latency. SLM switches the module clocks statically between On and Off and likewise switches one or more power domains statically between On and Off. SLM lowers the voltage substantially or shuts down applicable external and/or internal voltage regulators.

Adaptive Voltage Scaling (AVS) herein improves active power consumption and performance. For any given frequency of operation AVS adapts the voltage of each device individually according to its temperature and silicon performance determined by conditions of the silicon fabrication process or other semiconductor materials fabrication process. AVS automatically senses on-chip delay. AVS automatically adjusts the external voltage regulator according to the temperature and silicon performance.

Dynamic Voltage and Frequency Scaling (DVFS) also improves active power consumption and performance. DVFS dynamically adapts the voltage and frequency of operation of the device to the required performance of a given application or set of applications. DVFS predicts system load, adjusts the device frequency such as by software, and adjusts the device voltage such as by software and by AVS hardware if AVS is also enabled.

Dynamic Power Switching (DPS) improves active time. Based on to the hardware resources activity, as indicated by FIFO buffer status, for instance, DPS switches the device dynamically from any of several medium power modes to a lower power mode during application execution or to a low power Standby mode of TABLE 5. DPS predicts system load and switches the module clocks dynamically between On and Off modes. DPS switches one or more power domains dynamically between On and Retention, or between On and Off. DPS provides automatic hardware detection of conditions (e.g. FIFO fill status or IO hardware signals) for sleep and wakeup transition for clock and power. DPS performs hardware management of sleep and wakeup dependency between the power domain, and hardware handshaking with modules.

Active power consumption refers to the power consumption of the system during the active time, namely when some processing is on-going. The active power consumption is composed of dynamic power consumption (transistor switching) and leakage power consumption.

Standby power consumption refers to the power consumption of the system during standby time, namely when no processing (or very limited processing) is ongoing and the system is waiting for a wakeup event. The standby current consumption is composed mostly of leakage consumption and very limited amount of dynamic power consumption.

Dynamic Voltage and Frequency Scaling (DVFS) power management reduces active power consumption by reducing both dynamic and leakage power consumption. With DVFS combined with AVS, the system dynamically adapts its supply voltage Vn and operating frequency Fn to achieve the performance required by the operations in process. Applying DVFS, a processor or a system runs at the lowest OPPn representing a (frequency, voltage) pair operating point that is adequate to deliver the desired performance at a given time, and then AVS herein adjusts the voltage in the vicinity of OPPn voltage Vn for the particular environment.

In some embodiments, DVFS is applied to the Processor domain while the device Core domain that represents a large part of the logic is held at a lower and fixed voltage most of the time. In this way, power is conserved because a large part of the device always works at lower than nominal voltage. Also, the DVFS hardware and software are simplified because the Core domain interconnect, memory interfaces and peripherals are working at fixed voltage and frequency.

In some other embodiments allowing for lower interconnect bandwidth herein, DVFS is independently applied to the device Core domain. As used here the Core domain involves the interconnect and interfaces exclusive of the processor cores. In this case, the DVFS voltage in the Core domain is reduced to the minimum value that still allows the peripherals to be kept working at their nominal functional clock while their interface frequency is reduced. Further power savings are achieved and some DVFS software overhead is acceptable to accomplish the power savings.

The deployment of DVFS in some embodiments has appropriate software support performance prediction software to predict dynamically the performance requirement of the application(s) running on the processor. In some embodiments, the performance prediction software also predicts interconnect bandwidth requirements. Software flexibly accommodates any one or combination of performance prediction processes and system power management processes described herein or known to the power management art now or in the future.

Figure 16:
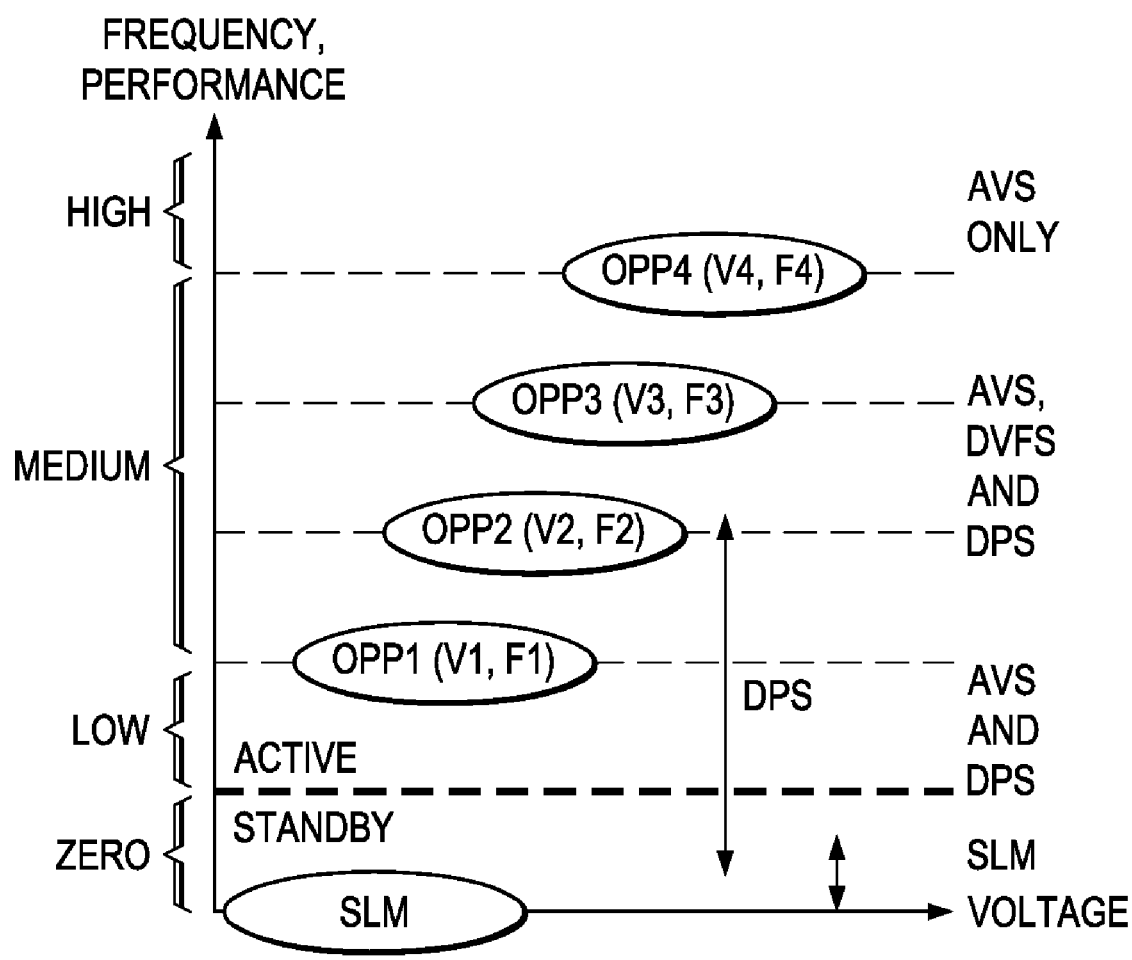
FIG. 16 is a partially graphical, partially flow diagram of a process of power management such as for inventive use and combination with the power management PRM and PRCM structures of FIGS. 2, 10, 11, 14 and 15, and other systems herein.

In FIG. 16, Standby Leakage Management (SLM) provides power management that reduces standby power consumption, or leakage power consumption. With SLM, the device switches into low power system modes automatically or in response to explicit user requests during system standby time such as when no application is started and the system activity is negligible or very limited.

Applying Standby Leakage Management (SLM) puts the system into the lowest static power mode and maintains that lowest mode, compatible with desired system response time. The integrated circuit operation in Standby Leakage Management SLM enters an ultra-low power mode called Off mode having very low total chip current and wherein the Wakeup domain on the chip can still be activated. The wakeup clock (e.g., 32 kHz) remains on and a wakeup power voltage remains applied to the Wakeup domain. A system and security timer and watchdog timer are functional and can wakeup the device. Also, a level transition can be detected, logged from any pad and thereby wakeup the device. Also, a small backup memory is retained in the Off mode. Thus, the SLM circuit still wakes up autonomously from Off mode in response to a timer interrupt or detection of any pad transition. SLM trades off static power consumption and wakeup latency (time interval consumed by a wakeup process).

Some application processor features to enable SLM are the same as or analogous to those provided to enable DPS. Domain state transitions are controlled in sequence according to their sleep and wakeup dependencies. Intelligent idle and standby power management is provided in any one, some or all modules. A main voltage domain (processor/core) can be fully turned Off in a lowest power mode, while full hardware control is maintained by the power management interface controller block PRCM. Software configurability of the IO state in lowest power mode reduces IO leakage. Flexible wakeup capability is provided from any pad in lowest power modes.

In FIG. 16, and comparing DPS and SLM, these two processes have some similarities in their processes and in the hardware utilized to support them. Both DPS and SLM switch between system modes, but their time scales is different. DPS and SLM differ principally by the latency allowed for the modes transitions and therefore by the modes attributes.

DPS is used such as in an applicative context or EE when each task is started and thus is useful for power savings due to intelligent control of CPUi power and bandwidth, e.g. see FIGS. 11, 12, 12A, 12B and 23 and scheduling of EEs and maintenance functions, and hot-plug control. Therefore, the mode transitions are related to scheduling categories or EEs to provide system performances as well as manage processor CPUi load. DPS transition latency is generally small compared to applications time constraints or deadlines so that DPS does not degrade application performance. For DPS, transitions latencies can be in a range of ten (10) microseconds to one hundred (100) microseconds, for instance, and latencies outside this illustrative range are also usable. DPS is supported by performance prediction software.

The performance prediction software monitors and controls transition latencies for DPS. The transition latency, in the case of real time application, is desirably kept short enough so that the transition latency does not deteriorate the device performance to a point where a deadline is missed. Analogously, in the case of an interactive application, the transition latency is kept short enough so that the transition latency does not noticeably degrade the user experience of interacting with the application.

SLM is not used in a running applicative context or active EE, and instead SLM operates with no task started in the applicable power domain or voltage domain. The mode transitions are more related to system responsiveness. The transitions latency on wakeup is made small compared to user perception so that the latency is compatible with a satisfying user experience. For SLM, transitions latencies for many systems are likely to lie in a range of one millisecond (1 ms) to ten milliseconds (10 ms) depending of available device mode, and SLM is feasible for longer or shorter latencies as well.

DPS and SLM also can differ by the type of wakeup event that triggers wakeup transitions. For DPS, wakeup events are application related (timer, DMA request, FIFO fill signal, peripheral interrupt, key pressed). In case of SLM, wakeup events are more user related, such as from touch screen, key-press, peripheral connections, etc.

Four wakeup processes are adapted to different modes of operation of the system. In active modes where either processor MPU and/or imaging, video and audio processor (IVA) is in Retention or OFF state but core is still active (clock running), an interrupt event can still wakeup the processor MPU and/or imaging, video and audio processor (IVA). In active modes where either processor (MPU or DSP) is in Retention or OFF state and core is inactive (clock stopped), a module wakeup event can still wakeup the processors and clocks. In active modes where processors (MPU and DSP) are OFF or in Retention and core is in Retention (Peripherals or Display can still be active), events mapped on GPIO in Peripheral domain or Wakeup domain can still wake up the other modules in the integrated circuit device. In standby modes and OFF mode (power domain are either OFF or RET), an IO can still wake up the device.

In regard to FIG. 16, Operating Performance points (OPP) are discussed further. For practical reasons related to device making (flow, tools), the DVFS process in some embodiments utilizes a few discrete steps, although a continuum of voltage and frequency values for OPPs is possible. Each step or Operating Performance Point (OPP) is composed of a voltage-frequency (V, F) pair. When defining OPPs, the skilled worker chooses to set the voltage steps or the frequency steps. Either way, for a given OPP (V, F), the frequency (F) corresponds to the maximum frequency allowed at voltage (V). Conversely, the voltage (V) corresponds to the minimum voltage allowed for frequency (F).

When adaptive voltage scaling (AVS) is used on a device, it is in some cases easier to set the frequency steps and let the AVS adapt or adjust the voltage according to the device silicon performance. In such case, each frequency step corresponds to a range of voltage, rather than a voltage step, depending on whether the device is a hot device or a cold device. The operating points OPP are then each defined as a pair ([Vs−Vw], F). Vw signifies the magnitude or width of the AVS control over voltage reduction compared to supply voltage Vs (e.g. an OPP nominal voltage) and in response to a sensor module SR1 or SR2. In such pair, the voltage difference [Vs−Vw] is the range of voltage over which the AVS process can have the device operate at a given frequency F. With AVS, the frequency steps are identified and AVS adapts the voltage according to the device silicon performance. In this case, for each frequency step, instead of a DVFS voltage step there is a corresponding range of voltages due to combined operation of DVFS and AVS. This range of voltages depends on the device fabrication process and its real-time operating state (temperature) at a given frequency.

DPS is a power-management technique, like DVFS, aimed at reducing active power consumption by the device. Whereas DVFS reduces both dynamic and leakage power consumption, DPS reduces leakage power consumption at the cost of a slight overhead in dynamic power consumption and temporarily shuts down one or more parts of the system that do not need to be powered at a given moment. With DPS, the system switches dynamically between high and low consumption system power modes during system active time. When DPS is applied, a processor or a system runs at a given OPP (full OPP frequency Fn) even when the OPP frequency exceeds a target performance frequency $f_{target}$. DPS thus combined with DVFS operates to complete tasks as fast as possible, given a currently established DVFS OPP, followed by an automatic switch to a low-power mode, for minimum leakage power consumption. DPS is also useful, for example, in situations herein where a real-time application is waiting for an event. The system can switch into a low-power system mode if the wake-up latency conditions allow it. This technique involves maximizing the idle period of the system to reduce its power consumption.

In FIG. 16, combining of contradictory power management processes is further described. Even more enhanced active power savings are obtained by combining DVFS, DPS and AVS processes and using SLM for static leakage management. AVS is used at boot time to adapt the voltage to device process characteristics (strong/weak) and then continuously to compensate temperature variations. In some situations that require maximum available application performance, some embodiments apply only AVS in the vicinity of a maximum OPP (e.g., OPP4 of FIG. 11). In situations that require medium application performance, DVFS is applied as well as AVS.

As application performance requirements are decreased, the voltage and frequency are scaled to correspond or match to the closest OPP that meets or satisfies the performance requirement. In situations where the application performance requirement is situated between two OPPs or in situations that require very low application performance below the lowest performance OPP, then DPS is suitably applied. Notice, as shown by a long vertical arrow in FIG. 16, that DPS automatically transitions or alternates between operation at one of the OPPs and a very low power Standby mode.

In FIG. 16, when combining DVFS and DPS, and unless DPS process is inapplicable for other reasons, the frequency is adjusted or set so that the frequency corresponds to the maximum allowed at a given voltage. The frequency does not need to be scaled independently of the voltage to match exactly the performance requirement. If DPS cannot be applied in a given context, scaling the frequency while keeping the voltage constant would not save energy but will reduce the peak power consumption. This can have positive effect on the temperature dissipation and also on battery capacity.

For low performance applications, a low voltage V1 is established and the frequency is established at frequency F1, represented by operating performance point OPP1 in FIG. 16, by power management processes AVS and DPS. As more applications and/or applications performance are required, beyond the maximum performance available at OPP1, then DVFS power management makes a discrete transition of operating voltage from voltage V1 to voltage V2 and increases the frequency from F1 to F2. Further in FIG. 16, as even more applications and applications performance are required, beyond the maximum performance available at OPP2, then DVFS power management makes a discrete transition of operating voltage from voltage V2 to voltage V3 and increases the frequency from F2 to F3, and so forth. At each OPP point, AVS power management manages the voltage depending on the parameters of the integrated circuit. DPS power management is activated if the target frequency $F_{target}$ for a given process is below a threshold frequency THRESHOLD 1, 2, 3, 4 so that DPS energy savings are sufficient to justify activating DPS at the given OPP, For example, in FIG. 16, if the currently-selected DVFS OPP is OPP2, target frequency $F_{target}$ is sufficiently below the frequency of OPP2 to be lower than THRESHOLD2, and DPS activation is justified.

The process operates in reverse as fewer applications and/or less applications performance are required. When performance needed can be managed at a lower OPP, then power management process DVFS makes a discrete transition of operating voltage downward by one voltage step to reach the next lower operating point $OPP_{n-1}$. MPU power management related software provides a HLOS Power Management framework that supports DVFS and DPS power management processes and a prediction software process to predict the CPU load. Based on MCU and DSP load predictions, the power management policies adapt dynamically frequency/voltage and enable or disable domain DPS in OS idle thread. Device drivers are notified of frequency/voltage change to program hardware if and as needed. A device driver implements on-demand power ON/OFF mechanism (clock gating). Device drivers are notified of device mode changes to program hardware if and as needed. In some embodiments, legacy applications need no modification.

Figure 17:
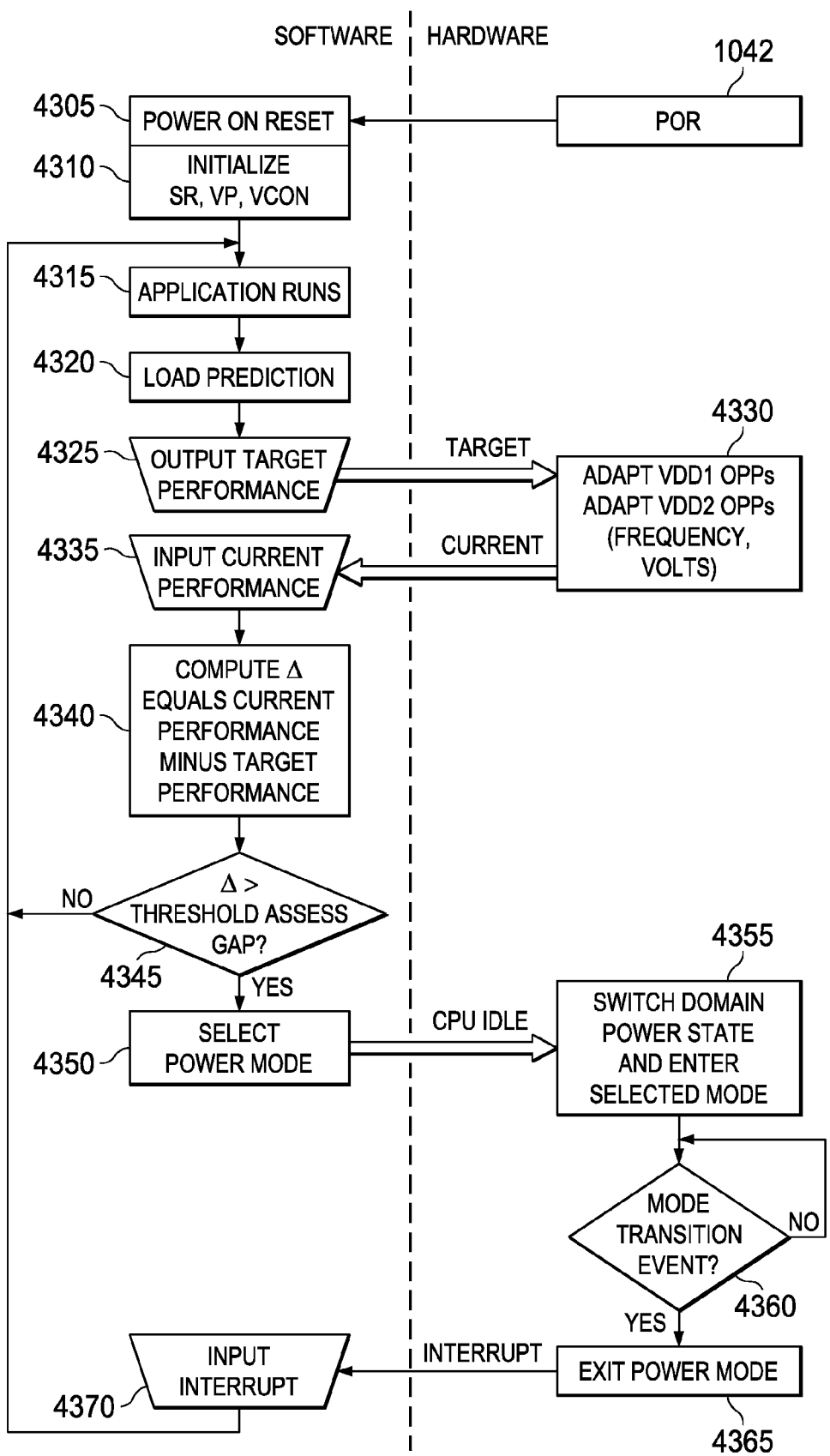
FIG. 17 is a flow diagram of a process of power management such as for inventive use and combination with the power management PRM and PRCM structures of FIGS. 10, 11, 14 and 15 in the process of FIG. 16 and in other systems herein.

In FIG. 17, software operations are shown by way of example in a column SW and hardware operations are shown for example in a column HW. Power On Reset POR 1042 resets the chip 1400 at a step 4305 and commences the mixed process. A step 4310 initializes the AVS Sensor modules SR1 and SR2. In a succeeding step 4315, an application runs on the system and needs to be power managed.

In a step 4320 a load or performance prediction is made for the application. Then a step 4325 outputs the target performance to the PRCM. A PRCM hardware operation 4330 adapts the DVFS OPPs for the VDD1 voltage domain, adapts the DVFS OPPs for the VDD2 voltage domain, and adapts the DVFS OPPs for any other DVFS controlled VDDx voltage domain. This adaptation or adjustment of an OPP involves a change of frequency F and a change of voltage V. The PRCM reports back that the adaptation is completed and represents a current OPP.

A software step 4335 inputs, confirms, or updates the current OPP. A succeeding step 4340 computes a metric representing an amount of difference Δ, discrepancy, disparity or gap between the current performance and the target performance of step 4325. Then a decision step 4345 assesses the gap by comparing the metric with a configured or predetermined threshold value THRESHOLDi. For example, this method is used for assessing a quantity called DPS margin to determine whether DPS power management should be activated or stopped. In FIG. 17, if step 4345 determines that the threshold is not exceeded or the gap is otherwise insignificant, then operations loop back to step 4315 to continue to run the application under the present conditions.

If step 4345 determines that the threshold is exceeded or the gap is otherwise significant, then operations proceed to a step 4350 to select an appropriate power mode to handle the power management to either deliver more power or less power in an appropriate way. Step 4350 activates a hardware operation 4355 to switch one or more domain power states and enter the selected power mode. Then hardware determines at a step 4360 whether the selected domain power states are now established and monitors until the switching is fully completed. Also at step 4360 hardware determines whether any hardware based mode transition event has occurred, such as a wakeup signal coming from a peripheral. Upon such completion or event, a succeeding step 4365 represents exit from the previous power mode, whereupon an interrupt of step 4370 is fed to the MPU or CPUi core and an application may run at step 4315 in the selected power mode.

FIG. 18 and TABLE 29 show a process flow embodiment for the Monitor Mode hypervisor 4410 with software interrupt SWI handlers 4420 and 4430 and an example of vectors and their addresses in an associated memory infrastructure for the Monitor Mode hypervisor. FIG. 18 is divided into a left half for depicting a Public space 4440 having Public categories or Public execution environments EE, and a right half for Secure space 4450. Other process and structure embodiments such as those of FIG. 5 and TABLE 29 and TABLE 42 and description elsewhere herein can be compared with and supplement FIG. 18 and each other.

In the Public space 4440, Public HLOS of FIGS. 4-6 or UIEE/PSEE of FIGS. 4A and 6A calls a Public SWI (software interrupt) handler 4420 to request activation of another category in FIG. 6 such as modem in public virtual category 2430 or a protected application (under security kernel) in secure non-virtual category 2450 or other software in some other category. A PSEE 2460 or 2470 or UIEE 2480 in FIG. 6A can also request activation of another PSEE, UIEE or Secure environment 2490. A Public SWI handler 4420 operates in Public Privilege mode and has an associated entry SWI vector 4425 offset from a base address Public_BA. Monitor code can also transition to the Public SWI handler 4420 by using the entry SWI vector 4425. Software Monitor Interrupt (SMI) in the Public SWI handler accesses a Monitor Mode vector 4455 to enter Monitor code. The STANDBYWFI signal of FIG. 12 or FIG. 12A is expanded so that the originating EE of the interrupt is identified. Compare to protection wall 2140 of FIG. 3.

In an MPU 2610 example of a CPU in FIG. 9A, the SECMON bus carries bit codes to identify modes for User, FIQ, IRQ, Supervisor, Abort, Undefined, System, and Monitor.

Each of the modes has an associated vector address including a base address and an offset address. Vector base address registers (designations with "_BA") are provided as in FIG. 18, for example. A software monitor interrupt SMI instruction is then used to make a transition from a given mode to the Monitor Mode.

In FIG. 18, Monitor code, Monitor Stack, and Monitor Mode vectors 4410 reside in the Secure space. At respective offsets from a Monitor Mode base address Monitor_BA, several Monitor Mode vectors are provided for SMI vector, External Prefetch Abort vector, External Data Abort vector, IRQ mode vector, FIQ mode vector. Monitor code is further offset from the base address Monitor_BA. On-chip Secure RAM has still further offset addresses and space for the Monitor Stack. The Monitor code acts as a bridge between public EEs and between categories by pushing and popping contexts of EEs to the Monitor Stack. These involve both register file RF and interrupt context IRQ/FIQ that are muxed in FIG. 13 depending on whether EE x is identified by register EE_Active=x or whether that EE is not so identified and is thus suspended (SUSP). The context for EE x that is pushed or popped is indicated in FIG. 18 by a context legend CTX: {$RF_x$, $IRQ/FIQ_x$}

In the Secure space 4450, Secure SWI (software interrupt) handler 4430 operates in Secure Privilege mode and has an associated entry SWI vector 4435 offset from a base address Secure_BA. Monitor code transitions to the Secure SWI handler 4430 by using the entry SWI vector 4435. Compare to protection wall 2150 of FIG. 3. To transition from the Secure SWI handler 4430, Software Monitor Interrupt (SMI) accesses a Monitor Mode vector in Secure mode at an address identified by the sum MONITOR_BA plus address offset and then enters Monitor code.

The hypervisor makes an entry identifying a particular EE in the EE_Active register or UIEE_Active register in any of several situations such as 1) when a SMI #code generated by the currently activated EE that is requesting a switch to the particular EE is allowed by the secure SW running in hypervisor using an allowed connectivity table, 2) hypervisor scheduler schedules the EE under normal processor bandwidth allocation wherein it has become the regular turn of the particular EE to be executed, 3) hypervisor schedules a switch to the particular EE when executing a service in a process of back and forth communication between a requesting EE and a servicing EE wherein the particular EE is the latest EE to be involved in the back-and-forth communication, 4) when a critical interrupt is received such as SSM_WFI (to force scheduling of execution of the particular EE or actions therein) or 5) other interrupts are received such as wakeup event, error event, connection event (e.g., USB plug-in), or other event.

An EE is active as soon as its boundaries of execution/data (Physical and Virtual) are defined in the SSM and as soon as the EE_ACTIVE and UIEE_ACTIVE registers are configured in SSM and as soon as Monitor mode is exited to some other CPUi mode. Then the SSM tags correctly all the CPUi bus transactions with the qualifier identifying the particular EE that is currently executing and thus active.

Hypervisor conversely removes an entry identifying an EE in the EE_Active register or UIEE_Active register in situations such as 1) SMI #code requested is allowed from the EE, so the EE is removed and an EE to be activated according to the SMI #code request is entered in the register instead, 2) EE is de-scheduled and removed from the register because its allowed time slice in FIG. 23 is finished, 3) hypervisor alternately enters and removes in the register an EE participating in back-and-forth communication between EEs and hypervisor correspondingly removes and enters the other EE in and the back-and-forth communication, 4) the currently active EE generates a WFI and consequently the EE is de-scheduled and removed from the register, or 5) hypervisor scheduler has assigned more priority to another EE because of a critical interrupt received so the higher priority EE is entered in the register in place of the current EE.

Notice that "000" signifies DOMAIN0 in the EE_Active register or UIEE_Active register. DOMAIN0 is the public domain for the UIEE SMP HLOS which is assumed to exist even if there were no PSEEs. Domain0 is the General Purpose (GP, lower security) device type default value for firewalls and DMA channels setup. The UIEE_Active register can contain an entry for an active UIEE at the same time as the EE_Active register contains an entry for an active PSEE. The UIEE_Active register is the default for transaction tagging when data transfer occurs outside the EE address start/end boundaries defined in the SSM hypervisor EE address range start/end registers. UIEE does not execute on a given CPU at the same time as a PSEE, and UIEE runs as EE if no PSEE is running. Transactions tagged to belong to UIEE (even if not currently running) can occur interleaved or interspersed with EE_Active running according to the time slices of FIG. 23.

In TABLE 29, fast context (CTX) switch is provided in the Monitor code of FIG. 18 for uncomplicated and inexpensive implementation. TABLE 42 depicts further aspects of the process. With fast context switch, a context switching MMU is unnecessary, and a moderate sized address space (e.g., 32M) is used to support Modem, Camera, and Linux operating system. In another example embodiment, full MMU context switching is provided and a very large 4 GB address space is provided to support relatively sophisticated, large-scale sharing of resources.

TABLE 29

MONITOR CODE TRANSITIONS

IF PUBLIC SMI -4420 use entry vector 4455; call to enter Secure space:
 PUSH CTX -Public EE Context to Monitor Code Stack
 SCR☐= 0 - Reset NS bit to establish Secure mode
 SCR☐= 1 - Set IRQ trap in Monitor Mode
 ENABLE I, F, A bits -- Enable MPU CPSR IRQ mask, FIQ mask
 ...
 <Hypervisor Body Software Operations here>
 ...
 POP CTX - Secure EE Context from Monitor Code Stack
 IMB (Flush prefetch buffer for Instruction Memory Barrier)
 Emulated SWI -- Enter Secure SWI using Secure SWI entry vector 4435
ENDIF
IF SECURE SMI --4430 use entry vector to Monitor code; call to enter Public space:
 PUSH CTX - Secure EE Context to Monitor Code Stack
 ENABLE I, F, A bits -- Enable MPU CPSR IRQ mask, FIQ mask
 ...
 <Hypervisor Body Software Operations here>
 ...
 SCR☐= 1 - Set NS bit to establish Public mode
 DISABLE I bit -- Disable IRQ mask
 SCR☐= 0 - Set IRQ trap in Public mode
 POP CTX - Public EE Context from Monitor Code Stack
 IMB (Flush prefetch buffer for Instruction Memory Barrier)
 Emulated SWI --Enter Public SWI using Public SWI entry vector 4425
ENDIF Before exiting the Monitor Mode an IMB (Instruction memory barrier, flush prefetch buffer) is established by executing assembly code to enter and propagate the altered NS Public/Secure bit value in the pipeline of MPU 2610.

In connection with FIG. 18 and context switch CTX, TABLE 13 shows the register banking capability vs. CPSR mode for a register file in a given CPUi. Rows are not listed for conciseness that respectively tabulate register R0 under every mode, R1 under every mode, . . . R7 under every mode in TABLE 13, but are to be understood as present and unreserved in this example. Note that some registers are suffixed in the TABLE 13 entries to indicate that the register is reserved to hold information pertaining to the mode identified in the TABLE 13 column. A register suffix is an abbreviation for the mode in a column.

TABLE 13

REGISTER BANKING VS. CPSR MODE

| User | System | Supervisor | Abort | Undefined | IRQ | FIQ | Monitor |
|---|---|---|---|---|---|---|---|
| R8 | R8 | R8 | R8 | R8 | R8 | R8_fiq | R8 |
| R9 | R9 | R9 | R9 | R9 | R9 | R9_fiq | R9 |
| R10 | R10 | R10 | R10 | R10 | R10 | R10_fiq | R10 |
| R11 | R11 | R11 | R11 | R11 | R11 | R11_fiq | R11 |
| R12 | R12 | R12 | R12 | R12 | R12 | R12_fiq | R12 |
| R13 | R13 | R13_svc | R13_abt | R13_und | R13_irq | R13_fiq | R13_mon |
| R14 | R14 | R14_svc | R14_abt | R14_und | R14_irq | R14_fiq | R14_mon |
| PC | PC | PC | PC | PC | PC | PC | PC |
| CPSR | CPSR | CPSR | CPSR | CPSR | CPSR | CPSR | CPSR |
|  |  | SPSR_svc | SPSR_abt | SPSR_und | SPSR_irq | SPSR_fiq | SPSR_mon |

As shown on TABLE 13, the registers of each CPSR mode are shared between public and secure worlds, therefore software does not leave sensitive information in any banked register file register when leaving the Secure mode.

In connection with FIG. 18, an exception vector base address configuration process is performed as follows. When the security zone SZ core is configured in low vector mode (VINHIT=0 and CP15 control register [13]=0 (V bit)) the vector base addresses are set up as shown in TABLE 14.

TABLE 14

EXCEPTION VECTOR BASE ADDRESS CONFIGURATION

| | | | Instruction properties | | |
|---|---|---|---|---|---|
| | | | | NS bit = 0 | |
| Register | Value | Instruction | NS bit = 1 | CP15SDISABLE = 0 | CP15SDISABLE = 1 |
| Non-Secure Vector Base | Public_BA | MCR p15, 0, Rd, c12, c0, 0 | DEFINED | — | — |
| Secure Vector Base | Secure_BA | MCR p15, 0, Rd, c12, c0, 0 | — | DEFINED | UNDEFINED |
| Monitor Vector Base | Monitor_BA | MCR p15, 0, Rd, c12, c0, 1 | UNDEFINED | DEFINED | UNDEFINED |

The Non-secure vector PUBLIC_BA and secure vector SECURE_BA are accessible with the same instruction but different banked registers are accessed depending on the state of the security NS bit. When Undefined instructions are executed, the applicable CPU enters the Undefined Exception Trap.

Regarding SMI in FIG. 18, SMI and WFI in some embodiments are used together in the system when WFI is expanded on a per-category per-EE basis as in FIG. 12 or FIG. 12A. SMI is used for IPC (inter-processor call) or for calling a new service, for instance. IPC are used when for example one domain is filling a buffer and executes an SMI to signal for another domain to process the buffer if the communication is likely to be faster than a mailbox.

An example of SMI and WFI used together features four domains numbered as follows: DOMAIN1: HLOS, DOMAIN2: Web browser, DOMAIN3: Display driver, DOMAIN4: Modem. At one point of time, the four domains are working all together and assume for this example that the hypervisor scheduler schedules each domain one after the other.

In FIG. 18, when an execution domain XX is scheduled it may, via an SMI instruction execution, request a service to be executed by another domain YY. For some ARM® processors, a SMI type of instruction is designated secure monitor call SMC and has a 16 bit immediate field. A set of predetermined values for use by CPUi software in the SMI immediate field are established and used herein to also respectively designate particular communications requests to the hypervisor from one domain XX to get service or information from another domain YY. Thus, the particular value in the 16-bit immediate field is chosen from the set of predetermined values. The hypervisor is configured and coded so that it interprets the particular value in the 16 bit immediate field correspondingly.

The SMI immediate value is present in the SMI opcode in CPUi and in some embodiments is also delivered directly to, or suitably decoded to, the SSM register 4220B of FIG. 12B. A system such as in FIG. 22B suitably has a set of counters 5085.i and signals for any active EE identified by hypervisor when configuring the set of counters 5085.i. In some embodiments, the SMI immediate information has the requesting domain EE signified by the processor CPUi executing that EE currently. In some security embodiments, the SSM includes a circuit that compares that SMI immediate information signifying EE with the register 4215A or 4215B entry EE_Active as indicated by hypervisor and issues a security violation signal if that information and the entry do not match.

Suppose that DOMAIN2 web browser is programmed to execute a SMI with a predetermined immediate such as SMI #012345, and that SMI number is configured in advance for reference by the hypervisor. The hypervisor compares the SMI immediate with its configured SMI numbers and thereby interprets the newly asserted SMI as a request from DOMAIN2 for service from DOMAIN3. Hypervisor responds and calls the Display service from DOMAIN3. The Display makes a determination of what to do and either schedules this action for later execution or direct execution using IPC inter-processor communication with web browser DOMAIN2. When Display DOMAIN3 executes the action, Display DOMAIN3 can request more data if needed by using an IPC return by executing, for example, SMI #132654, i.e., a SMI with a different numerical code configured to signify a request originated in DOMAIN3 directed towards DOMAIN2.

On the other hand, when Display DOMAIN3 is scheduled in an ordinary succession by the hypervisor scheduler, the Display may have nothing to do, meaning no action is needed by Display software. Display software will generate a WFI FIQ to the hypervisor. Without more, the hypervisor has no way of determining which domain is originating the WFI FIQ. (For instance, neither the ARM® wait for interrupt WFI and wait for event WFE are believed to have an immediate field, nor suggestion of providing one, nor establishing domain related codes for it.)

By use of the per CPU per EE (per domain) expansion such as in FIG. 12, 12A or FIG. 12B or otherwise as taught herein, the hypervisor can now de-schedule the Display DOMAIN3 in this example because DOMAIN3 is precisely the domain that has generated the current WFI FIQ. Additionally, the per-CPU per-EE (per domain) expansion is securely situated in the SSM hardware of the system as described herein. The hypervisor thereafter schedules by way of replacement one or more other domains, or executes one or more pending maintenance functions as discussed in connection with FIG. 11.

Expanding both SMI and WFI on a per-EE basis conveniently supports a substantial degree of desirable system communications complexity on a per-EE basis of domain interconnection. Moreover, this improvement is used in system embodiments to schedule processor bandwidth more efficiently and save power/energy when a processor can be transitioned to a lower voltage lower frequency OPP to reduce dynamic power dissipation or can even be substantially powered down to save static leakage power as well.

Regarding the degree of communications complexity, consider an example system with a secure domain and eight public domains 0-7 for a total of nine domains. Each domain among the nine domains can use the SMI command to interconnect with eight other domains. Public DOMAIN0 can assert SMI commands of the following form to the secure domain:

SMI #S_D0=service request from domain0 to secure domain S. In this example, a single secure domain S is assumed, which can be a part of the whole secure service accessible. Let other secure domains be designated S1, S2, etc. if plural secure domains are used. The EE index XX can identify either a secure domain or any public domain depending on the value of XX where that notation is used.

"#S_D0" represents a particular coded value in a range of predetermined code numbers. "#D0_S" represents another particular coded value in the range of predetermined code numbers. SMI #D0_S (IPC) represents a service return (IPC) from a SMI #S_D0 request.

Public DOMAIN0 can assert SMI commands of the following form to another public domain, DOMAIN2, representing any of seven instances (8 public EE, less one), where some forms of representative SMI notation herein are listed here and discussed a few paragraphs further down hereinbelow.
SMI #D2_D0 SMI #D0_D2
SMI #D0_D2 (IPC) SMI #D2_D0 (IPC)

For Interprocessor Communication (IPC), some embodiments conveniently use the same number or immediate value for the SMI immediate SMI #S_D0 (IPC) as is used as the number for the SMI immediate in SMI #S_D0 without the legend "(IPC)" in the notation, although different numbers are feasible too. For example, system management interrupt SMI represented by the notation SMI#S_D0 indicates that execution domain D0 performs a request to secure domain S (#code) to have a service performed by secure domain S. The legend (IPC) in the SMI notation SMI#S_D0 (IPC) in return represents that the secure domain S has performed the service for domain D0 and the secure domain S in effect says "your data are ready" by executing and generating in secure domain S the SMI #S_D0 (IPC) code. The hypervisor layer is suitably coded to recognize and respond to that SMI #S_D0 (IPC) code with same immediate value now emanating from secure domain S as an IPC request, and the hypervisor calls back execution domain D0 and restarts execution domain D0. Conversely, if the secure domain S generates SMI #D0_S to request service from execution domain D0, the expression SMI #D0_S (IPC) signifies a SMI asserted by the servicing domain D0 so that a service return (IPC) is performed after service is executed by the servicing domain D0 in response to the SMI #S_D0 request.

Analogously, any of the execution domains XX can assert SMI commands to any of the other domains YY, as represented by the following pseudocode:
SMI #YY_XX SMI #XX_YY
SMI #XX_YY (IPC) SMI #YY_XX (IPC)

This means that where there are N number of domains, e.g. 9, including a secure EE, then the desirable complexity of communication between domains that can be supported is remarkably high and given by N(N-1), e.g., 9×8=72.

In one embodiment, the SMI immediate is stored in any MPU register such as any register R0-R12. When a context switch occurs, the SMI immediate value is pushed onto the stack or stored as part of a domain context. The SMI immediate code is coded to include the requesting domain as well as the requested service as shown also in FIG. 12B register field SMI IMM in the SSM. In other embodiments the requesting domain information accompanies the SMI immediate separately and is kept, recorded, or recreated at hypervisor level or for use at hypervisor level as in FIGS. 12 and 12A.

In FIG. 12B, coding the SMI immediate with both the requesting domain and requested service can be alternatively used in place of, or instead of, expanding the WFI on a per-EE basis, with suitable changes in the software SW. For example, suitable changes in the software include coding the SMI immediate with both the requesting domain and requested service and causing the processor to wait in a restartable manner whether or not a WFI is also used. The system architecture is tested and verified to make sure that the hypervisor is responsive to the SMI and that the processor that was executing the requesting domain is arranged so that the hypervisor can restart that processor so that the platform does not freeze.

SMI is suitably coupled to the hypervisor as in FIG. 18 wherein the SMI is trapped in Monitor mode exception vectors (replace SWI (software interrupt) for this mode)). Thus coupling the SMI to the hypervisor through the GIC is not used in connection with the approach of FIG. 18. Some alternative embodiments can couple the SMI, or an expanded SMI expanded per-CPU per-EE, to the hypervisor through the GIC instead using SMI expansion of FIG. 12B. In FIG. 12B, the SMI immediate field is also coupled to the hypervisor by storing it in a per-CPU per-EE register XX_SMI_IMM for CPUi in FIG. 12B SSM register 4220B, which is accessible to the hypervisor. The SMI immediate field is used to route the domain and service (IPC or not).

Some embodiments are prepared with pre-existing operating systems, applications and drivers in mind. The use of circuit and process embodiments as in FIGS. 12 and 12A is likely to obviate such revision even if it is not inconvenient to revise one or more of the pre-existing operating systems, applications or drivers. Also, the circuit and process embodiments as in FIG. 12B involving SMI immediates are attractive when such revision is feasible or where new software for the system is being prepared.

Notice that the category or EE xx indicated by VP1_Active or an identifying value in register EE_Active[:] in FIGS. 12, 12A, 12B is updated by the hypervisor as active contexts change. Consider various relative timing of operations in this regard. Suppose a CPUi issues a WFI and/or SMI from one EE that requests service from another domain and CPUi is interrupted to begin another EE on CPUi while a servicing domain executed by CPUj is active. The hypervisor can, if its software indicates a benefit, update the EE_Active entered in the SSM registers for that CPUi so that CPUi is doing some processing of said another EE when the previous EE that was active on CPUi is waiting for the response to service by the servicing domain on CPUj.

Before that update of EE_Active, the WFI (and/or SMI) from the requesting EE xx is expanded using the then-current EE_Active information from register 4215, 4215A, or 4215B. The expansion makes an entry xx_WFI_Active in registers 4220 (FIG. 12) or 4220A (FIG. 12A), or an entry xx_SMI_Active in registers 4220B (FIG. 12B). In this way, the subsequent update of the EE_Active entry for another EE on CPUi usefully provides further information, while the entry xx_WFI_Active (or the entry xx_SMI Active) preserves the information xx identifying the requesting EE xx. Thus the results xx of the expansion are preserved in the register 4220, 4220A, or 4220B of FIGS. 12, 12A, 12B.

Figure 23A:
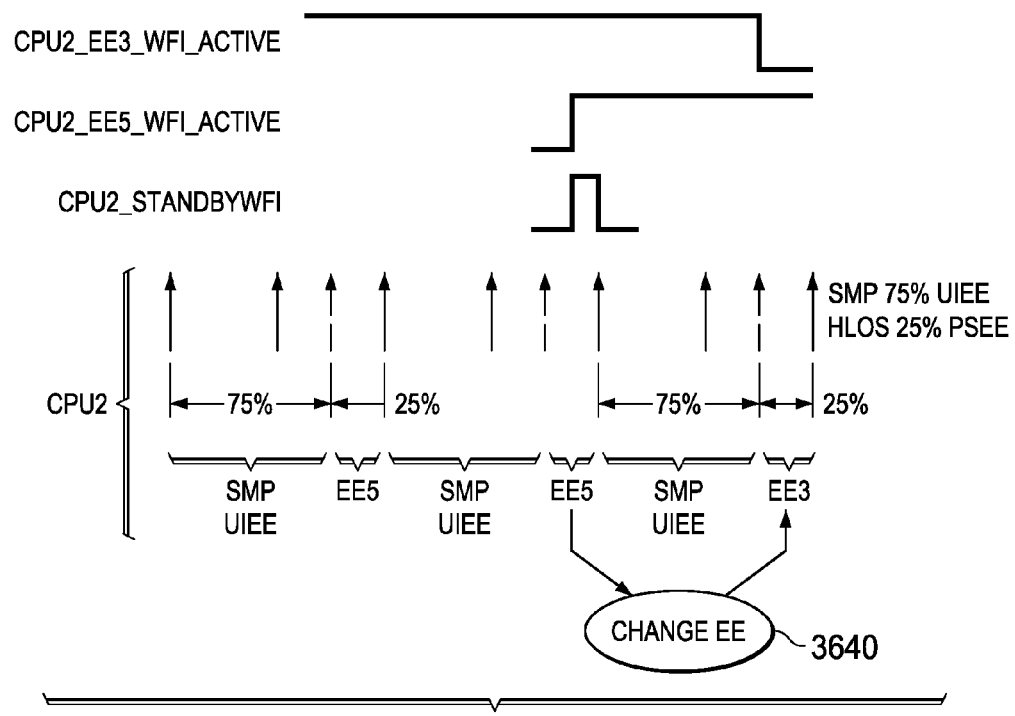
FIG. 23A is a timing diagram of an inventive process of digital signal transitions of an inventive system wherein an execution environment EE running on a processor is suspended and is replaced by another execution environment.

If there are successive WFIs from contexts on the same CPUi that successively go inactive any time interval of FIGS. 23, 23A, then plural WFI_Active bits are successively set in register 4220 xx_WFI_active corresponding to the plural categories or EEs xx that are active and corresponding successive SSM_WFI_FIQ signals are issued. The hypervisor is suitably coded to maintain registers 4215/A/B and 4220/A/B as its EE operations proceed. These registers are suitably serviced such as to reset the bits when a given time interval of FIGS. 23, 23A is completed in the loop, or other scheduling timeline, of FIG. 29D or to otherwise maintain the bits when appropriate.

Some other embodiments establish a WFI instruction format in each CPUi so that WFI is accompanied by a WFI immediate value. This immediate value is loaded with the same immediate value as a SMI in the code near the WFI for instance. If there is no SMI, then the WFI immediate is either zero or some default value, or identifies the EE xx that is becoming Idle. The WFI and immediate is in some of these embodiments even used instead of a SMI and SMI immediate. The WFI immediate is suitably used for security checks and for CPUi to identify the CPUi EE xx and servicing domain from which service is requested.

FIGS. 19-26F show some hardware security embodiments for symmetric multiprocessing (SMP) cores. One of the cores is called the SMP control core and designated CPU0. A hardware (HW) supported secure hypervisor runs at least on the SMP control core and is suitably present in Monitor code on all CPUi. Linux SMP HLOS is symmetric across all cores and is chosen as the Foreground SMP HLOS for the UIEE HLOS1 in some embodiments. Another SMP HLOS1' (compare FIGS. 4A, 19 and 20) is provided as a Background SMP HLOS. A secure environment SE software runs on the system and hardware protection for security is provided by use of SSM 2460 described in detail in connection with FIGS. 9A/9B and in connection with SSM 5030 of FIG. 22B. At least one core CPU0 acts as a control core and is provided with security zone circuitry and Security Environment SE so that the security zone applies to all cores in the multi-core embodiment. The HW hypervisor mechanism provides standalone CPU virtualization and operations in order to run a single processor operating system OS such as WinCE and Nucleus on the same platform.

The hypervisor code runs in Monitor Mode, and virtual worlds, categories or EEs are switched and activated from Monitor Mode. The hypervisor-mediated categories of FIG. 6, and EEs of FIG. 6A, are scheduled by timers in synchronous time sharing fashion in FIGS. 19-26F.

Figure 19:
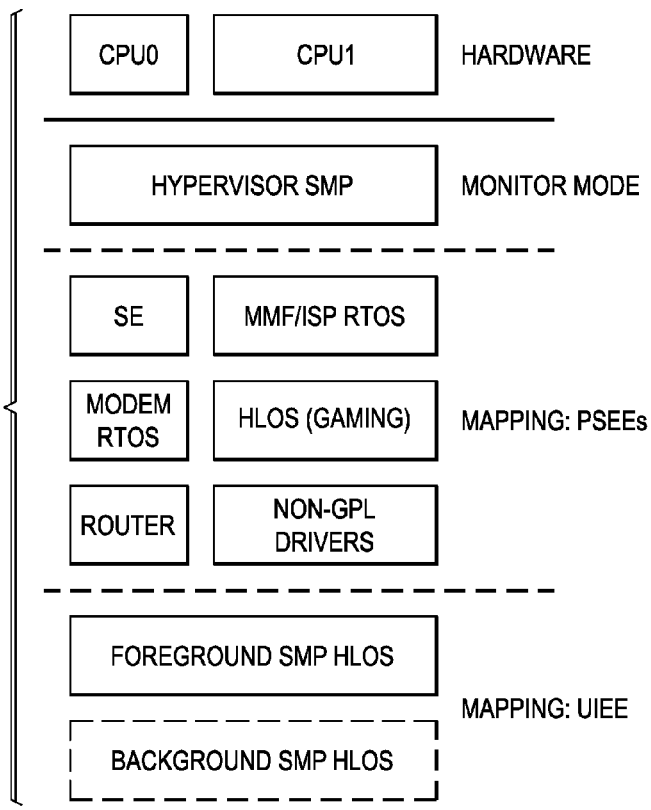
FIG. 19 is a block diagram of inventive dual-CPU hardware and software for dual core operation.

In some other embodiments, a pseudo-symmetric architecture has virtual processors wherein any of the virtual processors can do SMP (symmetric multi-processing) while using a control core CPU0 plus a further number n−1 (one less than n) CPU cores, also called processor cores herein. FIG. 19 shows another CPU1 to work with CPU0. CPU0 has the Secure Environment SE (EE with NS=0), as well as a Modem RTOS PSEE and a Router PSEE. CPU1 in FIG. 19 has a PSEE for a MMF/ISP RTOS (multimedia framework, Internet), a PSEE for a Gaming HLOS, and a PSEE for Non-GPL Drivers.

If a CPU cluster has four (4) cores or processors as in FIG. 20, then the pseudo-symmetric virtual core mechanism uses an SMP cluster of four CPUs as processor cores with some operations conducted by the control core CPU0. In FIG. 20, CPU0 runs the secure EE designated SE (NS=0) and also runs the Router PSEE (NS=1). CPU1 is allocated the MMF/ISP RTOS PSEE (NS=1) and Non-GPL Drivers PSEE (NS=1). CPU2 in FIG. 20 runs the Modem RTOS PSEE, and CPU3 runs the HLOS for gaming.

Some embodiments also are arranged to run CPU0 as a uniprocessor without any other cores, and CPU0 runs all the software in FIG. 4A and all software shown in FIGS. 19 and 20.

The hardware hypervisor in Monitor mode provides real time interrupt firing capability for EEs and categories to ensure RTOS capability. Any OS running in an EE or category is able to call Secure services even if the secure environment is on CPU0 and the EE or category is running on another CPU. The security mechanism, SE, SSM and hypervisor mechanism are invisible to the SMP HLOS. A minor latency introduction for FIQ (Fast interrupt request) has negligible effect on the SMP HLOS performance.

The Security zone mechanism (SZ) traps any FIQ in Monitor Mode. The Monitor code is written to identify to which FIG. 4 category (Public Non-virtual, Public Virtual, Secure Non-virtual or Secure Virtual) or to which FIG. 4A EE the FIQ belongs. To do this, the Monitor code reads the Interrupt Handler 2720 register of which category or EE an interrupt line belongs to in FIG. 12 or 12A, or reads the SSM 2460 (5030) register XX_WFI_ACTIVE. Using the identified mode information, the Monitor code switches operations to a specific processor CPUi and category or EE xx.

In some embodiments, the security zone mechanism is implemented on all CPUs of the cluster. The Secure Kernel and its secure services run specifically on CPU0 or any CPUi core hot plugged to run the Secure Kernel in place of CPU0.

In FIGS. 21A/21B/21C, WFI expansion and conversion are integrated with a multi-core CPU system. In FIGS. 21A/21B, the circuitry of FIG. 12 or 12A is replicated four times for four CPU cores in a multi-core WFI OS scheduling optimization embodiment. SSM Registers in FIG. 21C now has registers 4215.0, .1, .2, .3 for holding respective information pertaining to each CPU core CPU0, CPU1, CPU2, CPU3. Per-CPU CPUi_SSM_WFI_SCHEDULING registers 4220.0, .1, .2, .3 hold respective information pertaining to the enablement and operation of the WFI-related hardware analogous to the hardware in FIG. 12 or 12A for supporting each CPU core CPU0, CPU1, CPU2, CPU3.

This WFI-related hardware includes four portions 4230.0, .1, .2, .3 in FIG. 21A/21B which are each a replica of SSM WFI Scheduling block 4230, and which each are coupled to a Global Interrupt Controller GIC by per-world (xx) per-CPU (i) FIQ output lines CPUi_xx_WFI_FIQ. Each of these four portions 4230.0, .1, .2, .3 is respectively fed by and responsive to corresponding lines CPUi_STANDBY-WFI, and Public/Secure CPUi_CP15NS from its processor core CPUi, as well as a Virtual/Non-Virtual VP1_Active signal from the corresponding register 4215.0, .1, .2, .3.

Further in FIGS. 21A/21B/21C, the WFI-related hardware has internal blocks present and interconnected as shown in FIG. 12 or 12A and replicated four times for FIGS. 21A/21B/21C. These internal blocks and their interconnections are not explicitly shown because each replica is shown in FIG. 12 or 12A. The designations of these implicit blocks for purposes of FIGS. 21A/21B/21C are as follows. SSM WFI Scheduling blocks 4230.0, .1, .2, .3 include their corresponding WFI Active Expansion blocks 4234.0, .1, .2, .3 and FIQ Generator blocks 4238.0, .1, .2, .3. SSM Registers WFI blocks 4250.0, .1, .2, .3 include their WFI FIQ Acknowledgements blocks 4254.0, .1, .2, .3 and WFI Active Bits blocks 4258.0, .1, .2, .3.

Figure 21C:
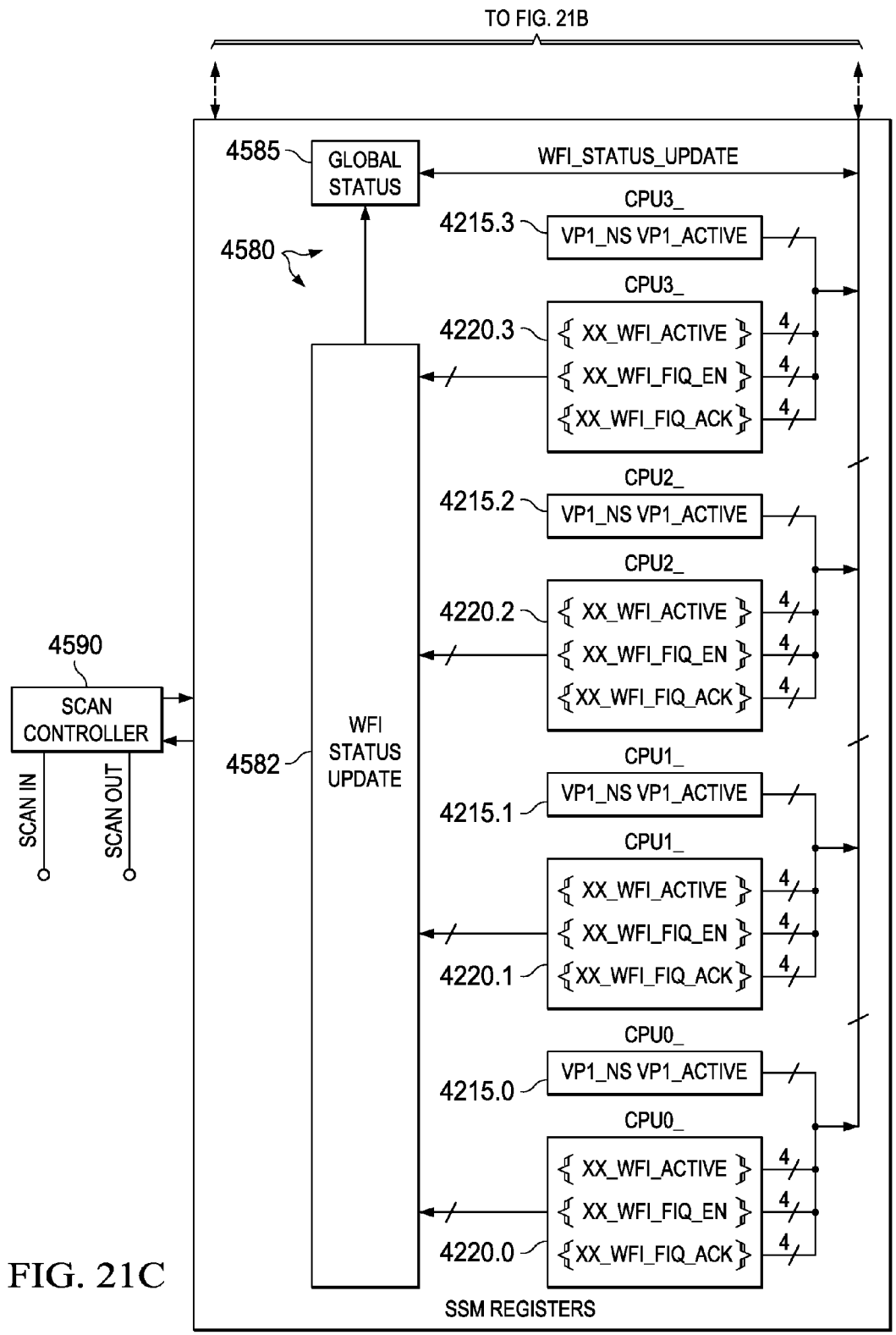

In FIG. 21C, further hardware circuits are provided to handle multi-core WFI OS scheduling in addition to and acting in concert with the replicated circuitry described just above. WFI Status Update circuitry 4580 has a WFI Status Update block 4582 fed by per-world per-CPU lines from each of the sixteen bits CPUi_xx_WFI_Active in registers 4220.0, .1, .2, .3. Block 4582 of WFI Status Update circuitry 4580 generates an active global output WFI_STATUS_UPDATE when any of those sixteen per-world per-CPU bits CPUi_xx_ WFI_Active changes state compared to its state in the previous clock cycle. In other words, if one of the CPUi in any world xx has generated or cleared a WFI Active of a register 4220.i, then the global output WFI_STATUS_UPDATE is made active by WFI Status Update circuitry 4580. This global output is stored as a bit designated WFI_STATUS_UPDATE in an SSM register 4585 called SSM_GLOBAL_STATUS, which has Secure Privilege access.

A scan controller 4590 serially scans in and scans out bits configuring and reporting operations from the per-CPUi, per-category registers 4215.i and 4220.i (or 4215A.i and 4220A.i of FIG. 12A) for WFI-based interrupt expansion as well as scanning in/out global status 4585. Scan controller 4590 serially provides a multi-bit scan signal to an emulator at a scan output and receives a multi-bit scan signal from the emulator at a scan input. The configurable register circuits 4215.i and 4220.i enable and record signal states and are coupled to a CPU peripheral bus for configuration. The configurable register circuits 4215.i and 4220.i (or 4215A.i and 4220A.i of FIG. 12A) are not only coupled to the WFI conversion circuits 4230.i, but also the configurable register circuits are coupled to the scan output and to the scan input of the scan controller 4590 for debug.

In FIGS. 21A/21B/21C, a Global Interrupt Controller GIC 5020 is configurable in Secure Privilege mode to maintain a record of the interrupt mapping and to route per-world per-CPU secure FIQ interrupt(s) from all the CPUi cores to the interrupt interface INTH for the particular CPU which is responsible for running the hypervisor. The CPU that is responsible for running the hypervisor in some embodiments is statically predetermined to be CPU0. In some other embodiments, the CPU that runs the hypervisor is suitably dynamically determined according to the power saving strategy and hot-plugged. In that case, the GIC 5020 is reconfigured in response to SSM register bits configured by the hypervisor running on a current CPU core designated for the hypervisor. The SMP hypervisor on the current core runs the hot-plug operations to re-configure the SSM register bits to represent the new hot-plug configuration whereupon the hypervisor transfers control to the CPU core dynamically determined to run the SMP hypervisor while the old SMP hypervisor changes to supervised processor mode to route the per-world per-CPU secure FIQ interrupts from the CPU cores to the particular CPU which is newly dynamically determined to run the hypervisor.

The CPU secure FIQ interrupts are routed from GIC 5020 on lines respectively designated CPU0_FIQ, CPU1_FIQ, CPU2_FIQ, CPU3_FIQ to GIC Bus interfaces of the cores CPU0, CPU1, CPU2, CPU3. Notice that because of the configurable GIC 5020, the secure FIQ signals are routed in a manner in FIGS. 21A/21B that goes beyond that shown for a single CPU system in FIG. 12.

In FIGS. 21A/21B, notice that interrupt-related output lines CPUi_xx_WFI_FIQ are coupled to provide at least some of the interrupts for routing as secure fast interrupt requests SFIQ by the global interrupt handler 5020, and the plural interrupt output lines are at least four times as a numerous as the wait for interrupt outputs CPUi_STANDBYWFI when the approach of FIG. 12 is used. The WFI conversion circuitry 4230.i selectively activates a selected one of the plural interrupt output lines CPUi_xx_WFI_FIQ depending on an active or inactive status of the security output CPUi_CP15NS from a given one of the processor cores CPUi and an active or inactive category or execution environment represented by the registers 4215.i.

In another embodiment, the circuitry of FIG. 12A is substituted into the system of FIGS. 21A/21B/21C. A single line CPU0_SSM_WFIFIQ is substituted for the four lines CPU0_xx_WFI_FIQ and similarly for each CPUi. In all, four lines CPU0_SSM_WFIFIQ, CPU1_SSM_WFIFIQ, CPU2_SSM_WFIFIQ, CPU3_SSM_WFIFIQ are substituted for the 16 lines CPUi_xx_WFI_FIQ in FIGS. 21A/21B. Similarly the SSM registers of FIG. 12A relating to execution environments and WFI expansion are replicated for each CPUi. In FIGS. 21A/21B, the SSM circuitry applying FIG. 12A. therein is suitably designated 4230A.0, 4230A.1, 4230A.2, 4230A.3.

In FIGS. 22A and 22B, a four-CPU hardware-supported hypervisor embodiment 5000 of FIGS. 21A/21B/21C is shown in more detail. FIGS. 22A/22B can be compared with and supplemented by the embodiments shown in FIGS. 26A/26B and FIGS. 6/6A, 9A/9B, 10, 11, 12/A/B, 13, 21A/B/C and other description elsewhere herein. EEs, Hypervisor and Secure Kernel run in the system coherently. MMUi (Memory Management Units) for each of the CPUi (CPU0-3), L1$i (Level 1 Cache) for each of the CPUi (CPU0-3), and a shared Snoop Control Unit SCU 5010 are provided for memory management and cache coherency to the extent desired. Public Virtual OS or RTOS (WinCE, Nucleus, etc.) runs non-coherently and as a not-shared device with an MMU.

In FIG. 22A, a Generalized Interrupt Handler GIC 5020 handles interrupts that are selectively masked and routed to respective GIC Bus 0-3 ports corresponding to each of the CPU cores CPU0-3 and operates in combination with structures as described in connection with FIGS. 10, 12, 12/A/B, 13 and 21A/B/C and elsewhere herein.

Further in FIG. 22B, SSM hardware hypervisor-support circuitry 5030 includes registers 5035 and logic for a Virtual Checker 5045, a Physical Checker 5055, and an EE Creator 5075. See FIGS. 21/A/B/C and FIGS. 12/A/B for SSM circuitry that is suitably used for each CPUi and replicated per-CPU as appropriate for the system of FIGS. 22A/22B. Registers 5035 include EE-related registers for each EE xx to be used. These are respectively designated EE_xx_Debug_Dis for debug disable, EE_xx_NS for EE-specific secure state or non-secure state, and EE_Active for active or inactive status. Registers are designated PHYSICAL_EE_xx_START, PHYSICAL_EE_xx_END, VIRTUAL_EE_xx_START, VIRTUAL_EE_xx_END for Start/End addresses to define physical address space(s) and virtual address spaces assigned to each of the execution environments EE indexed xx. A further register SSM_PHYSICAL_EE_DATA has a bit position xx for each EE xx to specify whether the physical address space for EE xx is Data-only or not. Another register SSM_VIRTUAL_EE has a bit position xx for each EE xx to specify whether the virtual address space for EE xx is Data-only or not. All the foregoing registers are used to define, activate and check operations of each EE and are read/write (R/W) accessible only in Monitor mode in one example.

In FIG. 22B, Virtual Checker 5045 checks each CPUi Trace Bus SECMON/ETM.i 2635 (FIG. 9A) and FIG. 22A to check that the currently-active EEs execute properly in their own virtual address spaces. Virtual Checker 5045 includes a CPSR_Mode switch checker and a Per-CPU Preemptive Masking circuit for each CPU0-3, see also FIG. 13. Virtual Checker 5045 has inputs from CPU0-3 (index i=0, 1, 2, 3) for CPUi_Trace_Virtual_Address, CPUi_CPSR_Mode, and CPU_CPSR_<> fields or bits CPSR_I for masking interrupts IRQ, CPSR_F for masking fast interrupts FIQ, and for External Abort EA. Virtual Checker 5045 has four outputs coupled to GIC 5020 of FIG. 22A. The outputs signify fast interrupt mask enables CPUi_FIQMASK and pertain respectively to the several CPU i.

Also in FIG. 22B, an Error Generator 5050 receives an Abort request SRESP from the Physical Checker 5055 in the same clock cycle in which a physical check violation occurs. Physical Checker 5055 checks each CPUi functional bus to make sure that the execution environments EEs execute properly in their own physical address space and that other running core CPUj are not injecting data or code into address spaces reserved for other EEs that are running or not. Error Generator 5050 is coupled to a Read channel and a Write channel of one or more Functional Buses emanating from SCU 5010 of FIG. 22B.

In the embodiment of FIG. 22B, the Read channel and Write channel are coupled via Error Generator 5050 to a level-two cache L2$ 5060. Physical checker 5055 checks the address and other signals on the Read channel and Write channel. L2$ 5060 is further coupled to a bus interface MPU2BUS 5065. A memory such as a ROM and/or RAM is accessible through MPU 2BUS block 5065. Depending on embodiment, SSM CPUi registers 5035 are accessible through an OCP splitter in MPU2BUS 5065 or via a peripheral bus and another MPU2BUS interface.

EE Creator 5075 protects and generates respective EE-specific MreqDomainX qualifiers for each EE indexed X. For example, if nine (9) EEs are identified (HLOS, RTOS), then corresponding MreqDomainX qualifiers or encoded values are provided to interface MPU2BUS 5065 on the same clock cycle in which the debug status arises. For EEs that have debug activated in registers 5035, the EE Creator 5075 generates an MreqDebug qualifier and conveys it to interface MPU2BUS 5065 on the same clock cycle in which the debug status arises. Some embodiments have encoded MreqDomainX [2:0] lines so that n lines, (e.g. n=3) carry signals that collectively signify any of $2^n$ (e.g. 8) EEs.

In FIG. 22B, the MreqDomainX qualifiers together with qualifiers MreqType, MreqPrivilege, MreqDebug, MreqSecure are relayed or generated by interface MPU2BUS 5065 and sent onto interconnects 5070 for each EE along with bus addresses and data and other bus control lines via an asynchronous interface ASYNC. Interconnects 5070 are coupled to various Firewalls 5080A, B . . . Z and are further coupled to respective configuration registers for Timers CPUiTimer 5085.0, .1, .n respective to the various CPUs indexed i from CPU0 to CPUn. The timers 5085.i are responsive to a common clock or counter 5088. The timers 5085.i are local timers for each CPU and have counters, comparators and configurable registers sufficient to handle FIG. 23 timing of each CPUi and timer interrupts IRQ to an RTOS Scheduler as in FIG. 29A. Additional timers 5085.i for secure environment, hypervisor and different HLOSes are also provided and discussed elsewhere herein.

A Security Violation Handler 5090 (compare 2760 of FIG. 9B) is responsive to any security violation(s) detected in Virtual Checker 5045, Physical Checker 5055, and EE Creator 5075. The Security Violation Handler 5090 provides appropriate security violation response output(s) such as aborts and neutralization and delivering reset control to a power, resets and control manager PRCM 5095. In this way SSM HW Hypervisor structures the multi-CPU system to that Monitor Mode of CPU0 operates as a hypervisor that has intelligent control on a per-CPU per-EE basis for scheduling and power management as in FIGS. 11 and 16.

The SSM 5030 implements all the registers and logic for providing exclusive debug or cooperating debug between CPUs and OS EEs (e.g., WinCE, Nucleus) for various EEs. The SSM 5030 differentiates for each interrupt the category (Public Non-virtual, Public Virtual, Secure Non-virtual or Secure Virtual) or EE to which the interrupt belongs.

In the GIC (Generalized Interrupt Handler) 5020 of FIG. 22A, IRQ are dedicated to SMP HLOS (e.g., Linux) in an example. Secure Fast Interrupt Requests SFIQ are dedicated to Secure Environment and suspended EEs as discussed in connection with FIGS. 12, 12A, 13, 21/A/B/C and 29A-E and 30-32, wherein WFI expansion and interrupt transformation are performed. The GIC 5020 differentiates the Public or Secure nature of each interrupt via a dedicated register having retention flip flops identifying the Public or Secure assignment of the corresponding interrupt line. Each interrupt line that is identified or configured as Secure is also made fast interrupt FIQ. Configuration of the register is accessible only by Secure Privilege data accesses such as at Boot time.

In FIGS. 22B and 23, synchronous timer scheduling makes all CPU timers synchronous relative to each other in order to facilitate scheduling and to efficiently schedule the different categories or EEs. Also, the timers are made configurable through interfaces 5080A-Z that are responsive to qualifier MreqDomainx, where index x on the qualifier name identifies which EE x is involved, and the qualifier signifies that EE x is attempting an access if the qualifier signal is active. This protects the category or EE from tampering of the timers.

The local timers 5085.i output two interrupts per CPUi, a first interrupt for the SMP HLOS and a second interrupt for the EE running on the CPUi or secure mode. On a dual core or multi-core embodiment where multiple virtual worlds are evolving on a single CPUi, software is made to have only the Secure mode control the local timers 5085.i (for allocating time/bandwidth to the EEs). In this way, the secure hypervisor dispatches or allocates CPU bandwidth correctly between EEs.

The local timers 5085.i are banked so that SMP HLOS programs its own setting. Then each EE xx or secure mode programs its respective setting into a timer bank register. The timer bank registers are each protected by a respective firewall 5080A, 5080B, etc. A comparator in each local timer 5085.i then detects when the timer counter has reached the configured or programmed setting, whereupon a local timer IRQ is generated to GIC 5020 as shown in FIGS. 26A/26B.

Figure 26A:
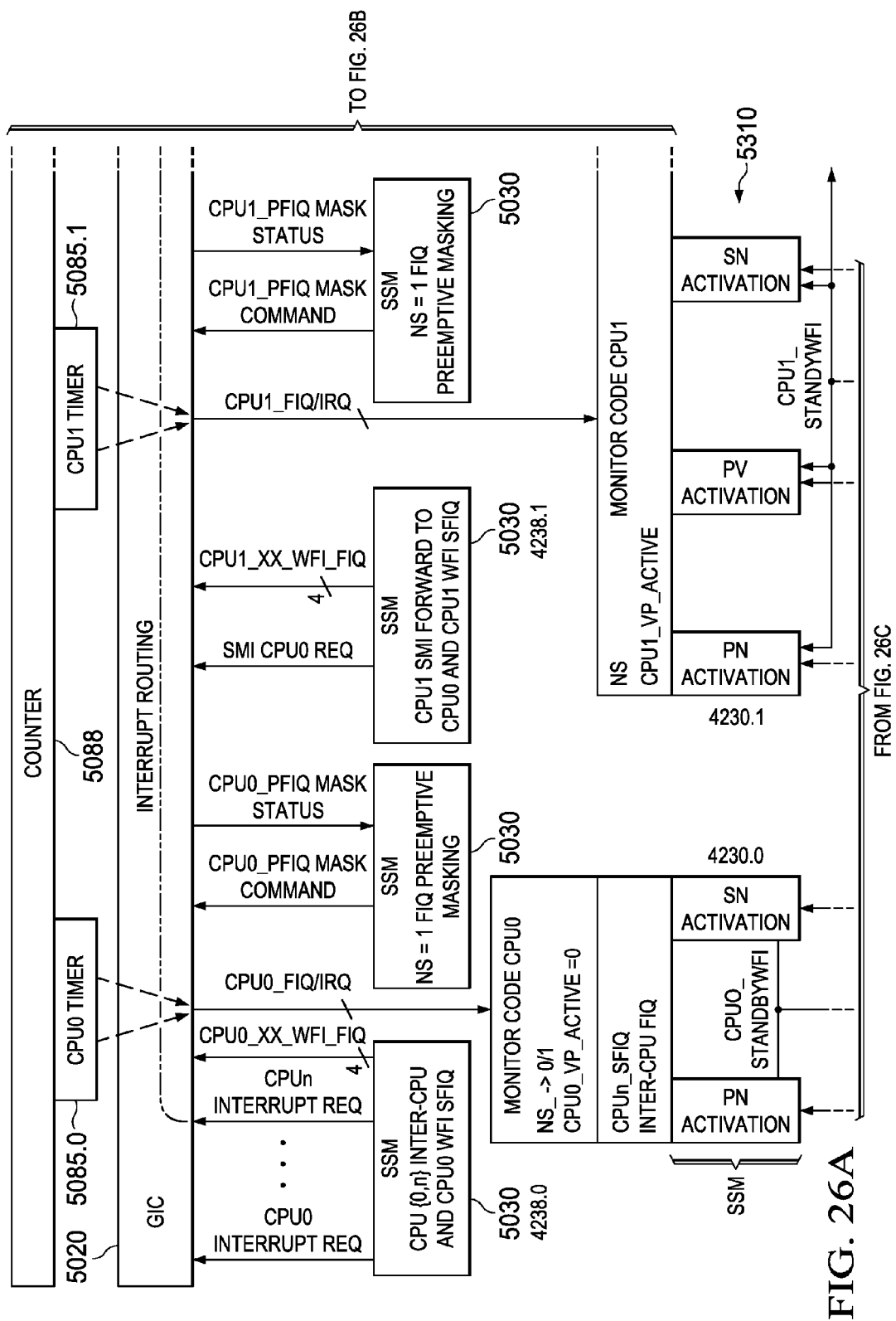
FIGS. 26A-26F are six portions of a composite block diagram of inventive four-CPU hardware and associated inventive hardware-support for an inventive hypervisor process for a system.

Describing an example of timers 5085.i for the system in somewhat more detail for FIGS. 22B, 23 and 26A/26B, a first timer is dedicated to the secure hypervisor timer and not accessible by the HLOSes. A second timer is dedicated to the secure kernel SE and not accessible by the HLOSes. A plurality of additional timers are provided as a pool of timers that can be allocated and accessed by a respective HLOS in public mode so that any HLOS has at least one timer to which it has access. Clocking is suitably driven from one or more instances of 32 KHz or other suitable time base. Some useful timer features are free running 32-bit up counter, compare and capture modes, auto-reload mode, start-stop mode, programmable divider clock source, dedicated input trigger for capture mode and dedicated output trigger, and on-the-fly read/write while counting.

In FIG. 23, the outputs of all timers 5085.i of FIG. 22B are made synchronous (aligned) relative to each other. The second interrupt for and programmed by the EEs or secure mode SE is in time coordination with the first interrupt for the SMP HLOS. The second interrupt is synchronized to occur between two SMP HLOS timer ticks. Plural full periods are also suitably left to SMP HLOS. For instance, FIG. 23 illustrates one tick for the second interrupt occurring every several ticks for the first-interrupt, and with that second interrupt occurring in between two SMP HLOS ticks that each produce an instance of the first interrupt.

In FIG. 23, the timers for FIGS. 22B and 26A/26B are shown in an example with Master Counter 5088 ticks being twice the rate of SMP HLOS timer ticks. CPU0 receives SMP HLOS ticks 87.5% and Secure Kernel SE 12.5% in the illustration of FIG. 23 so that the Secure Kernel has 12.5% of the CPU0 bandwidth and the SMP HLOS has 87.5% of the CPU0 bandwidth. Horizontal arrows for CPU0 in FIG. 23 show a 7/8=87.5% time interval and a 1/8=12.5% time interval. CPU1 receives SMP HLOS ticks 50% (½) and RTOS (e.g., modem) ticks 50% (½). CPU2 receives SMP HLOS ticks 75% (¾) and Public HLOS ticks 25% (¼). CPU3 receives SMP HLOS ticks 100% in this example. Different but analogous time allocations are shown for the other CPUs. The time allocations are configured in the local timer registers and FIG. 23 is illustrative of the process.

In the timing diagram of FIG. 23 the time interval(s) used by the hypervisor in Monitor mode each occupy a very short period of time indistinguishable from the width of each up-arrow (tick) itself that otherwise signifies the interrupt to hypervisor. The hypervisor runs to some extent on each processor CPUi as indicated by the up-arrows in the row for each processor.

In one system example, each HLOS or EE has a 1 ms (one millisecond) timer and a master counter helps synchronize all ticks (see FIG. 23 percentages %). Also, some HLOS have SW functions such that they auto-synchronize to keep a 1 millisecond window, in case their tick interrupt fired with latencies (being late), and this facilitates the scheduling setup.

The hypervisor can be scheduled in some embodiments to have certain time slots reserved for hypervisor to execute its own service tasks, in addition to the FIQ-responsive hypervisor processing which happens on demand. Other embodiments keep things simple by programming the hypervisor to operate minimally as a bridge between EEs and not implement any services in the hypervisor, which are instead otherwise allocated in the system. Some implementations have an intermediate strategy wherein L2$ control service is in Monitor mode, but hypervisor otherwise acts minimally as a bridge in Monitor mode.

In FIG. 23 the appropriate arrows (ticks) from local timers 5085i are selected to establish the percentages and are suitably gated onto FIQ interrupt lines to represent fast interrupt requests FIQ in the rows for CPU0-3 in FIG. 23 below the top row for Master Counter 5088 of FIGS. 22B and 26A/B. Some multi-processor system embodiments work as follows. FIQ are trapped in Monitor Mode by interrupt hardware and vectoring in CPUi and/or control CPU0. Each FIQ is tagged to belong to a category or EE such as SMP HLOS, SE, RTOS, Public HLOS in or by the hardware of GIC 5020 and SSM registers 2620. Each FIQ occurs on the particular CPUi that governs execution of, or is assigned to execute, the category or EE to which the FIQ belongs. When the FIQ is initiated (fires), that FIQ is trapped in the Monitor Mode of this particular CPUi. The Monitor Mode of the particular CPUi has code to initiate a context switch between the different categories or EEs. The category or EE of execution of the particular CPUi can usually mask only the FIQ belonging to that category or EE, with some possible exception as described elsewhere herein, refer to TABLE 42. In this way, the Monitor code of control core CPU0 allocates accurate bandwidth (e.g., FIG. 23 time percentage of each processor core CPUi) for each category or EE.

In the banked-timers section, the Master Counter 5088 is the principal counter. In FIG. 22B, the other counters called local counters or local timers 5085.i service the CPUs respectively and are derived from the Master Counter 5088. The multi-CPU system establishes the arrow percentages (SMP 50%, RTOS 50%, etc.) as follows. The Hypervisor code running in the Monitor Mode of the first core CPU0 accesses the local timer 5085.i of every core CPU0-CPUn and configures the local timer counts register to establish percentage values according to the different bandwidths required. As a given local timer counter counts up, a comparator fires and triggers an interrupt when a configured count is reached. Multiple registers for providing multiple configured counts for a CPUi are provided in some embodiments, while in other embodiments the hypervisor periodically changes the configured counts to cycle through two or more EEs. Secure privilege access is suitably used to establish the timers configuration. This bandwidth requirement depends on power consumption estimation and power constraints and bandwidth (e.g., MIPS millions of instructions per second) required per software application.

When an EE uses all the current time in one latest time slot for it, a secure hypervisor timer fires (ticks), the currently active EE HLOS timer can fire, and a HLOS timer for a suspended EE might fire, all at essentially the same time. If several timer interrupts occur simultaneously or very close in time, some coordination is advisable in the system. Accordingly, the hypervisor operates as an EE scheduler or bridge and the hypervisor timer is used to schedule which EE is made active currently. Then the EE currently scheduled (active) can program its own timer in this window of time represented by its percentage in FIG. 23.

The hypervisor reacts to interrupt of various EEs in a selective manner depending on whether the EE is suspended or active. Also, the FIQ have LOW, MEDIUM, HIGH priority (see registers 4222A and 4224A in FIG. 12A) such that LOW priority interrupt of other EE are masked in interrupt handler itself, MEDIUM are trapped by the monitor mode (HYPERVISOR code) but do not change current scheduling (can still affect it later on), and HIGH priority interrupts force a scheduling to activate the EE (and thus execution of its software) in response to the EE associated with the interrupt.

A HIGH priority interrupt can originate from an EE local timer 5085.*i*. It is important in verifying the system that the system operates properly even if plural local timers fire at the same time or that the system is arranged so that plural local timers do not fire all at the same time. In the latter type of system, synchronous shadowing or shading properties are suitably introduced in the system such that to prevent simultaneous timer firing several synchronous timers are implemented but activated with a phase shift relative to one another. For instance, each of the timers delivers several very closely spaced ticks inside an arrow in FIG. 23 with an EE-specific one of those closely spaced ticks selectively fed as one actual tick interrupt FIQ from a given EE timer by the hardware so that there is a phase shift or time delay between each of the ticks or FIQ emanating from plural timers respectively. The plural timer ticks then come in to the hypervisor as a burst of two or more closely spaced FIQ interrupts and the time-position of each tick in the burst corresponds to the respective EE timer that generated that tick. In this way, the hypervisor can either process such plural timer events in the burst by picking the one, such as the first one, and ignoring the rest of the burst or by more processing of some or all of the timers FIQs as appropriate.

The illustrated percentages of FIG. 23 are not limiting of suitable percentages allocated for any desired system operation. The timer configuration of percentages is static or dynamic, or both static and dynamic. In some embodiments, a hardware feedback loop is provided to establish optimization and bandwidth allocation.

In FIG. 23A, changing an execution environment EE or virtual world or category assigned to CPU2 is accomplished in a step 3640. The processor system is operable to execute plural high-level operating systems (HLOSes), indicated for instance as execution environments EE3 and EE5. Note that execution environment EE3 has been operative in the past but then issued a WFI as indicated by the bit or signal CPU2_EE3_WFI_Active in SSM register 4220. This WFI active signal has not been cleared by the hypervisor. Accordingly CPU2 is in a wait for interrupt mode relative to execution environment EE3. In the meantime, another execution environment EE5 has been running on the processor CPU2.

In due course, EE5 performs operations until a WFI instruction is hypothetically reached, whereupon a signal CPU2_STANDBYWFI is issued and circuitry such as in FIG. 12 or FIG. 12A activates the register 4220 bit CPU2_EE5_WFI_Active in FIG. 23A. In step 3640 of FIG. 11, the hypervisor is interrupted and substitutes the EE3 HLOS for the EE5 HLOS on CPU2. The hypervisor proceeds by initiating the EE3 HLOS on the same processor core CPU2 in the 25% timeslot that previously was used by the EE5 HLOS. To do this, the Hypervisor resets and inactivates the bit CPU2_EE3_WFI_Active in FIG. 23A in SSM register 4220 of FIG. 12 or 12A. Also, the hypervisor sends an interrupt to CPU2 so that the EE3 HLOS is launched in the 25% timeslot that previously was used by the EE5 HLOS, and the switchover is complete.

Any appropriate power management transition is also suitably handled at this time. Suppose the hypervisor process determines that the 25% timeslot should not be filled on CPU2 when the EE5 HLOS terminates, and the 25% timeslot is not projected to be utilized on CPU2 for a sufficient period of time. Notice that the SMP UIEE is using CPU2 in the 75% timeslot. The hypervisor can then reconfigure the local time counter 5085.2 for CPU2 so that SMP UIEE occupies CPU2 90% of the time (or even 100% of the time like CPU3 of FIG. 23), for example, instead of 75%. Since SMP UIEE may not really need this much CPU2 bandwidth, the PRCM is suitably controlled (see step 3625 of FIG. 11) and operated to reduce the operating performance point (OPP) for CPU2. This saves energy and increases battery life for the system. Note that if UIEE is intended to not only symmetrically but also identically use the processors CPUi, then if the allocation on one CPU is changed then other CPUs may have their local timers reconfigured to change the UIEE percentage allocation. Various embodiments may run the UIEE on fewer than all the CPUi. Then in the example, CPU2 might then have 75% bandwidth allocated to a PSEE such as EE4 which could then take over a higher amount of bandwidth such as 90% or 100%. Thus, numerous types of EE allocations are contemplated.

FIG. 24 shows an example of interrupt priority settings. GIC 5020 has a register called an SFIQ Prioritization register to prioritize each secure FIQ relative to other secure FIQ. Another GIC 5020 register called an Interrupt Prioritization register prioritizes each secure FIQ against public FIQ/IRQ. These GIC 5020 prioritization registers are configurable in secure privilege mode, such as at boot time, for example.

A default configuration suitably makes all SFIQ higher priority than PFIQ/IRQ as shown in the left two columns of FIG. 24. Notice that the lowest interrupt priority level of a secure FIQ (e.g., that of SFIQ 13) exceeds the highest interrupt priority level MAX PFIQ/IRQ configured for any Public FIQ (e.g., PFIQ 8, 9, 7) or other interrupt IRQ (e.g., IRQ 56).

SFIQ priority is downgraded as shown in the right two columns of FIG. 24 as appropriate. To downgrade the SFIQ priority, configure the GIC Interrupt Prioritization register to equal or less than a priority of some PFIQ and IRQ. In the illustration, SFIQ 15, SFIQ 16 and SFIQ 13 retain the same priority relationship to each other but now SFIQ 16 is between PFIQ 8 and PFIQ 9 in priority, and SFIQ 13 has a lower priority than that of IRQ 56. FIG. 24 is revised as shown in FIGS. 29D and 30 regarding interrupt operations of some of the embodiments.

In FIG. 25, SSM provides Public FIQ pre-emptive masking for hypervisor control over SMP (e.g. UIEE) if Public FIQ are used. Automatic handling for SMP of FIG. 23 (HLOS1 or HLOS1' of FIG. 4A) is completely hardware driven when an SSMFIQ_Automatic_EN signal is activated in FIG. 13. Otherwise, Manual method handling is provided in the sense that the masking handling is software-driven in Monitor Mode. Each of these FIGS. 13 and 25 may be used to supplement the other. Manual handling of FIG. 25 is also called the Monitor Mode method of FIG. 13.

In FIG. 25, the SSM has an Entry Condition hardware block 5110, Manual/Auto hardware block 5120, Flag/Mask hardware block 5130, and a Flag hardware block 5140 structured to do operations specified as follows in TABLE 38, for an example.

SSM hardware-support for hypervisor implements hypervisor world security by adding CPSR F bit tentative masking that is then sent out on the SECMON bus. See description of FIG. 25 blocks 5110 and 5170.

TABLE 38

SSM HARDWARE TO SUPPORT GIC 5020

IF (SECMON CPSR F Mask_Tentative = 1 & CP15NS_BIT= 1
   & SSM_FIQ_Preemptive_Masking = 1) -Block 5110--
THEN
   IF Automatic -determine whether Manual or Automatic in block
   5120-

TABLE 38-continued

SSM HARDWARE TO SUPPORT GIC 5020

```
THEN --in Block 5130--
    CPUx_FIQ_MASK_status = 1 (SSM HW flag)
    CPUx_GIC_PFIQ_MASK = 1 (HW signal Masks all
    PFIQ automatically at GIC):
ELSE -in Block 5140-
    CPUx_FIQ_MASK_status = 1 (SSM HW flag) -> System
    waits for FIQ
ENDIF
```

Upon an SFIQ event from Flag block 5140, operations go a Monitor software Mask/Unmask block 5150. Otherwise, if no SFIQ event, operations go to an Entry Condition hardware block 5170 in the SSM itself. Blocks 5150 and 5160 are performed in the Monitor Mode software in this example. Mask/Unmask Process block 5150 operates as in TABLE 39 on FIQ trapped into Monitor Code:

TABLE 39

MONITOR SOFTWARE MASK/UNMASK BLOCK 5150

```
IF (CPUx_FIQ_Mask_status = 1 ) THEN
    MASK all FIQ belonging to this world (GIC access)
    CPUx_FIQ_MASKED = 1              (SSM access)
ENDIF;
IF (SSM_FIQ_Unmask_REQ_Interrupt) THEN
    UNMASK all FIQ belonging to applicable world    (GIC access)
    Acknowledge SSM_FIQ_Unmask_REQ_Interrupt (SSM access)
ENDIF;
```

In Flag/Mask block 5130 if there is an occurrence called a PFIQ event corner case introduced by GIC sorting time, then operations go to a Corner Process monitor software block 5160 and use NEWFIQAGR, otherwise to the Entry Condition hardware block 5170. In such corner case, the PFIQ in the GIC sorting process cannot be masked and consequently trapped. Corner Process block 5160 in the Monitor Mode software code operates as follows upon such occurrence of a PFIQ Corner case:

TABLE 40

MONITOR SOFTWARE CORNER PROCESS BLOCK 5160

```
IF (CPUx_FIQ_Mask_status = 1 ) THEN
    Perform NewFIQAgr
    Wait PFIQ mask OK_feedback
ENDIF;
RETURN --Return without servicing--
```

The SSM 5030 has hardware blocks for Entry Condition 5170, Manual/Automatic 5175, Mask Status/Unmask 5180, and Mask Status/Unmask 5190. Entry Condition block 5170 has a structure defined as follows:

TABLE 41

SSM HARDWARE ENTRY CONDITION BLOCK 5170

```
IF (SECMON CPSR F_Unmask_Tentative = 1 & CP15NS_BIT= 1
    & SSM_FIQ_Preemptive_Masking = 1)
THEN
    IF AUTOMATIC    --Block 5175-
    THEN            --Block 5180 Automatic-
        CPUx_FIQ_MASK_status = 0
        CPUx_GIC_PFIQ_MASK = 0
        (Unmasks all PFIQ automatically by generating a HW
        signal to GIC)
    ELSE --MANUAL--
        CPUx_FIQ_MASK_status = 0
        IF (CPUx_FIQ_MASKED = 1)
        THEN Generate SSM_FIQ_Unmask_REQ_Interrupt --Block
        5190 Manual--
        ENDIF;
    ENDIF;
ENDIF;
```

In addition to the SSM PFIQ pre-emptive masking above, GIC 5020 also supports SSM Public (NS=1) FIQ pre-emptive masking capability. An input hardware bit or field GIC_PFIQ_MASK is provided. When this bit or field is set active, GIC 5020 masks all Public FIQ that can occur on this specific CPU core (enforcement analogous to PFIQ CPSR F enable). GIC 5020 provides an OK_Feedback readable by Secure Privilege software, SFIQ are still active. When the GIC_PFIQ_MASK is inactive, GIC 5020 unmasks all public FIQ that can occur on this specific core (analogous to PFIQ CPSR F disable). GIC 5020 clears the OK_Feedback, which is readable by secure privilege SW, and both PFIQ and SFIQ are active. Signals CPUx_GIC_PFIQ_MASK for each CPUi in a multi-processing embodiment are established and are configured and reset by Secure Privilege software.

Implementing PFIQ and SFIQ input at each CPUi core boundary, for example, provides an uncomplicated architectural approach. This provides interrupt virtualization wherein CPSR F Disable/Enable applies only on PFIQ input when operations are in Public mode. The GIC 5020 routes all FIQ marked as Public to PFIQ and all FIQ marked as Secure to SFIQ. Note that in some embodiments herein, no interrupts are marked PFIQ at all.

Turning to more hypervisor description, TABLE 43 depicts Hypervisor Monitor Code of FIG. 18 and switch handling operations for responding to various events such as SMI of TABLE 29, WFI FIQ of FIGS. 12 and 12A and FIGS. 21A/21B/21C; and to RTOS scheduler events of FIGS. 22B, 23, 23A, 26A, 26B, 28, 29A-E, and 30; and other hypervisor events.

TABLE 43

MONITOR CODE, SWITCH HANDLER

```
SMI, WFI FIQ, RTOS Scheduler or other Hypervisor event.
Save Register File RFx and SCR Interrupt context IRQ/FIQx of current category/EE by:
PUSH RF R0 -> R14 of each mode {User, Supervisor, System, IRQ, FIQ, Aborts, Undef}
Execute decision process to choose switching A/B/C/D.
Restore Register File and SCR Interrupt context of category/EE that has to be switched to:
POP RF R0 -> R14 of each mode {User, Supervisor, System, IRQ, FIQ, Aborts, Undef}
Data Coherency
Execute: Data Memory Barrier (DMB)
Execute: Data Synchronisation Barrier (DSB)
SWITCHING                        #COMMENTS
```

TABLE 43-continued

MONITOR CODE, SWITCH HANDLER

| | |
|---|---|
| A. Go to SMP HLOS | |
| CP15_NS_Bit = 1; | #Public world |
| Virtual_Processorx_Active = 0; | #Non-virtual world (SMP HLOS FIG. 4) or |
| UIEE_Active=0xx; | #User Interaction Execution Environment FIG 4A |
| Virtual_Processorx_Dbg = Debug_Conf | #Depends of current system debug settings |
| IRQ trapped in SMP HLOS | #Direct servicing of SMP HLOS IRQ in IRQ mode |
| FIQ trapped in Monitor Mode | #DISPATCH when in Monitor Mode (SMP HLOS, SE, Virtual worlds) |
| External aborts (EA) trapped in HLOS | #DMB/DSB ensures no EA pending after switch |
| IRQ maskable in HLOS | #- |
| FIQ not maskable in HLOS | #SMP HLOS FIQ is preempted (automatic mode) |
| SSM FIQ_Pre-emptive_Masking= 1; | #Mechanism activated in blocks 5110, 5170 |
| SSM FIQ_Automatic_EN=1; | #Automatic mode 100% hardware |
| B. Go to Public Virtual NON-REAL-TIME OS x | # (Public HLOS, e.g., WinCE, Non-GPL) x <= {0; n} possible worlds or EEs |
| CP15_NS_Bit = 1; | #Public world |
| Virtual_Processorx_Active = 1; | #Virtual world, FIG. 4 |
| EE_Active=0xx; | #Platform Support Execution Environment, FIG. 4A |
| Virtual_Processorx_Dbg = Debug_Conf | #Depends on current system debug settings |
| IRQ trapped in Monitor Mode | #Direct switch to SMP HLOS IRQ mode |
| FIQ trapped in Monitor Mode | #DISPATCH when in Monitor Mode (SMP HLOS, SE, Virtual worlds) |
| EA trapped in Public Virtual OS | #DMB/DSB ensures no EA pending after switch |
| IRQ maskable in Public Virtual OS | #SMP HLOS is maskable (rising condition of SMP) |
| FIQ not maskable in Public Virtual OS | #Virtual world is preempted (manual mode) |
| SSM FIQ_Pre-emptive_Masking = 1; | #mechanism activated in blocks 5110, 5170 |
| SSM FIQ_Automatic_EN=0; | #Manual mode (SW driven) re PFIQ |
| C. Go to Public Virtual REAL-TIME OS x | # (e.g., Nucleus OS Modem) x <= {0; n} possible real-time worlds |
| CP15_NS_Bit = 1; | #Public world |
| Virtual_Processorx_Active = 1; | #Virtual world, FIG. 4 |
| EE_Active=0xx, | #Platform Support Execution Environment, FIG. 4A |
| Virtual_Processorx_Dbg = Debug_Conf | #Depends on current system debug settings |
| IRQ trapped in Monitor Mode | #Direct switch to SMP HLOS IRQ mode |
| FIQ trapped in Monitor Mode | #Dispatch when in Monitor Mode (SMP HLOS, SE, Categories) |
| EA trapped in Public Virtual OS | #DMB/DSB ensures no EA pending after switch |
| IRQ maskable in Public Virtual OS | #SMP HLOS is maskable (rising condition of SMP) |
| FIQ maskable in Public Virtual OS | #True Real-Time capable (SE not running on this core, CPU1, 2, 3 DOS attacks are resisted) |
| SSM FIQ_Pre-emptive_Masking= 0; | #SSMFIQ_EN disabled, blocks 5110, 5170 |
| SSM FIQ_Automatic_EN=0; | #Manual mode re PFIQ |
| D. Go to SECURE OS | #S.E. |
| CP15_NS_Bit = 0; | #Secure Environment |
| Virtual_Processorx_Active = 0; | #Non-virtual world, FIG. 4 |
| EEActive=1xx; | #Secure Environment, FIG. 4A |
| Virtual_Processorx_Dbg = Debug_Conf | #Depends on current system debug settings |
| IRQ trapped in Monitor Mode | #Direct switch to SMP HLOS IRQ mode |
| FIQ trapped in Monitor Mode | #Dispatch when in Monitor Mode (SMP HLOS, SE, Categories) |
| EA trapped in Secure OS | #- |
| IRQ maskable in Secure OS | #SMP HLOS is maskable (rising condition of SMP) |
| FIQ maskable in Secure OS | #True Real-Time capable |
| SSM_FIQ_Pre-emptive_Masking= 0; | #SSMFIQ_EN disabled, blocks 5110, 5170 |
| SSM FIQ_Automatic_EN= 0; | #Manual mode re PFIQ |

Note:
DOS attack is denial of service attack.

Figure 26B:
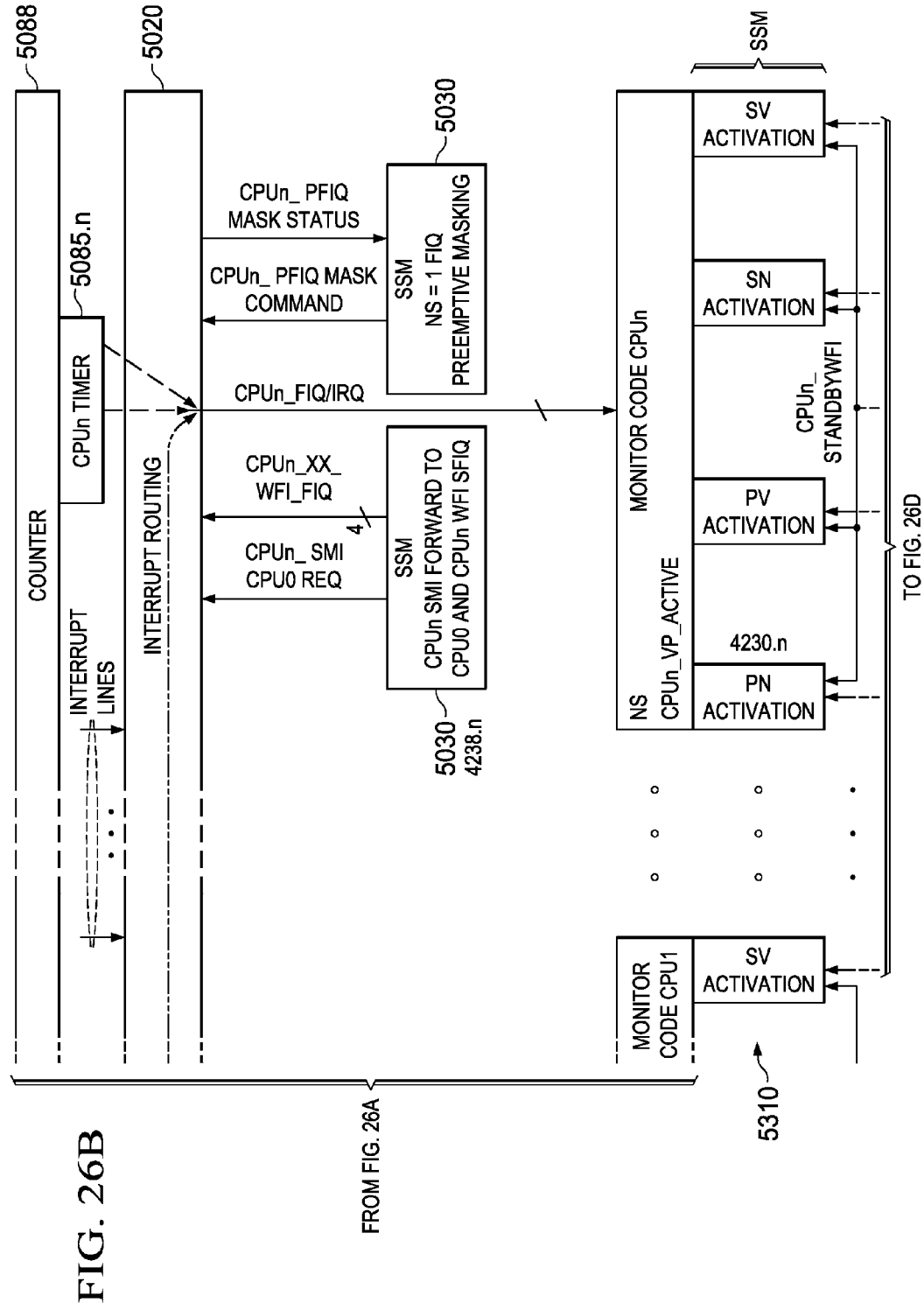
Figure 26C:
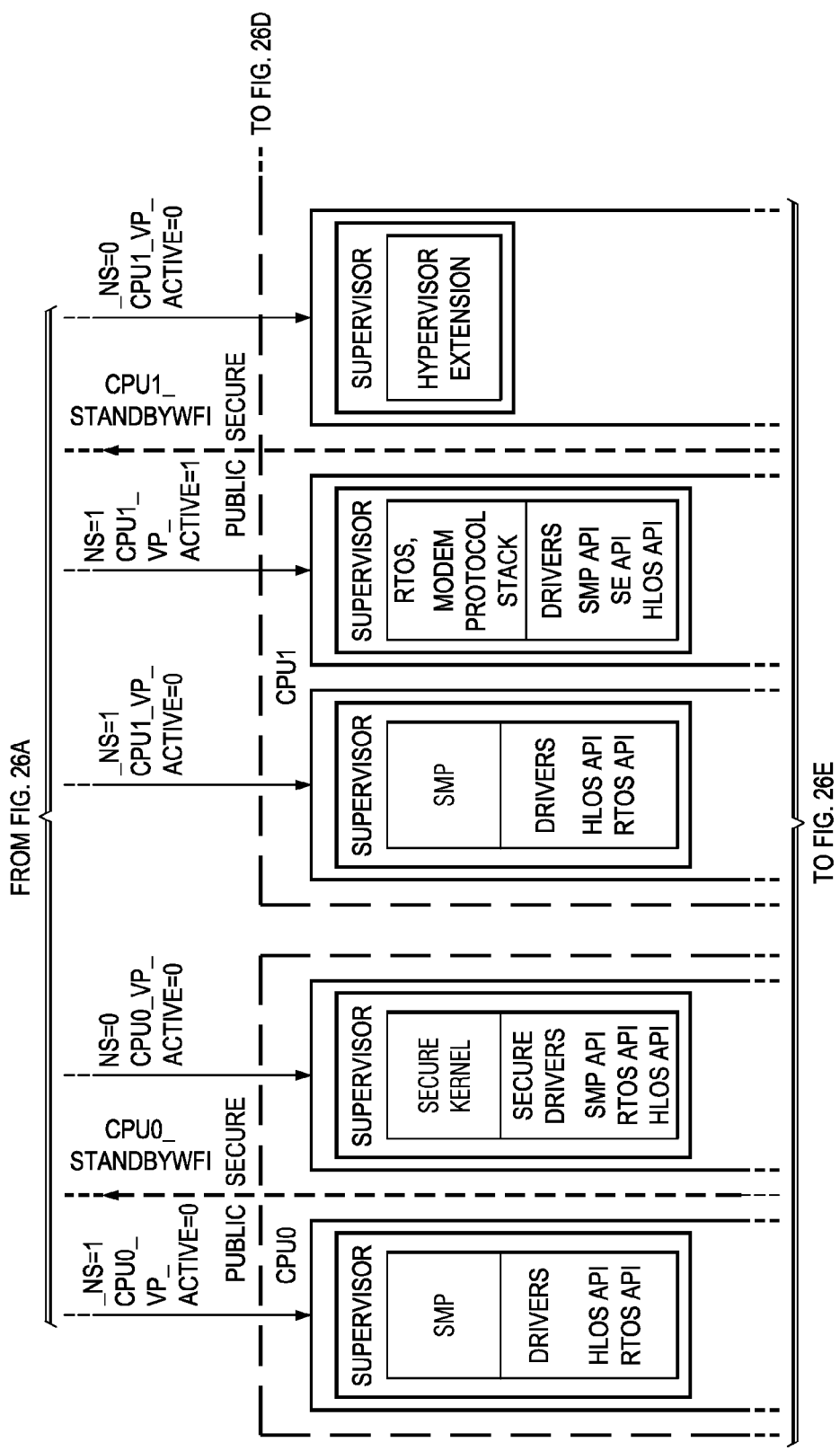
Figure 26D:
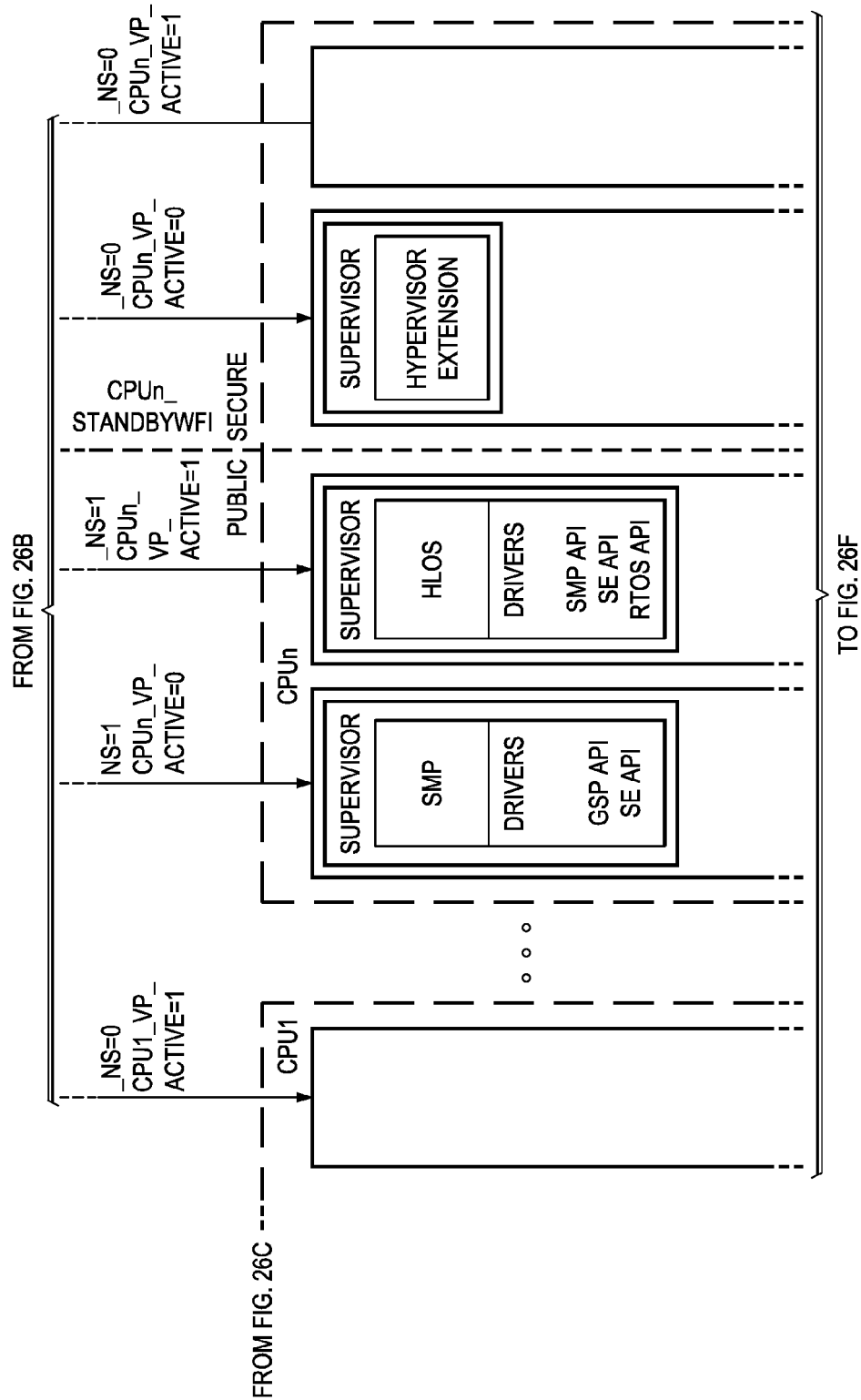
Figure 26E:
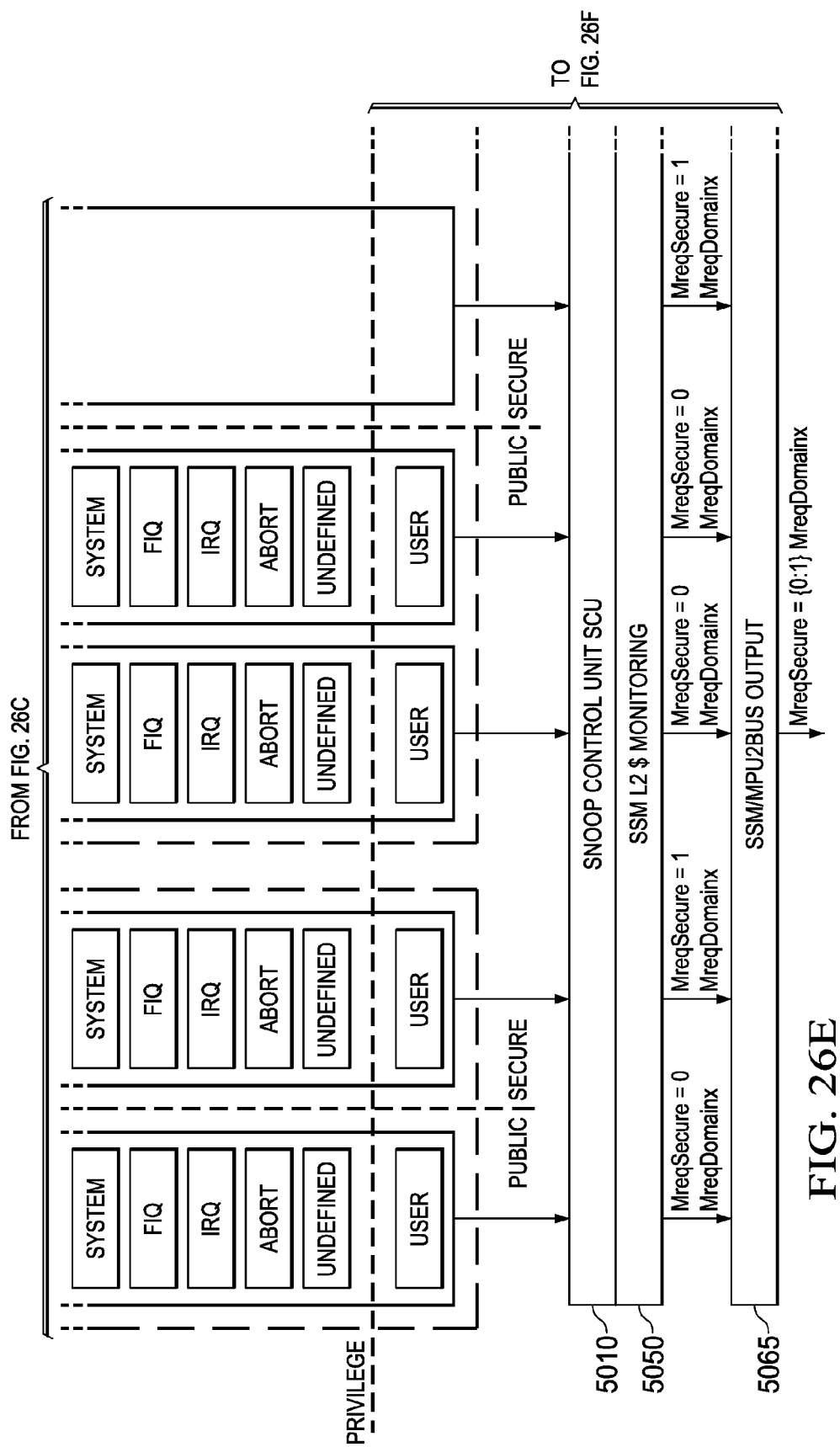
Figure 26F:
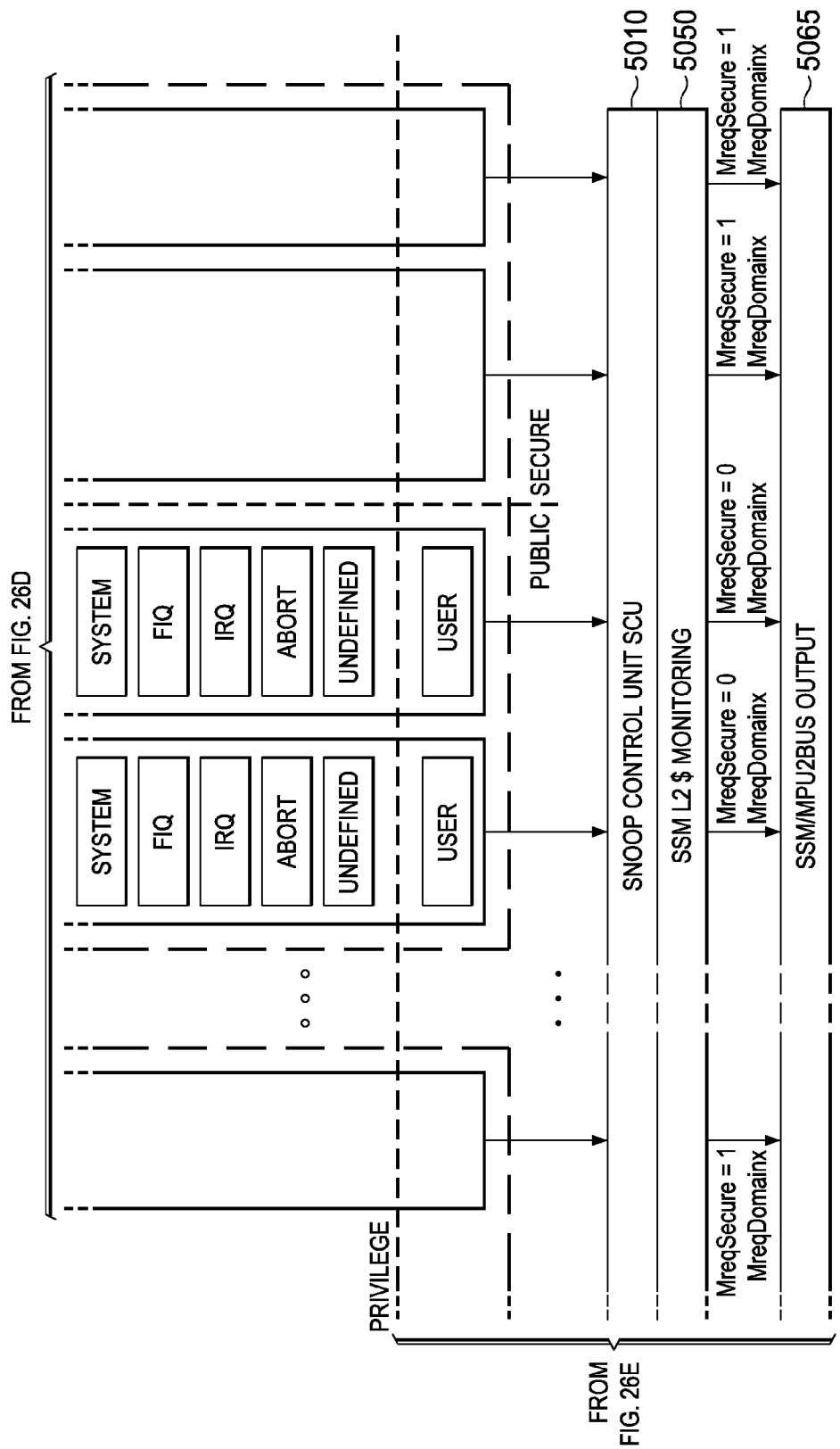

In FIGS. 22B and 26E, the Snoop Control Unit SCU 5010 distinguishes which CPUi has issued the current access. SCU 5010 propagates coherent shared data into the caches associated with the other CPUs. SCU 5010 ensures data coherency between all level-one caches L1$i of the cores CPUi as a cluster by moving/updating any updated instruction cache line and any updated data cache line from the cache area associated with any one CPUi to the caches of all the CPUs, i.e., all the cores in the cluster.

SCU 5010 is coupled to and cooperates with the multi-core hypervisor using an enable/disable circuit in SCU 5010 that operates as an asymmetric mode switch configurable by core CPU0 at run-time in an auxiliary control register. In that way, the core CPU0 that runs the hypervisor operates or disables the SCU 5010 so as to exclude accesses of the core CPU0 pertaining to the hypervisor process from being used to update cache lines for all the other CPUi. In other words, certain hypervisor-related accesses are selectively prevented from being taken into account by the SCU 5010 by turning off the snooping and cache line updating by SCU 5010 when hypervisor needs to disable those operations. This facilitates isolation of the hypervisor in CPU0 from the rest of the multi-core system. In this way SCU 5010 acts as an example of a cache control circuit for updating coherency between the caches subject to hypervisor isolation condition or to asymmetry conditions. The protective circuitry of SSM 5030 is responsive to a line from CPU0 indicating that Monitor Mode is activated in CPU0 to temporarily disable the cache control circuit from updating coherency between the caches.

Enable and disable of the symmetric coherent or asymmetric not-coherent configuration per CPUi is established, for example, by configuring an auxiliary control register asymmetric field on each CPUi of the cluster. When the asymmetric field is configured active on each core CPUi, then each transaction issued by the MMU stage of the respective core CPUi to its L1$i cache and then to SCU 5010 is tagged with in-band qualifier MreqNCoherence that commands or controls the SCU 5010 to not maintain coherency on these accesses. In some embodiments, the SCU 5010 outputs information pertaining to each access that tells which CPU0-3 has generated the access. In response to the information identifying which CPUi generated the access, the SSM 5030 generates the corresponding MreqDomainX qualifiers and provides the address boundary checking and configuration checking that pertain to that CPUi category or EE_xx.

The SSM 5030 implements added registers to support the CPU0 SMP core hypervisor. A register for CPU0 inter-CPU SFIQ generation is configurable in Secure Privilege mode and this register enables each SFIQ to occur on one or more specified CPUs that are configuration-specified. Each SFIQ is maskable individually by Secure Privilege software configuring a dedicated Mask register.

Per-CPU EE activation and debug control is provided. Per-CPU SMI call forward to CPU0 is provided. Per-CPU Wait for Interrupt WFI call forward to the same CPU is provided. CPUi can replace this by trapping WFI into Monitor Mode analogously to trapping SMI with a dedicated exception vector.

A Flag is provided for each interrupt line to identify which EE the interrupt line belongs to. A Secure/Public interrupt designation is made at GIC 5020 level. SSM 5030 adds the register CPUi_EE_ACTIVE to differentiate the EEs XX.

Debug control over different CPUi cores and execution domains EE_xx is established using bits described next. Debug is made applicable on a CPUi core-specific basis and execution domain EE-specific basis. Run time activation of DBGEN debug enable and NIDEN non-invasive debug enable is performed rapidly.

The SSM has an execution environment control register SSM_EE_CTRL[:] 4215A. A control bit Hypervisor_EN when active, enables hardware reinforcement of the hypervisor domain by the SSM protective circuitry. The register SSM_EE_CTRL has control fields for each CPUi for multi-processing. Several Disable bits SSM_DBGEN_DISABLE, SSM_NIDEN_DISABLE, SSM_SPIDEN_DISABLE, and SSM_SPNIDEN_DISABLE are respectively set high to inactivate (set low) the corresponding signal lines NIDEN, SPIDEN, and SPNIDEN at a given CPUi boundary. A set of execution environment debug control bits EE_Debug_DO-MAINx when active permits entry into the corresponding EE (allows entering), provided that both bits SSM_DB-GEN_DISABLE and SSM_NIDEN_DISABLE are active in this register. When CPUn_SSM_DBGEN_Disable field is active, DBGEN is low at CPUi boundary. When CPUn_E-E_xx_DEBUG_DIS field is active, SSM_DBGEN_Disable and SSM_NIDEN_Disable are set active before entering the Virtual world or EE and reset to previous value before exiting.

IN SSM_EE_CTRL register, a bit field UIEE_Active provides a binary number x that represents which domain x should be activated as UIEE domain for SMP (symmetric multiprocessing) when the hypervisor in Monitor mode exits. A bit field EE_Active provides a binary number x that represents which PSEE domain x (e.g., any number 0-7) should be activated as PSEE domain when the hypervisor in Monitor mode exits. All these bits are read-only, except read/write in Monitor mode.

Hypervisor control over the different categories and CPU cores is implemented, for example, as follows: When each particular low-active field is cleared (active), an interrupt is generated. When the interrupt is acknowledged, the particular field is automatically set inactive. Default value is inactive high. The _DEBUG_DIS fields are read-only, while the other TABLE 43 fields are Read or Write accessible. All the following are Read or Clear accessible: CPU<1/2/3>_inter-CPU SFIQ, and CPU<1/2/3>_SMI_SFIQ.

In FIGS. 26A-26F, a multi-processor core virtualization architecture embodiment is shown. FIGS. 26A-26F are compared with and/or supplemented by FIGS. 11-13 and 22A/22B and other Figures. Switching from the different categories or EEs on CPU cores is done through code in the Monitor Mode acting as a hardware-supported hypervisor.

In FIG. 26A, Timers 5085.*i* for each CPUi are suitably provided as dual synchronous output banked timers responsive to Master Counter 5088. GIC 5020 routes local timer 5085.*i* interrupts and many other interrupts, as indicated by example arrows therein. SSM 5030 provides visibility into the routing process of GIC 5020 such as which interrupts are being routed, from which EE_xx and CPUi each interrupt comes, and to which EE_xx and CPUi each interrupt goes using the circuitry of FIG. 12A replicated for each CPUi.

Further in FIG. 26A, the SSM 5030 provides CPUi {0, n} inter-CPU and CPU0 WFI SFIQ generation (Wait for Interrupt, Secure Fast Interrupt reQuest) using FIG. 12A circuitry via respective lines from the SSM 5030 to GIC 5020. For each CPUi {0, n}, SSM 5030 provides NS=1 FIQ preemptive masking using FIG. 13 circuitry by a PFIQ masking command line to GIC 5020 and a PFIQ masking feedback status line for each CPU{0,n} from GIC 5020 to SSM 5030 in FIGS. 26A/26B.

For each respective CPUi other than CPU0, SSM 5030 (circuit 4238.*i* in FIGS. 12/12A/12B) performs CPUi SMI forward to CPU0 along a line for SMI CPU0 request to the interrupt handler GIC 5020. For each respective CPUi, SSM 5030 performs CPUi WFI SFIQ generation along a line for WFI request via GIC 5020 to the interrupt handler for CPU0.

In FIG. 26A, Monitor Mode code is provided for every CPU0-CPU3. From each CPUi and via GIC 5020 to Monitor Mode for each CPU0-CPU3 in this example, each fast interrupt FIQ is trapped into the Monitor Mode, and each interrupt IRQ from a suspended EE is treated as FIQ and trapped into Monitor Mode as described more fully in connection with FIGS. 29A-E and FIG. 30. External Abort EA is not trapped in Monitor Mode. In other respects, the cores CPU1, CPU2, CPU3 suitably are provided with Monitor Mode code analogous to each other. In some embodiments the core CPU0 has somewhat different or augmented Monitor Mode code compared to the Monitor Mode code of the other cores CPU1, CPU2, CPU3. In some embodiments all the cores CPU0-

CPU3 have identical Monitor Mode code, and a designated control core such as CPU0 executes more parts of that Monitor Mode code as hypervisor so that hot plugging the hypervisor is facilitated.

For core CPU0, the Monitor Mode hypervisor code controls the CP15_NS bit by setting it active or inactive for transitions from Secure to Public or Public to Secure worlds respectively. CPU0 Monitor Mode hypervisor code clears/sets other bit fields in SSM 5030. The SSM bit field CPUi_EE_Active is used to identify and activate an EE or to inactivate it in a given CPUi. CPU0 Monitor Mode code generates CPUi_SFIQ inter-CPU FIQ for extra scheduling to the other cores CPU1, CPU2, CPU3.

For cores CPUi other than CPU0, the Monitor Mode code in the respective CPUi controls the CP15S_NS_Bit in CPUi by setting it active or inactive to establish Public world or Secure world in that CPUi depending on the Public or Secure operations configured or commanded for that CPUi by CPU0 and the SSM 5030. In the SSM 5030, another field CPUi_EE_Active is inactivated, activated or written with a value to establish an execution domain EE depending on the EE xx configured or commanded for that CPUi by hypervisor in CPU0 and the SSM 5030.

In FIGS. 26A/26B, SSM 5030 (and Control Module analogous to 2765 associated with SSM 5030) is bidirectionally coupled to each CPU0-CPU3 of FIG. 26B by Category/EE Activation blocks 5310 (4230.*i*) of SSM 5030. In an example configuration of CPU0, Public or Secure mode is defined by NS=1 or 0 and CPU0_EE_Active is loaded with a value identifying the active EE, if any, for CPU0, or CPUi_VP-Active is inactivated in both the Public and Secure modes. In an example configuration of the cores CPUi other than CPU0, Public or Secure mode is defined by NS=1 or 0 and CPU0_EE_Active is inactivated or activated depending on the desired category or EE of operation of FIG. 4 or 4A, 6 or 6A, and 12, 12A or 12B. FIG. 26A/26B shows activation by categories PN, SN, PV, SV (Public/Secure Non-Virtual/Virtual) and other embodiments have activation by EEs. The activation is responsive to CPUi STANDBYWFI of FIGS. 26A/26B and expanded in FIG. 12, 12A, or 12B such as to produce CPUi_xx_WFI_FIQ as shown using FIG. 12 circuitry in FIGS. 26A/26B.

In FIGS. 26C/26D, the categories or EEs of operation are defined, and category/EE identifying signals are sent from SSM to CPUi in the multi-processing system. In CPU0, the SMP HLOS Kernel and its Kernel Drivers and APIs operate in Public Supervisor mode. A SE API for interface to Secure Environment, and a real-time operating system RTOS API, and Public high-level operating system Public HLOS API are all provided for operation in the Public Supervisor mode of CPU0. In the Secure Supervisor mode of CPU0, a Secure Kernel operates and has associated Secure Drivers and interfaces to the SMP HLOS, the RTOS, and the Public HLOS through SMP API, RTOS API, and Public_HLOS_API respectively. Appropriate SE, RTOS and HLOSes and APIs are provided for execution on the respective CPUs to implement a system such as in FIG. 20. Notice that each CPUi has a STANDBYWFI line for interfacing with Monitor Code of FIGS. 26A/26B and as shown in FIGS. 12 and 12A.

In FIG. 26E/26F, each of the cores CPU0-CPU3 in each of the categories of operation thereof is coupled to the Snoop Control Unit SCU 5010. SCU 5010 is coupled to L2 Cache monitoring 5050. The current categories or EEs of operation of each CPUi are communicated along with attempted accesses asserted by SSM 5030 and interface MPU2BUS 5065 output to interconnect and firewalls of the system (see FIGS. 10 and 22B). The qualifier MreqSecure is 0 or 1 for Non-secure or Secure mode from the accessing CPUi.={0; 1} The x-indexed qualifier for EE x is designated MreqDomainx. MreqDomainx is 0 or 1 for if the execution environment EE x is active from the accessing CPUi and where a number of qualifiers are indexed x=1, 2, . . . n to identify each of them. Alternatively, the lines are encoded to carry binary value x itself, to reduce the number of MreqDomainx lines.

Figure 27:
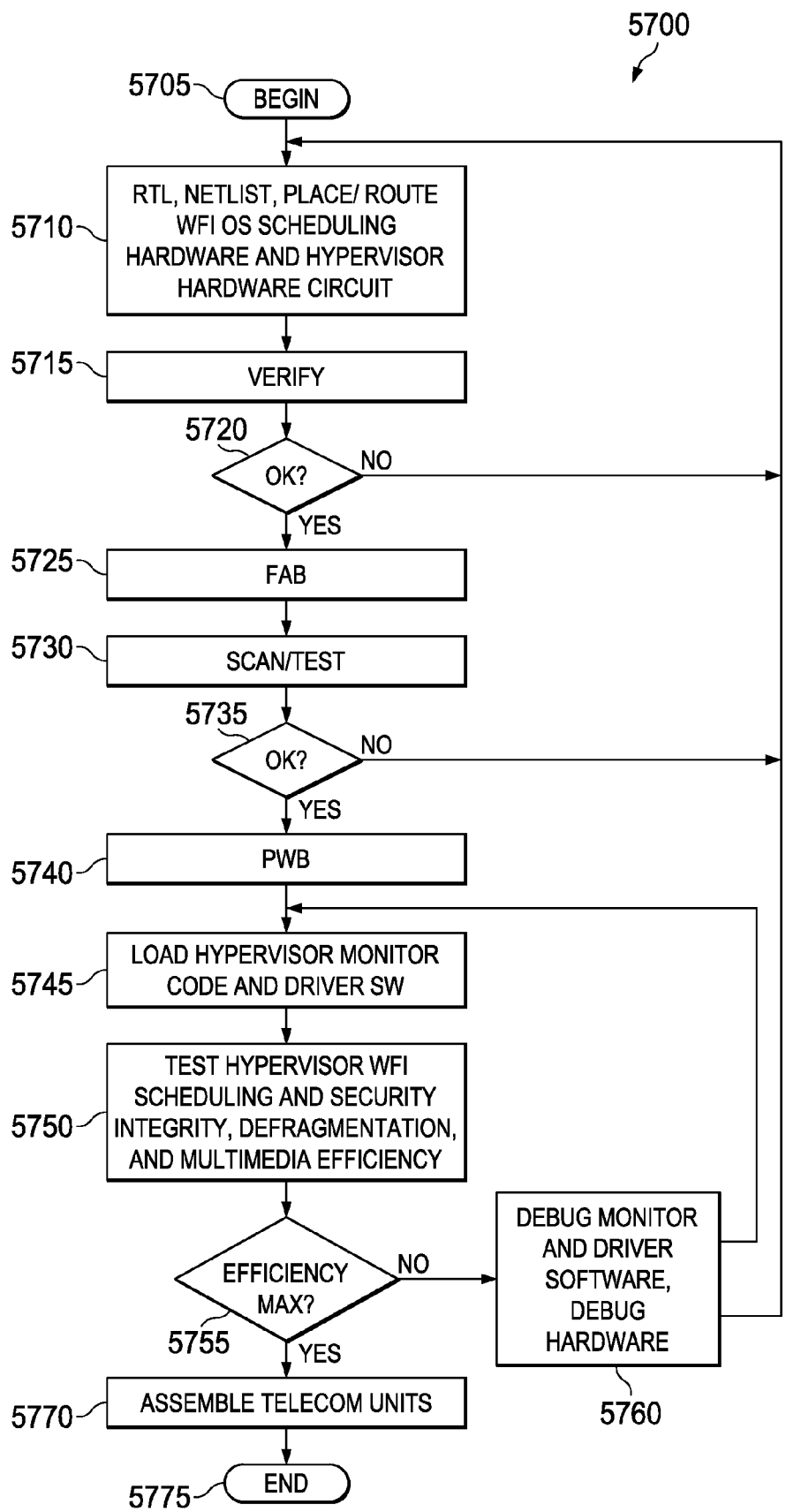
FIG. 27 is a flow diagram of an inventive process of manufacturing one or more integrated circuits, devices and systems of the foregoing Figures.

In FIG. 27, various embodiments of an integrated circuit improved as described herein are manufactured according to a suitable process of manufacturing 5700 as illustrated in the flow of FIG. 27 for design, verification and fabrication. The process begins at step 5705 and a step 5710 prepares RTL (register transfer language) and netlist for a particular design of one or more integrated circuits or a system as shown in one or more of the Figures of drawing herein as some examples and alternatives, and/or as described in the detailed description herein.

In a step 5715, the design of the hardware-supported hypervisor circuitry, for instance, is verified in simulation electronically on the RTL and netlist. In this way, the contents and timing of the registers, operation of the circuits in various configurations and using the registers, are verified and the firewalls and interrupt operation are verified. The operations are verified pertaining to real-time and non-real-time operations and interrupts and interrupt IRQ/FIQ transformation, and transitions through handlers, Monitor Mode, Secure Privilege modes, User mode, Debug modes, power management, per-category/EE per CPUi WFI scheduling coordination of integrity checking, defragmentation and other maintenance operations to facilitate gaming and other applications and functional operations of the cores and various attack scenarios. Then a verification evaluation step 5720 determines whether the verification results are currently satisfactory. If not, operations loop back to step 5710.

If verification evaluation 5720 is satisfactory, the verified design is fabricated in a wafer fab and packaged to produce a resulting integrated circuit at step 5725 according to the verified design. Then a step 5730 verifies the operations directly on first-silicon and production samples by using scan chain methodology on the per world per CPU WFI OS scheduling hardware, IRQ/FIQ transformation hardware, and hypervisor protecting SSM hardware. An evaluation decision step 5735 determines whether the chips are satisfactory, and if not satisfactory, the operations loop back as early in the process such as step 5710 as needed to get satisfactory integrated circuits.

Given satisfactory integrated circuits in step 5735, a telecommunications unit based on teachings herein is manufactured. This part of the process first prepares in a step 5740 a particular design and printed wiring board (PWB) of the telecommunication unit having a telecommunications modem, a microprocessor coupled to the telecommunications modem, a secure hardware support for a hypervisor coupled to the microprocessor and peripherals and firewalls for the peripherals, and a user interface coupled to the microprocessor. Storage, such as SDRAM and Flash memory and on-chip secure memory, is coupled to the system and is provided or previously loaded in a step 5745 with RTOS, Public HLOS, protected applications (PPAs and PAs), Boot configuration data and Monitor Mode software.

The particular design of the hardware-supported hypervisor is tested in a step 5750 by electronic simulation and is prototyped and tested in actual application. Operation of the circuits and using the registers in various configurations selectively activating fields of registers 4215 and 4220, for instance, are verified and the firewalls and interrupt operation are verified to confirm operations of the integrated circuit(s) and system and to perform verification and test operations that go beyond those operations earlier in the process. The verification and test operations pertaining to real-time and non-real-time operations and interrupts, and transitions through handlers, Monitor Mode, Secure Privilege modes, User mode, Debug modes, power management, various real-time scenarios such as modem operational scenarios. Further testing evaluates and confirms system stability and satisfactory operation of display, phone, gaming, e-mails/data service, web browsing, voice over packet, content player, camera/imaging, video, microcontroller, and other such operation that is apparent to the human user and can be evaluated by system use and in coordination with integrity checking, defragmentation, and other maintenance operations. Also, various attack scenarios are applied in the test operations, such as by using real viruses, DoS attacks and other attacks.

Parameters of the circuitry, software and system are adjusted for in faster application execution, lower power dissipation and/or energy use, evaluation of system user-experience, attack resistance, and other pertinent metrics. Examples of parameters include enable/disable fields in configuration registers of SSM Registers 2620 and Control Module 2765, and interrupt priorities in FIGS. 12A and 13. If further increased efficiency is called for in step 5755, then adjustment or reconfiguration of the parameter(s) is performed in a step 5760, and operations loop back to reload the parameter(s) at step 5745 and do further testing. When the testing is satisfactory at step 5755, operations proceed to step 5770.

In the manufacturing step 5770, the adjusted parameter(s) are loaded into the Flash memory or otherwise established in the integrated circuit(s) of the system. The components are assembled on a printed wiring board or otherwise as the form factor of the design is arranged to produce resulting telecommunications units according to the tested and adjusted design, whereupon operations are completed at END 5775.

In FIG. 27 and summarizing an aspect of the process of manufacturing an electronic product, the process prepares in integrated circuitry form an interrupt-related input line, a security related status input line, a virtual context-related status input line, and a conversion circuit having plural interrupt-related output lines and selectively operable in response to an interrupt-related signal on the interrupt-related input line depending on an active or inactive status of each of the security-related status input line and the context-related status input line.

Figure 28:
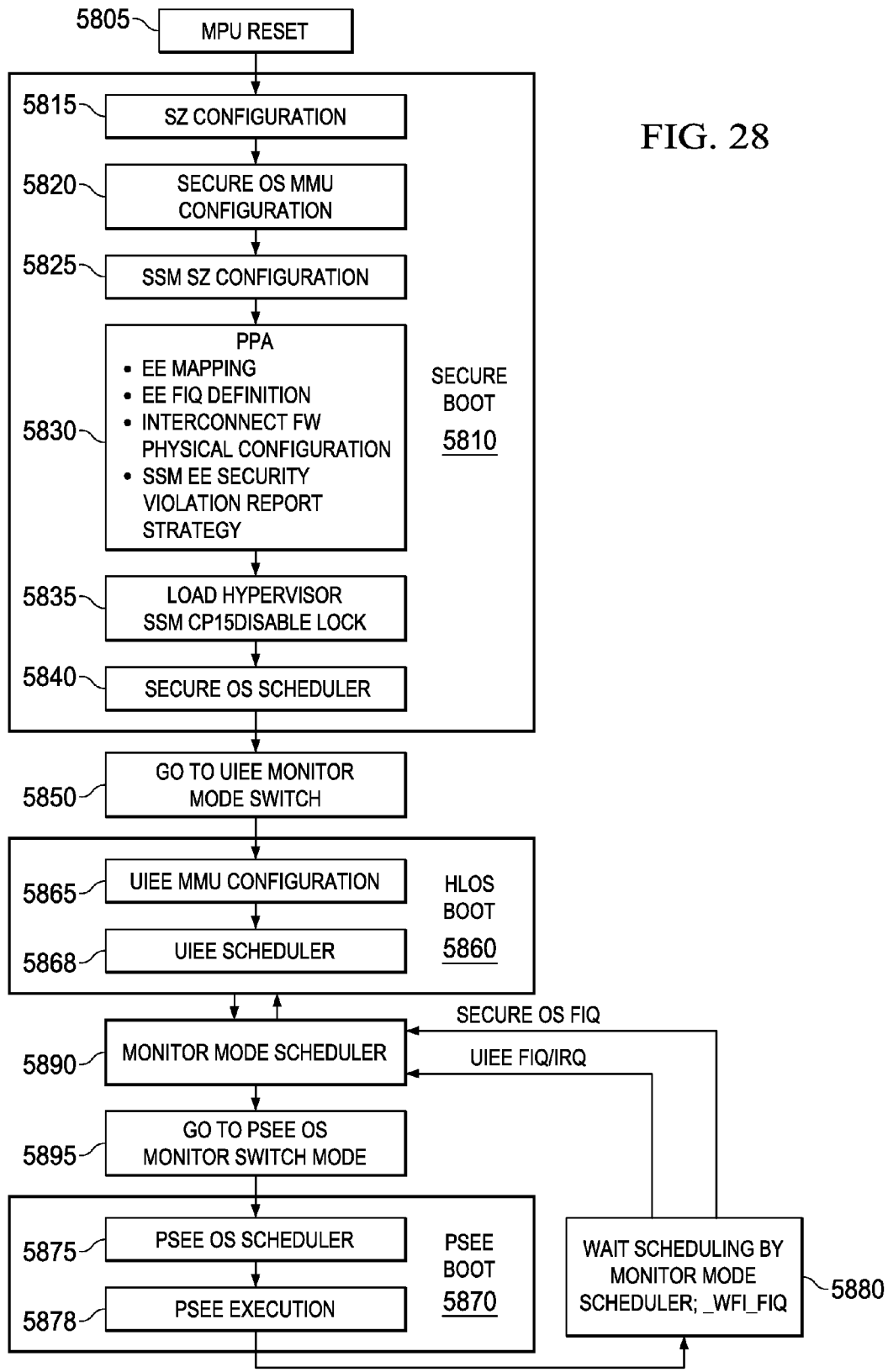
FIG. 28 is a flow diagram of an inventive boot and run-time process for use with the structures of the other Figures.

In FIG. 28, a boot process embodiment is shown. Operations commence with an MPU reset 5805 followed by Secure Boot 5810. Secure boot includes a secure zone SZ configuration step 5815, and then a secure operating system memory management unit MMU configuration 5820. Operations proceed in a step 5825 to do SSM secure zone SZ configuration. Compare with TABLE 42 and SWITCHING case D. A succeeding step 5830 operates a PPA that performs EE mapping, EE FIQ definition, interconnect firewall physical configuration, and configures the SSM EE security violation report strategy. A further step 5835 loads the hypervisor and performs an SSM CP15DISABLE Lock to lock the processor state. The secure OS scheduler is invoked in a step 5840.

Upon completion of secure boot 5810, operations proceed to a step 5850 to go to the UIEE execution environment via a Monitor mode switch. Compare with TABLE 42 and SWITCHING case A. Then HLOS boot 5860 commences for the UIEE execution environment. As part of HLOS boot, UIEE MMU configuration is performed in a step 5865, and then the UIEE scheduler is invoked in a step 5868.

Application launch in any of the PSEEs is initiated by the hypervisor using Monitor mode scheduler 5890, and operations go to the PSEE OS in a step 5895 by a Monitor mode switch. Compare TABLE 42 and SWITCHING case B or case C. The PSEE is booted in a step 5870. The PSEE OS scheduler is invoked in a step 5875. PSEE execution commences in a step 5878. During this PSEE execution an interrupt SSM_WFIFIQ of FIG. 12A (or an interrupt xx_WFI_FIQ of FIG. 12) may occur. In FIG. 28, this PSEE is now waiting (as indicated by the WFI occurrence) wherein system operations transition from step 5878 to a step 5880 for WFI wait scheduling via the Monitor Mode Scheduler 5890.

As shown in FIG. 28, Monitor Mode Scheduler 5890 is invoked either by secure OS FIQ or UIEE FIQ/IRQ (i.e., IRQ transformed into FIQ). Substitution of HLOS1' for HLOS1 in the UIEE as in FIG. 4A is performed by Monitor mode scheduler 5890 in FIG. 28 by configuring the substitution in the SSM register and transitioning from scheduler 5890 to UIEE HLOS1' boot 5860 such as by a Monitor mode switch like step 5850. A transition to a PSEE is made by Monitor Mode Scheduler 5890 going to PSEE OS by a Monitor mode switch in step 5895.

Further detailing FIG. 28, Boot software is coded to run in Secure Supervisor mode at Boot time to set an FIQ_Trap_In_Monitor bit/field of TABLE 8. SCR register circuitry of Interrupt Handler 2720 is also made so it is configurable to specify and make an interrupt a Secure FIQ when appropriate. A Secure FIQ means an interrupt that is handled only in a Secure mode. For the present example, one determines according to desired system architecture which interrupt(s) are to be Secure FIQ and boot-configures the SCR to make the thus-determined interrupts Secure FIQ. Interrupts that are not configured as FIQ in the SCR are ordinary interrupts IRQ. The configuration in the SCR is operative for a given EE when that EE is active. To configure the system to handle interrupts when a given EE is inactive, SSM register SSM_FIQ_EE_y of FIGS. 12A and 13 is additionally configured at step 5830 to make the ordinary interrupt requests IRQ into fast interrupt requests FIQ. Also, the priority HIGH register 4222A/B and priority MEDIUM registers 4224A/B of FIGS. 12A/12B are configured so that the priority of these transformed ordinary interrupts is specified for use when the given EE is inactive. In this way, the interrupt requests IRQ, FIQ and SFIQ are configured for use in the process of FIG. 28.

The Interrupt Handler 2720 circuitry has interrupt masking circuitry as described in FIG. 13. Boot software is further coded in Secure Supervisor mode to clear CPUi 2610 IRQ and FIQ masks to non-masked state for FIQ. Non-maskable Public FIQ allows a Public mode RTOS for a wireless or other modem, for instance, to operate freely in real-time under the Monitor mode hypervisor code in some embodiments. Some embodiments use MreqDomainx to make Public FIQ non-maskable qualified by MreqDomainx active. In this way, Public mode RTOS operates freely in real time in Public Virtual category 2430 or Modem PSEE, and Public mode HLOS (Public Non-virtual 2420 or e.g. Non-GPL PSEE) can mask or unmask Public FIQs without interfering with interrupt operation of Public Virtual category 2430 or Modem PSEE at run-time in FIG. 28.

Figure 29B:
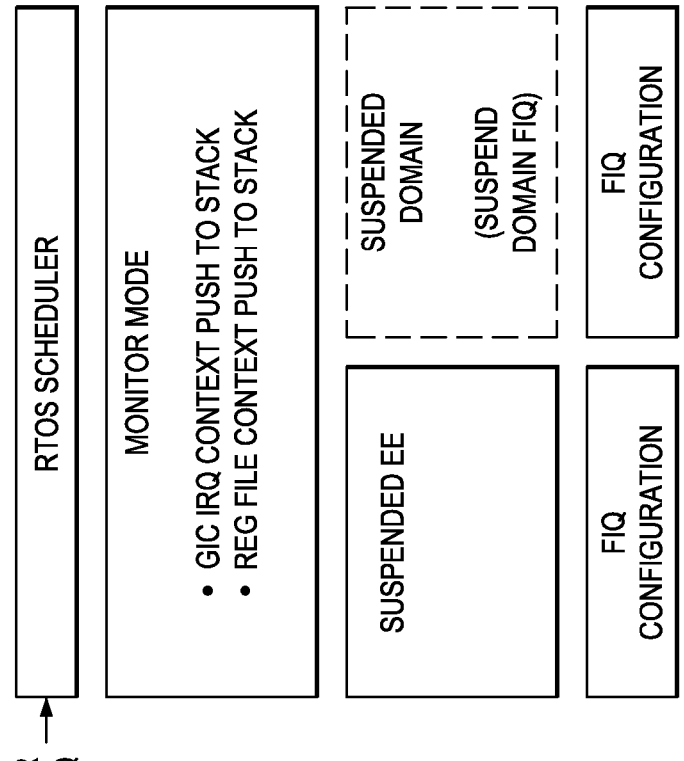

FIGS. 29A-29E are successive portions of a time sequence of operation of the structures and processes of the other Figures activating and suspending various execution environments EE, wherein each of FIGS. 29A-29E represents three operational layers: 1) RTOS scheduler coupled to 2) Monitor mode Hypervisor, which has high level supervision over 3) one or more execution environments EE or categories. FIG. 29D has an associated interrupt priority diagram.

Figure 29A:
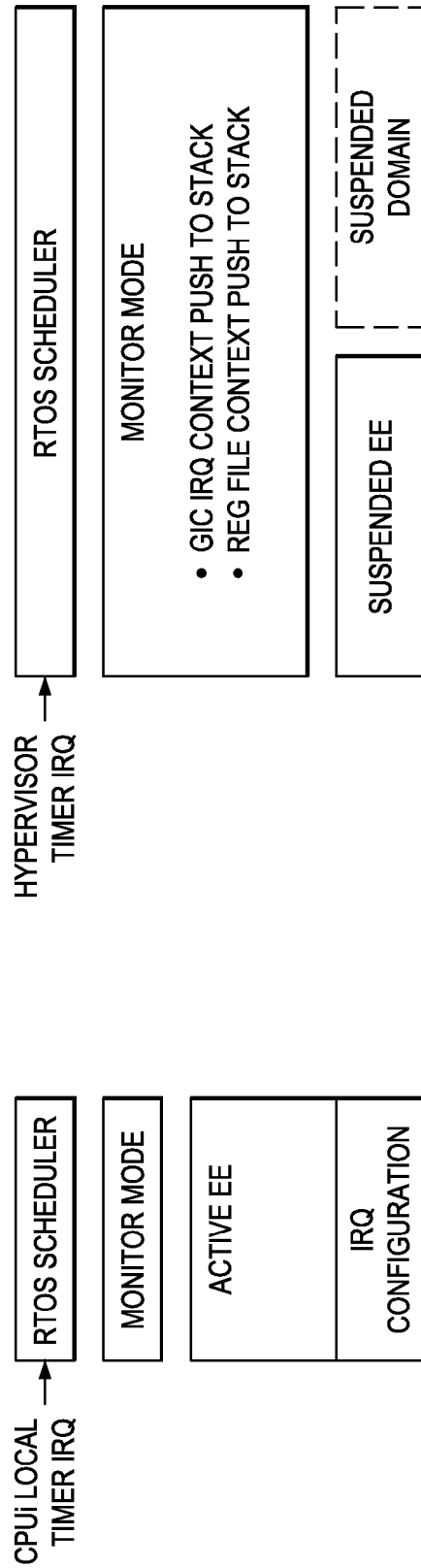
Figure 30:
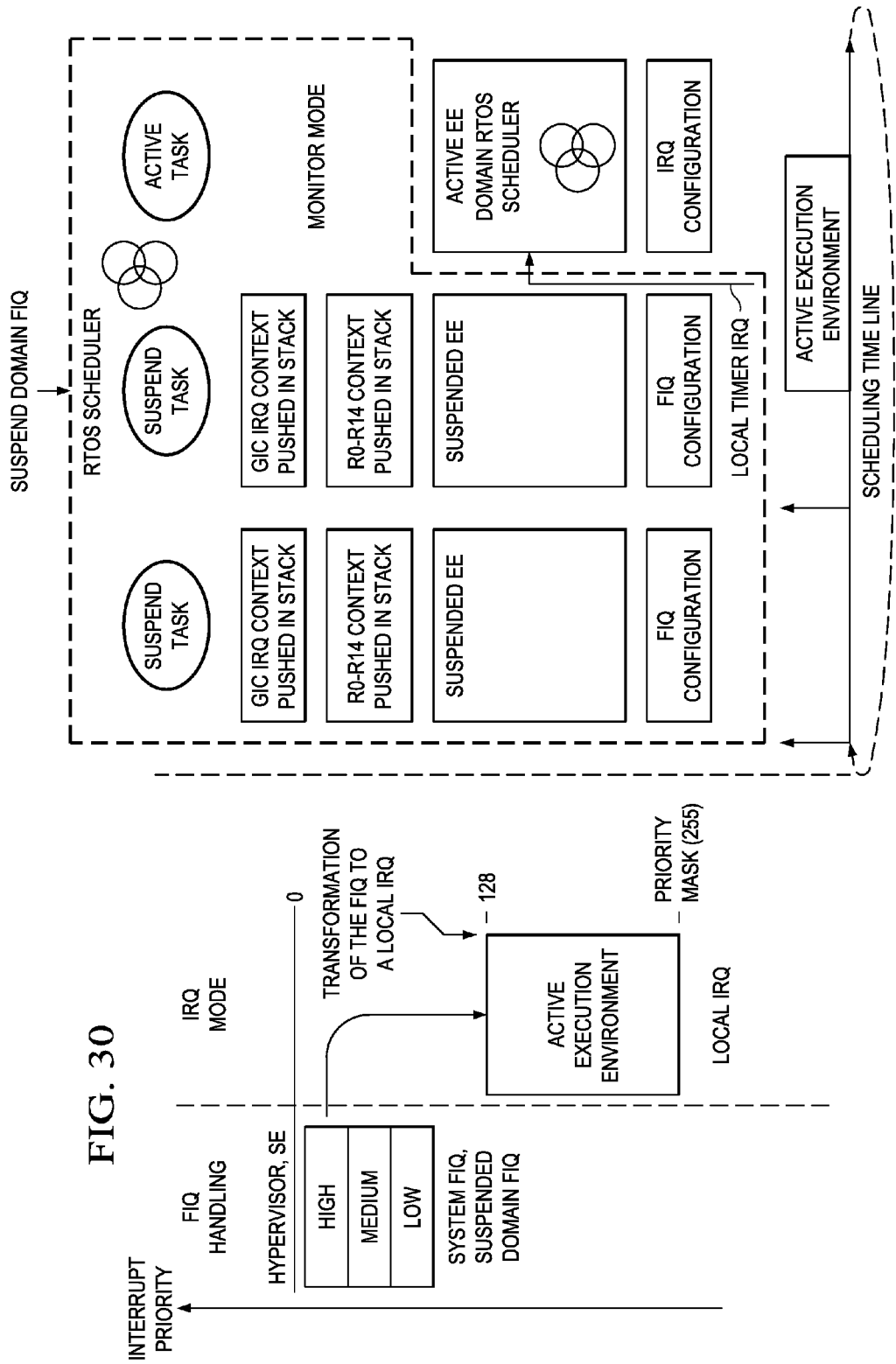
FIG. 30 has analogous format to FIG. 29D and shows an inventive transformation process of FIQ back to a local IRQ in a diagram that represents the three operational layers and interrupt priority diagram.

In FIG. 29A, an execution environment EE is active and has an IRQ configuration selected in FIG. 13 because that EE is not a suspended EE. Monitor mode is available but not currently active. An RTOS Scheduler is coupled to timers 5085.*i* of FIG. 22B for instance. In due course as time elapses, FIG. 23 CPUi local timer hardware 5085.*i* generates an interrupt request called a local timer IRQ which corresponds to an up arrow in FIG. 23 for the timer 5085.*i* for a given CPUi. The CPUi local timer IRQ indicates the EE is timed out and is to become a suspended EE. The CPUi local timer IRQ is received by the RTOS scheduler of FIG. 29A. Operations proceed to FIG. 29B.

In FIG. 29B, the RTOS scheduler supplies the hypervisor with a high priority timer Secure FIQ. The hypervisor operating in Monitor mode suspends the previously active EE of FIG. 29A. Any interrupt emanating from the suspended EE is configured as FIQ by muxing in FIG. 13. In Monitor mode, the hypervisor saves the GIC IRQ context by a push to stack operation and also saves the register file context from CPUi for the suspended EE by a PUSH to stack operation, compare TABLE 42.

Examples of conditions when a suspended EE would issue an interrupt request that is transformed or morphed into SFIQ include 1) an EE starts a DMA transfer and then gets de-scheduled/suspended, and the DMA component then issues an interrupt request identified to the EE upon completion. 2) The EE has programmed a timer 5085.*i* that fires an interrupt after the EE is suspended. 3) The EE receives a mailbox interrupt or interprocessor communication IPC coming from another EE, a processor core or block such DSP, IVA, UART, Modem, etc.

Even though the suspended EE is inactive in the sense of not executing software on a CPUi core, the EE nevertheless has the ability to act to issue such interrupt request which reaches hypervisor as SFIQ because resources like DMA, SAD2D, or peripherals attached to the EE have the ability to generate an interrupt on the behalf of or for the EE and because each of these resources has the respective EE=x information provided as MreqDomain to the resource from the corresponding three bit EE entry in the CONTROL_M-REQDOMAIN_EXP1,2, etc. register of FIG. 8A.

Further in FIG. 29B, suppose there exists a second suspended execution domain (shown dotted) with its own FIQ configuration. In Monitor mode, the hypervisor restores the GIC IRQ context pertaining to the second suspended execution domain by a pop from stack operation and also restores the register file context to CPUi for the second suspended EE by a POP from stack operation, compare TABLE 42.

Figure 29E:
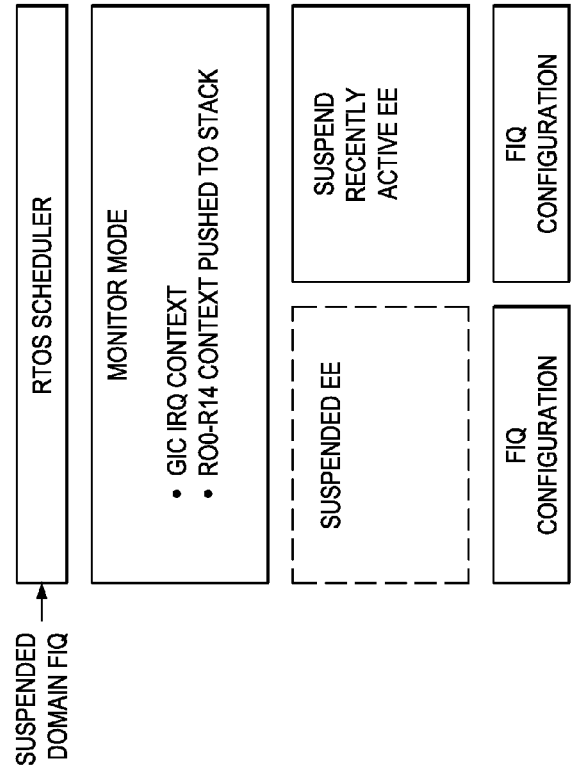
Figure 29C:
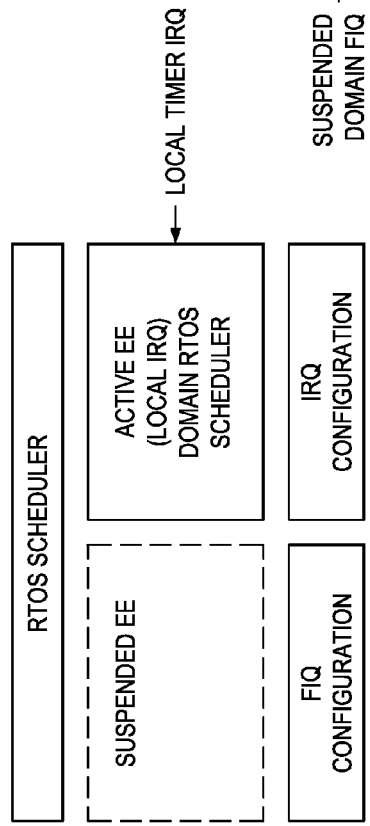

In FIG. 29C, the hypervisor has now activated the second previously suspended execution domain (dotted in FIG. 29B, at right in FIG. 29C, and in the middle in FIG. 29D), to now be an active EE with its interrupts configured as IRQ and not FIQ. Notice, however, that the now-active EE may complete its operations before the next local timer IRQ time-out event for the active EE, in which case the active EE issues a WFI. The WFI is provided to the WFI expansion circuit such as shown in FIG. 12 or FIG. 12A, or otherwise. The WFI is converted to an SFIQ that is trapped into the Monitor mode for hypervisor action. If the WFI does not occur prior to the local timer IRQ, then the RTOS scheduler handles the local timer event as in FIGS. 29A and 29B.

In FIGS. 29A-29E, SSM PSEE/UTIEE FIQ are configured, for example, so that ordinary interrupts nIRQ are dedicated to public world, are maskable in secure world, are not trapped into Monitor mode, and instead are trapped locally in IRQ mode, and Secure mode processes do not use IRQ. Fast interrupts nFIQ are dedicated to secure world, Monitor mode, and suspended execution domains EE. Ordinary interrupts nIRQ are not maskable in some embodiments by software operating in a public mode, but are maskable in and by secure modes and Monitor Mode. Fast interrupts nFIQ are trapped into Monitor Mode. Active execution domains EE do not use FIQ except for WFI FIQ as they go idle. When a PSEE/UTIEE is active (see EE_ACTIVE and UIEE_Active registers), then its interrupts are configured as IRQ (thus trapped in public IRQ mode). When a PSEE/UTIEE is not active (EE not entered in EE_ACTIVE or UIEE_ACTIVE register), then its interrupts are configured as secure FIQ (thus transformed and trapped as an FIQ vector in Monitor Mode). Each time a PSEE/UTIEE is activated, a save PUSH and restore POP of its IRQ context and processor and register file for the context (TABLE 13 register banking) is performed by software, and the save/restore includes the IRQ Mask (MIR register in interrupt handler 2720, or 4280 or 5020). Such context save/restore operations suitably access and use fast RAM such as in block 2744 of FIG. 9B or elsewhere in a suitably secure area of the hardware. FIG. 13 correspondingly shows a change from suspended to not suspended as a mux 5910 operation.

Some embodiments reconfigure the SCR register using selected contents of register SSM_FIQ_EE_y and suspend control circuit 5920 and mux 5910 of FIG. 13 on the basis of which EE has become suspended. When configuring the SCR register in FIG. 13, any IRQ of an inactivated or suspended PSEE/UTIEE becomes a secure FIQ of high priority O and SSM HW (e.g. using the FIG. 12A PR_HIGH priority and PR_MEDIUM priority registers 4222A and 4224A) then differentiates priority between such transformed IRQ and other secure FIQ. Some other embodiments (FIG. 13) are discussed in connection with FIGS. 31-32.

Mux circuit 5910 has inputs for the SCR and a Suspend Control circuit 5920 responsive to the suspended EEs, which are EE other than these EE specified in the EE_Active register of FIG. 12A. Configured original IRQ priority for each inactivated PSEE/UTIEE is kept in the interrupt handler 2720 even if not relevant to the inactivated state, and this simplifies the save and restore process. HW improvements, for example, relate to circuit support of the context switching that occurs with Interrupt Morphing. In the interrupt handler 2720 individual bit masking for FIQ interrupts prevents any race conditions when the morph or transformation actually takes place at the EE context switch points. A circuit change is provided in the SSM for detecting when an EE has finished processing an IRQ interrupt as indicated specifically by when the EE unmasks its global IRQ bit in the CPSR register. In response, the SSM fires an FIQ which the hypervisor can utilize to detect that the first IRQ of an EE actively running in its time slice has been delivered.

For use as in FIG. 29D, the SSM HW implements registers for interrupt priority high PR_High 4222A and interrupt priority medium PR_Medium 4224A in FIG. 12A to store and protect an interrupt certificate (e.g., file preestablished by the system architect representing an interrupt configuration) safely in the SSM HW. In this example, all FIQ are trapped into Monitor Mode, and each PSEE/UIEE that is not activated has its interrupt remapped as a more urgent type of interrupt request (e.g., FIQ) and with an interrupt priority specified by the system architect using registers 4222A and 4224A. Three types of priority shown in FIG. 29D are assignable by configuration for use by the SSM HW: LOW priority wherein each FIQ is masked or not masked at INTH 4280 level by Hypervisor as per interrupt certificate definition. MEDIUM priority means the FIQ is trapped into Monitor mode but does not necessarily cause a PSEE/UIEE context switch (Hypervisor SW decides what to do). HIGH priority means the FIQ is trapped in Monitor Mode and forces PSEE/UIEE context switch. Other embodiments use fewer or more priority registers for fewer or more levels as may be desired.

In FIG. 29D, FIQ sorting as between the different PSEE/UIEE is speeded up on the basis of these assigned priorities in registers 4222A and 4224A of FIG. 12A to facilitate hypervisor determination of what response is appropriate for a given FIQ.

A bank of registers SSM_FIQ_EE_y and PR_HIGH and PR_MEDIUM as described hereinbelow are added to SSM 2460 in order to inform the Hypervisor in Monitor Mode which FIQ belongs to which PSEE/UIEE and if it is of priority LOW, MEDIUM or HIGH.

Thus the configured system properties in that bank of registers specify which FIQ belong to which EE and specify the priority of each particular FIQ that each IRQ becomes when a given PSEE/UIEE becomes inactive (suspended). The configured system properties as a whole do not need to be either modified or saved and restored during UIEE/PSEE switch since they can reflect a static interrupt certificate pre-stored in nonvolatile memory. SSM IRQ context switching involves Secure State Machine SSM_FIQ_EE_y registers that assign FIQ interrupts to corresponding EEs, and thus concurrently, the hypervisor has save and restore access to and control over the contexts of IRQ and other context information stored in fast RAM 2744 of FIG. 9B pertaining to each of the PSEE and UIEE execution environments. When an FIQ occurs, the Hypervisor operating in Monitor mode as well as the information stored in the SSM registers EE_Active, SSM_FIQ_EE_y and SSM_FIQ_HIGH and SSM_FIQ_MEDIUM are together used to determine how to respond to the FIQ determination. The response determination includes 1) deciding whether any switch between execution environments is needed and if so, which execution environments EE are to be involved, and 2) if any security violation has occurred in case the inactivated EE should not be issuing an interrupt request.

Per-EE FIQ tagging in the SSM is accomplished as follows. For 128 interrupts, the corresponding number of bits are provided in a register space SCRx[:] in FIG. 13 that holds public IRQ and FIQ and secure FIQ in the SCR register space. And another corresponding number of interrupt mask bits for each of the interrupts are provided in a Mask Interrupt Register space MIRx[:] in the SCR register space in FIG. 13. Accesses other than secure privilege accesses are not permitted to SCRx to maintain security.

The SSM_FIQ_EE_y registers have a half-byte field (four bits) respective to each interrupt and associating the respective interrupt with one of the (e.g. 8) public EEs or one of up to 8 secure EEs with Monitor Mode as described elsewhere herein. A number n1 of these SSM_FIQ_EE_y registers y=1, 2, ... n1 is provided to accommodate a number M of interrupt lines in the hardware so that n1=4M/32, or first integer greater than or equal to 4M/32. The interrupt indexed i is handled by register y half byte Z where i=32y/4+Z or i=8y+Z. In other embodiments with registers other than 32 bits and interrupt information different from 4-bit (half-byte) then the formula is revised accordingly. The set of 32-bit registers 4222A also designated SSM_FIQ_HIGH has many bit positions signifying any given interrupt number by a bit position in the register set. One or more one (1) bits are entered in the register set at particular bit positions. Configuring a "one" bit at a particular bit position specifies that the interrupt represented by that bit position is high priority due to the "one" bit. Another set of 32-bit registers 4224A also designated SSM_FIQ_MEDIUM has "one" bits inserted therein to analogously specify which FIQ are medium priority. Secure FIQ are directed to the secure environment software or to the hypervisor in Monitor mode.

The number n2 of medium priority registers equals the number n2 of HIGH priority registers and n2 equals first integer greater than or equal to M/32 when the registers are 32 bit registers.

In a numerical example, SSM and interrupt handler INTH circuitry supports N=eight (8) PSEE for use by restore software, and a bank of memory space boundary registers (PHYSICAL_EE_XX_START/END and VIRTUAL_EE_START/END of FIG. 22B) is physically implemented in the SSM. When switching PSEE/UIEE, a restore of these registers is performed. The context switching process saves and restores registers defining physical START and END address boundaries of the respective EEs, and registers defining virtual START and END address boundaries of the respective EEs.

An SSM register SSM_PHYSICAL_EE_DATA has a reconfigurable bit for each of (e.g., N=8) physical memory spaces to indicate whether each physical memory space is data-only or not. An SSM register SSM_VIRTUAL_EE has a reconfigurable bit for each of the (e.g. 8) virtual memory spaces to indicate whether each virtual memory space is data-only or not.

In an interrupt handler INTH with M interrupts, the save and restore involves saving the SCRx registers that hold M interrupt configuration bits, including the MIRx registers that hold the corresponding mask bits. PSEE Interconnect firewall FW region definitions in the SSM are also saved and restored. For fast restore operation, the SSM is suitably implemented with read burst capability on these registers.

An example of an EE WFI OS scheduling process operates so that when software in a PSEE/UIEE/SECURE mode is running and is going to enter the IDLE mode (current task is finished and OS is waiting for re-scheduling or wake up event), that software executes a WFI instruction. When the WFI instruction is executed, the processor CPUi generates an HW signal STANDBYWFI at CPU boundary to signal PRCM 1470/3670. The PRCM starts a specified power saving procedure either as permitted or directed by the hypervisor. The system is independently running several EE that are not aware of each other, and this STANDBYWFI signal is used by the SSM as in FIG. 12 or 12A to generate a WFI FIQ that is treated as a secure fast interrupt request SFIQ and forces an automatic entry to the Monitor Mode hypervisor. The hypervisor operates according to the supervisory programming established for it and is able to activate another PSEE/UIEE in order to run/resume a pending task and perform further processing.

Because of the FIG. 12, FIG. 12A WFI expansion and conversion circuitry and processes described herein, the hypervisor has visibility to the security mode and particular execution environments EE pertaining to the system at any time. The hypervisor software is suitably programmed to respond according to various conditions based on the security mode and execution environments pertaining to the system. The hypervisor software suitably launches system maintenance functions as in FIG. 11 based on such conditions, and the hypervisor can launch any other software in a manner that is responsive to, and intelligently takes account of, the different WFI execution statuses.

For instance, the WFI scheduling of FIG. 12 or 12A now facilitates synchronizing of some resource consuming operations such as security integrity check and memory defragmentation in FIG. 11. This is because the hypervisor has the visibility to determine when the different pertinent OSes in the different execution environments are currently in WFI mode. Thus, launching integrity check or defragmentation would not then interfere with those OSes. Security integrity checks can jeopardize multimedia application performance since they may consume much processing bandwidth. For instance, it is desirable to synchronize or perform integrity checks when UIEE is in WFI mode so that there is no risk of application performance impact in that SMP WFI case wherein all the CPUi are in WFI mode.

Returning to FIG. 29D, two suspended EEs have their FIQ configuration operative and specified by or determined based on SSM registers SSM_FIQ_EE_y, SSM_FIQ_HIGH, and SSM_FIQ_MEDIUM. These EEs have their regular (e.g., IRQ) interrupt context and their register file context respectively pushed to stack. Active EE in FIG. 29D is an active task with its regular IRQ configuration restored to the SCR and MIR registers of FIG. 13, and with its register file context restored to the CPUi that is running the active EE.

Consider an FIQ of an execution domain EE (such as an IRQ-made-FIQ for a suspended EE). Such execution domain FIQ that is of Low priority or Medium priority is suspended by masking such interrupt at GIC level. The interrupt is kept pending but is disabled, and then it will be taken into account for subsequent scheduling.

As shown in FIG. 29D, the execution domain EE that is active at any given time is selected and rotated or switched to by Hypervisor in response to local timer interrupts and the RTOS scheduler. The activation of EEs in succession rotates in accordance with and around a process scheduling timeline in the system as illustrated by the loop in FIG. 29D.

In FIG. 29E, an FIQ from a suspended domain wherein the FIQ has High priority receives a response without any masking of such interrupt at GIC level. For example, a WFI FIQ may be configured in this way. For another example, suppose a peripheral IRQ from a peripheral is configured in register CONTROL_MREQDOMAIN_EXP_y (FIG. 8A) to be a hardware part of an EE the software operation of which is currently suspended on a given CPU. The peripheral IRQ is remapped as an FIQ while the EE is suspended. The peripheral IRQ is routed as an SFIQ with an assigned priority, which in this example is High priority hypothetically. The hypervisor in Monitor mode swiftly responds to the SFIQ from the suspended EE at lower left in FIG. 29E to in turn suspend an active EE by saving the GIC IRQ context and register file R0-R14 context by pushing a stack 5930 (FIG. 13). The suspended domain (dotted in FIG. 29E) which originated the SFIQ is then activated by restoring the GIC IRQ context and register file context applicable to that suspended domain. Operations now go to FIG. 30.

FIG. 30 is analogous to FIG. 29D in format and by contrast shows a transformation process, as the rotation proceeds, of FIQ to a local IRQ in a diagram that represents three operational layers: RTOS scheduler related to monitor mode hypervisor over one or more execution environments or categories, and FIG. 30 has an associated interrupt priority diagram. The Hypervisor in Monitor mode activates software operation in CPUi so that the suspended domain at right which had FIQ configuration in FIG. 29D now becomes fully active. Now the regular interrupts configuration for the newly-activated execution domain EE becomes restored so that some FIQ are IRQ again. At this point, local interrupts for this EE are local IRQ as shown at right in FIG. 30 and EE operations proceed. A local timer interrupt further rotates operations around the loop, or other scheduling timeline, whereupon FIG. 29A is reached again.

Note that incorporated patent application TI-61985 shows Public FIQ support by HLOS and an associated Public FIQ preemptive masking mechanism (of block 2715 in FIG. 13). Some embodiments herein are configured to have no Public FIQ and so the Public FIQ preemptive masking mechanism is less operative in such configuration are more operative in a configuration or embodiment involving Public FIQ. Accordingly, this hardware block 2715 is usefully provided with the other SSM hardware taught herein.

Figure 31:
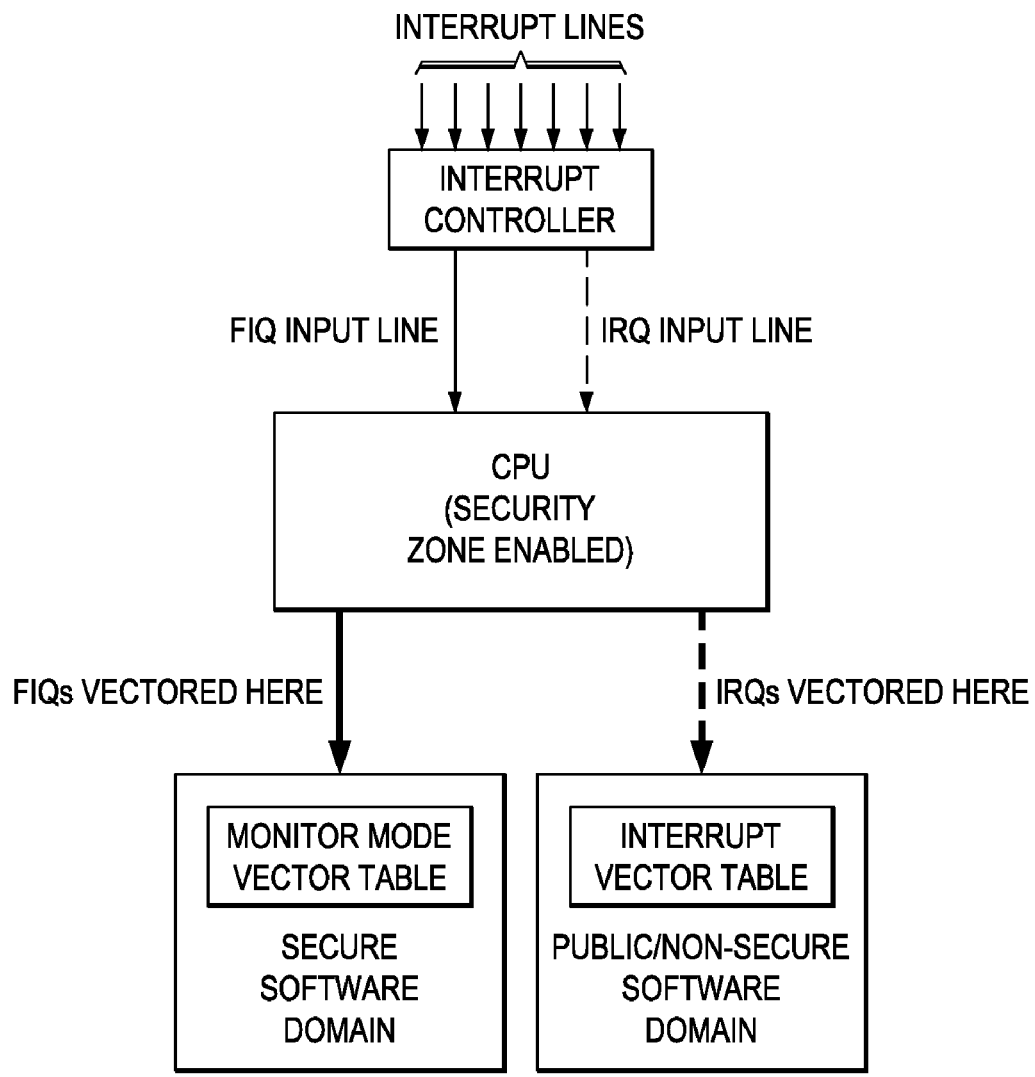
FIG. 31 is a block diagram of an inventive architecture wherein each of many system interrupt lines are each directed to IRQ or FIQ input lines of a CPU depending on active or suspended state of an execution environment, and hardware vectored to two different vector tables.
Figure 32:
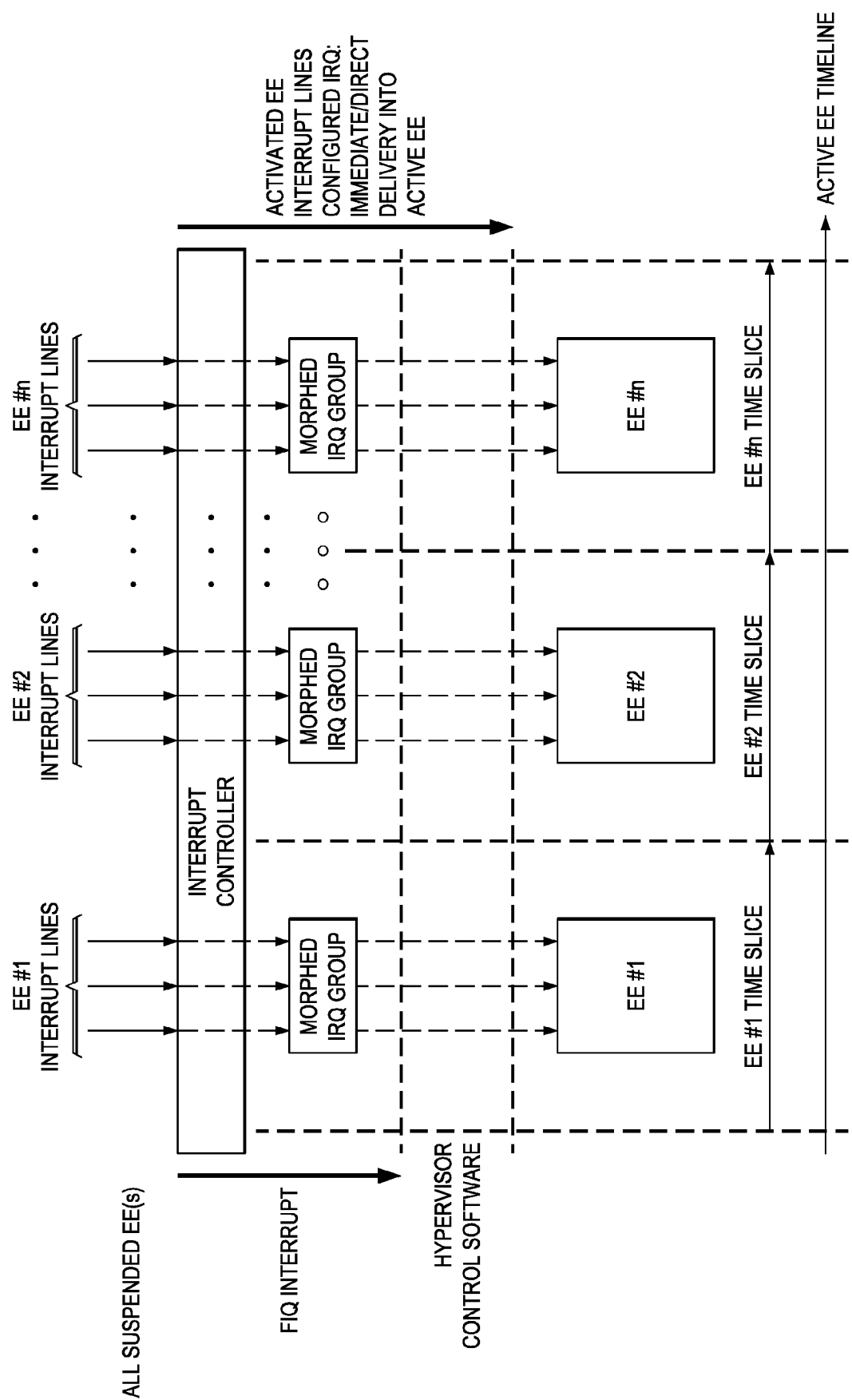
FIG. 32 is a timeline of inventive operations in interrupt controller hardware and CPU software showing different active execution environments in their successive time slices and with their interrupt lines dynamically routed as IRQ for the active execution environments while suspended execution environments (not shown) are routed as FIQ to the hypervisor.

FIGS. 31 and 32 show numerous system interrupt lines coupled to an interrupt controller. In FIG. 32, the interrupt lines are allocated and identified to their EEs in accordance with or determined from the contents of register SSM_FIQ_EE_y of FIG. 13. In FIG. 31, the interrupt controller routes any interrupt present on any of the interrupt lines allocated to an active EE to an IRQ input line to a CPU. An interrupt on any of the interrupt lines for a suspended EE is routed instead (subject to prioritization and masking) to an FIQ input of a CPU for hypervisor action. The CPU in FIG. 31 responds to an IRQ by vectoring the IRQ to a public interrupt vector table and responds to an FIQ by vectoring the FIQ to a secure Monitor mode vector table instead.

In FIG. 32, hypervisor control software successively suspends a current EE and activates a succeeding EE. Thus, successive time slices in FIG. 32 have a succession of different, currently active EEs. Correspondingly in the hardware, the FIQ interrupt configuration of the interrupt lines successively changes or morphs so that the interrupt handler is ready to deliver an FIQ in response to any interrupt on any of the lines allocated to the current set of suspended EEs. Also, the IRQ configuration dynamically changes to correspond to the latest currently active EE so that the interrupt handler is ready to deliver an IRQ in response to any interrupt on any of the lines allocated to that latest currently active EE. Thus some embodiments dynamically modulate each or all interrupt line configurations and interrupt priorities configurations at every context switch of the hypervisor to achieve the result wherein the SSM, interrupt handler and CPU(s) can deliver the majority of the interrupts as IRQ directly to the different execution environments that each of those interrupt sources is exclusively bound to via the interrupt line allocation and the interrupt configuration at any moment. Hardware in some embodiments substantially and intelligently diminishes the number of interrupts for which the hypervisor is specifically involved, and in this way significantly reduces cycles expended by the hypervisor for handling of interrupts. The hardware is then allowed in a controlled way to perform the direct dispensation of an interrupt to the EE where the interrupt is actually handled. Thus the overall interrupt delivery overhead, in a hypervisor environment, is made very streamlined and efficient.

In one type of embodiment for routing interrupts to IRQ and FIQ respectively, the interrupt handler 2720 has the SCR register configured with at least one bit for each interrupt line and representing whether that interrupt line is to be routed to IRQ or FIQ depending on whether the bit is active or inactive. A set of 1:2 Demuxes 5940 in FIG. 13 do the routing in response to selector control lines from each bit of the SCR register thus configured. When the SSM hypervisor enable HYP_EN in FIG. 13 (HYPERVISOR_EN in FIGS. 12A, 12B) is active however, the SCR register control over Demuxes 5940 is overridden by bit contents of a substitute register 5925 loaded by suspend control circuit 5920. Suspend control circuit 5920 has a set of comparators to determine match and non-match conditions as between the active EE represented in a register EE_Active and each EE per interrupt line represented in each bit field of the register SSM_FIQ_EE_y in the SSM. The per interrupt line match and non-match determinations constitute a dynamically determined routing representation. On each context switch to a new currently-active EE, the hypervisor revises the entry in the register EE_Active and the suspend control circuit 5920 updates the register 5925, whereupon the selector controls to the Demuxes 5940 are updated.

In a second type of embodiment for routing interrupts to IRQ and FIQ respectively, the interrupt handler 2720 has the SCR register configured with at least one bit for each interrupt line and representing whether that interrupt line is to be routed to IRQ or FIQ depending on whether the bit is active or inactive. The set of 1:2 Demuxes 5940 do the routing in response to selector control lines from each bit of the SCR register thus configured. When the SSM hypervisor enable HYP_EN is active however, the SCR register control over Demuxes 5940 is overridden by bit contents of a substitute register 5925 loaded by hypervisor with 128 bits from a small memory addressed by the by the bit field in register EE_active. The override is suitably accomplished by a 2×128:1×128 mux like 5910 having a first 128 bit input coupled to register 5925 and a second 128 bit input coupled to the SCR and a 128 bit output coupled to the selector controls of the Demuxes 5940. For instance, if the EE represented by the value decimal five (0101 binary) is the newly activated EE then the small memory is accessed by asserting an address 0101, and 128 bits are read out in parallel as a routing representation and delivered to register 5925 to control the Demuxes 5940. In various implementations, the memory and logic circuitry are suitably minimized using design technique to use real estate economically.

In a third type of embodiment for routing interrupts to IRQ and FIQ respectively, the interrupt handler 2720 has the SCR register configured with at least one bit for each interrupt line and representing whether that interrupt line is to be routed to IRQ or FIQ depending on whether the bit is active or inactive. The set of 1:2 Demuxes 5940 do the routing in response to selector control lines from each bit of the SCR register thus configured. When the SSM hypervisor enable HYP_EN is active however, the SCR register control over Demuxes 5940 is overridden by pushing the SCR register contents to a stack 5930 and loading the SCR register a with the IRQ/FIQ selector control bits as a routing representation for routing each interrupt line and as generated by circuitry in the suspend control circuit 5920. Register 5925 is omitted. Some embodiments use a FIFO or circular buffer instead of the stack to hold the SCR bits for the various EEs when they are activated in a regular repetitive order.

In a fourth type of embodiment for routing interrupts to IRQ and FIQ respectively, the interrupt handler 2720 has the SCR register configured with at least one bit for each interrupt line and representing whether that interrupt line is to be routed to IRQ or FIQ depending on whether the bit is active or inactive. The set of 1:2 Demuxes 5940 do the routing in response to selector control lines from each bit of the SCR register thus configured. When the SSM hypervisor enable HYP_EN is inactive, the SCR register is configured by loading it from a backup SCR register in FIG. 13 control module 2765 that itself was preconfigured at boot time. The contents of the backup SCR register are coupled to the SCR register in interrupt handler 2720 via the mux 5910 in FIG. 13. When the SSM hypervisor enable HYP_EN is active however, the SCR register is instead loaded with a routing representation from suspend control 5920 via a second input of the mux 5910.

In a fifth type of alternative embodiment for routing interrupts to IRQ and FIQ respectively, the suspend control 5920 is a small dedicated processor with secure firmware that computes the comparisons of the bits in register EE_Active with corresponding bit field in the register SSM_FIQ_EE_y in the SSM for each interrupt line. An additional configuration register coupled to the small dedicated processor and suspend control 5920 holds the order of activation of the EEs in a scheduling timeline or loop of FIG. 30. The dedicated processor proactively generates the latest contents for the register 5925 for the EE to be activated next. The dedicated processor operates at a slow speed with very low power consumption during each time slice of FIG. 32 when the currently active EE is running so that the processor generates contents as a routing representation to then be immediately loaded, at the moment of the context switch point, into register 5925 for the EE to be activated next.

Thus, any of many different embodiments can be employed by the skilled worker for controlling the routing of the interrupts on an EE specific and CPU-specific basis. With the interrupt morphing approach the interrupt line routing is reconfigured on every context switch or dispatch of an EE. The interrupt morphing structure and process is autonomous in that it does not require user intervention and adjusts and adapts the interrupt delivery system on-the-fly in real time at run-time. Initial and overall configuration for such interrupt morphing service is established via startup boot structures built and signed statically by the manufacturer or system integration customer outside of the target system, and then relocated to the target system for the signed and secured configuration thereof.

Various embodiments are used with one or more microprocessors, such as the processor CPUi cores, and each microprocessor may have a pipeline and be selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other micro-control blocks using any one or more of the foregoing.

Various embodiments are implemented in any integrated circuit manufacturing process such as different types of CMOS (complementary metal oxide semiconductor), SOI (silicon on insulator), SiGe (silicon germanium), organic transistors, and with various types of transistors such as single-gate and multiple-gate (MUGFET) field effect transistors, and with single-electron transistors and other structures. Photonic integrated circuit blocks, components, and interconnects are also suitably applied in various embodiments.

ASPECTS (See explanatory notes at end of this section)

1A. The electronic interrupt circuit claimed in claim 1 further comprising an interrupt handler circuit having interrupt request inputs coupled to said plural interrupt-related output lines.

1B. The electronic interrupt circuit claimed in claim 1 further comprising a processor having an interrupt-related output coupled to said interrupt-related input line.

1C. The electronic interrupt circuit claimed in claim 1B wherein said processor has a security status output coupled to said security status input line.

1D. The electronic interrupt circuit claimed in claim 1B further comprising a register coupled to said processor and to said context-related status input line.

1E. The electronic interrupt circuit claimed in claim 1 wherein said interrupt-related input line is a wait for interrupt line.

1F. The electronic interrupt circuit claimed in claim 1 wherein said plural interrupt-related output lines include a public nonvirtual interrupt output line, a secure nonvirtual interrupt output line, a public virtual interrupt output line, and a secure virtual interrupt output line.

1G. The electronic interrupt circuit claimed in claim 1 wherein said conversion circuit includes an interrupt enabling register and an interrupt-generating circuit, responsive to said interrupt enabling register and to each of said plural interrupt-related output lines, to selectively generate at least one interrupt.

14A. The electronic power management system claimed in claim 14 further comprising a modem coupled to at least one of said processors.

18A. The electronic power management system claimed in claim 18 wherein said second processor is operable to reconfigure said power control circuit for a different clock rate for said third processor.

20A. The processor system claimed in claim 20 wherein said wait for interrupt expansion circuit is responsive to provide the interrupt signal to a different one of the interrupt inputs depending on which security and context-related modes of a given one of the processors pertain to a wait for interrupt signal therefrom.

20B. The processor system claimed in claim 20 further comprising a register, and wherein said wait for interrupt expansion circuit is responsive to the at least one wait for interrupt output to supply a selected portion of said register with a signal representing which of the security and context-related modes of a given one of said processors pertains to a wait for interrupt signal therefrom, said register coupled to at least one of said processors.

20C. The processor system claimed in claim 20 wherein each processor having a category that issues the wait for interrupt signal is in a wait for interrupt mode relative to that category until interrupted, and the maintenance function includes an integrity check of a public category, and at least one of said processor cores is operable to launch the integrity check of the public category on that processor core provided an enabling condition exists that the public category is in the wait for interrupt mode.

20D. The processor system claimed in claim 20 further comprising a memory and a direct memory access (DMA) process operable in a public category, wherein each processor having a category that issues the wait for interrupt signal is in a wait for interrupt mode relative to that category until interrupted, and the maintenance function includes memory integrity check, and at least one of said processor cores is operable to launch the memory integrity check provided an enabling condition exists that the public category for the DMA process is in the wait for interrupt mode.

20E. The processor system claimed in claim 20 further comprising a cellular telephone modem coupled to at least one of said processor cores.

20F. The processor system claimed in claim 20 further comprising a digital video broadcast receiving circuit coupled to at least one of said processor cores.

20G. The processor system claimed in claim 20 further comprising a digital camera coupled to at least one of said processor cores.

25A. The method claimed in claim 25 wherein the electronic circuit has at least three processors operable to run applications and wherein the method further includes operating the second processor to respond to at least one interrupt signal to transfer at least one application from the first processor onto at least a third processor.

25B. The method claimed in claim 25A including configuring a power control circuit to put the first processor into a lower voltage state after the transfer.

30A. The telecommunications apparatus claimed in claim 30 wherein said apparatus further comprises a handset enclosure and a power control circuit operable to configurably adjust supply voltages and clock rates for said processor cores, and at least one of said processor cores operable to configure said power control circuit in response to said at least one interrupt signal from said wait for interrupt expansion circuit.

30B. The telecommunications apparatus claimed in claim 30 wherein said processing system is operable to execute an application associated with a said execution environment and to execute a maintenance function that would interfere with the application if concurrently executed, and at least one of said processor cores operable in response to said at least one interrupt signal from said wait for interrupt expansion circuit to schedule the maintenance function separate in time from execution of the application.

30C. The telecommunications apparatus claimed in claim 30 wherein at least three of said execution environments are each selected from the group consisting of: 1) modem, 2) secure environment, 3) router, 4) multimedia, 5) gaming, 6) symmetric multiprocessing (SMP).

30D. The telecommunications apparatus claimed in claim 30 further comprising a digital video broadcasting reception module coupled to said processing system.

Notes: Aspects are paragraphs which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

References to "monitor mode" refer to a high-level control mode of a processor and should be understood in a broad and substantial sense whether or not a particular processor that substantially has a monitor mode lacks the explicit name monitor mode, for instance.

It is emphasized here that while some embodiments may have an entire feature totally absent or totally present, other embodiments, such as those performing the blocks and steps of the Figures of drawing, have more or less complex arrangements that execute some process portions, selectively bypass others, and have some operations running concurrently sequentially regardless. Accordingly, words such as "enable," "disable," "operative," "inoperative" are to be interpreted relative to the code and circuitry they describe. For instance, disabling (or making inoperative) a second function by bypassing a first function can establish the first function and modify the second function. Conversely, making a first function inoperative includes embodiments where a portion of the first function is bypassed or modified as well as embodiments where the second function is removed entirely. Bypassing or modifying code increases function in some embodiments and decreases function in other embodiments.

A few preferred embodiments have been described in detail hereinabove. It is to be understood that the scope of the invention comprehends embodiments different from those described yet within the inventive scope. Processing circuitry comprehends digital, analog and mixed signal (digital/analog) integrated circuits, ASIC circuits, PALs, PLAs, decoders, memories, non-software based processors, microcontrollers and other circuitry, and digital computers including microprocessors and microcomputers of any architecture, or combinations thereof. Internal and external couplings and connections can be ohmic, capacitive, inductive, photonic, and direct or indirect via intervening circuits or otherwise as desirable. Implementation is contemplated in discrete components or fully integrated circuits in any materials family and combinations thereof. Various embodiments of the invention employ hardware, software or firmware. Block diagrams herein are also representative of flow diagrams for operations of any embodiments whether of hardware, software, or firmware, and processes of manufacture thereof. Process diagrams herein are also representative of structure of any embodiments and processes of operation and manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in the detailed description and/or the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. An electronic interrupt circuit comprising:
   an interrupt-related input line;
   a security-related status input line;
   a context-related status input line;
   a conversion circuit having plural interrupt-related output lines and selectively operable in response to an interrupt-related signal on said interrupt-related input line depending on an active or inactive status of each of said security-related status input line and said context-related status input line; and
   a plurality of enable lines and a logic circuitry having a first set of inputs respectively coupled to the plurality of enable lines and a second set of inputs respectively coupled to said plural interrupt-related output lines.

2. The electronic interrupt circuit claimed in claim 1 wherein said logic circuitry supplies a one-line logic output responsive to both said first set of inputs and said second set of inputs.

3. The electronic interrupt circuit claimed in claim 2 further comprising a reporting register bit coupled to receive said one-line logic output from said logic circuitry.

4. The electronic interrupt circuit claimed in claim 3 further comprising a coupling circuit having an input connected to said one-line logic output from said logic circuitry, said coupling circuit having an interrupt output line.

5. The electronic interrupt circuit claimed in claim 1 wherein said logic circuitry has a set of output lines and includes plural logic gate circuits, each having a first input connected to one of the enable lines and a second input connected to one of the interrupt-related output lines, the logic gate circuits each having an output line forming a different one of the set of output lines of the logic circuitry.

6. The electronic interrupt circuit claimed in claim 5 further comprising a reporting register having a bit field coupled to receive each said output line from said logic gate circuits.

7. The electronic interrupt circuit claimed in claim 1 further comprising an interrupt handler circuit having interrupt request inputs coupled to said plural interrupt-related output lines.

8. The electronic interrupt circuit claimed in claim 1 further comprising a processor having an interrupt-related output coupled to said interrupt-related input line.

9. The electronic interrupt circuit claimed in claim 8 wherein said processor has a security status output coupled to said security status input line.

10. The electronic interrupt circuit claimed in claim 8 further comprising a register coupled to said processor and to said context-related status input line.

11. The electronic interrupt circuit claimed in claim 1 wherein said interrupt-related input line is a wait for interrupt line.

12. The electronic interrupt circuit claimed in claim 1 wherein said conversion circuit includes an interrupt enabling register and an interrupt-generating circuit, responsive to said interrupt enabling register and to each of said plural interrupt-related output lines, to selectively generate at least one interrupt.

13. An electronic interrupt circuit comprising:
   an interrupt-related input line;
   a security-related status input line;
   a context-related status input line;
   a conversion circuit having plural interrupt-related output lines and selectively operable in response to an interrupt-related signal on said interrupt-related input line depending on an active or inactive status of each of said security-related status input line and said context-related status input line; and
   register having a bit field for holding bits related to the state of activity of said plural interrupt-related output lines, a processor circuit, and an interrupt handler circuit coupling said plural interrupt-related output lines to said processor circuit, and said register is coupled separately to said processor circuit.

14. A process of manufacturing an electronic product, the process comprising:
   preparing in integrated circuitry form an interrupt-related input line, a security related status input line, a virtual context-related status input line and a conversion circuit having plural interrupt-related output lines and selectively operable in response to an interrupt-related signal on said interrupt-related input line depending on an active or inactive status of each of said security-related status input line and said context-related status input line, wherein said plural interrupt-related output lines include a public nonvirtual interrupt output line, a secure nonvirtual interrupt output line, a public virtual interrupt output line, and a secure virtual interrupt output line.

15. An electronic interrupt circuit comprising:
   an interrupt-related input line;
   a security-related status input line;
   a context-related status input line;
   a conversion circuit having plural interrupt-related output lines and selectively operable in response to an interrupt-related signal on said interrupt-related input line depending on an active or inactive status of each of said security-related status input line and said context-related status input line; and
   wherein said plural interrupt-related output lines include a public nonvirtual interrupt output line, a secure nonvirtual interrupt output line, a public virtual interrupt output line, and a secure virtual interrupt output line.

* * * * *